US012759424B2

(12) United States Patent
Murakami et al.

(10) Patent No.: US 12,759,424 B2
(45) **Date of Patent: *Oct. 13, 2026**

(54) COMMUNICATION SYSTEM AND COMMUNICATION METHOD

(71) Applicant: Panasonic Intellectual Property Corporation of America, Torrance, CA (US)

(72) Inventors: Yutaka Murakami, Kanagawa (JP); Nobuhiko Hashida, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/918,393

(22) Filed: Oct. 17, 2024

(65) Prior Publication Data

US 2025/0038787 A1 Jan. 30, 2025

Related U.S. Application Data

(63) Continuation of application No. 18/143,687, filed on May 5, 2023, now Pat. No. 12,126,398, which is a (Continued)

(30) Foreign Application Priority Data

Oct. 26, 2017 (JP) ................................ 2017-207345

(51) Int. Cl.
*B60L 53/67* (2019.01)
*B60L 53/12* (2019.01)
(Continued)

(52) U.S. Cl.
CPC ............... *B60L 53/67* (2019.02); *B60L 53/12* (2019.02); *B60L 53/305* (2019.02); *B60L 53/66* (2019.02);
(Continued)

(58) Field of Classification Search
CPC ... H04B 3/54; H02J 50/80; H02J 50/10; H02J 7/00032; H02J 7/0042; H02J 7/02;
(Continued)

(56) References Cited

U.S. PATENT DOCUMENTS 7,047,278 B2 * 5/2006 Miyazawa ............. H04L 29/06 370/229
7,817,551 B2 * 10/2010 Ido .......................... H04L 47/29 370/235
(Continued)

FOREIGN PATENT DOCUMENTS

JP 2002-320259 10/2002
JP 2008-288889 11/2008
(Continued)

OTHER PUBLICATIONS

Extended European Search Report issued Jul. 13, 2020 in corresponding European Patent Application No. 18869813.8.
(Continued)

*Primary Examiner* — Freshteh N Aghdam
(74) *Attorney, Agent, or Firm* — Wenderoth, Lind & Ponack, L.L.P.

(57) ABSTRACT

A communication system includes one or more chargers and a server capable of communicating with the one or more chargers. The server obtains first information from a first vehicle via a first charger included in the one or more chargers, during charging of the first vehicle by the first charger, and supplies second information based on the first information to a second vehicle via a second charger included in the one or more chargers, during charging of the second vehicle by the second charger.

8 Claims, 73 Drawing Sheets

Related U.S. Application Data continuation of application No. 17/711,321, filed on Apr. 1, 2022, now Pat. No. 11,683,069, which is a continuation of application No. 17/333,334, filed on May 28, 2021, now Pat. No. 11,323,151, which is a continuation of application No. 16/856,710, filed on Apr. 23, 2020, now Pat. No. 11,057,075, which is a continuation of application No. PCT/JP2018/039417, filed on Oct. 24, 2018.

(51) Int. Cl.

| | |
|---|---|
| ***B60L 53/30*** | (2019.01) |
| ***B60L 53/66*** | (2019.01) |
| ***H02J 7/02*** | (2016.01) |
| ***H02J 7/40*** | (2026.01) |
| ***H02J 7/70*** | (2026.01) |
| ***H02J 50/10*** | (2016.01) |
| ***H02J 50/80*** | (2016.01) |
| ***H04B 3/54*** | (2006.01) |
| ***H04L 67/12*** | (2022.01) |

(52) U.S. Cl.

CPC .................. *H02J 7/02* (2013.01); *H02J 7/40* (2026.01); *H02J 7/70* (2026.01); *H02J 50/10* (2016.02); *H02J 50/80* (2016.02); *H04B 3/54* (2013.01); *H04L 67/12* (2013.01)

(58) Field of Classification Search

CPC ........ B60L 53/12; B60L 53/66; B60L 53/305; H04L 67/42

See application file for complete search history.

(56) References Cited

U.S. PATENT DOCUMENTS

| | | | | |
|---|---|---|---|---|
| 9,294,402 | B2 | 3/2016 | Yamaguchi et al. | |
| 9,623,762 | B2 | 4/2017 | Park | |
| 9,851,213 | B2 | 12/2017 | Oh | |
| 2004/0245473 | A1 | 12/2004 | Takayama et al. | |
| 2005/0058149 | A1 | 3/2005 | Howe | |
| 2009/0096410 | A1 | 4/2009 | Sakurai | |
| 2012/0220239 | A1 | 8/2012 | Hosoya et al. | |
| 2013/0141043 | A1 | 6/2013 | Rossi | |
| 2014/0059222 | A1* | 2/2014 | Short | H04L 65/1069 709/225 |
| 2014/0137194 | A1* | 5/2014 | Nagasaki | G06F 3/1292 726/3 |
| 2014/0207498 | A1 | 7/2014 | Cho | |
| 2015/0042278 | A1 | 2/2015 | Leary | |
| 2015/0102775 | A1 | 4/2015 | Von Novak, III et al. | |
| 2015/0244496 | A1 | 8/2015 | Goto et al. | |
| 2015/0288067 | A1 | 10/2015 | Kwon | |
| 2016/0173394 | A1* | 6/2016 | Harvell | H04L 47/25 709/203 |
| 2017/0013031 | A1* | 1/2017 | Kweon | H04L 41/0896 |
| 2017/0230472 | A1* | 8/2017 | Hasegawa | H04L 67/42 |
| 2018/0007701 | A1* | 1/2018 | Adachi | H04W 74/04 |
| 2018/0224909 | A1 | 8/2018 | Koo | |
| 2019/0297137 | A1* | 9/2019 | Richardson | H04L 67/101 |

FOREIGN PATENT DOCUMENTS

| | | |
|---|---|---|
| JP | 2009-182380 | 8/2009 |
| JP | 2014-039127 | 2/2014 |
| JP | 2014-099890 | 5/2014 |
| JP | 2014-154092 | 8/2014 |
| WO | 2004/025805 | 1/2006 |
| WO | 2011/055536 | 5/2011 |

OTHER PUBLICATIONS

International Search Report issued Dec. 11, 2018 in International (PCT) Application No. PCT/JP2018/039417.

The extended European Search Report dated Oct. 5, 2021 in European patent application No. 21187119.9.

* cited by examiner

COMMUNICATION SYSTEM AND COMMUNICATION METHOD

CROSS REFERENCE TO RELATED APPLICATIONS

This application is a continuation of U.S. application Ser. No. 18/143,687 filed May 5, 2023, which is a continuation of U.S. application Ser. No. 17/711,321, filed Apr. 1, 2022, now U.S. Pat. No. 11,683,069, which is a continuation of U.S. application Ser. No. 17/333,334, filed May 28, 2021, now U.S. Pat. No. 11,323,151, which is a continuation of U.S. application Ser. No. 16/856,710, filed Apr. 23, 2020, now U.S. Pat. No. 11,057,075, which is a continuation of PCT International Patent Application Number PCT/JP2018/039417 filed on Oct. 24, 2018, claiming the benefit of priority of Japanese Patent Application Number 2017-207345 filed on Oct. 26, 2017, the entire contents of which are hereby incorporated by reference.

BACKGROUND

1. Technical Field

The present disclosure relates to a communication system and a communication method.

2. Description of the Related Art

A conventional example of a communication method performed using a plurality of antennas is a communication method called multiple-input multiple-output (MIMO). In multi-antenna communication typified by MIMO, data reception quality and/or a data communication rate (per unit time) can be enhanced by modulating transmission data of a plurality of streams and simultaneously transmitting modulated signals from different antennas using the same frequency (common frequency).

Furthermore, in such multi-antenna communication, an antenna having a quasi-omni pattern which allows a transmitting device to have a substantially constant antenna gain in various directions in a space may be used when multicast/broadcast communication is performed. For example, WO2011/055536 discloses that a transmitting device transmits a modulated signal using an antenna having a quasi-omni pattern.

SUMMARY

There is a demand for further improvement in performance of the overall system and support for new forms of services, when a communication method, exemplified by a communication method performed using a plurality of antennas, is used.

A communication system according to one aspect of the present disclosure includes one or more chargers and a server capable of communicating with the one or more chargers. The server obtains first information from a first vehicle via a first charger included in the one or more chargers, during charging of the first vehicle by the first charger, and supplies second information based on the first information to a second vehicle via a second charger included in the one or more chargers, during charging of the second vehicle by the second charger.

The present disclosure makes it possible to facilitate the improvement in performance of a communication system and support for new forms of services.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

DETAILED DESCRIPTION OF THE EMBODIMENTS

Embodiment 1

Figure 1:
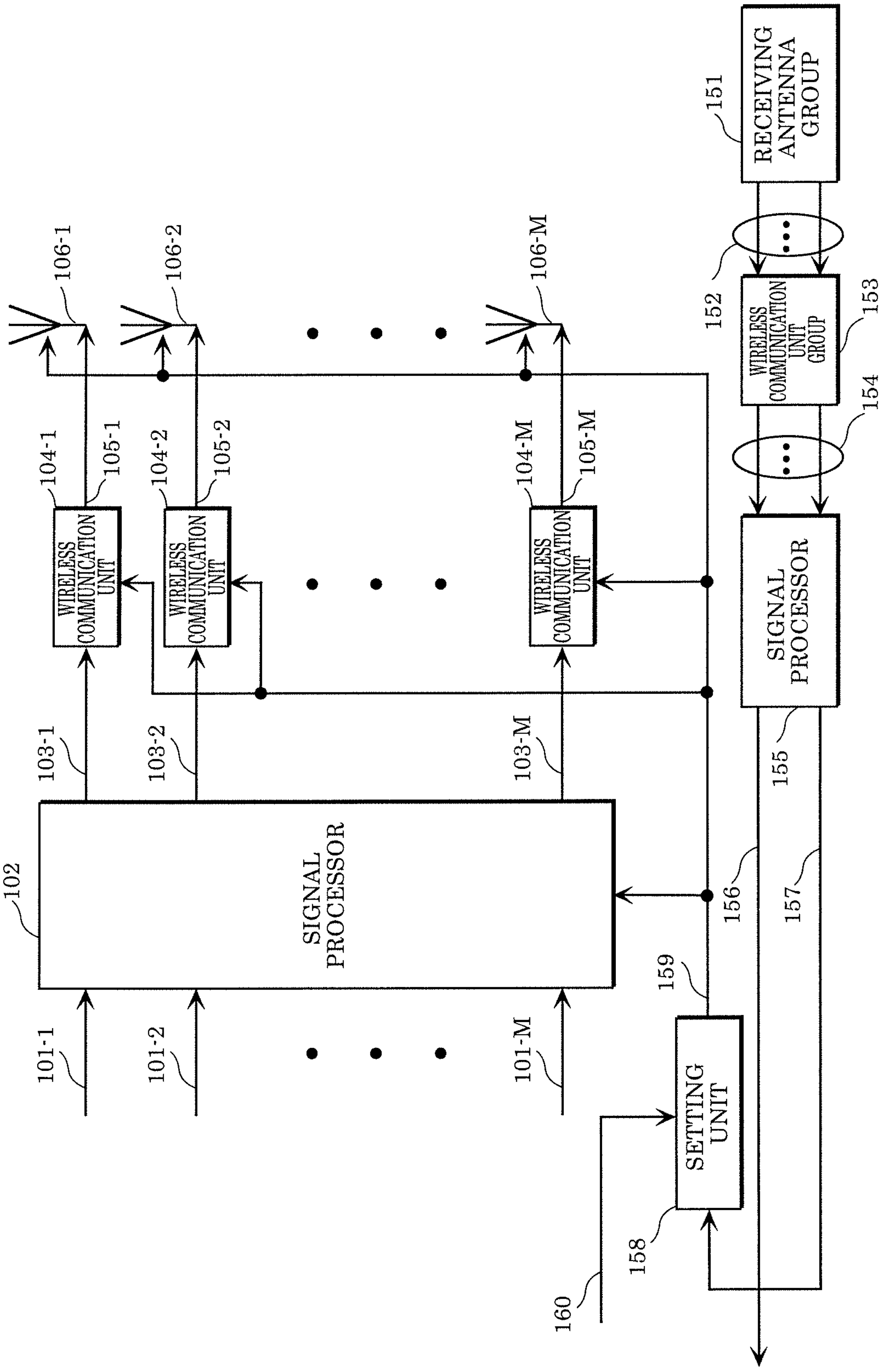
FIG. 1 is a diagram illustrating an example of a configuration of a base station.

FIG. 1 illustrates an example of a configuration of a base station (or an access point, for instance) in the present embodiment.

101-1 denotes #1 information, 101-2 denotes #2 information, . . . , and 101-M denotes #M information. 101-*i* denotes #i information, where i is an integer of 1 or greater and M or smaller. Note that M is an integer greater than or equal to 2. Note that not all the information items from #1 information to #M information are necessarily present.

Signal processor 102 receives inputs of #1 information 101-1, #2 information 101-2, . . . , #M information 101-M, and control signal 159. Signal processor 102 performs signal processing based on information included in control signal 159 such as "information on a method of error correction coding (a coding rate, a code length (block length))", "information on a modulation method", "information on precoding", "a transmitting method (multiplexing method)", "whether to perform transmission for multicasting or transmission for unicasting (transmission for multicasting and transmission for unicasting may be carried out simultaneously)", "the number of transmission streams when multicasting is performed", and "a transmitting method performed when transmitting a modulated signal for multicasting (this point will be later described in detail)", and outputs signal 103-1 obtained as a result of the signal processing, signal 103-2 obtained as a result of the signal processing, . . . , and signal 103-M obtained as a result of the signal processing, that is, signal 103-*i* obtained as a result of the signal processing. Note that not all the signals from signal #1 obtained as a result of the signal processing to signal #M obtained as a result of the signal processing are necessarily present. At this time, signal processor 102 performs error correction coding on #i information 101-*i*, and thereafter maps resultant information according to a modulation method which has been set, thus obtaining a baseband signal.

Signal processor 102 collects baseband signals corresponding to information items, and precodes the baseband signals. For example, orthogonal frequency division multiplexing (OFDM) may be applied.

Wireless communication unit 104-1 receives inputs of signal 103-1 obtained as a result of the signal processing and control signal 159. Wireless communication unit 104-1 performs processing such as band limiting, frequency conversion, and amplification, based on control signal 159, and outputs transmission signal 105-1. Then, transmission signal 105-1 is output as a radio wave from antenna unit 106-1.

Similarly, wireless communication unit 104-2 receives inputs of signal 103-2 obtained as a result of the signal processing and control signal 159. Wireless communication unit 104-2 performs processing such as band limiting, frequency conversion, and amplification, based on control signal 159, and outputs transmission signal 105-2. Then, transmission signal 105-2 is output as a radio wave from antenna unit 106-2. A description of wireless communication unit 104-3 to wireless communication unit 104-(M−1) is omitted.

Wireless communication unit 104-M receives inputs of signal 103-M obtained as a result of the signal processing and control signal 159. Wireless communication unit 104-M performs processing such as band limiting, frequency conversion, and amplification, based on control signal 159, and outputs transmission signal 105-M. Then, transmission signal 105-M is output as a radio wave from antenna unit 106-M.

Note that the wireless communication units may not perform the above processing when a signal obtained as a result of the signal processing is not present.

Wireless communication unit group 153 receives inputs of received signal group 152 received by receiving antenna group 151. Wireless communication unit group 153 performs processing such as frequency conversion and outputs baseband signal group 154.

Signal processor 155 receives an input of baseband signal group 154, and performs demodulation and error correction decoding, and thus also performs processing such as time synchronization, frequency synchronization, and channel estimation. At this time, signal processor 155 receives modulated signals transmitted by one or more terminals and performs processing, and thus obtains data transmitted by the one or more terminals and control information transmitted by the one or more terminals. Accordingly, signal processor 155 outputs data group 156 corresponding to the one or more terminals, and control information group 157 corresponding to the one or more terminals.

Setting unit 158 receives inputs of control information group 157 and setting signal 160. Setting unit 158 determines, based on control information group 157, "a method of error correction coding (a coding rate, a code length (block length))", "a modulation method", "a precoding method", "a transmitting method", "antenna settings", "whether to perform transmission for multicasting or transmission for unicasting (transmission for multicasting and transmission for unicasting may be carried out simultaneously)", "the number of transmission streams when multicasting is performed", and "a transmitting method performed when transmitting a modulated signal for multicasting", for instance, and outputs control signal 159 that includes such information items determined.

Antenna units 106-1, 106-2, . . . , and 106-M each receive an input of control signal 159. The operation at this time is to be described with reference to FIG. 2.

Figure 2:
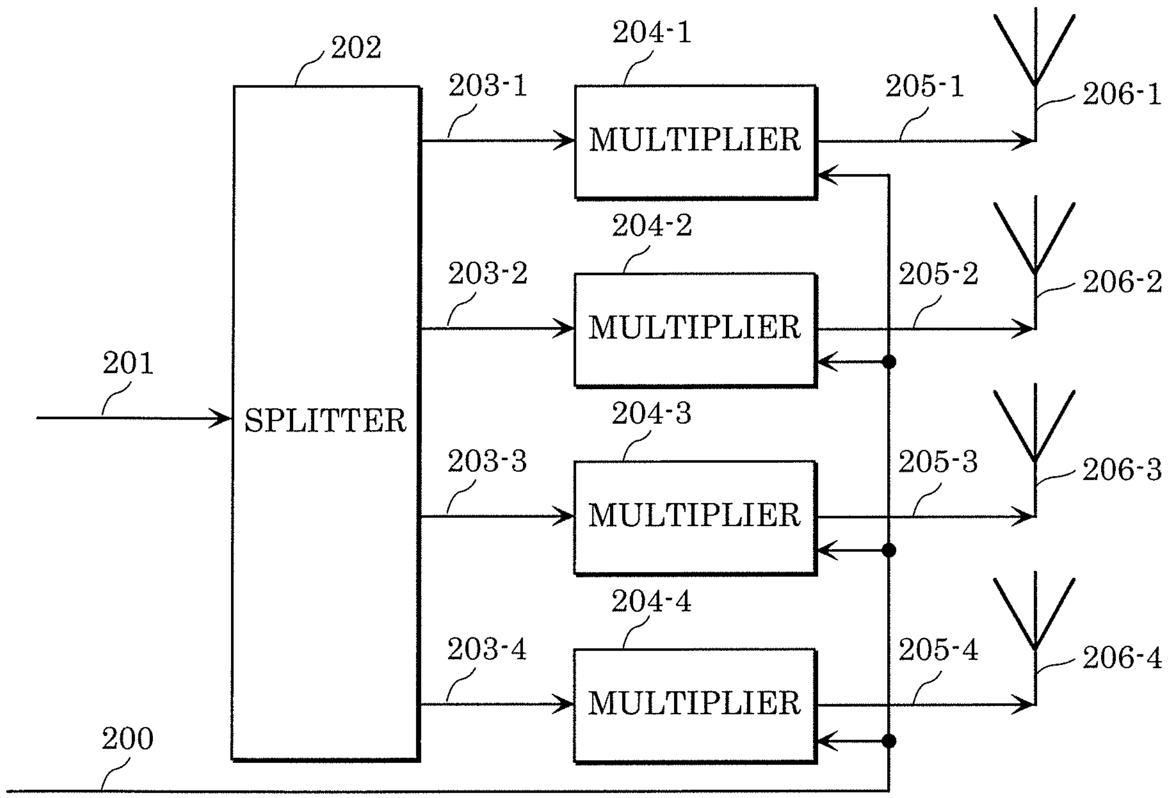
FIG. 2 is a diagram illustrating an example of a configuration of an antenna unit of the base station.

FIG. 2 illustrates an example of a configuration of antenna units 106-1, 106-2, . . . , and 106-M. Each antenna unit includes a plurality of antennas, as illustrated in FIG. 2. Note that FIG. 2 illustrates four antennas, yet each antenna unit may include at least two antennas. Note that the number of antennas is not limited to 4.

FIG. 2 illustrates a configuration of antenna unit 106-*i*, where i is an integer of 1 or greater and M or smaller.

Splitter 202 receives an input of transmission signal 201 (corresponding to transmission signal 105-*i* in FIG. 1). Splitter 202 splits transmission signal 201, and outputs signals 203-1, 203-2, 203-3, and 203-4.

Multiplier 204-1 receives inputs of signal 203-1 and control signal 200 (corresponding to control signal 159 in FIG. 1). Multiplier 204-1 multiplies signal 203-1 by coefficient W1, based on information on a multiplication coefficient included in control signal 200, and outputs signal 205-1 obtained as a result of the multiplication. Note that coefficient W1 can be defined by a complex number. Accordingly, W1 can also be a real number. Thus, if signal 203-1 is v1($t$), signal 205-1 obtained as a result of the multiplication can be expressed by W1×v1($t$) (t denotes time). Then, signal 205-1 obtained as a result of the multiplication is output as a radio wave from antenna 206-1.

Similarly, multiplier 204-2 receives inputs of signal 203-2 and control signal 200. Multiplier 204-2 multiplies signal 203-2 by coefficient W2, based on information on a multiplication coefficient included in control signal 200, and outputs signal 205-2 obtained as a result of the multiplication. Note that coefficient W2 can be defined by a complex number. Accordingly, W2 can also be a real number. Thus, if signal 203-2 is v2($t$), signal 205-2 obtained as a result of the multiplication can be expressed by W2×v2($t$) (t denotes time). Then, signal 205-2 obtained as a result of the multiplication is output as a radio wave from antenna 206-2.

Multiplier 204-3 receives inputs of signal 203-3 and control signal 200. Multiplier 204-3 multiplies signal 203-3 by coefficient W3, based on information on a multiplication coefficient included in control signal 200, and outputs signal 205-3 obtained as a result of the multiplication. Note that coefficient W3 can be defined by a complex number. Accordingly, W3 can also be a real number. Thus, if signal 203-3 is expressed by v3($t$), signal 205-3 obtained as a result of the multiplication can be expressed by W3×v3($t$) (t denotes time). Then, signal 205-3 obtained as a result of the multiplication is output as a radio wave from antenna 206-3.

Multiplier 204-4 receives inputs of signal 203-4 and control signal 200. Multiplier 204-2 multiplies signal 203-4 by coefficient W4, based on information on a multiplication coefficient included in control signal 200, and outputs signal 205-4 obtained as a result of the multiplication. Note that coefficient W4 can be defined by a complex number. Accordingly, W4 can also be a real number. Thus, if signal 203-4 is v4($t$), signal 205-4 obtained as a result of the multiplication can be expressed by W4×v4($t$) (t denotes time). Then, signal 205-4 obtained as a result of the multiplication is output as a radio wave from antenna 206-4.

Note that the absolute value of W1, the absolute value of W2, the absolute value of W3, and the absolute value of W4 may be equal to one another.

Figure 3:
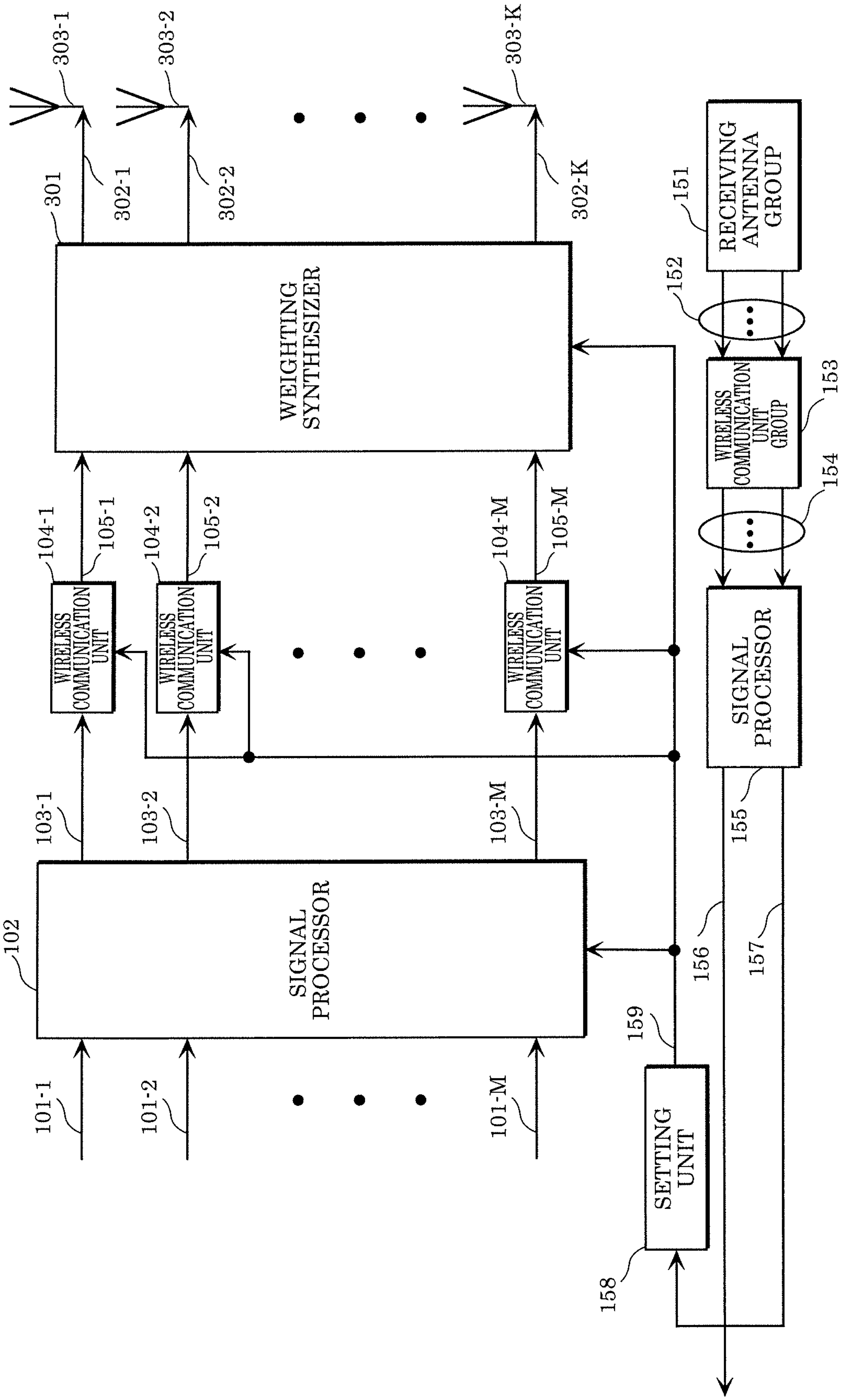
FIG. 3 is a diagram illustrating an example of a configuration of the base station.

FIG. 3 illustrates a configuration of the base station different from the configuration of the base station in FIG. 1 in the present embodiment. In FIG. 3, the same reference numerals are assigned to elements which operate in the same manner as those in FIG. 1, and a description thereof is omitted below.

Weighting synthesizer 301 receives inputs of modulated signal 105-1, modulated signal 105-2, . . . , modulated signal 105-M, and control signal 159. Then, weighting synthesizer 301 weighting synthesizes modulated signal 105-1, modulated signal 105-2, . . . , and modulated signal 105-M, based on information on weighting synthesis included in control signal 159, and outputs signals 302-1, 302-2, . . . , and 302-K obtained as a result of the weighting synthesis. K is an integer of 1 or greater. Signal 302-1 obtained as a result of the weighting synthesis is output as a radio wave from antenna 303-1, signal 302-2 obtained as a result of the weighting synthesis is output as a radio wave from antenna 303-2, . . . , and signal 302-K obtained as a result of the weighting synthesis is output as a radio wave from antenna 303-K.

Signal $y_i$(t) 302-*i* (i is an integer of 1 or greater and K or smaller) obtained as a result of the weighting synthesis is expressed as follows (t denotes time).

[Math. 1]

Expression (1)

$$y_i(t) = A_{i1} \times x_1(t) + A_{i2} \times x_2(t) + \cdots + A_{iM} \times x_M(t) = \sum_{j=1}^{M} A_{ij} \times x_j(t)$$

Note that in Expression (1), $A_{ij}$ is a value which can be defined by a complex number. Accordingly, $A_{ij}$ can also be a real number, and $x_j$(t) is modulated signal 105-*j*, where j is an integer of 1 or greater and M or smaller.

Figure 4:
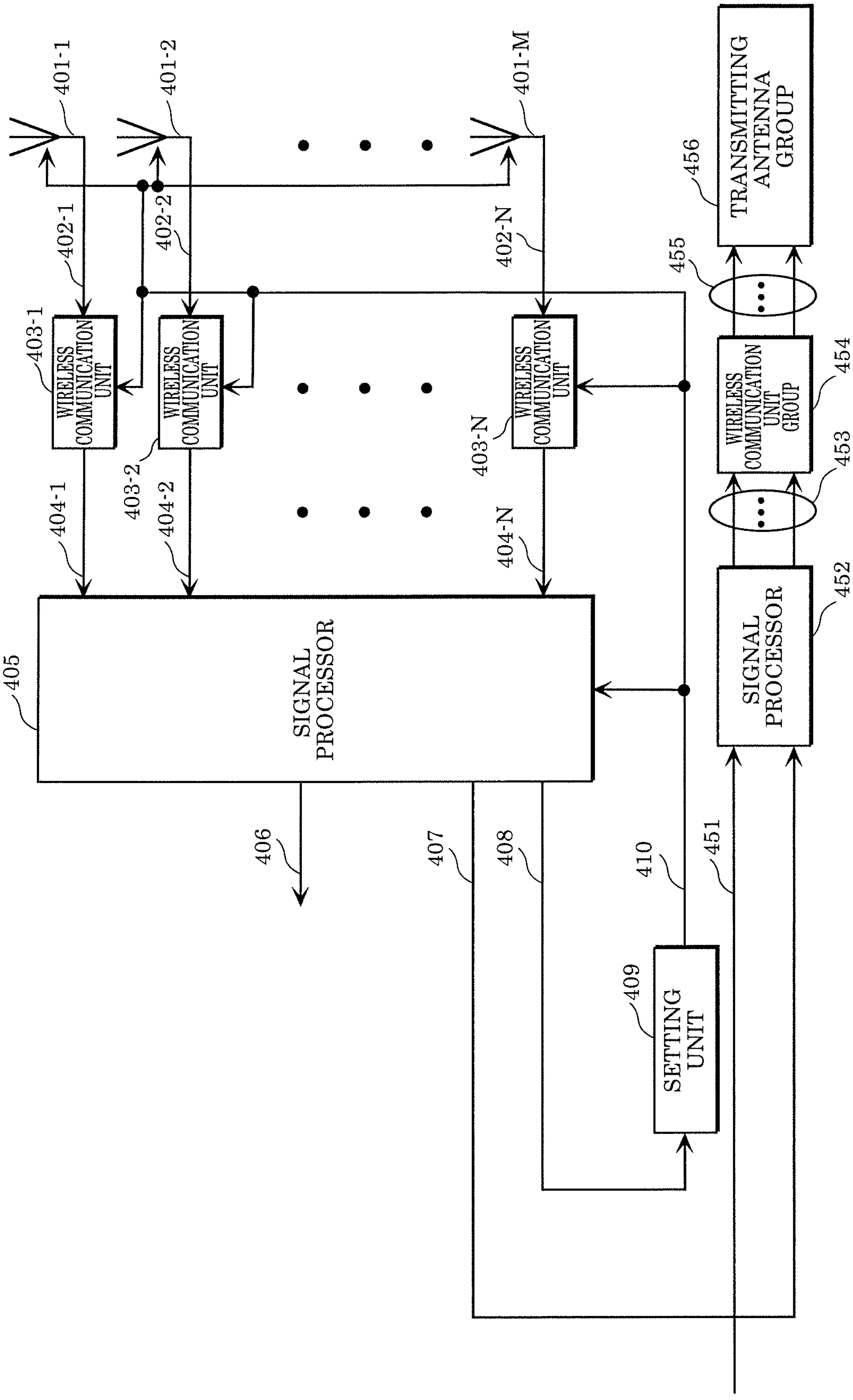
FIG. 4 is a diagram illustrating an example of a configuration of a terminal.

FIG. 4 illustrates an example of a configuration of a terminal. Antenna units 401-1, 401-2, . . . , and 401-N each receive an input of control signal 410, where N is an integer of 1 or greater.

Wireless communication unit 403-1 receives inputs of received signal 402-1 received by antenna unit 401-1 and control signal 410. Based on control signal 410, wireless communication unit 403-1 performs processing such as frequency conversion on received signal 402-1, and outputs baseband signal 404-1.

Similarly, wireless communication unit 403-2 receives inputs of received signal 402-2 received by antenna unit 401-2 and control signal 410. Based on control signal 410, wireless communication unit 403-2 performs processing such as frequency conversion on received signal 402-2, and outputs baseband signal 404-2. Note that a description of wireless communication units 403-3 to 403-(N−1) is omitted.

Wireless communication unit 403-N receives inputs of received signal 402-N received by antenna unit 401-N and control signal 410. Based on control signal 410, wireless communication unit 403-N performs processing such as frequency conversion on received signal 402-N, and outputs baseband signal 404-N.

Note that not all of wireless communication units 403-1, 403-2, . . . , and 403-N may operate. Accordingly, not all of baseband signals 404-1, 404-2, . . . , and 404-N are necessarily present.

Signal processor 405 receives inputs of baseband signals 404-1, 404-2, . . . , 404-N, and control signal 410. Based on control signal 410, signal processor 405 performs demodulation and error correction decoding processing, and outputs data 406, control information 407 for transmission, and control information 408. Specifically, signal processor 405 also performs processing such as time synchronization, frequency synchronization, and channel estimation.

Setting unit 409 receives an input of control information 408. Setting unit 409 performs setting with regard to a receiving method, and outputs control signal 410.

Signal processor 452 receives inputs of information 451 and control information 407 for transmission. Signal processor 452 performs processing such as error correction coding and mapping according to a modulation method which has been set, and outputs baseband signal group 453.

Wireless communication unit group 454 receives an input of baseband signal group 453. Wireless communication unit group 454 performs processing such as band limiting, frequency conversion, and amplification, and outputs transmission signal group 455. Transmission signal group 455 is output as a radio wave from transmitting antenna group 456.

Figure 5:
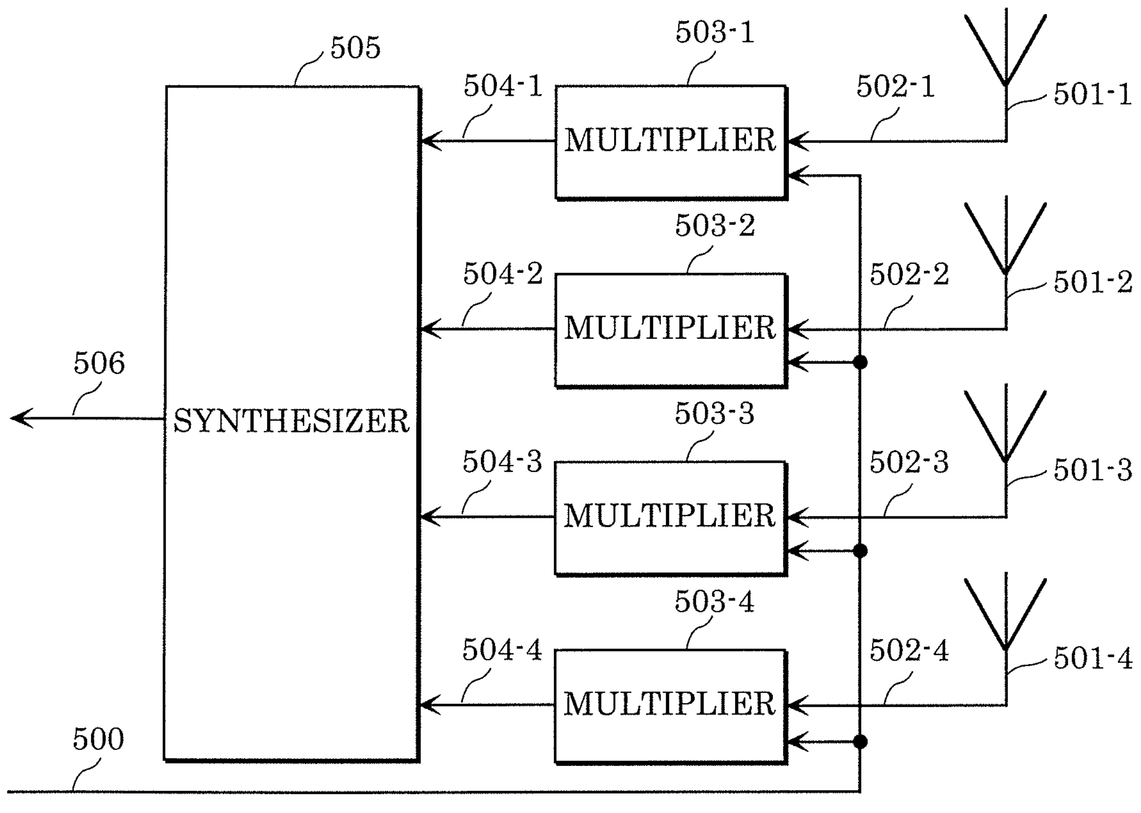
FIG. 5 is a diagram illustrating an example of a configuration of an antenna unit of a terminal.

FIG. 5 illustrates an example of a configuration of antenna units 401-1, 401-2, . . . , and 401-N. Each antenna unit includes a plurality of antennas, as illustrated in FIG. 5. Note that FIG. 5 illustrates four antennas, yet each antenna unit may include at least two antennas. Note that the number of antennas included in each antenna unit is not limited to 4.

FIG. 5 illustrates a configuration of antenna unit 401-*i*, where i is an integer of 1 or greater and N or smaller.

Multiplier 503-1 receives inputs of received signal 502-1 received by antenna 501-1 and control signal 500 (corresponding to control signal 410 in FIG. 4). Multiplier 503-1 multiplies received signal 502-1 by coefficient D1, based on information on a multiplication coefficient included in control signal 500, and outputs signal 504-1 obtained as a result of the multiplication. Note that coefficient D1 can be defined by a complex number. Accordingly, D1 can also be a real number. Thus, if received signal 502-1 is expressed by e1(*t*), signal 504-1 obtained as a result of the multiplication can be expressed by D1×e1(*t*) (t denotes time).

Similarly, multiplier 503-2 receives inputs of received signal 502-2 received by antenna 501-2 and control signal 500. Based on information on a multiplication coefficient included in control signal 500, multiplier 503-2 multiplies received signal 502-2 by coefficient D2, and outputs signal 504-2 obtained as a result of the multiplication. Note that coefficient D2 can be defined by a complex number. Accordingly, D2 can also be a real number. Thus, if received signal 502-2 is expressed by e2(*t*), signal 504-2 obtained as a result of the multiplication can be expressed by D2×e2(*t*) (t denotes time).

Multiplier 503-3 receives inputs of received signal 502-3 received by antenna 501-3 and control signal 500. Based on information on a multiplication coefficient included in control signal 500, multiplier 503-3 multiplies received signal 502-3 by coefficient D3, and outputs signal 504-3 obtained as a result of the multiplication. Note that coefficient D3 can be defined by a complex number. Accordingly, D3 can also be a real number. Thus, if received signal 502-3 is expressed by e3(*t*), signal 504-3 obtained as a result of the multiplication can be expressed by D3×e3(*t*) (t denotes time).

Multiplier 503-4 receives inputs of received signal 502-4 received by antenna 501-4 and control signal 500. Based on information on a multiplication coefficient included in control signal 500, multiplier 503-4 multiplies received signal 502-4 by coefficient D4, and outputs signal 504-4 obtained as a result of the multiplication. Note that coefficient D4 can be defined by a complex number. Accordingly, D4 can also be a real number. Thus, if received signal 502-4 is expressed by e4 (*t*), signal 504-4 obtained as a result of the multiplication can be expressed by D4×e4(*t*) (t denotes time).

Synthesizer 505 receives inputs of signals 504-1, 504-2, 504-3, and 504-4 obtained as a result of the multiplication. Synthesizer 505 adds signals 504-1, 504-2, 504-3, and 504-4 obtained as a result of the multiplication, and outputs synthesized signal 506 (corresponding to received signal 402-*i* in FIG. 4). Thus, synthesized signal 506 is expressed by D1×e1(*t*)+D2×e2(*t*)+D3×e3(*t*)+D4×e4(*t*).

Figure 6:
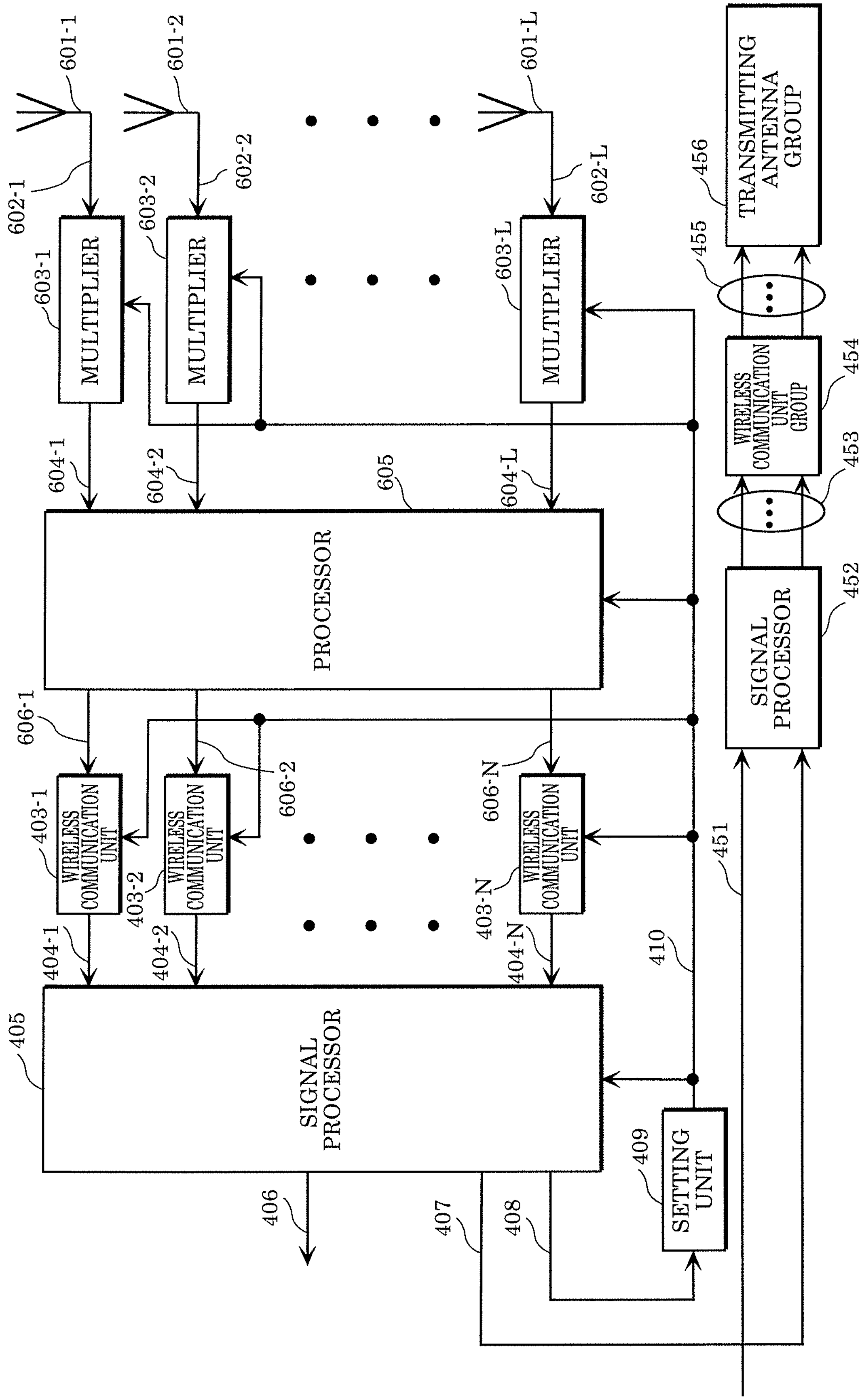
FIG. 6 is a diagram illustrating an example of a configuration of a terminal.

FIG. 6 illustrates a configuration of a terminal different from the configuration of the terminal in FIG. 4 in the present embodiment.

Elements which operate in the same manner as those in FIG. 4 are assigned the same reference numerals in FIG. 6, and a description thereof is omitted below.

Multiplier 603-1 receives inputs of received signal 602-1 received by antenna 601-1 and control signal 410. Based on information on a multiplication coefficient included in control signal 410, multiplier 603-1 multiplies received signal 602-1 by coefficient G1, and outputs signal 604-1 obtained as a result of the multiplication. Note that coefficient G1 can be defined by a complex number. Accordingly, G1 can also be a real number. Thus, if received signal 602-1 is expressed by c1(*t*), signal 604-1 obtained as a result of the multiplication can be expressed by G1×c1(*t*) (t denotes time).

Similarly, multiplier 603-2 receives inputs of received signal 602-2 received by antenna 601-2 and control signal 410. Based on information on a multiplication coefficient included in control signal 410, multiplier 603-2 multiplies received signal 602-2 by coefficient G2, and outputs signal 604-2 obtained as a result of the multiplication. Note that coefficient G2 can be defined by a complex number. Accordingly, G2 can also be a real number. Thus, if received signal 602-2 is expressed by c2(*t*), signal 604-2 obtained as a result of the multiplication can be expressed by G2×c2(*t*) (t denotes time). A description of multiplier 603-3 to multiplier 603-(L−1) is omitted.

Multiplier 603-L receives inputs of received signal 602-L received by antenna 601-L and control signal 410. Based on information on a multiplication coefficient included in control signal 410, multiplier 603-L multiplies received signal 602-L by coefficient GL, and outputs signal 604-L obtained as a result of the multiplication. Note that coefficient GL can be defined by a complex number. Accordingly, GL can also be a real number. Thus, if received signal 602-L is expressed by cL(t), signal 604-L obtained as a result of the multiplication can be expressed by GL×cL(t) (t denotes time).

Accordingly, multiplier 603-*i* receives inputs of received signal 602-*i* received by antenna 601-*i* and control signal 410. Based on information on a multiplication coefficient included in control signal 410, multiplier 603-*i* multiplies received signal 602-*i* by coefficient Gi, and outputs signal 604-*i* obtained as a result of the multiplication. Note that coefficient Gi can be defined by a complex number. Accordingly, Gi can also be a real number. Thus, if received signal 602-*i* is expressed by ci (t), signal 604-*i* obtained as a result of the multiplication can be expressed by Gi×ci(t) (t denotes time). Note that i is an integer of 1 or greater and L or smaller, and L is an integer of 2 or greater.

Processor 605 receives inputs of signals 604-1, 604-2, . . . , and 604-L obtained as a result of the multiplication and control signal 410. Based on control signal 410, processor 605 performs signal processing, and outputs signals 606-1, 606-2, . . . , and 606-N obtained as a result of the signal processing, where N is an integer of 2 or greater. At this time, signal 604-*i* obtained as a result of the multiplication is expressed by pi(t) (i is an integer of 1 or greater and L or smaller). Then, signal 606-*j* ($r_j$(t)) as a result of the processing is expressed as follows (j is an integer of 1 or greater and N or smaller).

[Math. 2]

Expression (2)

$$r_j(t) = B_{j1} \times p_1(t) + B_{j2} \times p_2(t) + \cdots + B_{jL} \times p_L(t) = \sum_{i=1}^{L} B_{ji} \times p_i(t)$$

Note that in Expression (2), $B_{ji}$ is a value which can be defined by a complex number. Accordingly, $B_{ji}$ can also be a real number.

Figure 7:
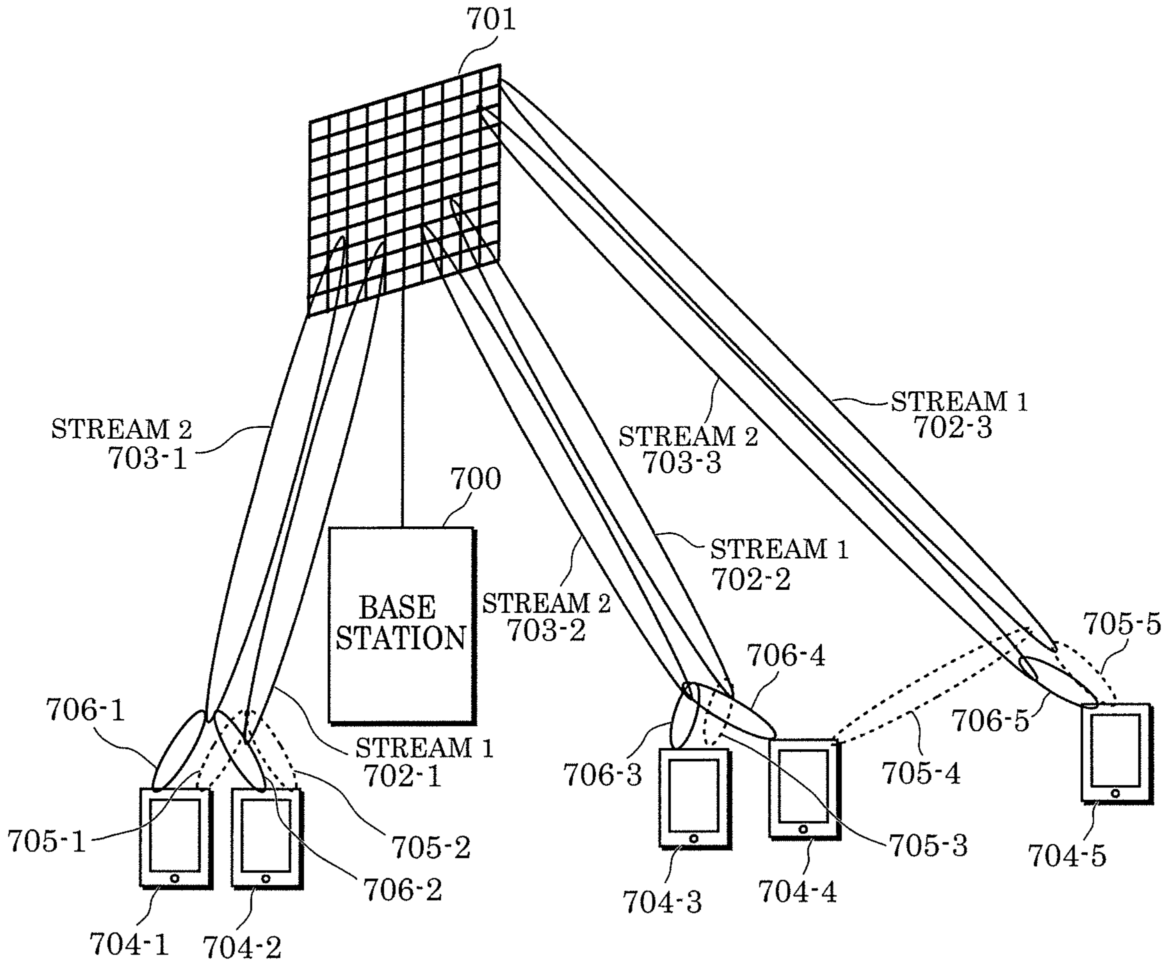
FIG. 7 is a diagram illustrating an example of a state of communication between the base station and terminals.

FIG. 7 illustrates an example of a state of communication between the base station and terminals. Note that the base station may be referred to as an access point or a broadcast station, for instance.

Base station 700 includes a plurality of antennas, and transmits a plurality of transmission signals from antenna 701 for transmission. At this time, base station 700 has a configuration as illustrated in FIG. 1 or 3, for example, and performs transmission beamforming (directivity control) by signal processor 102 (and/or weighting synthesizer 301) performing precoding (weighting synthesis).

FIG. 7 illustrates transmission beam 702-1 for transmitting data of stream 1, transmission beam 702-2 for transmitting data of stream 1, and transmission beam 702-3 for transmitting data of stream 1.

FIG. 7 illustrates transmission beam 703-1 for transmitting data of stream 2, transmission beam 703-2 for transmitting data of stream 2, and transmission beam 703-3 for transmitting data of stream 2.

Note that in FIG. 7, the number of transmission beams for transmitting data of stream 1 is 3 and the number of transmission beams for transmitting data of stream 2 is 3, yet the present disclosure is not limited to such numbers. The number of transmission beams for transmitting data of stream 1 may be at least two, and the number of transmission beams for transmitting data of stream 2 may be at least two.

FIG. 7 includes terminals 704-1, 704-2, 704-3, 704-4, and 704-5, and the terminals have the configuration same as the configuration of the terminals illustrated in FIGS. 4 and 5, for example.

For example, terminal 704-1 performs directivity control for receiving, via "signal processor 405" and/or "antennas 401-1 to 401-N" and/or "multipliers 603-1 to 603-L and processor 605", and forms receiving directivity 705-1 and receiving directivity 706-1. Receiving directivity 705-1 allows terminal 704-1 to receive and demodulate transmission beam 702-1 for transmitting data of stream 1, and receiving directivity 706-1 allows terminal 704-1 to receive and demodulate transmission beam 703-1 for transmitting data of stream 2.

Similarly, terminal 704-2 performs directivity control for receiving, via "signal processor 405" and/or "antennas 401-1 to 401-N" and/or "multipliers 603-1 to 603-L and processor 605", and forms receiving directivity 705-2 and receiving directivity 706-2. Receiving directivity 705-2 allows terminal 704-2 to receive and demodulate transmission beam 702-1 for transmitting data of stream 1, and receiving directivity 706-2 allows terminal 704-2 to receive and demodulate transmission beam 703-1 for transmitting data of stream 2.

Terminal 704-3 performs directivity control for receiving, via "signal processor 405" and/or "antennas 401-1 to 401-

N" and/or "multipliers 603-1 to 603-L and processor 605", and forms receiving directivity 705-3 and receiving directivity 706-3.

Receiving directivity 705-3 allows terminal 704-3 to receive and demodulate transmission beam 702-2 for transmitting data of stream 1, and receiving directivity 706-3 allows terminal 704-3 to receive and demodulate transmission beam 703-2 for transmitting data of stream 2.

Terminal 704-4 performs directivity control for receiving, via "signal processor 405" and/or "antennas 401-1 to 401-N" and/or "multipliers 603-1 to 603-L and processor 605", and forms receiving directivity 705-4 and receiving directivity 706-4. Receiving directivity 705-4 allows terminal 704-4 to receive and demodulate transmission beam 702-3 for transmitting data of stream 1, and receiving directivity 706-4 allows terminal 704-4 to receive and demodulate transmission beam 703-2 for transmitting data of stream 2.

Terminal 704-5 performs directivity control for receiving, via "signal processor 405" and/or "antennas 401-1 to 401-N" and/or "multipliers 603-1 to 603-L and processor 605", and forms receiving directivity 705-5 and receiving directivity 706-5. Receiving directivity 705-5 allows terminal 704-5 to receive and demodulate transmission beam 702-3 for transmitting data of stream 1, and receiving directivity 706-5 allows terminal 704-5 to receive and demodulate transmission beam 703-3 for transmitting data of stream 2.

In FIG. 7, a terminal selects, according to a spatial position, at least one transmission beam from among transmission beams 702-1, 702-2, and 702-3 for transmitting data of stream 1, and can obtain data of stream 1 with high quality by directing a receiving directivity to the selected transmission beam(s). Furthermore, the terminal selects, according to a spatial position, at least one transmission beam from among transmission beams 703-1, 703-2, and 703-3 for transmitting data of stream 2, and can obtain data of stream 2 with high quality by directing a receiving directivity to the selected transmission beam(s).

Note that base station 700 transmits transmission beam 702-1 for transmitting data of stream 1 and transmission beam 703-1 for transmitting data of stream 2, using the same frequency (the same frequency band) at the same time. Base station 700 transmits transmission beam 702-2 for transmitting data of stream 1 and transmission beam 703-2 for transmitting data of stream 2, using the same frequency (the same frequency band) at the same time. Base station 700 transmits transmission beam 702-3 for transmitting data of stream 1 and transmission beam 703-3 for transmitting data of stream 2, using the same frequency (the same frequency band) at the same time.

Transmission beams 702-1, 702-2, and 702-3 for transmitting data of stream 1 may be beams having the same frequency (the same frequency band) or may be beams having different frequencies (different frequency bands). Transmission beams 703-1, 703-2, and 703-3 for transmitting data of stream 2 may be beams having the same frequency (the same frequency band), or may be beams having different frequencies (different frequency bands).

A description of operation of setting unit 158 of the base station in FIGS. 1 and 3 is to be given.

Setting unit 158 receives an input of setting signal 160. Setting signal 160 includes information with regard to "whether to perform transmission for multicasting or transmission for unicasting", and if the base station performs transmission as illustrated in FIG. 7, information indicating "to perform transmission for multicasting" is input to setting unit 158 according to setting signal 160.

Setting signal 160 includes information with regard to "the number of transmission streams when multicasting is performed" and if the base station performs transmission as illustrated in FIG. 7, information indicating that "the number of transmission streams is 2" is input to setting unit 158 according to setting signal 160.

Setting signal 160 may include information with regard to "how many transmission beams are to be used to transmit each stream". If the base station performs transmission as illustrated in FIG. 7, information indicating that "the number of transmission beams for transmitting stream 1 is 3 and the number of transmission beams for transmitting stream 2 is 3" is input to setting unit 158 according to setting signal 160.

Note that the base station in FIGS. 1 and 3 may transmit a control information symbol which includes, for instance, information with regard to "whether to perform transmission for multicasting or transmission for unicasting", information with regard to "the number of transmission streams when multicasting is performed", information with regard to "how many transmission beams are to be used to transmit each stream". Accordingly, a terminal can appropriately receive data. A configuration of a control information symbol will be later described in detail.

Figure 8:
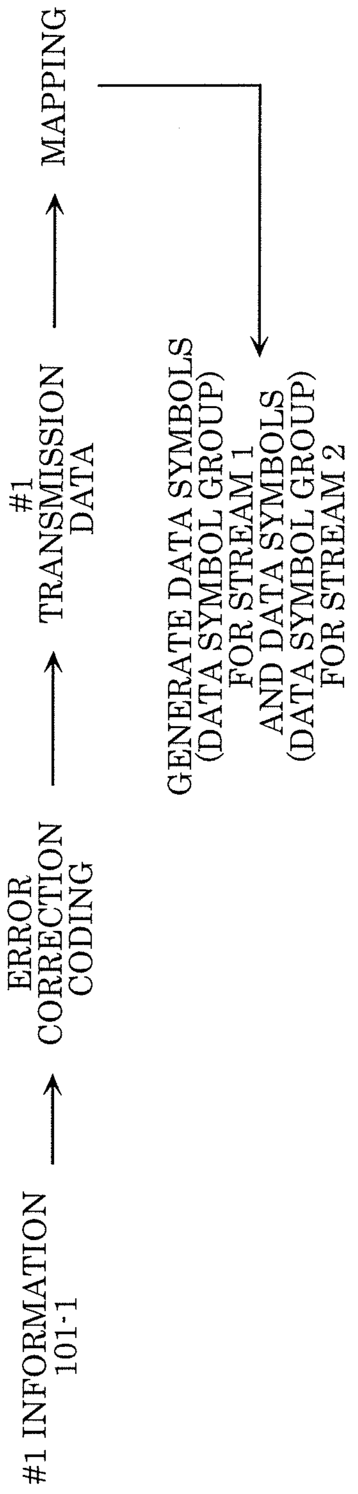
FIG. 8 is a diagram for describing a relation of a plurality of streams.

FIG. 8 is a drawing for describing a relation between #i information 101-*i* in FIGS. 1 and 3 and "stream 1" and "stream 2" described with reference to FIG. 7. For example, processing such as error correction coding is performed on #1 information 101-1, and data obtained as a result of the error correction coding is obtained. The data obtained as a result of the error correction coding is named #1 transmission data.

Data symbols are obtained by mapping #1 transmission data. By separating data symbols into data symbols for stream 1 and data symbols for stream 2, data symbols (data symbol group) for stream 1 and data symbols (data symbol group) for stream 2 are obtained. The symbol group for stream 1 includes data symbols (data symbol group) for stream 1, and is transmitted from the base station in FIGS. 1 and 3. The symbol group for stream 2 includes data symbols (data symbol group) for stream 2, and is transmitted from the base station in FIGS. 1 and 3.

Figure 9:
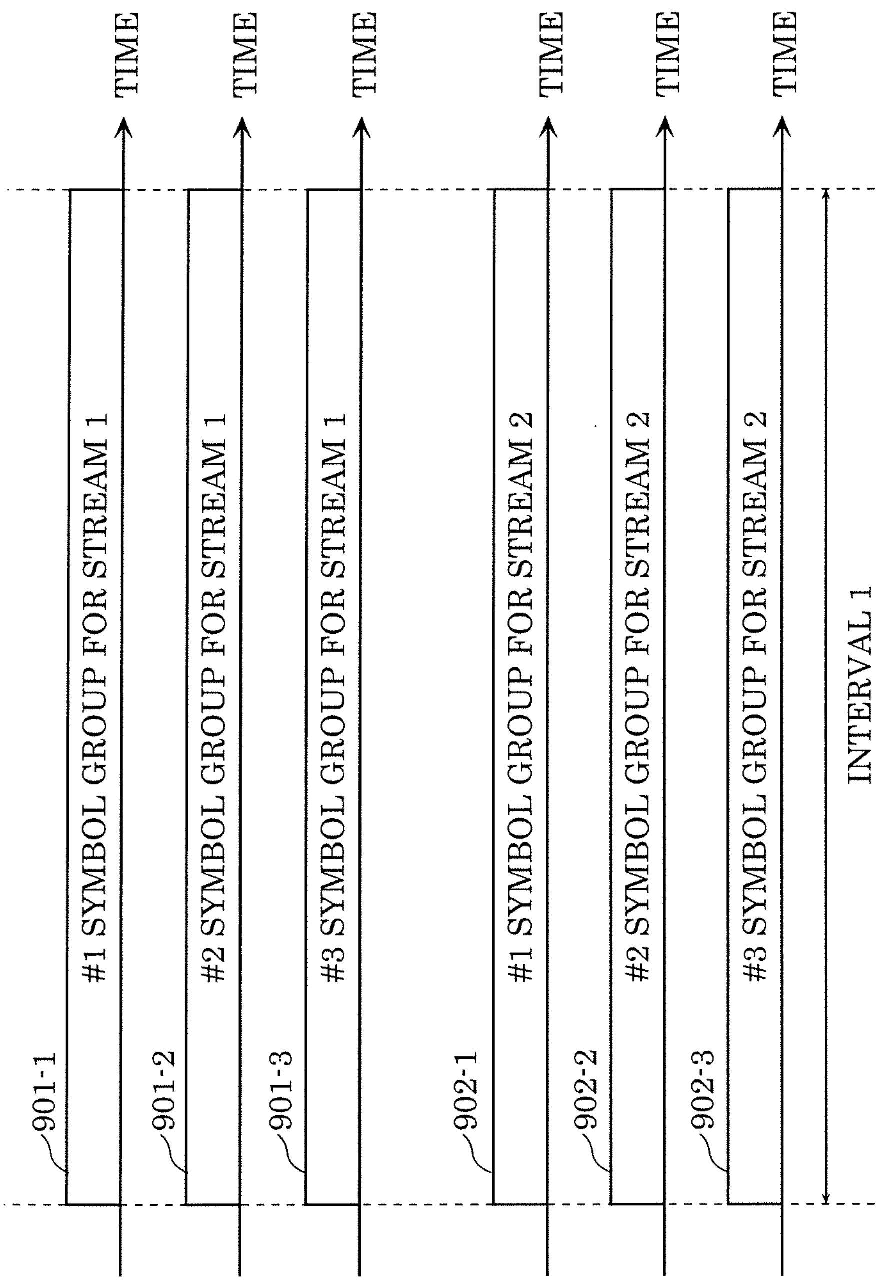
FIG. 9 is a diagram illustrating an example of a frame configuration.

FIG. 9 illustrates an example of a frame configuration when the horizontal axis indicates time.

#1 symbol group 901-1 for stream 1 in FIG. 9 is a symbol group for transmission beam 702-1 for transmitting data of stream 1 in FIG. 7.

#2 symbol group 901-2 for stream 1 in FIG. 9 is a symbol group for transmission beam 702-2 for transmitting data of stream 1 in FIG. 7.

#3 symbol group 901-3 for stream 1 in FIG. 9 is a symbol group for transmission beam 702-3 for transmitting data of stream 1 in FIG. 7.

#1 symbol group 902-1 for stream 2 in FIG. 9 is a symbol group for transmission beam 703-1 for transmitting data of stream 2 in FIG. 7.

#2 symbol group 902-2 for stream 2 in FIG. 9 is a symbol group for transmission beam 703-2 for transmitting data of stream 2 in FIG. 7.

#3 symbol group 902-3 for stream 2 in FIG. 9 is a symbol group for transmission beam 703-3 for transmitting data of stream 2 in FIG. 7.

#1 symbol group 901-1 for stream 1, #2 symbol group 901-2 for stream 1, #3 symbol group 901-3 for stream 1, #1 symbol group 902-1 for stream 2, #2 symbol group 902-2 for stream 2, and #3 symbol group 902-3 for stream 2 are present in time interval 1, for example.

As described above, #1 symbol group 901-1 for stream 1 and #2 symbol group 902-1 for stream 2 are transmitted using the same frequency (the same frequency band), #2 symbol group 901-2 for stream 1 and #2 symbol group 902-2 for stream 2 are transmitted using the same frequency (the same frequency band), and #3 symbol group 901-3 for stream 1 and #3 symbol group 902-3 for stream 2 are transmitted using the same frequency (the same frequency band).

For example, "data symbol group A for stream 1" and "data symbol group A for stream 2" are generated from information, following the procedure in FIG. 8. The symbol group, namely "data symbol group A-1 for stream 1" which includes the same symbols as symbols included in "data symbol group A for stream 1", the symbol group, namely "data symbol group A-2 for stream 1" which includes the same symbols as symbols included in "data symbol group A for stream 1", and the symbol group, namely "data symbol group A-3 for stream 1" which includes the same symbols as symbols included in "data symbol group A for stream 1" are prepared.

Thus, the symbols included in "data symbol group A-1 for stream 1", the symbols included in "data symbol group A-2 for stream 1", and the symbols included in "data symbol group A-3 for stream 1" are the same.

At this time, #1 symbol group 901-1 for stream 1 in FIG. 9 includes "data symbol group A-1 for stream 1", #2 symbol group 901-2 for stream 1 in FIG. 9 includes "data symbol group A-2 for stream 1", and #3 symbol group 901-3 for stream 1 in FIG. 9 includes "data symbol group A-3 for stream 1". Accordingly, #1 symbol group 901-1 for stream 1, #2 symbol group 901-2 for stream 1, and #3 symbol group 901-3 for stream 1 include the same data symbol group.

The symbol group, namely "data symbol group A-1 for stream 2" which includes the same symbols as symbols included in "data symbol group A for stream 2", the symbol group, namely "data symbol group A-2 for stream 2" which includes the same symbols as symbols included in "data symbol group A for stream 2", and the symbol group, namely "data symbol group A-3 for stream 2" which includes the same symbols as symbols included in "data symbol group A for stream 2" are prepared.

Accordingly, the symbols included in "data symbol group A-1 for stream 2", the symbols included in "data symbol group A-2 for stream 2", and the symbols included in "data symbol group A-3 for stream 2" are the same.

At this time, #1 symbol group 902-1 for stream 2 in FIG. 9 includes "data symbol group A-1 for stream 2", #2 symbol group 902-2 for stream 2 in FIG. 9 includes "data symbol group A-2 for stream 2", and #3 symbol group 902-3 for stream 2 in FIG. 9 includes "data symbol group A-3 for stream 2". Accordingly, #1 symbol group 902-1 for stream 2, #2 symbol group 902-2 for stream 2, and #3 symbol group 902-3 for stream 2 include the same data symbol group.

Figure 10:
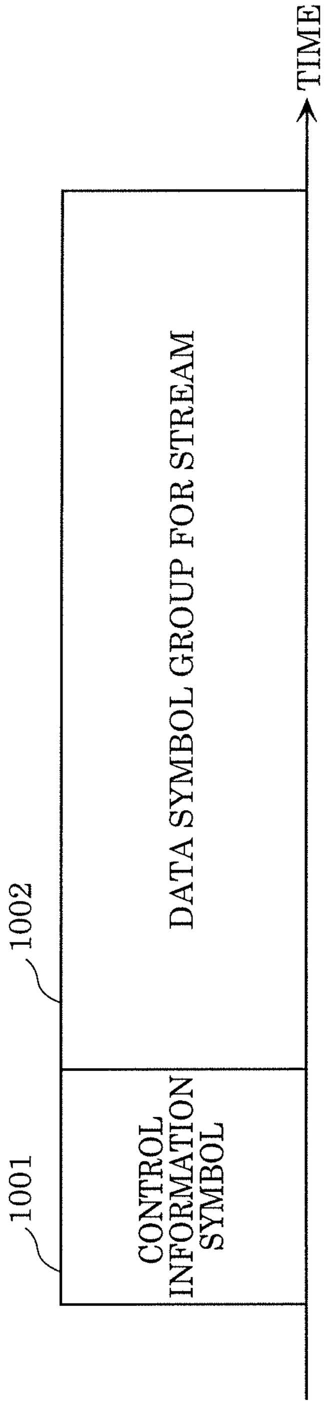
FIG. 10 is a diagram illustrating an example of a frame configuration.

FIG. 10 illustrates an example of a frame configuration of "symbol group #Y for stream X" (X=1, 2; Y=1, 2, 3) described with reference to FIG. 9. In FIG. 10, while the horizontal axis indicates time, 1001 denotes a control information symbol and 1002 denotes a data symbol group for a stream. At this time, data symbol group 1002 for the stream includes symbols for transmitting "data symbol group A for stream 1" or "data symbol group A for stream 2" described with reference to FIG. 9.

Note that a multi-carrier method such as the orthogonal frequency division multiplexing (OFDM) method may be used for the frame configuration in FIG. 10, and symbols may be present in the direction of the frequency axis, in this case. The symbols may include a reference symbol for a receiving device to perform time synchronization and frequency synchronization, a reference symbol for a receiving device to detect a signal, and a reference symbol for a receiving device to perform channel estimation, for instance. The frame configuration is not limited to the configuration in FIG. 10, and control information symbol 1001 and data symbol group 1002 for a stream may be arranged in any manner. Note that the reference symbol may be referred to as a preamble and a pilot symbol.

The following describes a configuration of control information symbol 1001.

Figure 11:
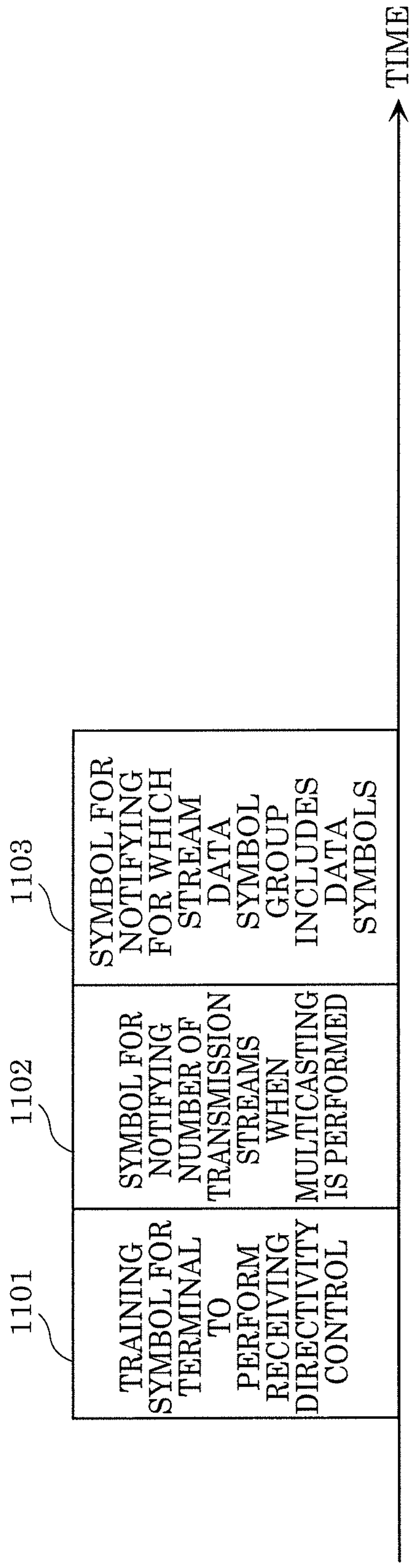
FIG. 11 is a diagram illustrating an example of a symbol configuration.

FIG. 11 illustrates an example of a configuration of symbols transmitted as a control information symbol in FIG. 10, and the horizontal axis indicates time. In FIG. 11, a terminal receives "training symbol for a terminal to perform receiving directivity control" 1101 to determine a signal processing method for the directivity control for receiving, which is implemented by "signal processor 405" and/or "antennas 401-1 to 401-N" and/or "multipliers 603-1 to 603-L and processor 605".

A terminal receives "symbol for notifying the number of transmission streams when multicasting is performed" 1102 so that the terminal is informed of the number of streams to be obtained.

A terminal receives "symbol for notifying for which stream data symbols are" 1103 so that the terminal can be informed which stream has been successfully received among the streams which the base station is transmitting.

A description of an example with regard to the above is to be given.

The case where the base station transmits streams using transmission beams as illustrated in FIG. 7 is to be described. Specific information indicated by a control information symbol in #1 symbol group 901-1 for stream 1 in FIG. 9 is to be described.

In the case of FIG. 7, since the base station is transmitting "stream 1" and "stream 2", information indicated by "symbol for notifying the number of transmission streams when multicasting is performed" 1102 indicates "2".

#1 symbol group 901-1 for stream 1 in FIG. 9 is for transmitting data symbols for stream 1, and thus information indicated by "symbol for notifying for which stream data symbols are" 1103 indicates "stream 1".

The case where, for example, a terminal receives #1 symbol group 901-1 for stream 1 in FIG. 9 is to be described. At this time, the terminal becomes aware that "the number of transmission streams is 2" from "symbol for notifying the number of transmission streams when multicasting is performed" 1102, and that the terminal has obtained "data symbols for stream 1" from "symbol 1103 for notifying for which stream data symbol group includes data symbols".

After that, since the terminal becomes aware that "the number of transmission streams is 2" and the obtained data symbols are "data symbols for stream 1", the terminal is aware that the terminal is to obtain "data symbols for stream 2". Thus, the terminal can start operation for searching for a symbol group for stream 2. For example, the terminal searches for one of transmission beams for transmitting #1 symbol group 902-1 for stream 2, #2 symbol group 902-2 for stream 2, and #3 symbol group 902-3 for stream 2 in FIG. 9.

Then, the terminal obtains one of transmission beams for transmitting #1 symbol group 902-1 for stream 2, #2 symbol group 902-2 for stream 2, and #3 symbol group 902-3 for stream 2, to obtain data symbols for both streams 1 and 2.

Configuring control information symbols in this manner yields an advantageous effect that a terminal can obtain data symbols precisely.

As described above, the base station transmits data symbols using a plurality of transmission beams, and a terminal selectively receives a transmission beam with good quality among the plurality of transmission beams in multicast transmission and broadcast data transmission, and furthermore, transmission directivity control and receiving directivity control have been performed on modulated signals transmitted by the base station, thus achieving advantageous effects of increasing an area where high data receiving quality is achieved.

In the above description, a terminal performs receiving directivity control, yet advantageous effects can be obtained as mentioned above without the terminal performing receiving directivity control.

Note that the modulating method for "data symbol group for a stream" 1002 in FIG. 10 may be any modulating method, and a mapping method according to the modulating method for "data symbol group for a stream" 1002 may be changed for each symbol. Accordingly, a phase of a constellation may be changed for each symbol on an in-phase I-quadrature Q plane after mapping.

Figure 12:
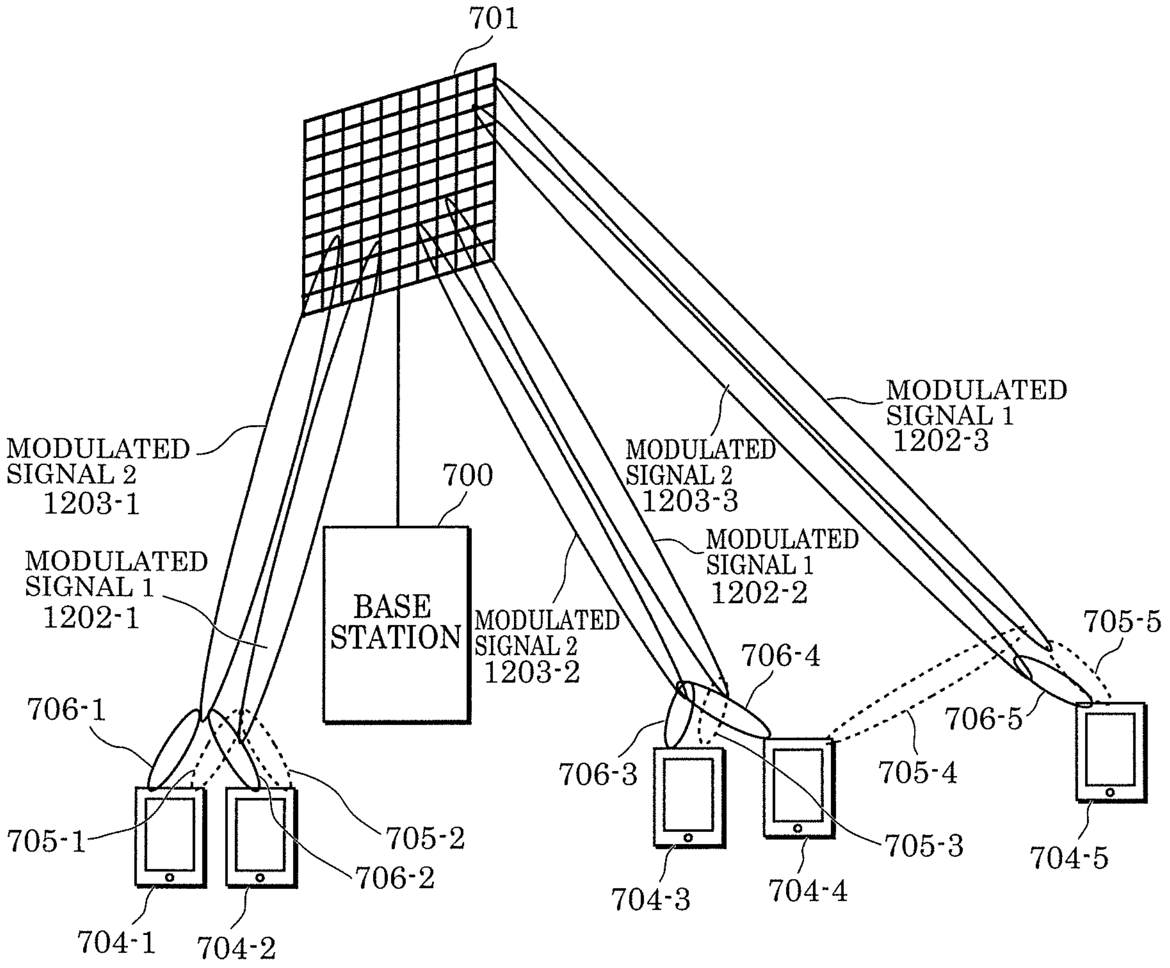
FIG. 12 is a diagram illustrating an example of a state of communication between the base station and terminals.

FIG. 12 illustrates an example of a state of communication between a base station and terminals different from the example in FIG. 7. Note that elements which operate in the same manner as those in FIG. 7 are assigned the same reference numerals in FIG. 12.

Base station 700 includes a plurality of antennas, and transmits a plurality of transmission signals through antenna 701 for transmission. At this time, base station 700 has a configuration as illustrated in, for example, FIG. 1 or 3, and performs transmission beamforming (directivity control) by signal processor 102 (and/or weighting synthesizer 301) performing precoding (weighting synthesis).

FIG. 12 illustrates transmission beam 1202-1 for transmitting "modulated signal 1", transmission beam 1202-2 for transmitting "modulated signal 1", and transmission beam 1202-3 for transmitting "modulated signal 1".

FIG. 12 illustrates transmission beam 1203-1 for transmitting "modulated signal 2", transmission beam 1203-2 for transmitting "modulated signal 2", and transmission beam 1203-3 for transmitting "modulated signal 2".

Note that although in FIG. 12, the number of transmission beams for transmitting "modulated signal 1" is 3 and the number of transmission beams for transmitting "modulated signal 2" is 3, the present disclosure is not limited to such numbers, and the number of transmission beams for transmitting "modulated signal 1" may be at least 2 and the number of transmission beams for transmitting "modulated signal 2" may be at least 2. A detailed description of "modulated signal 1" and "modulated signal 2" will be given later.

FIG. 12 includes terminals 704-1, 704-2, 704-3, 704-4, and 704-5, and the terminals have the same configuration as those in FIGS. 4 and 5, for example.

For example, terminal 704-1 performs directivity control for receiving, via "signal processor 405" and/or "antennas 401-1 to 401-N" and/or "multipliers 603-1 to 603-L and processor 605", and forms receiving directivity 705-1 and receiving directivity 706-1. Receiving directivity 705-1 allows terminal 704-1 to receive and demodulate transmission beam 1202-1 for transmitting "modulated signal 1", and receiving directivity 706-1 allows terminal 704-1 to receive and demodulate transmission beam 1203-1 for transmitting "modulated signal 2".

Similarly, terminal 704-2 performs directivity control for receiving, via "signal processor 405" and/or "antennas 401-1 to 401-N" and/or "multipliers 603-1 to 603-L and processor 605", and forms receiving directivity 705-2 and receiving directivity 706-2. Receiving directivity 705-2 allows terminal 704-2 to receive and demodulate transmission beam 1202-1 for transmitting "modulated signal 1", and receiving directivity 706-2 allows terminal 704-2 to receive and demodulate transmission beam 1203-1 for transmitting "modulated signal 2".

Terminal 704-3 performs directivity control for receiving, via "signal processor 405" and/or "antennas 401-1 to 401-N" and/or "multipliers 603-1 to 603-L and processor 605", and forms receiving directivity 705-3 and receiving directivity 706-3.

Receiving directivity 705-3 allows terminal 704-3 to receive and demodulate transmission beam 1202-2 for transmitting "modulated signal 1", and receiving directivity 706-3 allows terminal 704-3 to receive and demodulate transmission beam 1203-2 for transmitting "modulated signal 2".

Terminal 704-4 performs directivity control for receiving, via "signal processor 405" and/or "antennas 401-1 to 401-N" and/or "multipliers 603-1 to 603-L and processor 605", and forms receiving directivity 705-4 and receiving directivity 706-4. Receiving directivity 705-4 allows terminal 704-4 to receive and demodulate transmission beam 1202-3 for transmitting "modulated signal 1", and receiving directivity 706-4 allows terminal 704-4 to receive and demodulate transmission beam 1203-2 for transmitting "modulated signal 2".

Terminal 704-5 performs directivity control for receiving, via "signal processor 405" and/or "antennas 401-1 to 401-N" and/or "multipliers 603-1 to 603-L and processor 605", and forms receiving directivity 705-5 and receiving directivity 706-5. Receiving directivity 705-5 allows terminal 704-5 to receive and demodulate transmission beam 1202-3 for transmitting "modulated signal 1", and receiving directivity 706-5 allows terminal 704-5 to receive and demodulate transmission beam 1203-3 for transmitting "modulated signal 2".

Distinguishing points in FIG. 12 are that a terminal selects, based on a spatial position, at least one transmission beam from among transmission beams 1202-1, 1202-2, and 1202-3 for transmitting "modulated signal 1", and can obtain "modulated signal 1" with high quality by directing a receiving directivity to the selected transmission beam(s). Further, the terminal selects, based on a spatial position, at least one transmission beam from among transmission beams 1203-1, 1203-2, and 1203-3 for transmitting "modulated signal 2", and can obtain "modulated signal 2" with high quality by directing a receiving directivity to the selected transmission beam(s).

Note that base station 700 transmits transmission beam 1202-1 for transmitting "modulated signal 1" and transmission beam 1203-1 for transmitting "modulated signal 2" using the same frequency (the same frequency band) at the same time. Then, base station 700 transmits transmission beam 1202-2 for transmitting "modulated signal 1" and transmission beam 1203-2 for transmitting "modulated signal 2" using the same frequency (the same frequency band) at the same time.

Further, base station 700 transmits transmission beam 1202-3 for transmitting "modulated signal 1" and transmission beam 1203-3 for transmitting "modulated signal 2" using the same frequency (the same frequency band) at the same time.

Transmission beams 1202-1, 1202-2, and 1202-3 for transmitting "modulated signal 1" may be beams having the same frequency (the same frequency band) or may be beams having different frequencies (different frequency bands). Transmission beams 1203-1, 1203-2, and 1203-3 for transmitting "modulated signal 2" may be beams having the same frequency (the same frequency band) or may be beams having different frequencies (different frequency bands).

A description of operation of setting unit 158 of the base station in FIGS. 1 and 3 is to be given.

Setting unit 158 receives an input of setting signal 160. Setting signal 160 includes information with regard to "whether to perform transmission for multicasting or transmission for unicasting", and if the base station performs transmission as illustrated in FIG. 12, information indicating "to perform transmission for multicasting" is input to setting unit 158 according to setting signal 160.

Setting signal 160 includes information with regard to "the number of transmission modulated signals when multicasting is performed" and if the base station performs transmission as illustrated in FIG. 12, information indicating that "the number of transmission modulated signals is 2" is input to setting unit 158 according to setting signal 160.

Setting signal 160 may include information with regard to "how many transmission beams are to be used to transmit each modulated signal". If the base station performs transmission as illustrated in FIG. 12, information indicating that "the number of transmission beams for transmitting modulated signal 1 is 3 and the number of transmission beams for transmitting modulated signal 2 is 3" is input to setting unit 158 according to setting signal 160.

Note that the base station in FIGS. 1 and 3 may transmit a control information symbol which includes, for instance, information with regard to "whether to perform transmission for multicasting or transmission for unicasting", information with regard to "the number of transmission modulated signals when multicasting is performed", information with regard to "how many transmission beams are to be used to transmit each modulated signal". Accordingly, a terminal can appropriately receive data. A configuration of a control information symbol will be later described in detail.

Figure 13:
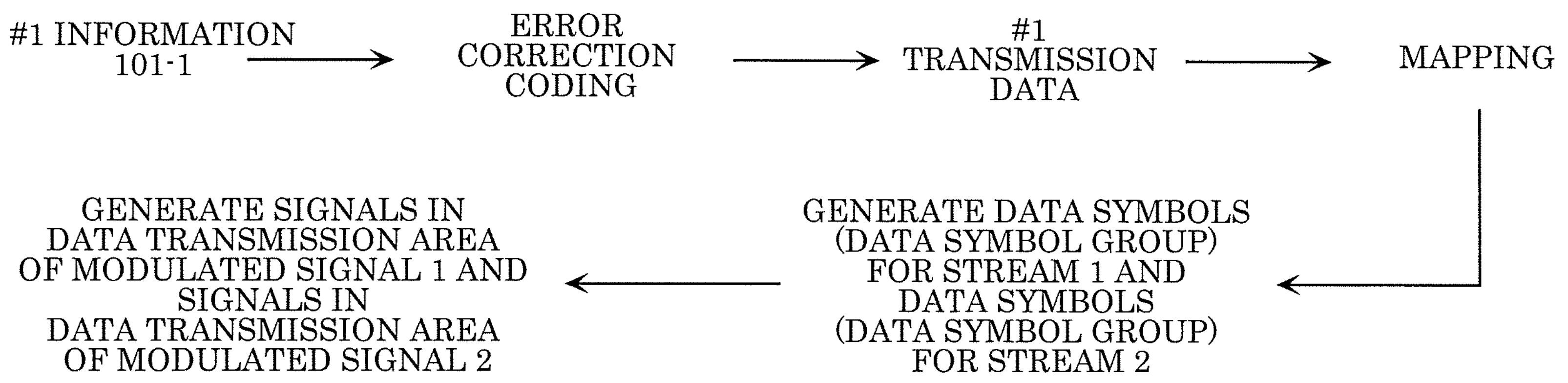
FIG. 13 is a diagram illustrating a relation of a plurality of modulated signals.

FIG. 13 is a drawing for describing a relation between #i information 101-*i* in FIGS. 1 and 3 and "modulated signal 1" and "modulated signal 2" described with reference to FIG. 12.

For example, #1 information 101-1 is subjected to error correction coding, for instance, and data obtained as a result of the error correction coding is obtained. The data obtained as a result of the error correction coding is named #1 transmission data. Data symbols are obtained by mapping #1 transmission data. The data symbols are separated into data symbols for stream 1 and data symbols for stream 2, so that data symbols (data symbol group) for stream 1 and data symbols (data symbol group) for stream 2 are obtained. At this time, a data symbol having symbol number i for stream 1 is s1(*i*) and a data symbol having symbol number i for stream 2 is s2(*i*). Then, "modulated signal 1" tx1(*i*) having symbol number i is expressed as follows, for example.

[Math. 3]

Expression (3)

$$tx1(i) = \alpha(i) \times s1(i) + \beta(i) \times s2(i)$$

Then, "modulated signal 2" tx2(*i*) having symbol number i is expressed as follows, for example.

[Math. 4]

Expression (4)

$$tx2(i) = \gamma(i) \times s1(i) + \delta(i) \times s2(i)$$

Note that in Expressions (3) and (4), a(i) can be defined by a complex number (and thus may be a real number), p(i) can be defined by a complex number (and thus may be a real number), y(i) can be defined by a complex number (and thus may be a real number), and 5(*i*) can be defined by a complex number (and thus may be a real number). Furthermore, although a(i) is indicated, a(i) may not be a function of symbol number i (may be a fixed value), although p(i) is indicated, p(i) may not be a function of symbol number i (may be a fixed value), although y(i) is indicated, y(i) may not be a function of symbol number i (may be a fixed value), and although 6(*i*) is indicated, 6(*i*) may not be a function of symbol number i (may be a fixed value).

Then, "a symbol group for modulated signal 1" which includes "signals in a data transmission area of modulated signal 1" which are constituted by data symbols is transmitted from the base station in FIG. 1 or 3. Further, "a symbol group for modulated signal 2" which includes "signals in a data transmission area of modulated signal 2" which are constituted by data symbols is transmitted from the base station in FIG. 1 or 3.

Note that signal processing such as phase modification and cyclic delay diversity (CDD) may be performed on "modulated signal 1" and "modulated signal 2". Note that the method for signal processing is not limited to those.

Figure 14:
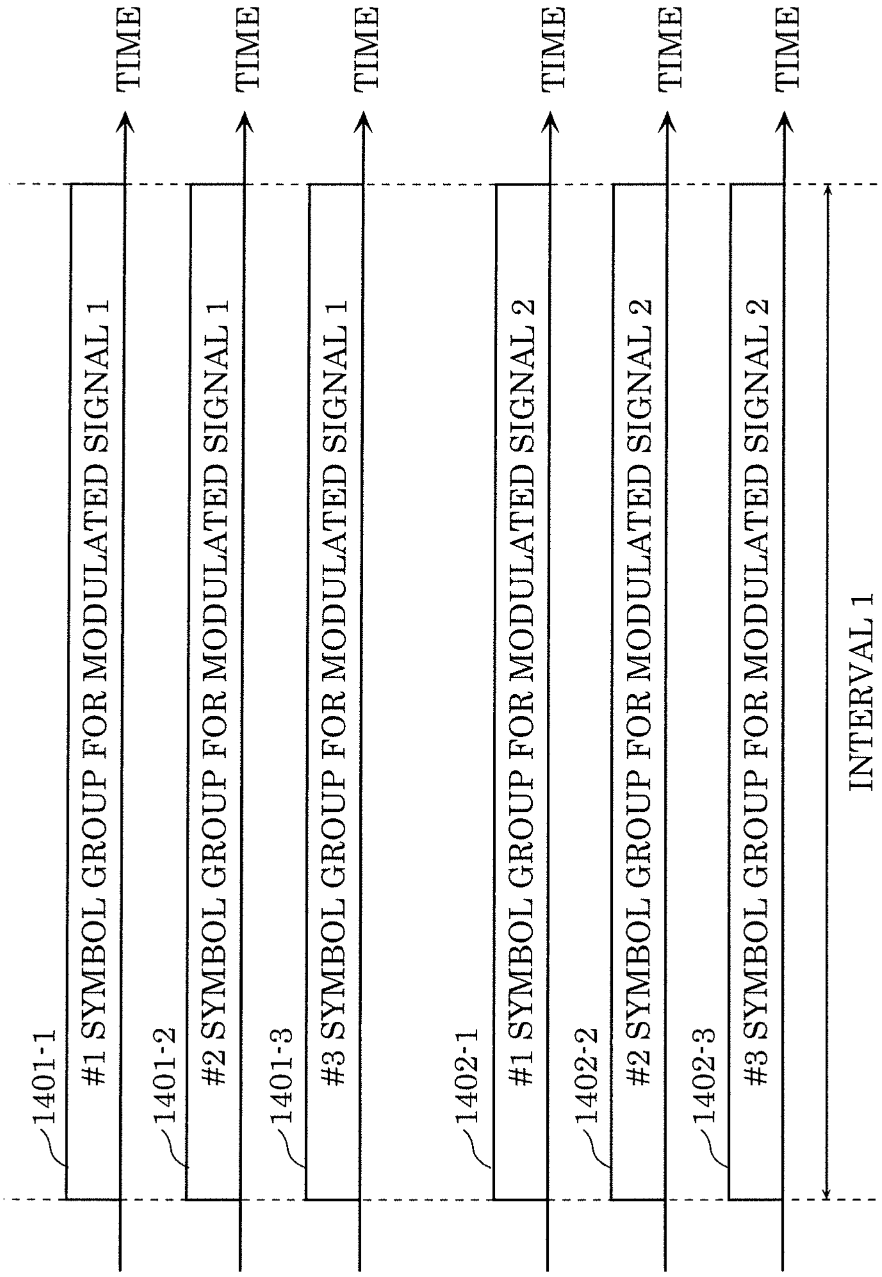
FIG. 14 is a diagram illustrating an example of a frame configuration.

FIG. 14 illustrates an example of a frame configuration when the horizontal axis indicates time.

#1 symbol group (1401-1) for modulated signal 1 in FIG. 14 is a symbol group for transmission beam 1202-1 for transmitting data of modulated signal 1 in FIG. 12.

#2 symbol group (1401-2) for modulated signal 1 in FIG. 14 is a symbol group for transmission beam 1202-2 for transmitting data of modulated signal 1 in FIG. 12.

#3 symbol group (1401-3) for modulated signal 1 in FIG. 14 is a symbol group for transmission beam 1202-3 for transmitting data of modulated signal 1 in FIG. 12.

#1 symbol group (1402-1) for modulated signal 2 in FIG. 14 is a symbol group for transmission beam 1203-1 for transmitting data of modulated signal 2 in FIG. 12.

#2 symbol group (1402-2) for modulated signal 2 in FIG. 14 is a symbol group for transmission beam 1203-2 for transmitting data of modulated signal 2 in FIG. 12.

#3 symbol group (1402-3) for modulated signal 2 in FIG. 14 is a symbol group for transmission beam 1203-3 for transmitting data of modulated signal 2 in FIG. 12.

#1 symbol group (1401-1) for modulated signal 1, #2 symbol group (1401-2) for modulated signal 1, #3 symbol group (1401-3) for modulated signal 1, #1 symbol group (1402-1) for modulated signal 2, #2 symbol group (1402-2) for modulated signal 2, and #3 symbol group (1402-3) for modulated signal 2 are present in time interval 1, for example.

As previously described, #1 symbol group (1401-1) for modulated signal 1 and #1 symbol group (1402-1) for modulated signal 2 are transmitted using the same frequency (the same frequency band), #2 symbol group (1401-2) for modulated signal 1 and #2 symbol group (1402-2) for modulated signal 2 are transmitted using the same frequency (the same frequency band), and #3 symbol group (1401-3) for modulated signal 1 and #3 symbol group (1402-3) for modulated signal 2 are transmitted using the same frequency (the same frequency band).

For example, "signal A in the data transmission area of modulated signal 1" and "signal A in the data transmission area of modulated signal 2" are generated from information in accordance with the procedure in FIG. 13.

"Signal A-1 in the data transmission area of modulated signal 1" which is a signal constituted by a signal equivalent to a signal which constitutes "signal A in the data transmission area of modulated signal 1", "signal A-2 in the data transmission area of modulated signal 1" which is a signal constituted by a signal equivalent to a signal which constitutes "signal A in the data transmission area of modulated signal 1", and "signal A-3 in the data transmission area of modulated signal 1" which is a signal constituted by a signal equivalent to a signal which constitutes "signal A in the data transmission area of modulated signal 1" are prepared (thus, the signal which constitutes "signal A-1 in the data transmission area of modulated signal 1", the signal which constitutes "signal A-2 in the data transmission area of modulated signal 1", and the signal which constitutes "signal A-3 in the data transmission area of modulated signal 1" are the same).

At this time, #1 symbol group (1401-1) for modulated signal 1 in FIG. 14 includes "signal A-1 in the data transmission area of modulated signal 1", #2 symbol group (1401-2) for modulated signal 1 in FIG. 14 includes "signal A-2 in the data transmission area of modulated signal 1", and #3 symbol group (1401-3) for modulated signal 1 in FIG. 14 includes "signal A-3 in the data transmission area of modulated signal 1". Specifically, #1 symbol group (1401-1) for modulated signal 1, #2 symbol group (1401-2) for modulated signal 1, and #3 symbol group (1401-3) for modulated signal 1 include equivalent signals.

Further, "signal A-1 in the data transmission area of modulated signal 2" which is a signal constituted by a signal equivalent to a signal which constitutes "signal A in the data transmission area of modulated signal 2", "signal A-2 in the data transmission area of modulated signal 2" which is a signal constituted by a signal equivalent to a signal which constitutes "signal A in the data transmission area of modulated signal 2", and "signal A-3 in the data transmission area of modulated signal 2" which is a signal constituted by a signal equivalent to a signal which constitutes "signal A in the data transmission area of modulated signal 2" are prepared (thus, the signal which constitutes "signal A-1 in the data transmission area of modulated signal 2", the signal which constitutes "signal A-2 in the data transmission area of modulated signal 2", and the signal which constitutes "signal A-3 in the data transmission area of modulated signal 2" are the same).

At this time, #1 symbol group (1402-1) for modulated signal 2 in FIG. 14 includes "signal A-1 in the data transmission area of modulated signal 2", #2 symbol group (1402-2) for stream 2 in FIG. 14 includes "signal A-2 in the data transmission area of modulated signal 2", and #3 symbol group (1402-3) for modulated signal 2 in FIG. 14 includes "signal A-3 in the data transmission area of modulated signal 2". Specifically, #1 symbol group (1402-1) for modulated signal 2, #2 symbol group (1402-2) for modulated signal 2, and #3 symbol group (1402-3) for modulated signal 2 include equivalent signals.

Figure 15:
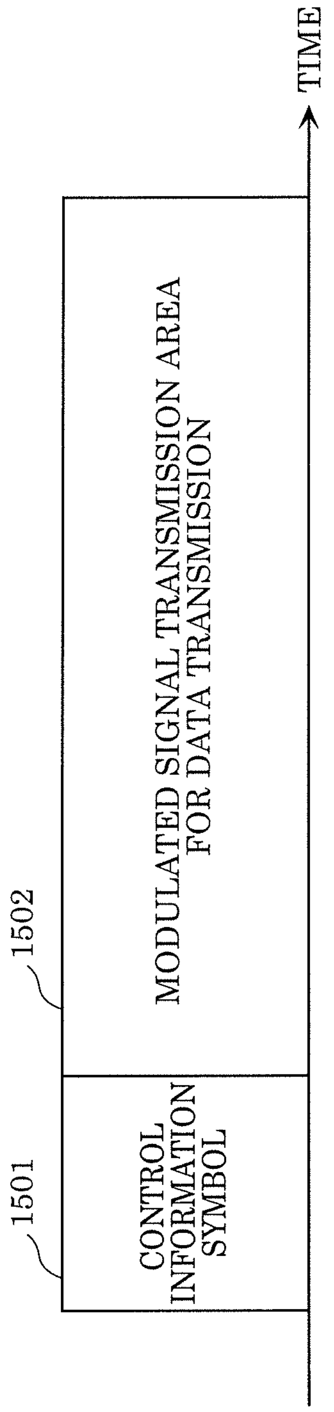
FIG. 15 is a diagram illustrating an example of a frame configuration.

FIG. 15 illustrates an example of a frame configuration of "symbol group #Y for modulated signal X" (X=1, 2; Y=1, 2, 3) described with reference to FIG. 14. In FIG. 15, the horizontal axis indicates time, 1501 indicates a control information symbol, and 1502 indicates a modulated signal transmission area for data transmission. At this time, modulated signal transmission area 1502 for data transmission includes symbols for transmitting "signal A in the data transmission area of modulated signal 1" or "signal A in the data transmission area of modulated signal 2" described with reference to FIG. 14.

Note that in the frame configuration in FIG. 15, a multi-carrier method such as an orthogonal frequency division multiplexing (OFDM) method may be used, and in this case, symbols may be present in the direction of the frequency axis. The symbols may each include a reference symbol for a receiving device to perform time synchronization and frequency synchronization, a reference symbol for a receiving device to detect a signal, and a reference symbol for a receiving device to perform channel estimation, for instance. The frame configuration is not limited to the configuration in FIG. 15, and control information symbol 1501 and modulated signal transmission area 1502 for data transmission may be arranged in any manner. A reference symbol may also be called a preamble and a pilot symbol, for example.

Next is a description of a configuration of control information symbol 1501.

Figure 16:
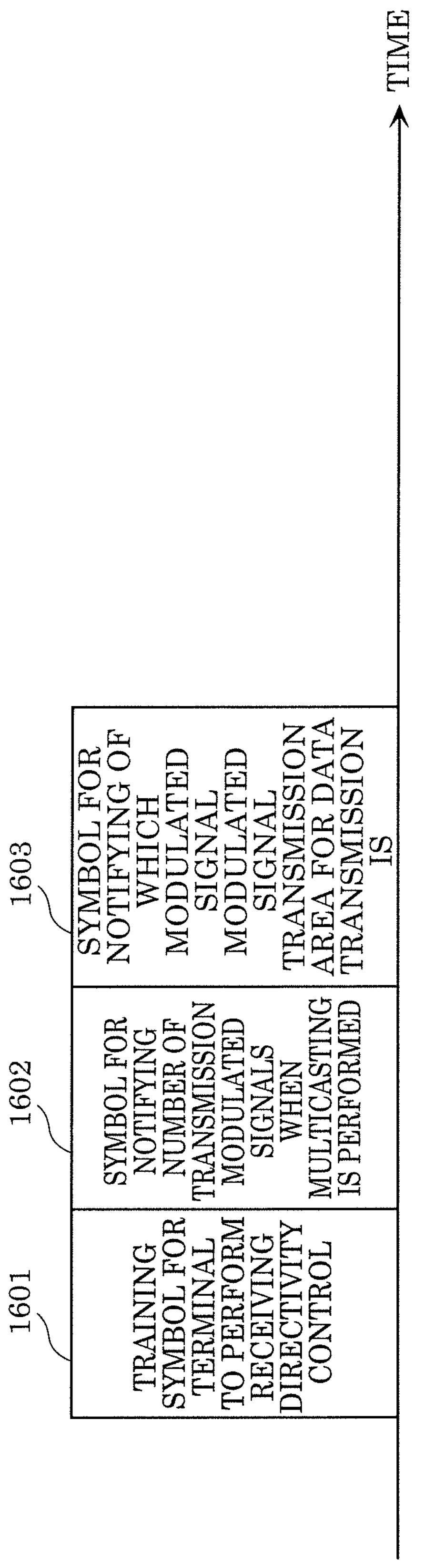
FIG. 16 is a diagram illustrating an example of a symbol configuration.

FIG. 16 illustrates an example of a configuration of symbols which are to be transmitted as a control information symbol in FIG. 15, and the horizontal axis indicates time. In FIG. 16, 1601 denotes "a training symbol for a terminal to perform receiving directivity control", and the terminal determines a signal processing method for the directivity control for receiving, which is performed by "signal processor 405" and/or "antennas 401-1 to 401-N" and/or "multipliers 603-1 to 603-L and processor 605", by receiving "training symbol for a terminal to perform receiving directivity control" 1601.

1602 denotes "a symbol for notifying the number of transmission modulated signals when multicasting is performed", and the terminal is informed of the number of modulated signals which are to be obtained, by receiving "symbol for notifying the number of transmission modulated signals when multicasting is performed" 1602.

1603 denotes "a symbol for notifying of which modulated signal a modulated signal transmission area for data transmission is", and the terminal can be informed of which modulated signal has been successfully received among modulated signals which the base station is transmitting, by receiving "symbol for notifying of which modulated signal a modulated signal transmission area for data transmission is" 1603.

An example of the above is to be described.

Now consider the case where the base station is transmitting "modulated signals" using transmission beams as illustrated in FIG. 12. Specific information on a control information symbol in #1 symbol group 1401-1 for modulated signal 1 in FIG. 14 is to be described.

In the case of FIG. 12, the base station is transmitting "modulated signal 1" and "modulated signal 2", and thus information indicated by "symbol for notifying the number of transmission modulated signals when multicasting is performed" 1602 is "2".

#1 symbol group 1401-1 for modulated signal 1 in FIG. 14 is for transmitting a signal in the data transmission area of modulated signal 1, and thus information indicated by "symbol for notifying of which modulated signal a modulated signal transmission area for data transmission is" 1603 indicates "modulated signal 1".

For example, a terminal is assumed to receive #1 symbol group 1401-1 for modulated signal 1 in FIG. 14. At this time, the terminal becomes aware that "the number of modulated signals is 2" is obtained from "symbol for notifying the number of transmission modulated signals when multicasting is performed" 1602, and that "modulated signal 1" from "symbol for notifying of which modulated signal a modulated signal transmission area for data transmission is" 1603.

The terminal then becomes aware that "the number of present modulated signals is 2" and that the obtained modulated signal is "modulated signal 1", and thus the terminal is aware that "modulated signal 2" is to be obtained. Accordingly, the terminal can start operation of searching for "modulated signal 2". The terminal searches for one of transmission beams for any of "#1 symbol group 1402-1 for modulated signal 2", "#2 symbol group 1402-2 for modulated signal 2", "#3 symbol group 1402-3 for modulated signal 2" in FIG. 14, for example.

The terminal obtains both "modulated signal 1" and "modulated signal 2", and can obtain data symbols for stream 1 and data symbols for stream 2 with high quality, by obtaining one transmission beam for "#1 symbol group 1402-1 for modulated signal 2", "#2 symbol group 1402-2 for modulated signal 2", and "#3 symbol group 1402-3 for modulated signal 2".

Configuring a control information symbol in the above manner yields advantageous effects that the terminal can precisely obtain data symbols.

As described above, in multicast data transmission and broadcast data transmission, the base station transmits data symbols using a plurality of transmission beams, and a terminal selectively receives a transmission beam with good quality among the plurality of transmission beams, thus achieving advantageous effects that a modulated signal which the base station has transmitted increases an area where high data receiving quality is achieved. This is because the base station performs transmission directivity control and receiving directivity control.

In the above description, a terminal performs receiving directivity control, yet advantageous effects can be obtained as mentioned above without the terminal performing receiving directivity control.

Note that the case where each terminal obtains both a modulated signal of stream 1 and a modulated signal of stream 2 is described with reference to FIG. 7, yet the present disclosure is not limited to such an embodiment. For example, an embodiment in which a modulated signal desired to be obtained varies depending on a terminal may be achieved as in a case where there are a terminal which desires to obtain a modulated signal of stream 1, a terminal which desires to obtain a modulated signal of stream 2, and a terminal which desires to obtain both a modulated signal of stream 1 and a modulated signal of stream 2.

Embodiment 2

Embodiment 1 has described a method in which a base station transmits data symbols using a plurality of transmission beams in multicast data transmission and broadcast data transmission. The present embodiment describes, as a variation of Embodiment 1, the case where a base station performs unicast data transmission as well as multicast data transmission and broadcast data transmission.

Figure 17:
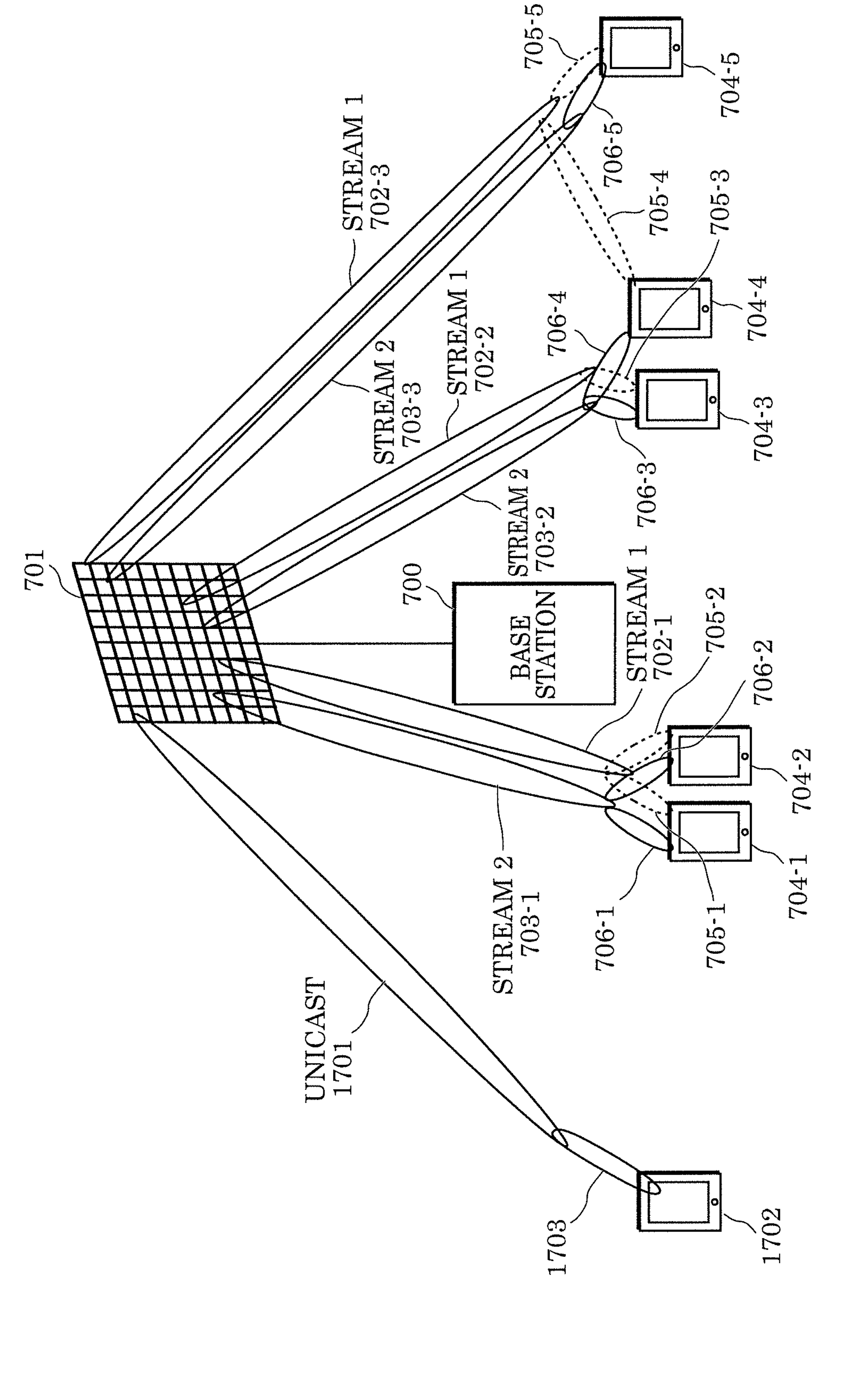
FIG. 17 is a diagram illustrating an example of a state of communication between the base station and terminals.

FIG. 17 illustrates an example of a state of communication between the base station (or an access point, for instance) and terminals. Elements which operate in the same manner as those in FIG. 7 are assigned the same reference numerals, and a detailed description thereof is omitted.

Base station 700 includes a plurality of antennas, and transmits a plurality of transmission signals through antenna 701 for transmission. At this time, base station 700 has a configuration as illustrated in, for example, FIG. 1 or 3, and performs transmission beamforming (directivity control) by signal processor 102 (and/or weighting synthesizer 301) performing precoding (weighting synthesis).

Then, transmission beams 702-1, 702-2, 702-3, 703-1, 703-2, and 703-3 are as described with reference to FIG. 7, and thus a description thereof is omitted.

Terminals 704-1, 704-2, 704-3, 704-4, and 704-5, and receiving directivities 705-1, 705-2, 705-3, 705-4, 705-5, 706-1, 706-2, 706-3, 706-4, and 706-5 are as described with reference to FIG. 7, and thus a description thereof is omitted.

In FIG. 17, a distinguishing point is that the base station performs multicasting, as described with reference to FIG. 7, and also base station 700 and a terminal (for example, 1702) perform unicast communication.

In addition to transmission beams for multicasting 702-1, 702-2, 702-3, 703-1, 703-2, and 703-3, in FIG. 17, base station 700 generates transmission beam 1701 for unicasting, and transmits to terminal 1702 data therefor. Note that FIG. 17 illustrates an example in which base station 700 transmits one transmission beam 1701 to terminal 1702. Yet, the number of transmission beams is not limited to one, and base station 700 may transmit a plurality of transmission beams to terminal 1702 (may transmit a plurality of modulated signals).

Terminal 1702 performs directivity control for receiving, via "signal processor 405" and/or "antennas 401-1 to 401-N" and/or "multipliers 603-1 to 603-L and signal processor 605", and forms receiving directivity 1703. This allows terminal 1702 to receive and demodulate transmission beam 1701.

Note that in order to generate transmission beams which include transmission beam 1701, the base station performs precoding (weighting synthesis) using signal processor 102 (and/or weighting synthesizer 301) in the configuration as illustrated in FIG. 1 or 3, for example.

On the contrary, when terminal 1702 transmits a modulated signal to base station 700, terminal 1702 performs precoding (or weighting synthesis), and transmits transmission beam 1703. Base station 700 performs directivity control for receiving and forms receiving directivity 1701. Accordingly, base station 700 can receive and demodulate transmission beam 1703.

Note that base station 700 transmits transmission beam 702-1 for transmitting data of stream 1 and transmission beam 703-1 for transmitting data of stream 2, using the same frequency (the same frequency band) at the same time. Base station 700 transmits transmission beam 702-2 for transmitting data of stream 1 and transmission beam 703-2 for transmitting data of stream 2, using the same frequency (the same frequency band) at the same time. Further, base station 700 transmits transmission beam 702-3 for transmitting data of stream 1 and transmission beam 703-3 for transmitting data of stream 2, using the same frequency (the same frequency band) at the same time.

Transmission beams 702-1, 702-2, and 702-3 for transmitting data of stream 1 may be beams having the same frequency (the same frequency band), or may be beams having different frequencies (different frequency bands). Transmission beams 703-1, 703-2, and 703-3 for transmitting data of stream 2 may be beams having the same frequency (the same frequency band), or may be beams having different frequencies (different frequency bands).

Then, transmission beam 1701 for unicasting may be a beam having the same frequency (the same frequency band) as or a different frequency (a different frequency band) from those of transmission beams 702-1, 702-2, 702-3, 703-1, 703-2, and 703-3.

A description has been given with reference to FIG. 17, assuming that a terminal which performs unicast communication is a single terminal, yet the number of terminals which perform unicast communication with the base station may be two or more.

Operation of setting unit 158 at this time in the base station having the configuration illustrated in FIG. 1 or 3 is described.

Setting unit 158 receives an input of setting signal 160. Setting signal 160 includes information with regard to "whether to perform transmission for multicasting or transmission for unicasting", and if the base station performs transmission as illustrated in FIG. 17, information indicating "to perform both transmission for multicasting and transmission for unicasting" is input to setting unit 158 according to setting signal 160.

Also, setting signal 160 includes information with regard to "the number of transmission streams when multicasting is performed" and if the base station performs transmission as illustrated in FIG. 17, information indicating that "the number of transmission streams is 2" is input to setting unit 158 according to setting signal 160.

Setting signal 160 may include information with regard to "how many transmission beams are to be used to transmit each stream". If the base station performs transmission as illustrated in FIG. 17, information indicating that "the number of transmission beams for transmitting stream 1 is 3 and the number of transmission beams for transmitting stream 2 is 3" is input to setting unit 158 according to setting signal 160.

Note that the base station in FIGS. 1 and 3 may transmit a control information symbol which includes information with regard to "whether to perform transmission for multicasting or transmission for unicasting", information with regard to "the number of transmission streams when multicasting is performed", information with regard to "how many transmission beams are to be used to transmit each stream", and others. Accordingly, a terminal can appropriately receive data.

Furthermore, the base station may transmit, to a terminal with which the base station performs unicast communication, a control information symbol for training for the base station to perform directivity control, and a control information symbol for training for a terminal to perform directivity control.

Figure 18:
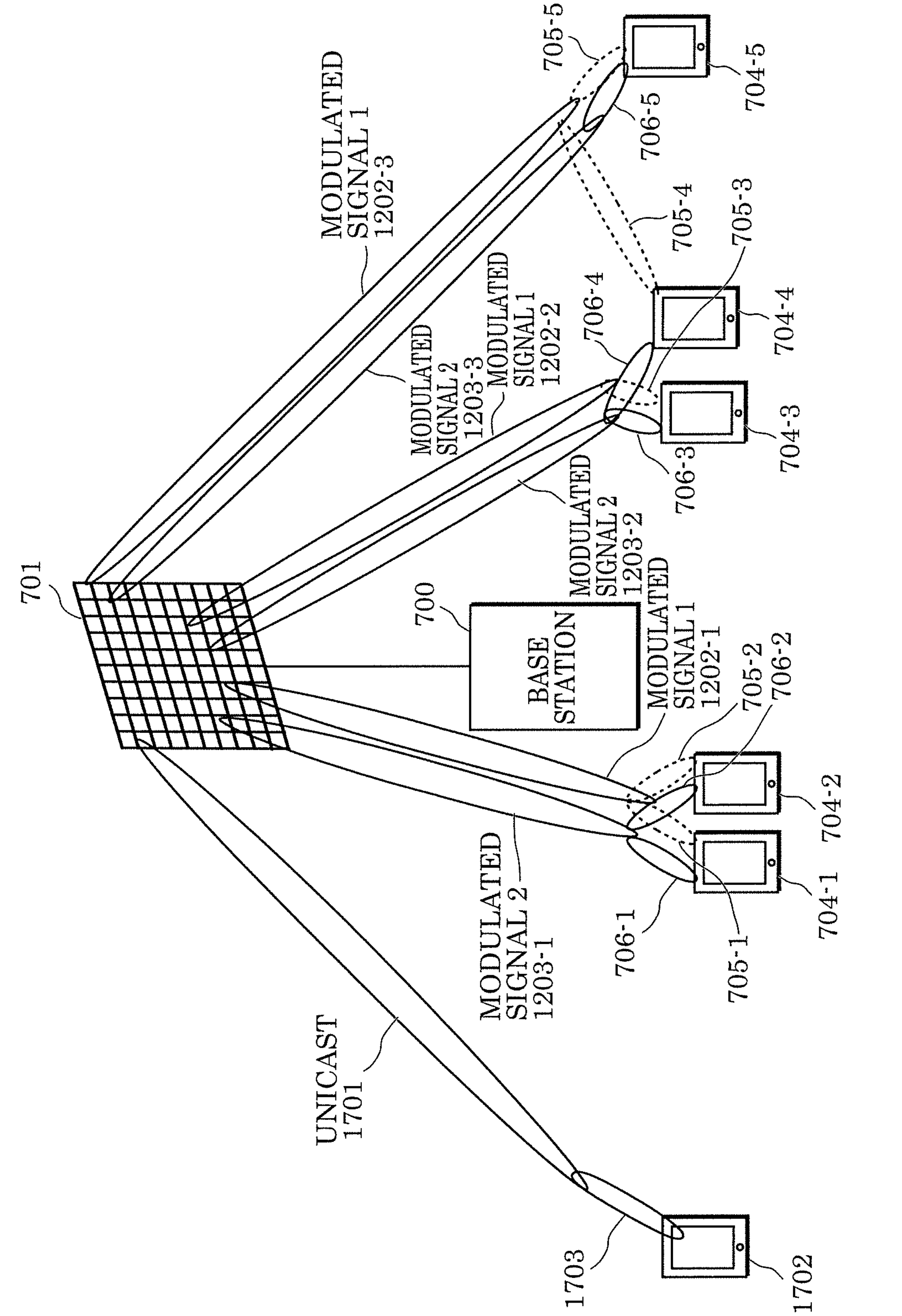
FIG. 18 is a diagram illustrating an example of a state of communication between the base station and terminals.

FIG. 18 illustrates an example of a state of communication between a base station (or an access point or the like) and terminals, and elements which operate in the same manner as those in FIGS. 7 and 12 are assigned the same reference numerals in FIG. 18, and a detailed description thereof is omitted.

Base station 700 includes a plurality of antennas, and transmits a plurality of transmission signals from antenna 701 for transmission. At this time, base station 700 has a configuration as illustrated in, for example, FIG. 1 or 3, and performs transmission beamforming (directivity control) by signal processor 102 (and/or weighting synthesizer 301) performing precoding (weighting synthesis).

A description of transmission beams 1202-1, 1202-2, 1202-3, 1203-1, 1203-2, and 1203-3 is as described with reference to FIG. 12, and thus a description thereof is omitted.

A description of terminals 704-1, 704-2, 704-3, 704-4, and 704-5, and receiving directivities 705-1, 705-2, 705-3, 705-4, 705-5, 706-1, 706-2, 706-3, 706-4, and 706-5 is as given with reference to FIG. 12, and thus a description thereof is omitted.

A distinguishing point in FIG. 18 is that while the base station performs multicasting, as described with reference to FIG. 12, base station 700 and a terminal (for example, 1702) perform unicast communication.

In FIG. 18, base station 700 generates transmission beam 1701 for unicasting in addition to transmission beams 1202-1, 1202-2, 1202-3, 1203-1, 1203-2, and 1203-3 for multicasting, and transmits to terminal 1702 data therefor. Note that FIG. 18 illustrates an example in which base station 700 transmits one transmission beam 1701 to terminal 1702, yet the number of transmission beams is not limited to one, and base station 700 may transmit a plurality of transmission beams to terminal 1702 (may transmit a plurality of modulated signals).

Terminal 1702 performs directivity control for receiving, via "signal processor 405" and/or "antennas 401-1 to 401-N" and/or "multipliers 603-1 to 603-L and signal processor 605", and forms receiving directivity 1703. Accordingly, terminal 1702 can receive and demodulate transmission beam 1701.

Note that in order to generate transmission beams which include transmission beam 1701, the base station performs precoding (weighting synthesis) in signal processor 102 (and/or, weighting synthesizer 301) in the configuration as illustrated in, for example, FIG. 1 or 3.

On the contrary, when terminal 1702 transmits a modulated signal to base station 700, terminal 1702 performs precoding (or weighting synthesis), and transmits transmission beam 1703, and base station 700 performs directivity control for receiving, and forms receiving directivity 1701. Accordingly, base station 700 can receive and demodulate transmission beam 1703.

Note that base station 700 transmits transmission beam 1202-1 for transmitting "modulated signal 1" and transmission beam 1203-1 for transmitting "modulated signal 2", using the same frequency (the same frequency band) at the same time. Then, base station 700 transmits transmission beam 1202-2 for transmitting "modulated signal 1" and transmission beam 1203-2 for transmitting "modulated signal 2", using the same frequency (the same frequency band) at the same time.

Further, base station 700 transmits transmission beam 1202-3 for transmitting "modulated signal 1" and transmission beam 1203-3 for transmitting "modulated signal 2", using the same frequency (the same frequency band) at the same time.

Transmission beams 1202-1, 1202-2, and 1202-3 for transmitting "modulated signal 1" may be beams having the same frequency (the same frequency band) or may be beams having different frequencies (different frequency bands). Transmission beams 1203-1, 1203-2, and 1203-3 for transmitting "modulated signal 2" may be beams having the same frequency (the same frequency band) or may be beams having different frequencies (different frequency bands).

Transmission beam 1701 for unicasting may be a beam having the same frequency (the same frequency band) as or a different frequency (different frequency band) from those of transmission beams 1202-1, 1202-2, 1202-3, 1203-1, 1203-2, and 1203-3.

A description has been given with reference to FIG. 18, assuming that a terminal which performs unicast communication is a single terminal, yet the number of terminals which perform unicast communication with the base station may be two or more.

Operation of setting unit 158 at this time in the base station having the configuration illustrated in FIG. 1 or 3 is described.

Setting unit 158 receives an input of setting signal 160. Setting signal 160 includes information with regard to "whether to perform transmission for multicasting or transmission for unicasting", and if the base station performs transmission as illustrated in FIG. 18, information indicating "to perform both transmission for multicasting and transmission for unicasting" is input to setting unit 158 according to setting signal 160.

Setting signal 160 also includes information with regard to "the number of transmission streams when multicasting is performed" and if the base station performs transmission as illustrated in FIG. 18, information indicating that "the number of transmission streams is 2" is input to setting unit 158 according to setting signal 160.

Setting signal 160 may include information with regard to "how many transmission beams are to be used to transmit each stream". If the base station performs transmission as illustrated in FIG. 18, information indicating that "the number of transmission beams for transmitting stream 1 is 3 and the number of transmission beams for transmitting stream 2 is 3" is input to setting unit 158 according to setting signal 160.

Note that the base station in FIGS. 1 and 3 may transmit a control information symbol which includes information with regard to "whether to perform transmission for multicasting or transmission for unicasting", information with regard to "the number of transmission streams when multicasting is performed", and information with regard to "how many transmission beams are to be used to transmit each stream", for instance.

Accordingly, a terminal can appropriately receive data.

Furthermore, the base station may transmit, to a terminal with which the base station performs unicast communication, a control information symbol for training for the base station to perform directivity control, and a control information symbol for training for a terminal to perform directivity control.

The following describes the case where the base station transmits a plurality of data by multicasting, as a variation of Embodiment 1.

Figure 19:
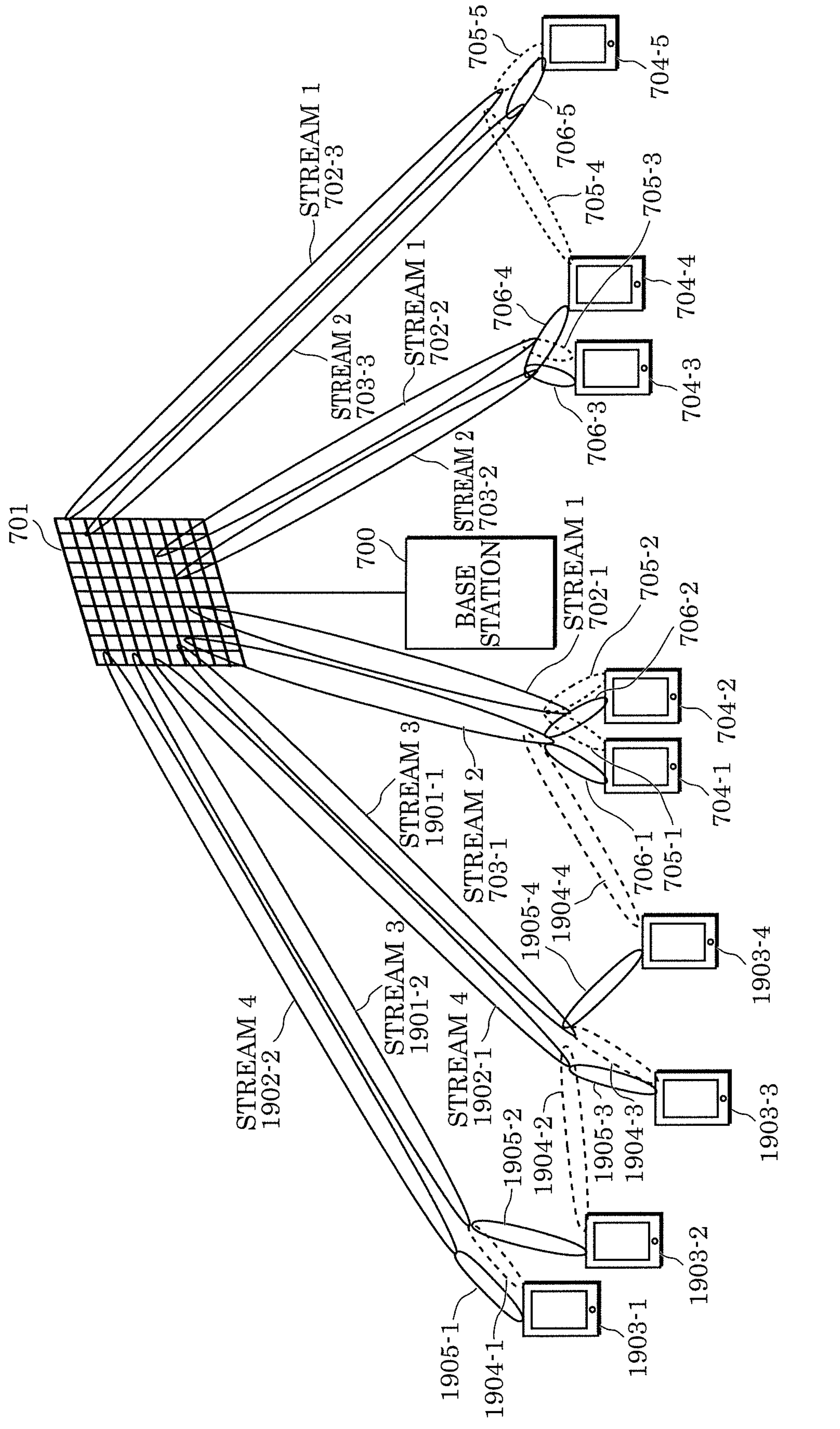
FIG. 19 is a diagram illustrating an example of a state of communication between the base station and terminals.

FIG. 19 illustrates an example of a state of communication between the base station (or an access point, for instance) and terminals, and elements which operate in the same manner as those in FIG. 7 are assigned the same reference numerals in FIG. 19, so that a detailed description thereof is omitted.

Base station 700 includes a plurality of antennas, and transmits a plurality of transmission signals through antenna 701 for transmission. At this time, base station 700 has a configuration as illustrated in, for example, FIG. 1 or 3, and performs transmission beamforming (directivity control) by signal processor 102 (and/or weighting synthesizer 301) performing precoding (weighting synthesis).

A description of transmission beams 702-1, 702-2, 702-3, 703-1, 703-2, and 703-3 is as given with reference to FIG. 7, and thus a description thereof is omitted.

A description of terminals 704-1, 704-2, 704-3, 704-4, and 704-5 and receiving directivities 705-1, 705-2, 705-3, 705-4, 705-5, 706-1, 706-2, 706-3, 706-4, and 706-5 is as described with reference to FIG. 7, and thus a description thereof is omitted.

Base station 700 transmits transmission beams 1901-1, 1901-2, 1902-1, and 1902-2, in addition to transmission beams 702-1, 702-2, 702-3, 703-1, 703-2, and 703-3.

Transmission beam 1901-1 is a transmission beam for transmitting data of stream 3. Transmission beam 1901-2 is also a transmission beam for transmitting data of stream 3.

Transmission beam 1902-1 is a transmission beam for transmitting data of stream 4. Transmission beam 1902-2 is also a transmission beam for transmitting data of stream 4.

Reference numerals 704-1, 704-2, 704-3, 704-4, 704-5, 1903-1, 1903-2, and 1903-3 denote terminals, and each have a configuration as illustrated in FIGS. 4 and 5, for example. Note that operation of terminals 704-1, 704-2, 704-3, 704-4, and 704-5 is as described with reference to FIG. 7.

Terminal 1903-1 performs directivity control for receiving, via "signal processor 405" and/or "antennas 401-1 to 401-N" and/or "multipliers 603-1 to 603-L and processor 605", and forms receiving directivity 1904-1 and receiving directivity 1905-1. Receiving directivity 1904-1 allows terminal 1903-1 to receive and demodulate transmission beam 1901-2 for transmitting data of stream 3, and receiving directivity 1905-1 allows terminal 1903-1 to receive and demodulate transmission beam 1902-2 for transmitting data of stream 4.

Terminal 1903-2 performs directivity control for receiving, via "signal processor 405" and/or "antennas 401-1 to 401-N" and/or "multipliers 603-1 to 603-L and processor 605", and forms receiving directivity 1904-2 and receiving directivity 1905-2. Receiving directivity 1904-2 allows terminal 1903-2 to receive and demodulate transmission beam 1902-1 for transmitting data of stream 4, and receiving directivity 1905-2 allows terminal 1903-2 to receive and demodulate transmission beam 1901-2 for transmitting data of stream 3.

Terminal 1903-3 performs directivity control for receiving, via "signal processor 405" and/or "antennas 401-1 to 401-N" and/or "multipliers 603-1 to 603-L and processor 605", and forms receiving directivity 1904-3 and receiving directivity 1905-3. Receiving directivity 1904-3 allows terminal 1903-3 to receive and demodulate transmission beam 1901-1 for transmitting data of stream 3, and receiving directivity 1905-3 allows terminal 1903-3 to receive and demodulate transmission beam 1902-1 for transmitting data of stream 4.

Terminal 1903-4 performs directivity control for receiving, via "signal processor 405" and/or "antennas 401-1 to 401-N" and/or "multipliers 603-1 to 603-L and processor 605", and forms receiving directivity 1904-4 and receiving directivity 1905-4. Receiving directivity 1904-4 allows terminal 1903-4 to receive and demodulate transmission beam 703-1 for transmitting data of stream 2, and receiving directivity 1905-4 allows terminal 1903-4 to receive and demodulate transmission beam 1901-1 for transmitting data of stream 3.

In FIG. 19, a distinguishing point is that the base station transmits a plurality of streams each including data for multicasting, and also transmits each stream using a plurality of transmission beams, and each terminal selectively receives one or more transmission beams for one more streams among a plurality of streams.

Note that base station 700 transmits transmission beam 702-1 for transmitting data of stream 1 and transmission beam 703-1 for transmitting data of stream 2, using the same frequency (the same frequency band) at the same time. Base station 700 transmits transmission beam 702-2 for transmitting data of stream 1 and transmission beam 703-2 for transmitting data of stream 2, using the same frequency (the same frequency band) at the same time. Further, base station 700 transmits transmission beam 702-3 for transmitting data of stream 1 and transmission beam 703-3 for transmitting data of stream 2, using the same frequency (the same frequency band) at the same time.

Base station 700 transmits transmission beam 1901-1 for transmitting data of stream 3 and transmission beam 1902-1 for transmitting data of stream 4, using the same frequency (the same frequency band) at the same time. Base station 700 transmits transmission beam 1901-2 for transmitting data of stream 3 and transmission beam 1902-2 for transmitting data of stream 4, using the same frequency (the same frequency band) at the same time.

Transmission beams 702-1, 702-2, and 702-3 for transmitting data of stream 1 may be beams having the same frequency (the same frequency band), or may be beams having different frequencies (different frequency bands). Transmission beams 703-1, 703-2, and 703-3 for transmitting data of stream 2 may be beams having the same frequency (the same frequency band), or may be beams having different frequencies (different frequency bands).

Transmission beams 1901-1 and 1901-2 for transmitting data of stream 3 may be beams having the same frequency (the same frequency band), or may be beams having different frequencies (different frequency bands). Transmission beams 1902-1 and 1902-2 for transmitting data of stream 4 may be beams having the same frequency (the same frequency band), or may be beams having different frequencies (different frequency bands).

Then, data symbols for stream 1 and data symbols for stream 2 may be generated from #1 information 101-1 in FIG. 1, and data symbols for stream 3 and data symbols for stream 4 may be generated from #2 information 101-2. Note that error correction coding may be performed on each of #1 information 101-1 and #2 information 101-2, and thereafter data symbols may be generated therefrom.

Data symbols for stream 1 may be generated from #1 information 101-1 in FIG. 1, data symbols for stream 2 may be generated from #2 information 101-2 in FIG. 1, data symbols for stream 3 may be generated from #3 information 101-3 in FIG. 1, and data symbols for stream 4 may be generated from #4 information 101-4 in FIG. 1. Note that error correction coding may be performed on each of #1 information 101-1, #2 information 101-2, #3 information 101-3, and #4 information 101-4, and thereafter data symbols may be generated therefrom.

Specifically, data symbols for streams may be generated from any of the information in FIG. 1. This yields advantageous effect that a terminal can selectively obtain a stream for multicasting.

Operation of setting unit 158 at this time in the base station having the configuration illustrated in FIG. 1 or 3 is to be described. Setting unit 158 receives an input of setting signal 160. Setting signal 160 includes information with regard to "whether to perform transmission for multicasting or transmission for unicasting", and if the base station performs transmission as illustrated in FIG. 19, information indicating "to perform transmission for multicasting" is input to setting unit 158 according to setting signal 160.

Setting signal 160 includes information with regard to "the number of transmission streams when multicasting is performed" and if the base station performs transmission as illustrated in FIG. 19, information indicating that "the number of transmission streams is 4" is input to setting unit 158 according to setting signal 160.

Setting signal 160 may include information with regard to "how many transmission beams are to be used to transmit each stream". If the base station performs transmission as illustrated in FIG. 19, information indicating that "the number of transmission beams for transmitting stream 1 is 3, the number of transmission beams for transmitting stream 2 is 3, the number of transmission beams for transmitting stream 3 is 2, and the number of transmission beams for transmitting stream 4 is 2" is input to setting unit 158 according to setting signal 160.

Note that the base station in FIGS. 1 and 3 may transmit a control information symbol which includes, for instance, information with regard to "whether to perform transmission for multicasting or transmission for unicasting", information with regard to "the number of transmission streams when multicasting is performed", and information with regard to "how many transmission beams are to be used to transmit each stream". Accordingly, a terminal can appropriately receive data.

The following describes the case where the base station transmits a plurality of data by multicasting, as a variation of Embodiment 1.

Figure 20:
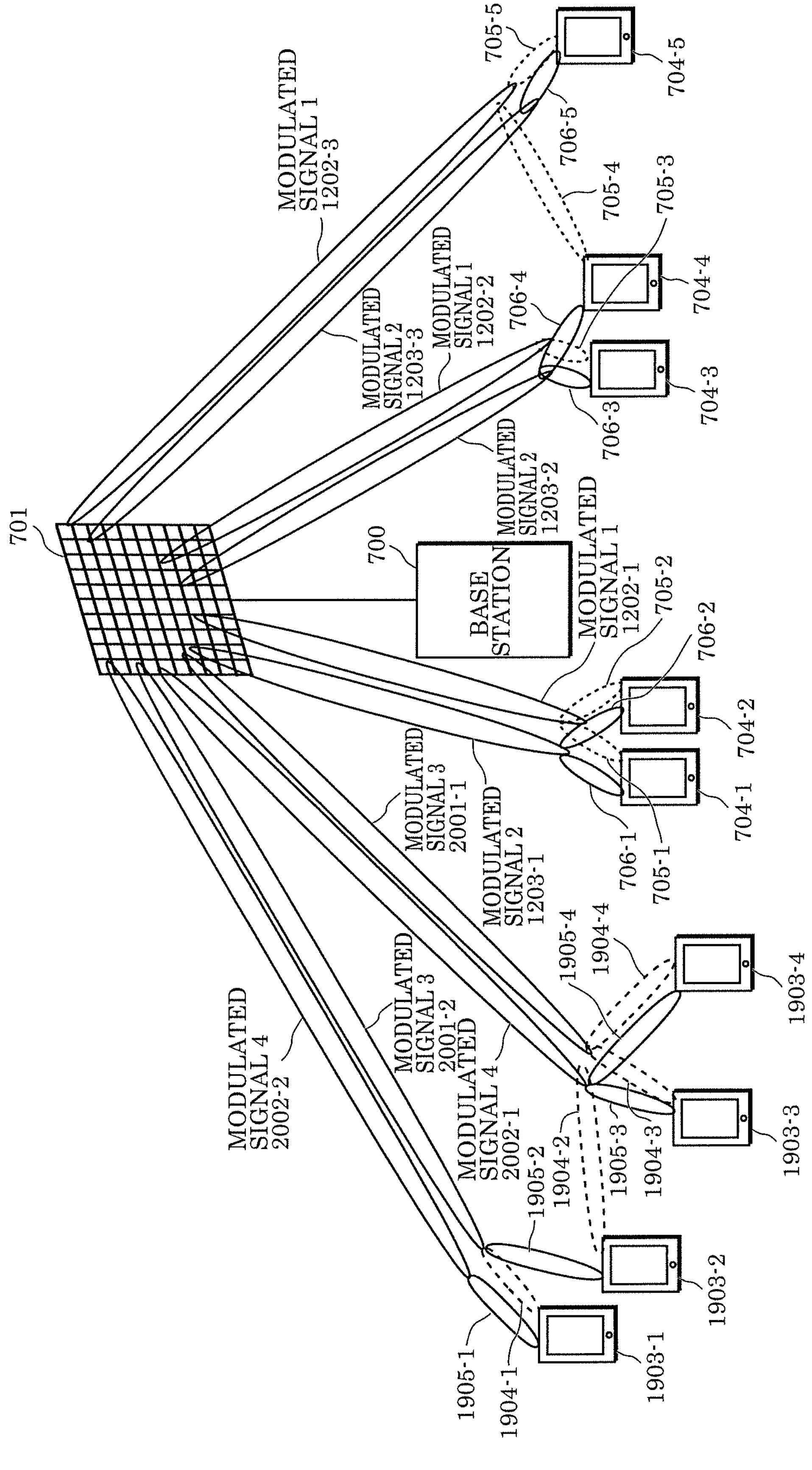
FIG. 20 is a diagram illustrating an example of a state of communication between the base station and terminals.

FIG. 20 illustrates an example of a state of communication between the base station (or an access point, for instance) and terminals, and elements which operate in the same manner as those in FIGS. 7, 12, and 19 are assigned the same reference numerals in FIG. 20, so that a detailed description thereof is omitted.

Base station 700 includes a plurality of antennas, and transmits a plurality of transmission signals from antenna 701 for transmission. At this time, base station 700 has a configuration as illustrated in, for example, FIG. 1 or 3, and performs transmission beamforming (directivity control) by signal processor 102 (and/or weighting synthesizer 301) performing precoding (weighting synthesis).

A description of transmission beams 1202-1, 1202-2, 1202-3, 1203-1, 1203-2, and 1203-3 overlaps a description given with reference to FIG. 12, and thus a description thereof is omitted.

A description of terminals 704-1, 704-2, 704-3, 704-4, and 704-5, and receiving directivity 705-1, 705-2, 705-3, 705-4, 705-5, 706-1, 706-2, 706-3, 706-4, and 706-5 overlaps a description given with reference to FIG. 12, and thus a description thereof is omitted.

Base station 700 transmits transmission beams 2001-1, 2001-2, 2002-1, and 2002-2, in addition to transmission beams 1202-1, 1202-2, 1202-3, 1203-1, 1203-2, and 1203-3.

Transmission beam 2001-1 is a transmission beam for transmitting "modulated signal 3". Transmission beam 2001-2 is also a transmission beam for transmitting "modulated signal 3".

Transmission beam 2002-1 is a transmission beam for transmitting "modulated signal 4". Transmission beam 2002-2 is also a transmission beam for transmitting "modulated signal 4".

Terminals 704-1, 704-2, 704-3, 704-4, 704-5, 1903-1, 1903-2, and 1903-3 have the same configuration as those illustrated in FIGS. 4 and 5, for example. Note that operation of terminals 704-1, 704-2, 704-3, 704-4, and 704-5 is the same as a description given with reference to FIG. 7.

Terminal 1903-1 performs directivity control for receiving, via "signal processor 405" and/or "antennas 401-1 to 401-N" and/or "multipliers 603-1 to 603-L and processor 605", and forms receiving directivity 1904-1 and receiving directivity 1905-1. Receiving directivity 1904-1 allows terminal 1903-1 to receive and demodulate transmission beam 2001-2 for transmitting "modulated signal 3", and receiving directivity 1905-1 allows terminal 1903-1 to receive and demodulate transmission beam 2002-2 for transmitting "modulated signal 4".

Terminal 1903-2 performs directivity control for receiving, via "signal processor 405" and/or "antennas 401-1 to 401-N" and/or "multipliers 603-1 to 603-L and processor 605", and forms receiving directivity 1904-2 and receiving directivity 1905-2. Receiving directivity 1904-2 allows terminal 1903-2 to receive and demodulate transmission beam 2002-1 for transmitting "modulated signal 4", and receiving directivity 1905-2 allows terminal 1903-2 to receive and demodulate transmission beam 2001-2 for transmitting "modulated signal 3".

Terminal 1903-3 performs directivity control for receiving, via "signal processor 405" and/or "antennas 401-1 to 401-N" and/or "multipliers 603-1 to 603-L and processor 605", and forms receiving directivity 1904-3 and receiving directivity 1905-3. Receiving directivity 1904-3 allows terminal 1903-3 to receive and demodulate transmission beam 2001-1 for transmitting "modulated signal 3", and receiving directivity 1905-3 allows terminal 1903-3 to receive and demodulate transmission beam 2002-1 for transmitting "modulated signal 4".

Terminal 1903-4 performs directivity control for receiving, via "signal processor 405" and/or "antennas 401-1 to 401-N" and/or "multipliers 603-1 to 603-L and processor 605", and forms receiving directivity 1904-4 and receiving directivity 1905-4. Receiving directivity 1904-4 allows terminal 1903-4 to receive and demodulate transmission beam 2001-1 for transmitting "modulated signal 3", and receiving directivity 1905-4 allows terminal 1903-4 to receive and demodulate transmission beam 2002-1 for transmitting "modulated signal 4".

In FIG. 20, the base station transmits a plurality of modulated signals each including data for multicasting, and transmits each modulated signal using a plurality of transmission beams. Each terminal selectively receives one or more transmission beams used to transmit one or more streams among the plurality of modulated signals.

Note that base station 700 transmits transmission beam 1202-1 for transmitting "modulated signal 1" and transmission beam 1203-1 for transmitting "modulated signal 2", using the same frequency (the same frequency band) at the same time. Then, base station 700 transmits transmission beam 1202-2 for transmitting "modulated signal 1" and transmission beam 1203-2 for transmitting "modulated signal 2", using the same frequency (the same frequency band) at the same time.

Further, base station 700 transmits transmission beam 1202-3 for transmitting "modulated signal 1" and transmission beam 1203-3 for transmitting "modulated signal 2", using the same frequency (the same frequency band) at the same time.

Base station 700 transmits transmission beam 2001-1 for transmitting "modulated signal 3" and transmission beam 2002-1 for transmitting "modulated signal 4", using the same frequency (the same frequency band) at the same time. Then, base station 700 transmits transmission beam 2001-2 for transmitting "modulated signal 3" and transmission beam 2002-2 for transmitting "modulated signal 4", using the same frequency (the same frequency band) at the same time.

Transmission beams 702-1, 702-2, and 702-3 for transmitting data of stream 1 may be beams having the same frequency (the same frequency band), or may be beams having different frequencies (different frequency bands). Transmission beams 703-1, 703-2, and 703-3 for transmitting data of stream 2 may be beams having the same frequency (the same frequency band), or may be beams having different frequencies (different frequency bands).

Transmission beams 2001-1 and 2001-2 for transmitting "modulated signal 3" may be beams having the same frequency (the same frequency band) or may be beams having different frequencies (different frequency bands). Transmission beams 2002-1 and 2002-2 for transmitting "modulated signal 4" may be beams having the same frequency (the same frequency band) or may be beams having different frequencies (different frequency bands).

Operation of setting unit 158 at this time in the base station having the configuration illustrated in FIG. 1 or 3 is to be described. Setting unit 158 receives an input of setting signal 160. Setting signal 160 includes information with regard to "whether to perform transmission for multicasting or transmission for unicasting", and if the base station performs transmission illustrated in FIG. 19, information indicating "to perform transmission for multicasting" is input to setting unit 158 according to setting signal 160.

Setting signal 160 includes information with regard to "the number of transmission modulated signals when multicasting is performed", and if the base station performs transmission illustrated in FIG. 20, information indicating "the number of transmission modulated signals is 4" is input to setting unit 158 according to setting signal 160. Setting signal 160 may include information with regard to "how many transmission beams are to be used to transmit each modulated signal". When the base station performs transmission illustrated in FIG. 20, information indicating that "the number of transmission beams for transmitting modulated signal 1 is 3, the number of transmission beams for transmitting modulated signal 2 is 3, the number of transmission beams for transmitting modulated signal 3 is 2, and the number of transmission beams for transmitting modulated signal 4 is 2" is input to setting unit 158 according to setting signal 160.

Note that the base station in FIGS. 1 and 3 may transmit a control information symbol which includes, for instance, information with regard to "whether to perform transmission for multicasting or transmission for unicasting", information with regard to "the number of transmission streams when multicasting is performed", information with regard to "how many transmission beams are to be used to transmit each stream". Accordingly, a terminal can appropriately receive data.

Note that in FIG. 20, if a terminal receives both a transmission beam for "modulated signal 1", and a transmission beam for "modulated signal 2", the terminal can obtain data of stream 1 and data of stream 2 with high receiving quality.

Similarly, if a terminal receives both a transmission beam for "modulated signal 3", and a transmission beam for "modulated signal 4", the terminal can obtain data of stream 3 and data of stream 4 with high receiving quality.

FIG. 20 illustrates an example in which the base station transmits "modulated signal 1", "modulated signal 2", "modulated signal 3", and "modulated signal 4", yet the base station may transmit "modulated signal 5" and "modulated signal 6" for transmitting data of stream 5 and data of stream 6, respectively, and may transmit more modulated signals in order to transmit more streams. Note that the base station transmits each of the modulated signals using one or more transmission beams.

Furthermore, as described with reference to FIGS. 17 and 18, one or more transmission beams for unicasting (or receiving directivity control) may be present.

Figure 21:
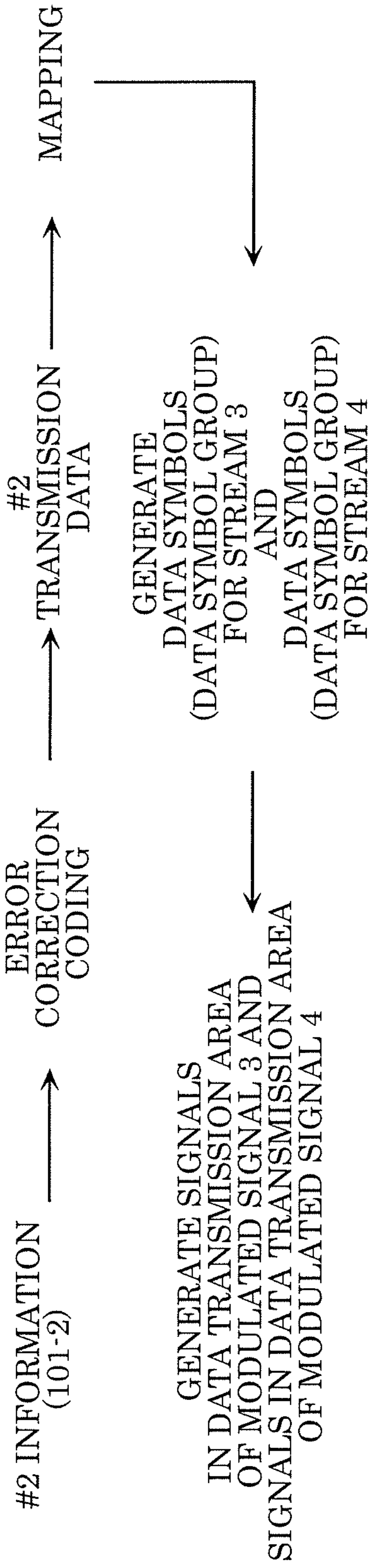
FIG. 21 is a diagram illustrating a relation of a plurality of modulated signals.

A description of a relation between "modulated signal 1" and "modulated signal 2" overlaps a description with reference to FIG. 13, and thus the description thereof is omitted. Here, a description of a relation between "modulated signal 3" and "modulated signal 4" is given with reference to FIG. 21.

For example, #2 information 101-2 is subjected to processing such as error correction coding, and data obtained as a result of the error correction coding is obtained. The data obtained as a result of the error correction coding is named #2 transmission data. Data symbols are obtained by mapping #2 transmission data. The data symbols are separated into data symbols for stream 3 and data symbols for stream 4, so that data symbols (data symbol group) for stream 3 and data symbols (data symbol group) for stream 4 are obtained. At this time, a data symbol having symbol number i for stream 3 is s3(*i*), and a data symbol having symbol number i for stream 4 is s4(*i*). Then, "modulated signal 3" tx3(*i*) having symbol number i is expressed as follows, for example.

[Math. 5]

Expression (5)

$$tx3(i)=e(i)\times s3(i)+f(i)\times s4(i)$$

Then, "modulated signal 4" tx4(*i*) having symbol number i is expressed as follows, for example.

[Math. 6]

Expression (6)

$$tx4(i)=g(i)\times s3(i)+h(i)\times s4(i)$$

Note that e(i), f(i), g(i), and h(i) in Expressions (5) and (6) can be defined by complex numbers, and thus may be real numbers.

Although e(i), f(i), g(i), and h(i) are indicated, e(i), f(i), g(i), and h(i) may not be functions of symbol number i and may be fixed values.

Then, the base station in FIG. 1 or 3 transmits "a symbol group for modulated signal 3" which includes "signals in a data transmission area of modulated signal 3" which are constituted by data symbols. Then, the base station in FIG. 1 or 3 transmits "a symbol group for modulated signal 4" which includes "signals in a data transmission area of modulated signal 4" which are constituted by data symbols.

SUPPLEMENTARY NOTE

As a matter of course, the present disclosure may be carried out by combining a plurality of the exemplary embodiments and other contents described herein.

Moreover, each exemplary embodiment and the other contents are only examples. For example, while a "modulating method, an error correction coding method (an error correction code, a code length, a coding rate and the like to be used), control information and the like" are exemplified, it is possible to carry out the present disclosure with the same configuration even when other types of a "modulating method, an error correction coding method (an error correction code, a code length, a coding rate and the like to be used), control information and the like" are applied.

As for a modulating method, even when a modulating method other than the modulating methods described herein is used, it is possible to carry out the exemplary embodiments and the other contents described herein. For example, amplitude phase shift keying (APSK), pulse amplitude modulation (PAM), phase shift keying (PSK), and quadrature amplitude modulation (QAM) may be applied, or in each modulating method, uniform mapping or non-uniform mapping may be performed. APSK includes 16APSK, 64APSK, 128APSK, 256APSK, 1024APSK, and 4096APSK, for example. PAM includes 4PAM, 8PAM, 16PAM, 64PAM, 128PAM, 256PAM, 1024PAM, and 4096PAM, for example. PSK includes BPSK, QPSK, 8PSK, 16PSK, 64PSK, 128PSK, 256PSK, 1024PSK, and 4096PSK, for example. QAM includes 4QAM, 8QAM, 16QAM, 64QAM, 128QAM, 256QAM, 1024QAM, and 4096QAM, for example.

A method for arranging signal points, such as 2 signal points, 4 signal points, 8 signal points, 16 signal points, 64 signal points, 128 signal points, 256 signal points, and 1024 signal points on an I-Q plane (a modulating method having 2 signal points, 4 signal points, 8 signal points, 16 signal points, 64 signal points, 128 signal points, 256 signal points, and 1024 signal points, for instance) is not limited to a signal point arranging method according to the modulating methods described herein.

The "base station" described herein may be a broadcast station, a base station, an access point, a terminal, or a mobile phone, for example. Then, the "terminal" described herein may be a television, a radio, a terminal, a personal computer, a mobile phone, an access point, or a base station, for instance. The "base station" and the "terminal" in the present disclosure may be devices having a communication function, and such devices may be configured to be connected with devices for running applications such as a television, a radio, a personal computer, and a mobile phone, via a certain interface. Furthermore, in the present embodiment, symbols other than data symbols, such as, for example, a pilot symbol and a symbol for control information may be arranged in any manner in frames.

Then, any names may be given to a pilot symbol and a symbol for control information, and such symbols may be, for example, known symbols modulated using PSK modulation in a transmitting device or a receiving device. Alternatively, the receiving device may be able to learn a symbol transmitted by the transmitting device by establishing synchronization. The receiving device performs, using the symbol, frequency synchronization, time synchronization, channel estimation of each modulated signal (estimation of channel state information (CSI)), and signal detection, for instance. Note that a pilot symbol may be referred to as a preamble, a unique word, a postamble, or a reference symbol, for instance.

Moreover, the control information symbol is a symbol for transmitting information that is used for realizing communication other than communication for data (data of an application, for instance) and that is to be transmitted to a communicating party (for example, a modulating method used for communication, an error correction coding method, a coding rate of the error correction coding method, setting information in an upper layer, and the like).

Note that the present disclosure is not limited to each exemplary embodiment, and can be carried out with various modifications. For example, the case where the present disclosure is performed as a communication device is described in each exemplary embodiment. However, the present disclosure is not limited to this case, and this communication method can also be used as software.

Note that a program for executing the above-described communication method may be stored in a ROM (Read Only Memory) in advance, and a CPU (Central Processing Unit) may be caused to operate this program.

Moreover, the program for executing the above-described communication method may be stored in a computer-readable storage medium, the program stored in the recording medium may be recorded in a RAM (Random Access Memory) of a computer, and the computer may be caused to operate according to this program.

Then, the configurations of the above-described exemplary embodiments, for instance, may be each realized as an LSI (Large Scale Integration) which is typically an integrated circuit having an input terminal and an output terminal. The configurations may be separately formed as one chip, or all or at least one of the configurations of the exemplary embodiments may be formed as one chip. The LSI is described here, but the integrated circuit may also be referred to as an IC (Integrated Circuit), a system LSI, a super LSI, or an ultra LSI, depending on a degree of integration. Moreover, a circuit integration technique is not limited to the LSI, and may be realized by a dedicated circuit or a general purpose processor. After manufacturing of the LSI, a programmable FPGA (Field Programmable Gate Array) or a reconfigurable processor which is reconfigurable in connection or settings of circuit cells inside the LSI may be used. Further, when development of a semiconductor technology or another derived technology provides a circuit integration technology which replaces the LSI, as a matter of course, functional blocks may be integrated by using this technology. Application of biotechnology, for instance, is one such possibility.

Embodiment 3

The present embodiment describes a multicast communication method when beamforming different from the beamforming in Embodiments 1 and 2 is applied.

The configuration of the base station is as described with reference to FIGS. 1 to 3 in Embodiment 1, and thus a description of portions which operate in the same manner as those in Embodiment 1 is omitted. Also, the configuration of a terminal which communicates with a base station is as described with reference to FIGS. 4 to 6 in Embodiment 1, and thus a description of portions which operate in the same manner as those in Embodiment 1 is omitted.

The following describes an example of operation of a base station and a terminal in the present embodiment.

Figure 22:
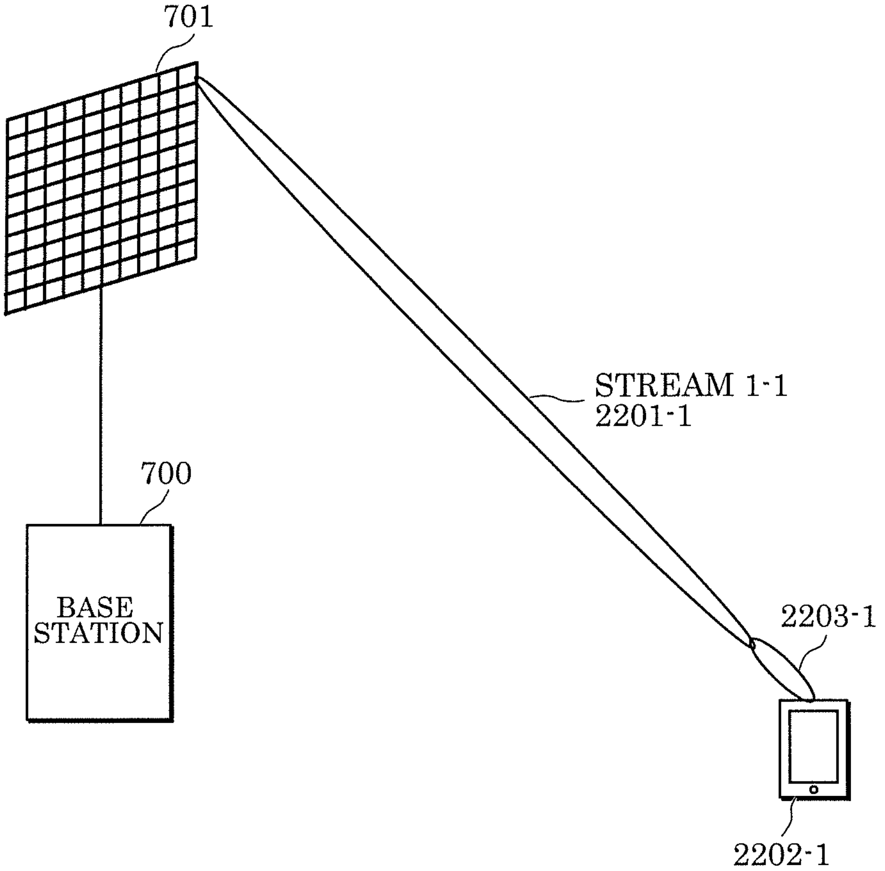
FIG. 22 is a diagram illustrating an example of a state of communication between the base station and a terminal.

FIG. 22 illustrates the case where the base station transmits a transmission stream for multicasting to one terminal.

In FIG. 22, base station 700 transmits transmission beam 2201-1 for "stream 1-1 (a first beam for stream 1) (for multicasting)" from an antenna for transmission to terminal 2202-1, and terminal 2202-1 performs directivity control to generate receiving directivity 2203-1, and receives transmission beam 2201-1 for "stream 1-1".

Figure 23:
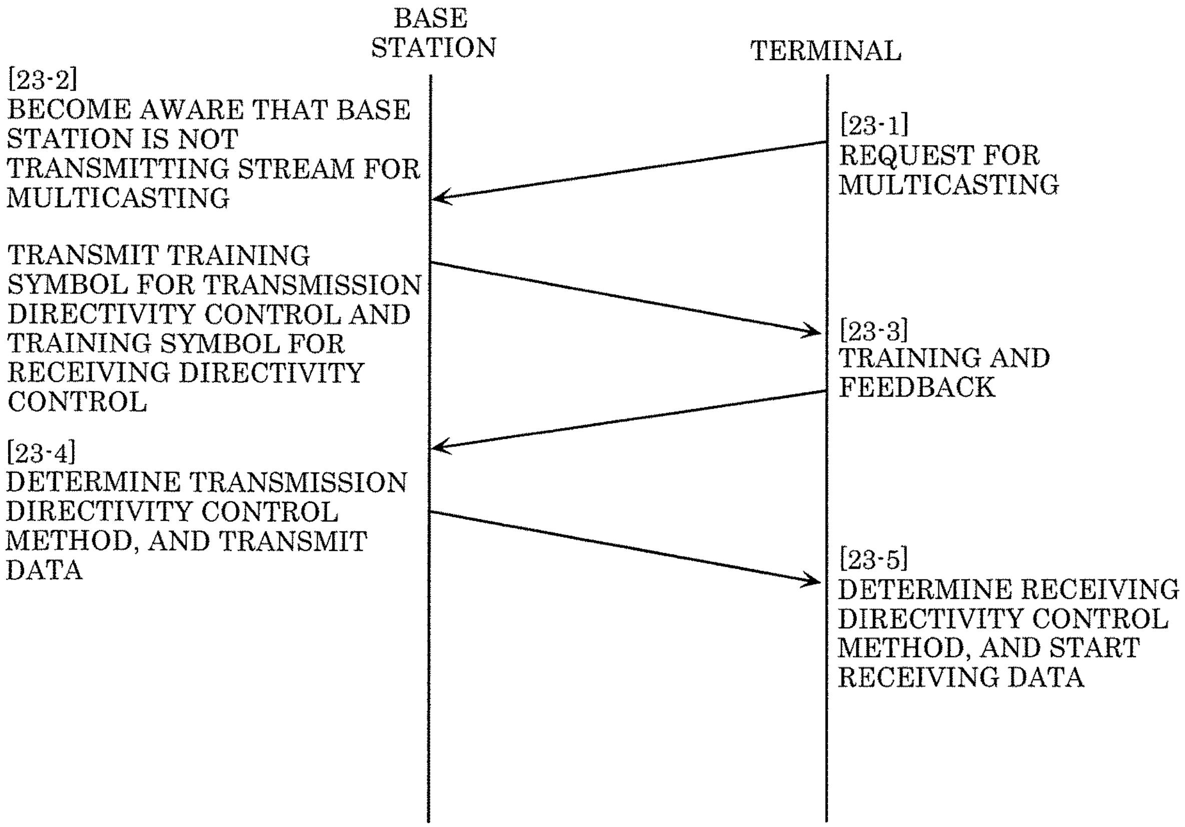
FIG. 23 is a diagram illustrating a procedure of performing communication between the base station and a terminal.

FIG. 23 is for describing a "procedure for performing communication between a base station and a terminal" to achieve the state of communication between the base station and the terminal as illustrated in FIG. 22.

[23-1] First, the terminal transmits a "request to transmit stream 1 by multicasting" to a base station.

[23-2] Upon receiving [23-1], the base station becomes aware that the base station "is not transmitting stream 1 by multicasting". Then, the base station transmits, to the terminal, a training symbol for transmission directivity control, and a training symbol for receiving directivity control, in order to transmit stream 1 by multicasting.

[23-3] The terminal receives the training symbol for transmission directivity control and the training symbol for receiving directivity control transmitted by the base station, and transmits feedback information to the base station in order that the base station performs transmission directivity control and the terminal performs receiving directivity control.

[23-4] The base station determines a method for transmission directivity control (determines, for instance, a weighting factor to be used for directivity control), based on the feedback information transmitted by the terminal, performs transmission directivity control, and transmits data symbols for stream 1.

[23-5] The terminal determines a receiving directivity control method (determines, for instance, a weighting factor to be used for directivity control), and starts receiving the data symbols for stream 1 transmitted by the base station.

Note that the "procedure for a base station and a terminal to communicate" in FIG. 23 is an example, and the order of transmitting information items is not limited to the order in FIG. 23, and communication between the base station and the terminal can be similarly established even if the order of transmitting information items has changed. FIG. 23 illustrates, as an example, the case in which the terminal performs receiving directivity control, yet the terminal may not perform receiving directivity control. In such a case, the base station may not transmit a training symbol for receiving directivity control and the terminal does not determine a receiving directivity control method, in FIG. 23.

When the base station performs transmission directivity control, if the base station has a configuration in FIG. 1, for example, multiplication coefficients for multipliers 204-1, 204-2, 204-3, and 204-4 in FIG. 2 are determined, whereas if the base station has a configuration in FIG. 3, weighting factors for weighting synthesizer 301 are determined, for example. Note that the number of streams to be transmitted is "1" in FIG. 22, yet the present disclosure is not limited to this.

When the terminal performs receiving directivity control, if the terminal has a configuration in FIG. 4, for example, multiplication coefficients for multipliers 503-1, 503-2, 503-3, and 503-4 in FIG. 5 are determined, whereas when the terminal has the configuration in FIG. 6, multiplication coefficients for multipliers 603-1, 603-2, . . . , and 603-L, for example, are determined.

Figure 24:
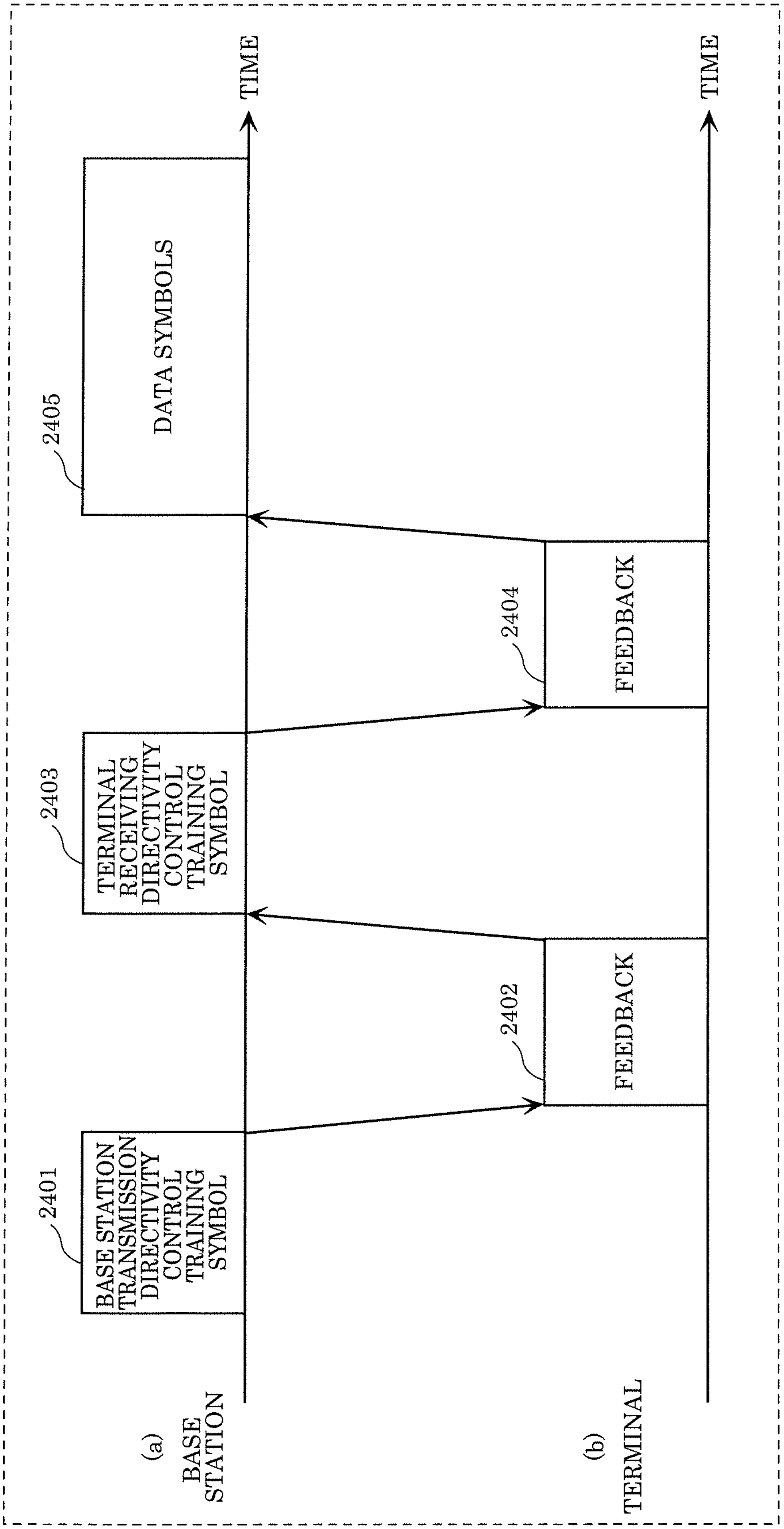
FIG. 24 is a diagram illustrating examples of symbols which the base station and a terminal transmit.

FIG. 24 is a diagram illustrating examples of symbols which the base station transmits and symbols which a terminal transmits along a time-axis, when the base station in FIG. 23 transmits a symbol for transmission directivity control, a symbol for receiving directivity control, and data symbols. In FIG. 24, (a) is a diagram illustrating examples of symbols which the base station transmits, along the time-axis, and (b) is a diagram illustrating examples of symbols which the terminal transmits along the time-axis, while the horizontal axis indicates time in both of (a) and (b).

When the base station and the terminal communicate with each other as illustrated in FIG. 23, first, the base station transmits "base station transmission directivity control training symbol" 2401 as illustrated in FIG. 24. For example, "base station transmission directivity control training symbol" 2401 includes a control information symbol and a known PSK symbol.

Then, the terminal receives "base station transmission directivity control training symbol" 2401 transmitted by the base station, and transmits, as feedback information symbol 2402, information on an antenna to be used by the base station for transmission and information on multiplication coefficients (or weighting factors) to be used for directivity control, for example.

The base station receives "feedback information symbol" 2402 transmitted by the terminal, determines an antenna to be used for transmission from feedback information symbol 2402, and determines a coefficient to be used for transmission directivity control from feedback information symbol 2402. After that, the base station transmits "terminal receiving directivity control training symbol" 2403. For example, "terminal receiving directivity control training symbol" 2403 includes a control information symbol and a known PSK symbol.

Then, the terminal receives "terminal receiving directivity control training symbol" 2403 transmitted by the base station, and determines an antenna which the terminal is to use for receiving and a multiplication coefficient which the terminal is to use for receiving directivity control, for example. Then, the terminal transmits feedback information symbol 2404, notifying that preparation for receiving data symbols is completed.

Then, the base station receives "feedback information symbol" 2404 transmitted by the terminal, and outputs data symbols 2405 based on feedback information symbol 2404.

Note that communication between the base station and the terminal in FIG. 24 is an example, and the order of transmitting symbols and the order in which the base station and the terminal transmit symbols are not limited to those illustrated therein. "Base station transmission directivity control training symbol" 2401, "feedback information symbol" 2402, "terminal receiving directivity control training symbol" 2403, "feedback information symbol" 2404, and "data symbols" 2405 may each include: a preamble for signal detection, time synchronization, frequency synchronization, frequency offset estimation, and channel estimation, a reference symbol, a pilot symbol, and a symbol for transmitting control information, for instance.

Figure 25:
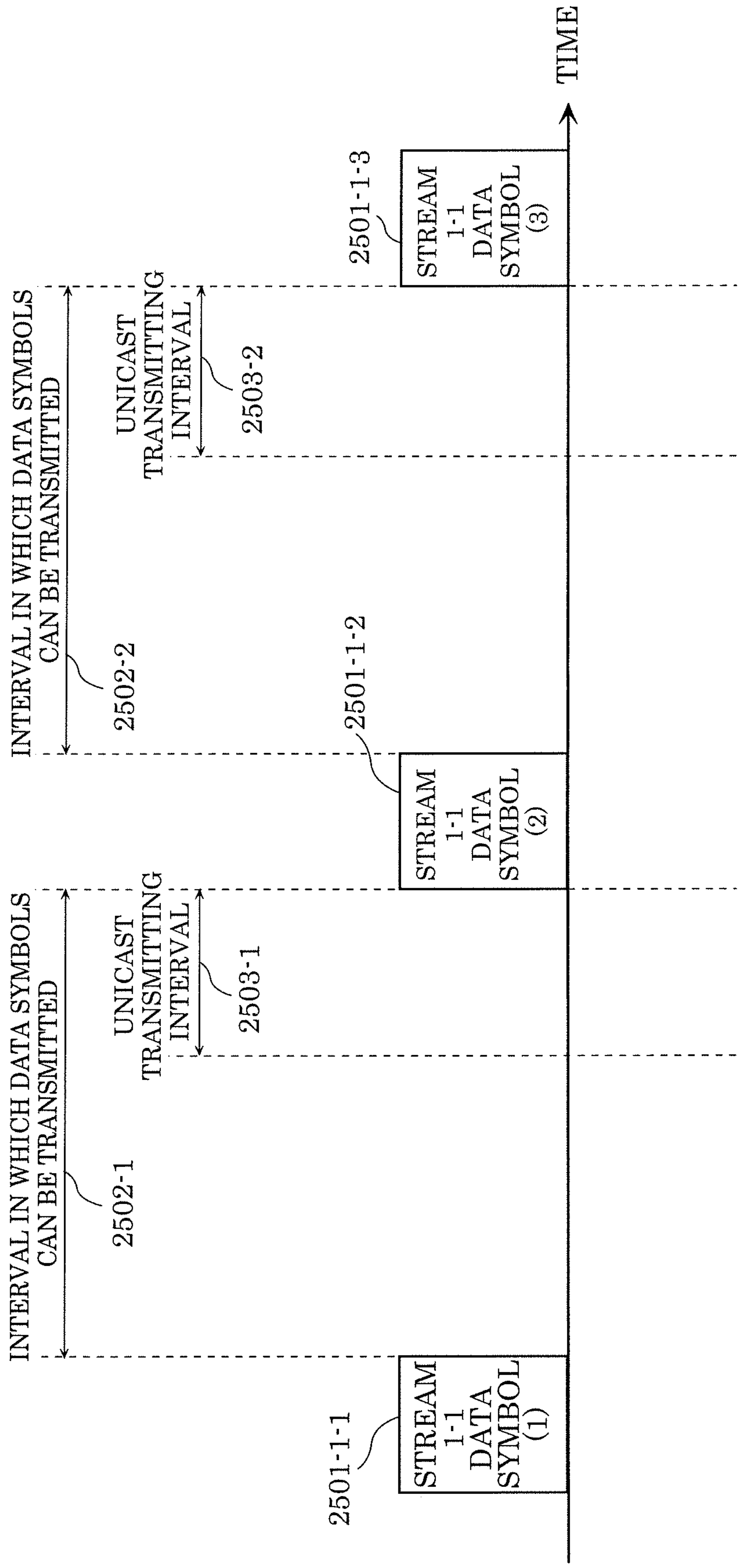
FIG. 25 is a diagram illustrating examples of symbols which the base station transmits.

FIG. 25 illustrates examples of symbols which the base station transmits when the base station transmits data symbols for stream 1 after communication between the base station and the terminal in FIG. 23 is completed, while the horizontal axis indicates time.

In FIG. 25, the base station transmits a first data symbol for transmission beam 1 for stream 1 as "stream 1-1 data symbol (1) (for multicasting)" 2501-1-1. After that, interval 2502-1 in which data symbols can be transmitted is arranged.

After that, the base station transmits a second data symbol for transmission beam 1 for stream 1 (for multicasting) as "stream 1-1 data symbol (2) (for multicasting)" 2501-1-2. After that, interval 2502-2 in which data symbols can be transmitted is arranged.

After that, the base station transmits a third data symbol for transmission beam 1 for stream 1 (for multicasting) as "stream 1-1 data symbol (3) (for multicasting)" 2501-1-3.

Accordingly, the base station transmits data symbols for "stream (for multicasting) 1-1" 2201-1 illustrated in FIG. 22. Note that in FIG. 25, "stream 1-1 data symbol (1) (for multicasting)" 2501-1-1, "stream 1-1 data symbol (2) (for multicasting)" 2501-1-2, "data symbol 1-1 data symbol (3) (for multicasting)" 2501-1-3, and so on may each include, other than a data symbol, a preamble for signal detection, time synchronization, frequency synchronization, frequency offset estimation, and channel estimation, a reference symbol, a pilot symbol, and a symbol for transmitting control information, for instance.

Note that in FIG. 25, interval 2502-1 in which data symbols can be transmitted includes unicast transmitting interval 2503-1, and interval 2502-2 in which data symbols can be transmitted includes unicast transmitting interval 2503-2.

In FIG. 25, a frame includes unicast transmitting intervals 2503-1 and 2503-2. For example, in FIG. 25, the base station may transmit symbols for multicasting in an interval within interval 2502-1 in which data symbols can be transmitted and other than unicast transmitting interval 2503-1, and an interval within interval 2502-2 in which data symbols can be transmitted and other than unicast transmitting interval 2503-2. This point will be described later using an example.

Thus, including a unicast transmitting interval in a frame is a useful feature for stably operating a wireless communication system. This point will be later described using an example. Note that the unicast transmitting intervals may not be in the temporal positions as illustrated in FIG. 25, and may be arranged in any temporal positions. Note that in the unicast transmitting intervals, the base station may transmit symbols or the terminal may transmit symbols.

Furthermore, a configuration may be adopted in which the base station can directly set a unicast transmitting interval, or as another method, the base station may set the maximum transmission-data transmission speed for transmitting symbols for multicasting.

For example, when the transmission speed at which the base station can transmit data is 2 Gbps (bps: bits per second) and the maximum transmission speed at which the base station can transmit data that can be assigned to transmit symbols for multicasting is 1.5 Gbps, a unicast transmitting interval corresponding to 500 Mbps can be set.

Accordingly, a configuration may be adopted in which the base station can indirectly set a unicast transmitting interval. Note that another specific example will be described later.

Note that in accordance with the state in FIG. 22, FIG. 25 illustrates a frame configuration in which "stream 1-1 data symbol (1) (for multicasting)" 2501-1-1, "stream 1-1 data symbol (2) (for multicasting)" 2501-1-2, and "stream 1-1 data symbol (3) (for multicasting)" 2501-1-3 are present, yet the present disclosure is not limited to such a frame configuration. For example, a data symbol for a stream for multicasting other than stream 1 (stream 1-1) may be present, a data symbol for stream 1-2 which is a second transmission beam for stream 1, and a data symbol for stream 1-3 which is a third transmission beam for stream 1 may be present. This point will be described later.

Figure 26:
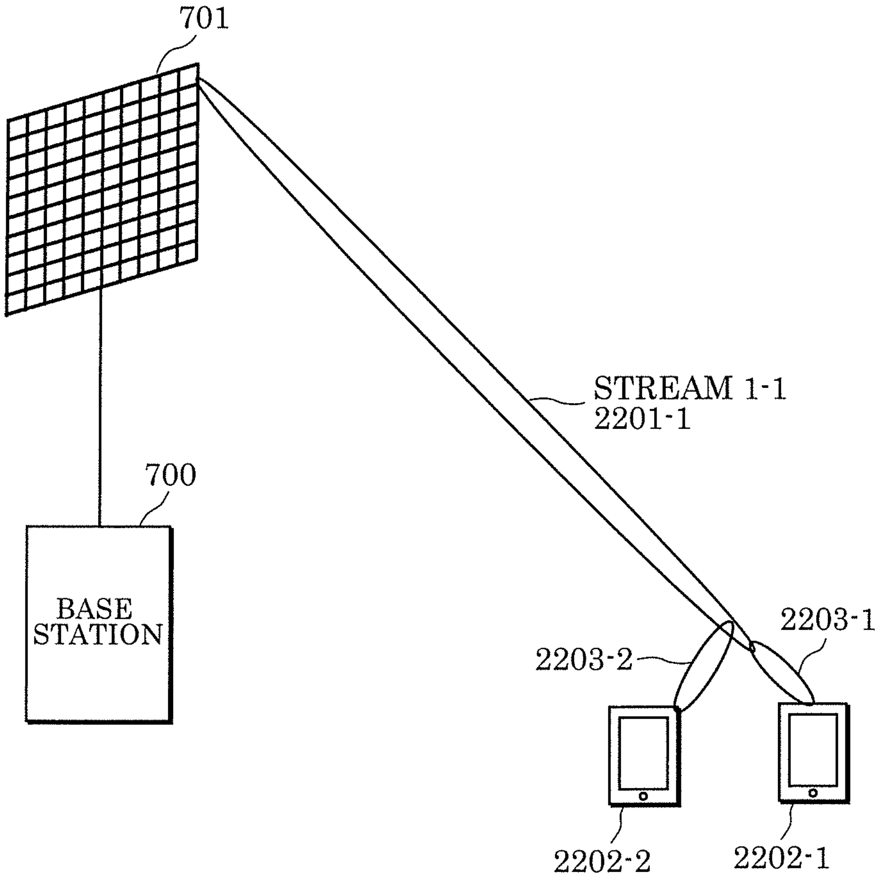
FIG. 26 is a diagram illustrating an example of a state of communication between the base station and terminals.

FIG. 26 illustrates a state when a terminal is newly added to the state in FIG. 22 in which the base station transmits transmission streams for multicasting to one terminal, and elements which operate in the same manner as those in FIG. 22 are assigned the same reference numerals.

In FIG. 26, the terminal newly added is 2202-2. Terminal 2202-2 generates receiving directivity 2203-2 by performing directivity control, and receives transmission beam 2201-1 for "stream 1-1 (for multicasting)".

The following describes FIG. 26.

Figure 27:
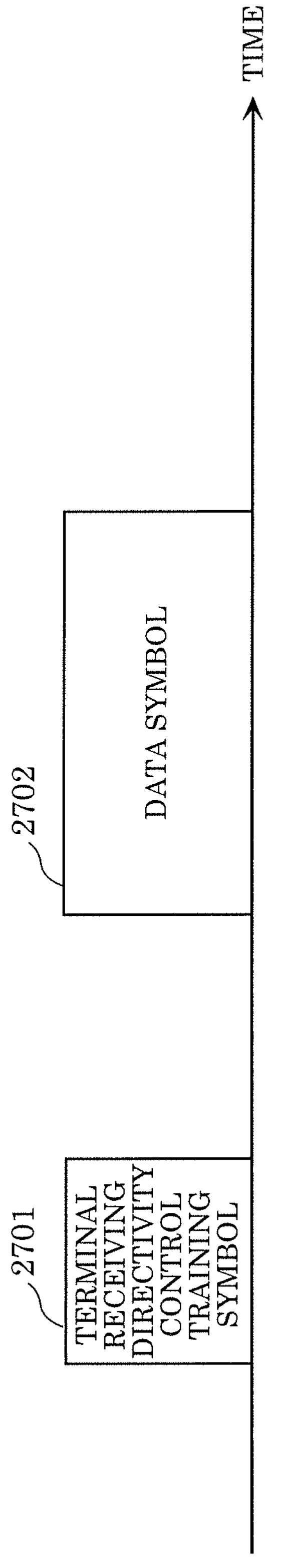
FIG. 27 is a diagram illustrating examples of symbols which the base station transmits.

In the following description, in FIG. 26, terminal 2202-2 newly participates in the multicast communication in a state where base station 700 and terminal 2202-1 are performing multicast communication. Thus, as illustrated in FIG. 27, the base station transmits "terminal receiving directivity control training symbol" 2701 and "data symbol" 2702, and does not transmit "base station transmission training symbol" illustrated in FIG. 24. Note that in FIG. 27, the horizontal axis indicates time.

Figure 28:
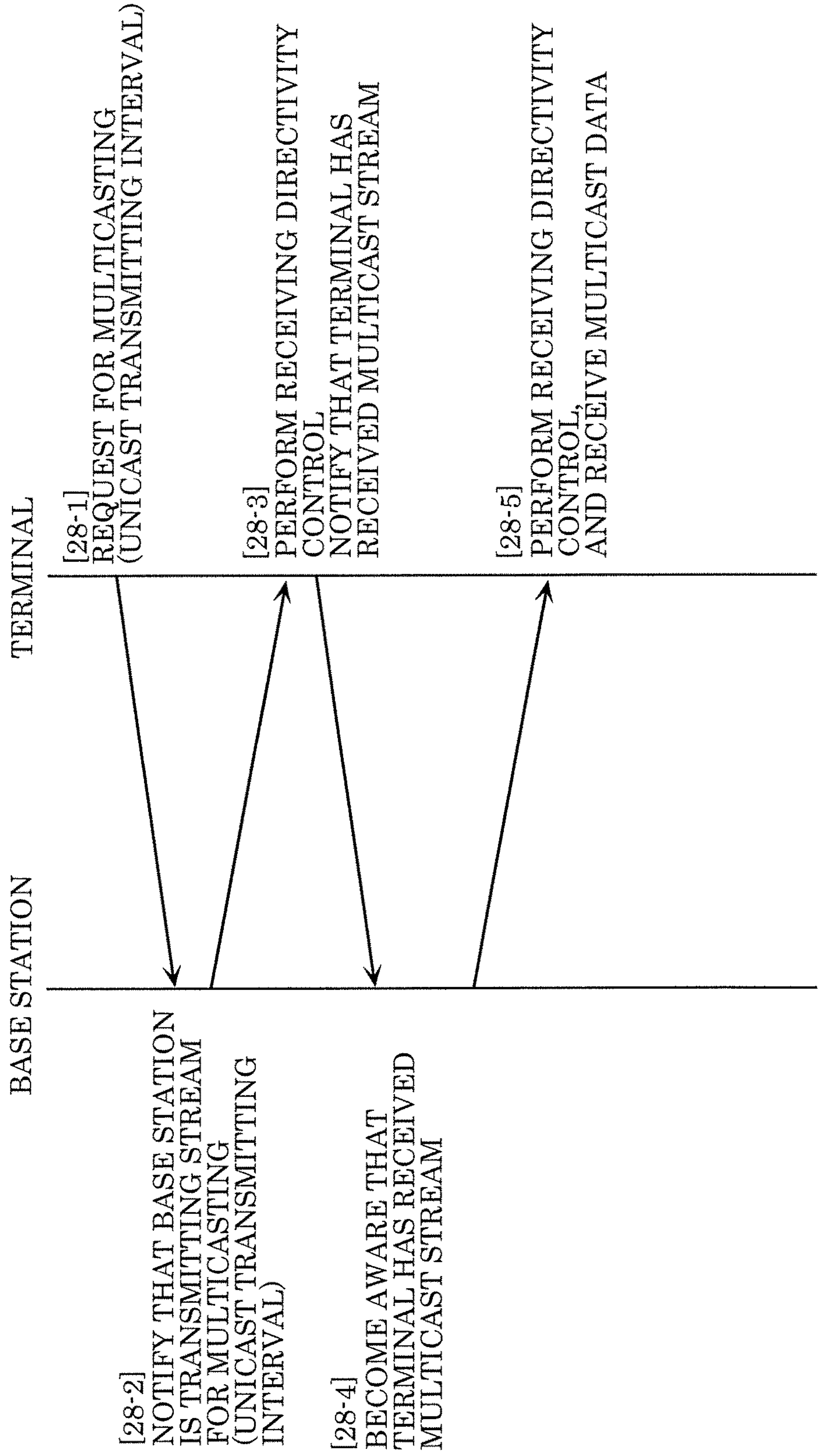
FIG. 28 is a diagram illustrating a procedure of performing communication between the base station and a terminal.

FIG. 28 illustrates an example of operation performed to achieve a state in which the base station transmits transmission beams for multicasting to two terminals as illustrated in FIG. 26.

[28-1] Terminal 2202-2 transmits a "request to transmit stream 1 by multicasting" to the base station. Note that the "request to transmit stream 1 by multicasting" is transmitted in a unicast transmitting interval in FIG. 25.

[28-2] Upon receiving [28-1], the base station notifies terminal 2202-2 that "the base station is transmitting stream 1 for multicasting". Note that the base station transmits a notification indicating that "the base station is transmitting stream 1 for multicasting" in a unicast transmitting interval in FIG. 25.

[28-3] Upon receiving [28-2], terminal 2202-2 performs receiving directivity control, in order to start receiving stream 1 for multicasting. Then, terminal 2202-2 performs receiving directivity control, and notifies the base station that "terminal 2202-2 has successfully received stream 1 for multicasting".

[28-4] Upon receiving [28-3], the base station becomes aware that the terminal has successfully received "stream 1 for multicasting".

[28-5] Terminal 2202-2 performs receiving directivity control, and starts receiving "stream 1 for multicasting".

Figure 29:
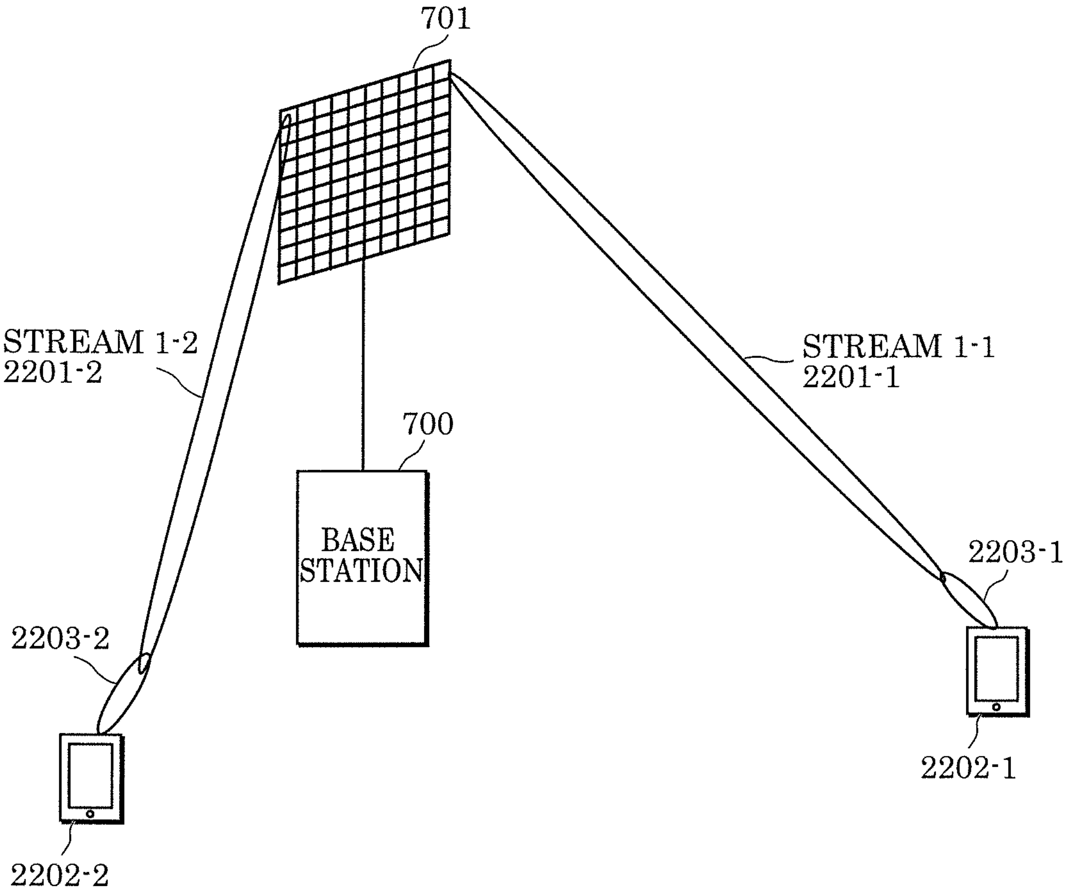
FIG. 29 is a diagram illustrating an example of a state of communication between the base station and terminals.

FIG. 29 illustrates that a terminal is newly added to a state in FIG. 22 in which the base station is transmitting a transmission stream for multicasting to one terminal. Elements which operate in the same manner as those in FIG. 22 are assigned the same reference numerals.

In FIG. 29, the terminal newly added is 2202-2. At this time, different points from FIG. 26 are that base station 700 newly transmits transmission beam 2201-2 for "stream 1-2 (second transmission beam for stream 1) (for multicasting)", and terminal 2202-2 performs directivity control to generate receiving directivity 2203-2, and receives transmission beam 2201-2 for "stream 1-2 (for multicasting)".

The following describes control for achieving the state as in FIG. 29.

In the following description, in FIG. 29, terminal 2202-2 newly participates in multicast communication in a state in which base station 700 and terminal 2202-1 are performing multicast communication.

Figure 30:
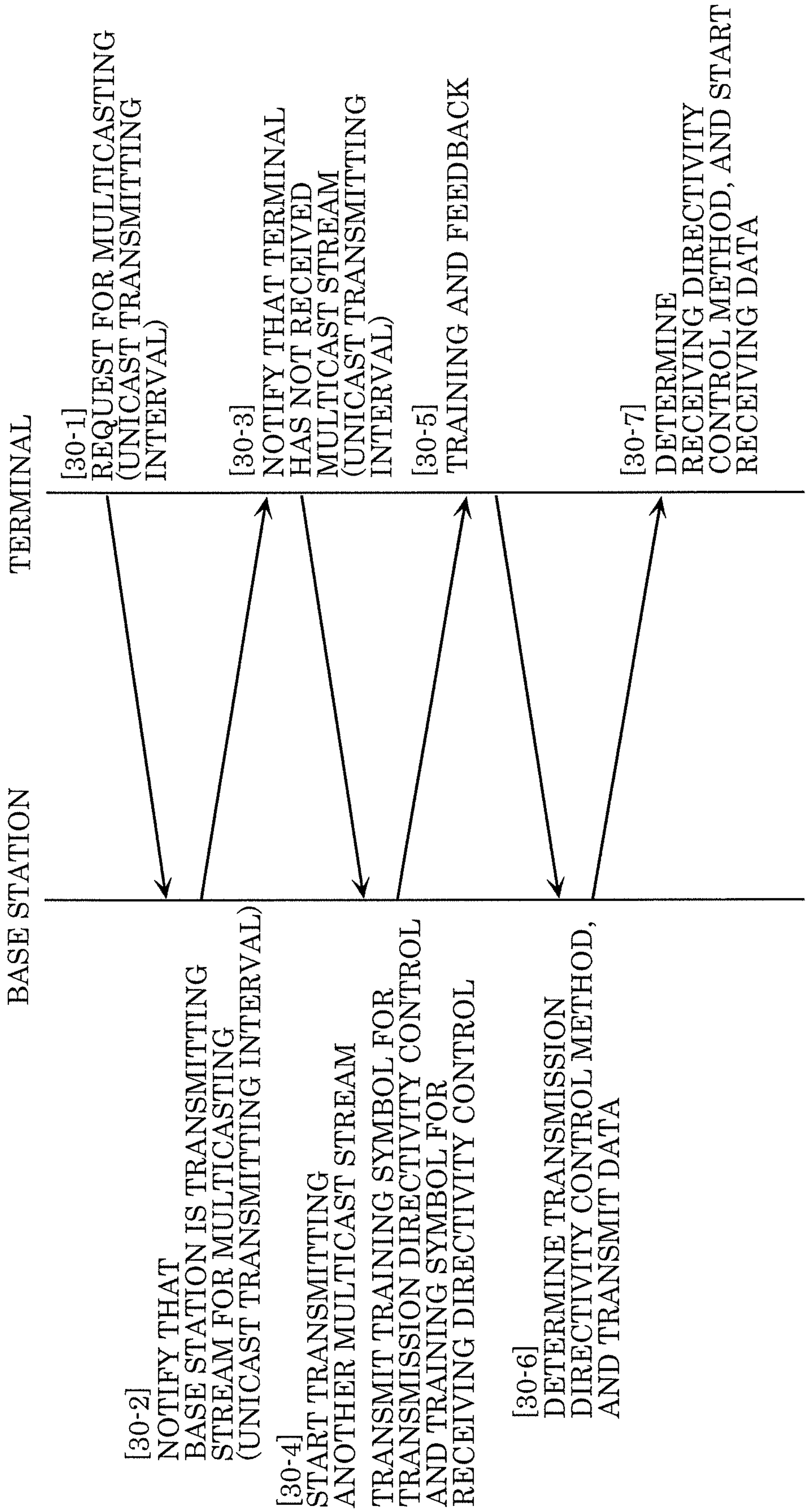
FIG. 30 is a diagram illustrating a procedure of performing communication between the base station and a terminal.

FIG. 30 illustrates an example of operation performed in order to achieve a state in which the base station transmits transmission beams for multicasting to two terminals, as illustrated in FIG. 29.

[30-1] Terminal 2202-2 transmits a "request to transmit stream 1 by multicasting" to the base station. Note that the "request to transmit stream 1 by multicasting" is transmitted in a unicast transmitting interval in FIG. 25.

[30-2] Upon receiving [30-1], the base station notifies terminal 2202-2 that "the base station is transmitting stream 1 for multicasting". Note that the base station transmits a notification indicating that "the base station is transmitting stream 1 for multicasting" in a unicast transmitting interval in FIG. 25.

[30-3] Upon receiving [30-2], terminal 2202-2 notifies the base station that "terminal 2202-2 has not received stream 1 for multicasting". Note that terminal 2202-2 transmits the notification indicating that "stream 1 for multicasting is not received" in a unicast transmitting interval in FIG. 25.

[30-4] Upon receiving [30-3], the base station determines to transmit another transmission beam (specifically, transmission beam 2201-2 in FIG. 29) for stream 1 for multicasting. Note that here, the base station determines to transmit another transmission beam for stream 1 for multicasting, yet the base station may determine not to transmit another transmission beam for stream 1 for multicasting. This point will be later described.

Thus, the base station transmits a training symbol for transmission directivity control and a training symbol for receiving directivity control to terminal 2202-2, in order to transmit stream 1 by multicasting. Note that the base station transmits a transmission beam for stream 1-1 in FIG. 29, separately from transmission of these symbols. This point will be described later.

[30-5] Terminal 2202-2 receives a training symbol for transmission directivity control and a training symbol for receiving directivity control which the base station has transmitted, and transmits feedback information to the base station in order that the base station performs transmission directivity control and terminal 2202-2 performs receiving directivity control.

[30-6] Based on the feedback information transmitted by terminal 2202-2, the base station determines a method for transmission directivity control (determines, for instance, a weighting factor to be used when performing directivity control), and transmits a data symbol for stream 1 (transmission beam 2201-2 for stream 1-2 in FIG. 29).

[30-7] Terminal 2202-2 determines a receiving directivity control method (determines, for instance, a weighting factor to be used when performing directivity control), and starts receiving data symbols for stream 1 (transmission beam 2201-2 for stream 1-2 in FIG. 29) which the base station has transmitted.

Note that the "procedure for a base station and a terminal to communicate" in FIG. 30 is an example, and the order of transmitting information items is not limited to the order in FIG. 30. Thus, communication between the base station and the terminal can be similarly established even if the order of transmitting information items has changed.

FIG. 30 illustrates an example in which the terminal performs receiving directivity control, yet the terminal may not perform receiving directivity control. In such a case, the base station may not transmit a training symbol for receiving directivity control, and the terminal may not determine a receiving directivity control method, in FIG. 30.

When the base station performs transmission directivity control, if the base station has a configuration in FIG. 1, for example, multiplication coefficients for multipliers 204-1, 204-2, 204-3, and 204-4 in FIG. 2 are determined, whereas if the base station has a configuration in FIG. 3, weighting factors for weighting synthesizer 301 are determined, for example. Note that the number of streams to be transmitted is "2" in the case of FIG. 29, yet the present disclosure is not limited to this.

Then, when terminals 2202-1 and 2202-2 perform receiving directivity control, if the terminals have a configuration in FIG. 4, for example, multiplication coefficients for multiplier 503-1, 503-2, 503-3, and 503-4 in FIG. 5 are determined, whereas when the terminals have a configuration in FIG. 6, multiplication coefficients for multipliers 603-1, 603-2, . . . , and 603-L are determined, for example.

Figure 31:
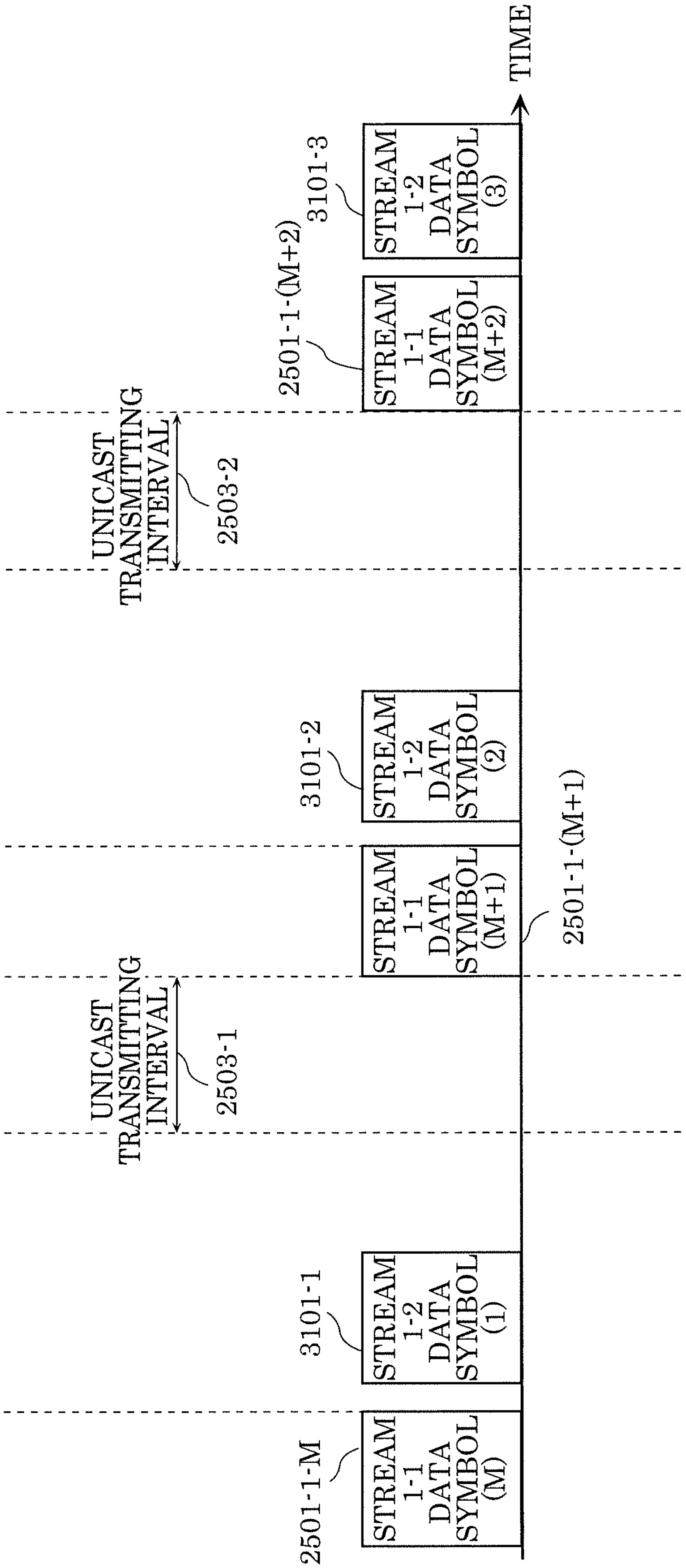
FIG. 31 is a diagram illustrating examples of symbols which the base station transmits.

FIG. 31 illustrates examples of symbols transmitted by the base station when the base station transmits data symbols for stream 1 after communication between the base station and the terminal in FIG. 30 is completed, while the horizontal axis indicates time.

In FIG. 31, "stream 1-1" in FIG. 29 is present, and thus similarly to FIG. 25, "stream 1-1 data symbol (M) (for multicasting)" 2501-1-M, "stream 1-1 data symbol (M+1) (for multicasting)" 2501-1-(M+1), and "stream 1-1 data symbol (M+2) (for multicasting)" 2501-1-(M+2) are present. Note that "(M), (M+1), (M+2)" are illustrated, and this is because stream 1-1 (for multicasting) is already present before stream 1-2 (for multicasting) is present. Accordingly, in FIG. 31, M is assumed to be an integer of 2 or greater.

Then, as illustrated in FIG. 31, "stream 1-2 data symbol (1) (for multicasting)" 3101-1, "stream 1-2 data symbol (2) (for multicasting)" 3101-2, and "stream 1-2 data symbol (3) (for multicasting)" 3101-3 are present in intervals other than unicast transmitting intervals 2503-1 and 2503-2.

The features are as follows as described above.

"Stream 1-1 data symbol (M) (for multicasting)" 2501-1-M, "stream 1-1 data symbol (M+1) (for multicasting)" 2501-1-(M+1), "stream 1-1 data symbol (M+2) (for multicasting)" 2501-1-(M+2), "stream 1-2 data symbol (1) (for multicasting)" 3101-1, "stream 1-2 data symbol (2) (for multicasting)" 3101-2, and "stream 1-2 data symbol (3) (for multicasting)" 3101-3 are all data symbols for transmitting "stream 1".

The terminal can obtain "data of stream 1" by obtaining "data symbols for stream 1-1". The terminal can obtain "data of stream 1" by obtaining "data symbols for stream 1-2".

The directivities of transmission beams for "stream 1-1 data symbol (M) (for multicasting)" 2501-1-M, "stream 1-1 data symbol (M+1) (for multicasting)" 2501-1-(M+1), and "stream 1-1 data symbol (M+2) (for multicasting)" 2501-1-(M+2) are different from the directivities of transmission beams for "stream 1-2 data symbol (1) (for multicasting)" 3101-1, "stream 1-2 data symbol (2) (for multicasting)" 3101-2, and "stream 1-2 data symbol (3) (for multicasting)" 3101-3. Thus, a set of multiplication coefficients (or weighting factors) for the transmitting device of the base station used in order to generate transmission beams for "stream 1-1 data symbol (M) (for multicasting)" 2501-1-M, "stream 1-1 data symbol (M+1) (for multicasting)" 2501-1-(M+1), and "stream 1-1 data symbol (M+2) (for multicasting)" 2501-1-(M+2) are different from a set of multiplication coefficients (or weighting factors) for the transmitting device of the base station used in order to generate transmission beams for "stream 1-2 data symbol (1) (for multicasting)" 3101-1, "stream 1-2 data symbol (2) (for multicasting)" 3101-2, and "stream 1-2 data symbol (3) (for multicasting)" 3101-3.

The above allows two terminals to receive multicast streams which the base station has transmitted. At this time, directivity control is performed by the transmitting device and the receiving device, and thus an advantageous effect of increasing an area in which streams for multicasting can be received is yielded. Furthermore, streams and transmission beams are added only when necessary, and thus an advantageous effect of effectively utilizing frequency, time, and space resources for transmitting data.

Note that control as described below may be performed. The details of the control are as follows.

Figure 32:
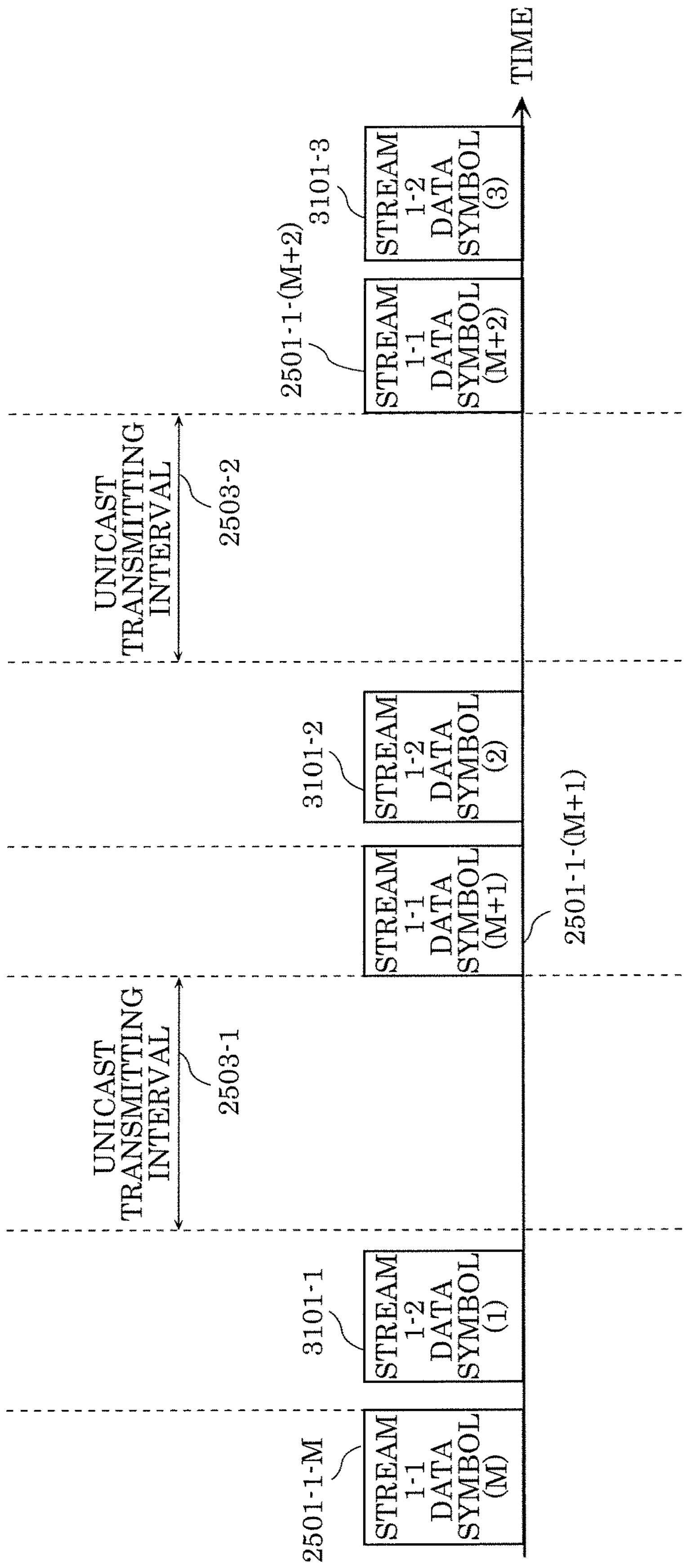
FIG. 32 is a diagram illustrating examples of symbols which the base station transmits.

FIG. 32 illustrates "examples of symbols which the base station transmits when the base station transmits data symbols (for stream 1) after communication between the base station and the terminal in FIG. is completed", which are different from FIG. 31, where the horizontal axis indicates time. Note that elements which operate in the same manner as in FIGS. 25 and 31 are assigned the same reference numerals in FIG. 32.

Different points in FIG. 32 from FIG. 31 are that unicast transmitting intervals 2503-1 and 2503-2 are set to longer time periods, and thus the base station does not further add and transmit symbols for multicasting.

Figure 33:
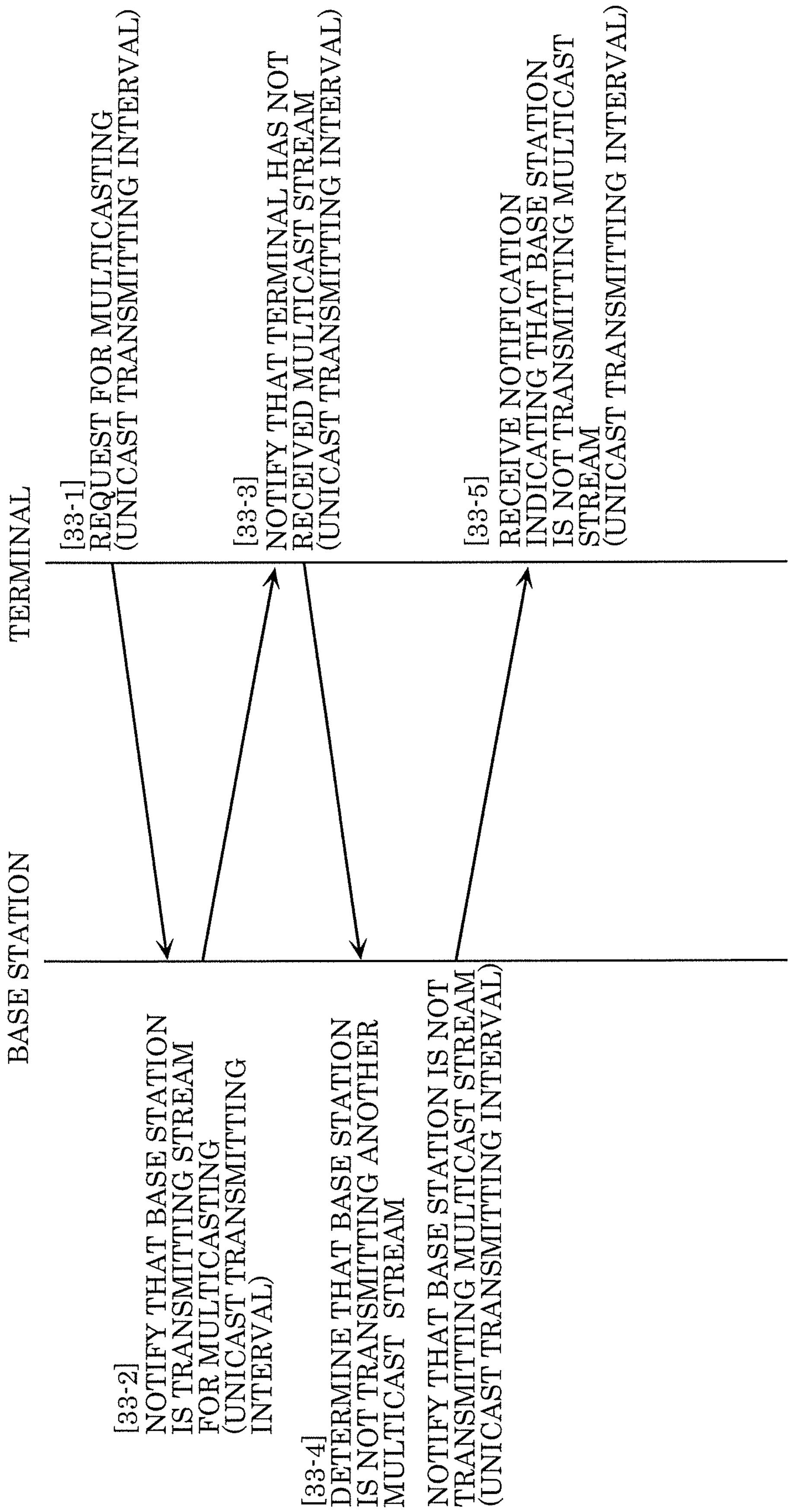
FIG. 33 is a diagram illustrating a procedure of performing communication between the base station and a terminal.

FIG. 33 illustrates an example of operation when new terminal 2202-3 transmits a request to the base station to add a transmission beam, in addition to transmission beams for multicasting transmitted by the base station to two terminals (terminals 2202-1 and 2202-2), as illustrated in FIG. 29. Note that FIG. 32 illustrates a frame of a modulated signal which the base station transmits.

[33-1] Terminal 2202-3 transmits to the base station a "request to transmit stream 1 by multicasting". Note that terminal 2202-3 transmits the "request to transmit stream 1 by multicasting" in a unicast transmitting interval in FIG. 32.

[33-2] Upon receiving [33-1], the base station notifies terminal 2202-3 that "the base station is transmitting stream 1 for multicasting". Note that the base station transmits the "notification indicating that the base station is transmitting stream 1 for multicasting" in a unicast transmitting interval in FIG. 32.

[33-3] Upon receiving [33-2], terminal 2202-3 notifies the base station that "terminal 2202-3 has not received stream 1 for multicasting". Note that terminal 2202-3 transmits the "notification indicating that stream 1 for multicasting has not been received" in a unicast transmitting interval in FIG. 32.

[33-4] Upon receiving [33-3], the base station determines whether a transmission beam other than the transmission beam for stream 1-1 and the transmission beam for stream 1-2 can be transmitted as a transmission beam for stream 1 for multicasting. At this time, taking into consideration that the frame is as illustrated in FIG. 32, the base station determines not to transmit another transmission beam for stream 1 for multicasting. Accordingly, the base station notifies terminal 2202-3 that "the base station is not to transmit another transmission beam for stream 1 for multicasting". Note that the base station transmits the "notification indicating that the base station is not to transmit another transmission beam for stream 1 for multicasting" in a unicast transmitting interval in FIG. 32.

[33-5] Terminal 2202-3 receives the "notification indicating that the base station is not to transmit another transmission beam for stream 1 for multicasting".

Note that the "procedure for a base station and a terminal to communicate" in FIG. 33 is an example, and the order of transmitting information items is not limited to the order in FIG. 33, so that communication between the base station and the terminal can be similarly established even if the order of transmitting items has changed. In this manner, if there are insufficient communication resources for multicast transmission, a multicast transmission beam may not be added.

Figure 34:
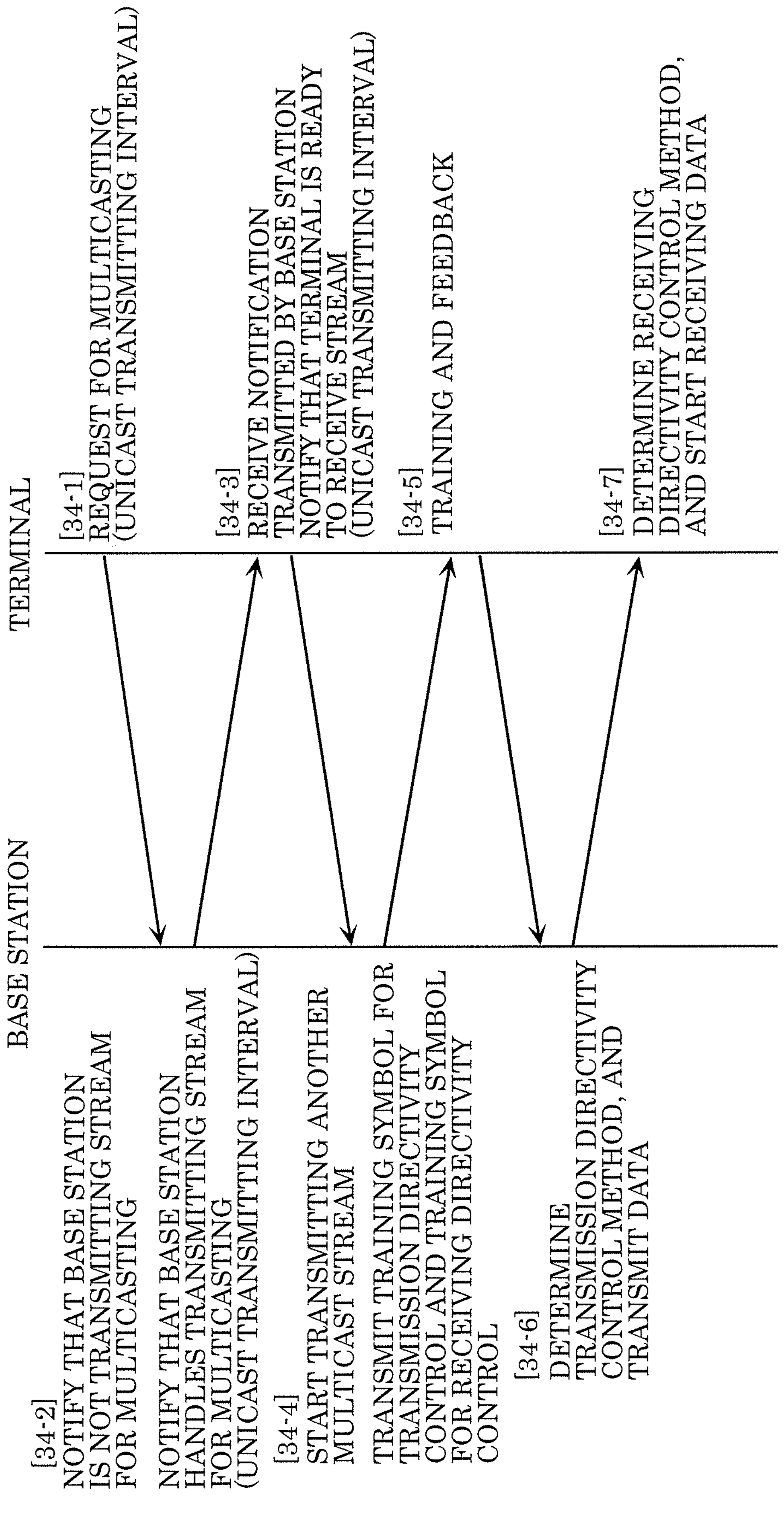
FIG. 34 is a diagram illustrating a procedure of performing communication between the base station and a terminal.

FIG. 34 illustrates an example of operation when new terminal 2202-3 transmits a request to the base station to add a transmission beam for another stream for multicasting (stream 2), in addition to transmission beams for multicasting transmitted by the base station to two terminals (terminals 2202-1 and 2202-2), illustrated in FIG. 29. Note that a frame of a modulated signal transmitted by the base station is in the state as illustrated in FIG. 31.

[34-1] Terminal 2202-3 transmits to the base station a "request to transmit stream 2 by multicasting". Note that terminal 2202-3 transmits the "request to transmit stream 2 by multicasting" in unicast transmitting interval 2503 in FIG. 31.

[34-2] Upon receiving [34-1], the base station notifies terminal 2202-3 that "the base station is not transmitting stream 2 for multicasting". In addition, the base station determines "whether the base station can add and transmit a transmission beam for stream 2 for multicasting". At this time, taking into consideration that the frame is in the state as illustrated in FIG. 31, the base station notifies terminal 2202-3 that "the base station is able to transmit a transmission beam for stream 2 for multicasting". Note that the base station transmits the "notification indicating that the base station is not transmitting stream 2 for multicasting" and the "notification indicating that the base station is able to transmit a transmission beam for stream 2 for multicasting" in unicast transmitting interval 2503 in FIG. 31.

[34-3] Upon receiving [34-2], terminal 2202-3 notifies the base station that "terminal 2203-3 is ready to receive stream 2 for multicasting". Note that terminal 2202-3 transmits the notification indicating that "terminal 2202-3 is ready to receive stream 2 for multicasting" in unicast transmitting interval 2503 in FIG. 31.

[34-4] Upon receiving [34-3], the base station determines to transmit a transmission beam for stream 2 for multicasting. Then, the base station transmits a training symbol for transmission directivity control and a training symbol for receiving directivity control, in order to transmit stream 2 to terminal 2202-3 by multicasting. Note that the base station transmits transmission beams for streams 1-1 and 1-2, as illustrated in FIG. 31, separately from transmission of the above symbols. This point will be described later.

[34-5] Terminal 2202-3 receives the training symbol for transmission directivity control and the training symbol for receiving directivity control which the base station has transmitted, and transmits feedback information to the base station in order that the base station performs transmission directivity control and terminal 2202-3 performs receiving directivity control.

[34-6] Based on the feedback information transmitted by terminal 2202-3, the base station determines a method for transmission directivity control (determines a weighting factor used for directivity control, for instance), and transmits data symbols for stream 2.

[34-7] Terminal 2202-3 determines a receiving directivity control method (determines a weighting factor used for directivity control, for instance), and starts receiving the data symbols for stream 2 which the base station has transmitted.

Note that the "procedure for a base station and a terminal to communicate" in FIG. 34 is an example, and the order of transmitting information items is not limited to the order in FIG. 34, and communication between the base station and the terminal can be similarly established even if the order of transmitting information items has changed. FIG. 34 illustrates an example in which the terminal performs receiving directivity control, yet the terminal may not perform receiving directivity control. In such a case, the base station may not transmit a training symbol for receiving directivity control, and the terminal does not determine a receiving directivity control method, in FIG. 34.

When the base station performs transmission directivity control, for example, multiplication coefficients for multipliers 204-1, 204-2, 204-3, and 204-4 in FIG. 2 are determined if the base station has a configuration in FIG. 1.

Then, when terminals 2202-1, 2202-2, and 2202-3 perform receiving directivity control, if the terminals have a configuration in FIG. 4, multiplication coefficients for multipliers 503-1, 503-2, 503-3, and 503-4 in FIG. 5 are determined, for example, whereas if the terminals have a configuration in FIG. 6, multiplication coefficients for multipliers 603-1, 603-2, . . . , and 603-L are determined, for example.

Figure 35:
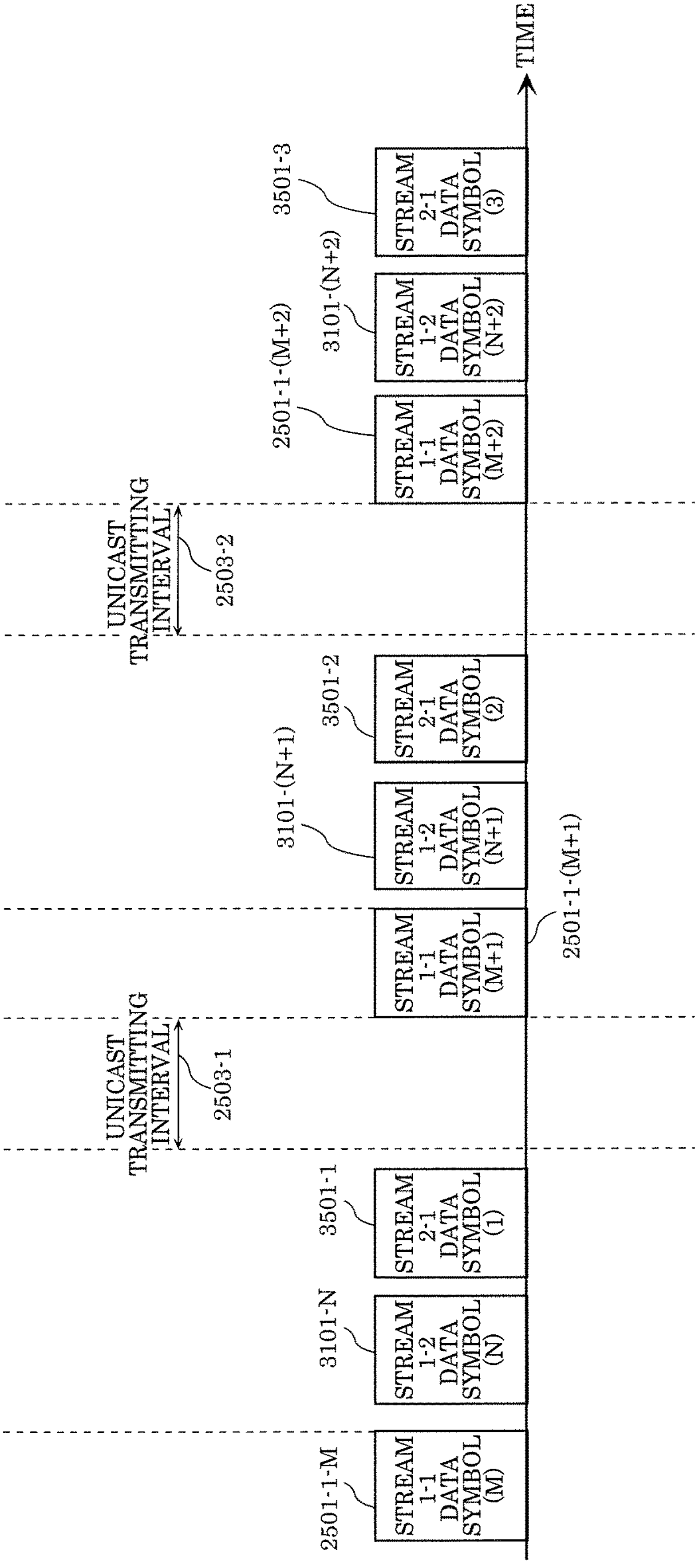
FIG. 35 is a diagram illustrating examples of symbols which the base station transmits.

FIG. 35 illustrates examples of symbols which the base station transmits when the base station transmits data symbols for stream 1 and stream 2 after communication between the base station and a terminal in FIG. 34 is completed, where the horizontal axis indicates time.

In FIG. 35, "stream 1-1" and "stream 1-2" illustrated in FIG. 31 are present, and thus "stream 1-1 data symbol (M) (for multicasting)" 2501-1-M, "stream 1-1 data symbol (M+1) (for multicasting)" 2501-1-(M+1), and "stream 1-1 data symbol (M+2) (for multicasting)" 2501-1-(M+2) are present. In addition, "stream 1-2 data symbol (N) (for multicasting)" 3101-N, "stream 1-2 data symbol (N+1) (for multicasting)" 3101-(N+1), and "stream 1-2 data symbol (N+2) (for multicasting)" 3101-(N+2) are present. Note that N and M are integers of 2 or greater.

As illustrated in FIG. 35, in intervals other than unicast transmitting intervals 2503-1 and 2503-2, "stream 2-1 data symbol (1) (for multicasting)" 3501-1, "stream 2-1 data symbol (2) (for multicasting)" 3501-2, and "stream 2-1 data symbol (3) (for multicasting)" 3501-3 are present.

As described above, the features achieved at this time are as follows.

- "Stream 1-1 data symbol (M) (for multicasting)" 2501-1-M, "stream 1-1 data symbol (M+1) (for multicasting)" 2501-1-(M+1), "stream 1-1 data symbol (M+2) (for multicasting)" 2501-1-(M+2), "stream 1-2 data symbol (N) (for multicasting)" 3101-N, "stream 1-2 data symbol (N+1) (for multicasting)" 3101-(N+1), and "stream 1-2 data symbol (N+2) (for multicasting)" 3101-(N+2) are all data symbols for transmitting "stream 1".
- A terminal obtains "data of stream 1" by obtaining "data symbols for stream 1-1". Further, the terminal obtains "data of stream 1" by obtaining "data symbols for stream 1-2".
- The directivities of transmission beams for "stream 1-1 data symbol (M) (for multicasting)" 2501-1-M, "stream 1-1 data symbol (M+1) (for multicasting)" 2501-1-(M+1), and "stream 1-1 data symbol (M+2) (for multicasting)" 2501-1-(M+2) are different from the directivities of transmission beams for "stream 1-2 data symbol (1) (for multicasting)" 3101-1, "stream 1-2 data symbol (2) (for multicasting)" 3101-2, and "stream 1-2 data symbol (3) (for multicasting)" 3101-3.

Thus, a set of multiplication coefficients (or weighting factors) for the transmitting device of the base station used in order to generate transmission beams for "stream 1-1 data symbol (M) (for multicasting)" 2501-1-M, "stream 1-1 data symbol (M+1) (for multicasting)" 2501-1-(M+1), and "stream 1-1 data symbol (M+2) (for multicasting)" 2501-1-(M+2) is different from a set of multiplication coefficients (or weighting factors) for the transmitting device of the base station used in order to generate transmission beams for "stream 1-2 data symbol (1) (for multicasting)" 3101-1, "stream 1-2 data symbol (2) (for multicasting)" 3101-2, and "stream 1-2 data symbol (3) (for multicasting)" 3101-3.

- "Stream 2-1 data symbol (1) (for multicasting)" 3501-1, "stream 2-1 data symbol (2) (for multicasting)" 3501-2, and "stream 2-1 data symbol (3) (for multicasting)" 3501-3 are data symbols for transmitting "stream 2".
- A terminal obtains data of "stream 2" by obtaining "data symbols for stream 2-1". The above allows the terminal to receive a plurality of multicast streams (streams 1 and 2) transmitted by the base station. At this time, directivity control is performed by the transmitting device and the receiving device, and thus an advantageous effect of increasing an area in which streams for multicasting can be received is yielded. Furthermore, streams and transmission beams are added only when necessary, and thus an advantageous effect of effectively utilizing frequency, time, and space resources for transmitting data.

Note that control as described below may be performed. The details of the control are as follows.

FIG. 32 illustrates "examples of symbols which the base station transmits when the base station transmits data symbols (for stream 1)", which is different from FIG. 35, where the horizontal axis indicates time. Note that elements which operate in the same manner as those in FIGS. and 31 are assigned the same reference numerals in FIG. 32.

Different points in FIG. 32 from FIG. 35 are that unicast transmitting intervals 2503-1 and 2503-2 are set to longer time periods, and thus the base station does not add and transmit any more symbols for multicasting, that is, for example, symbols for a new stream.

Figure 36:
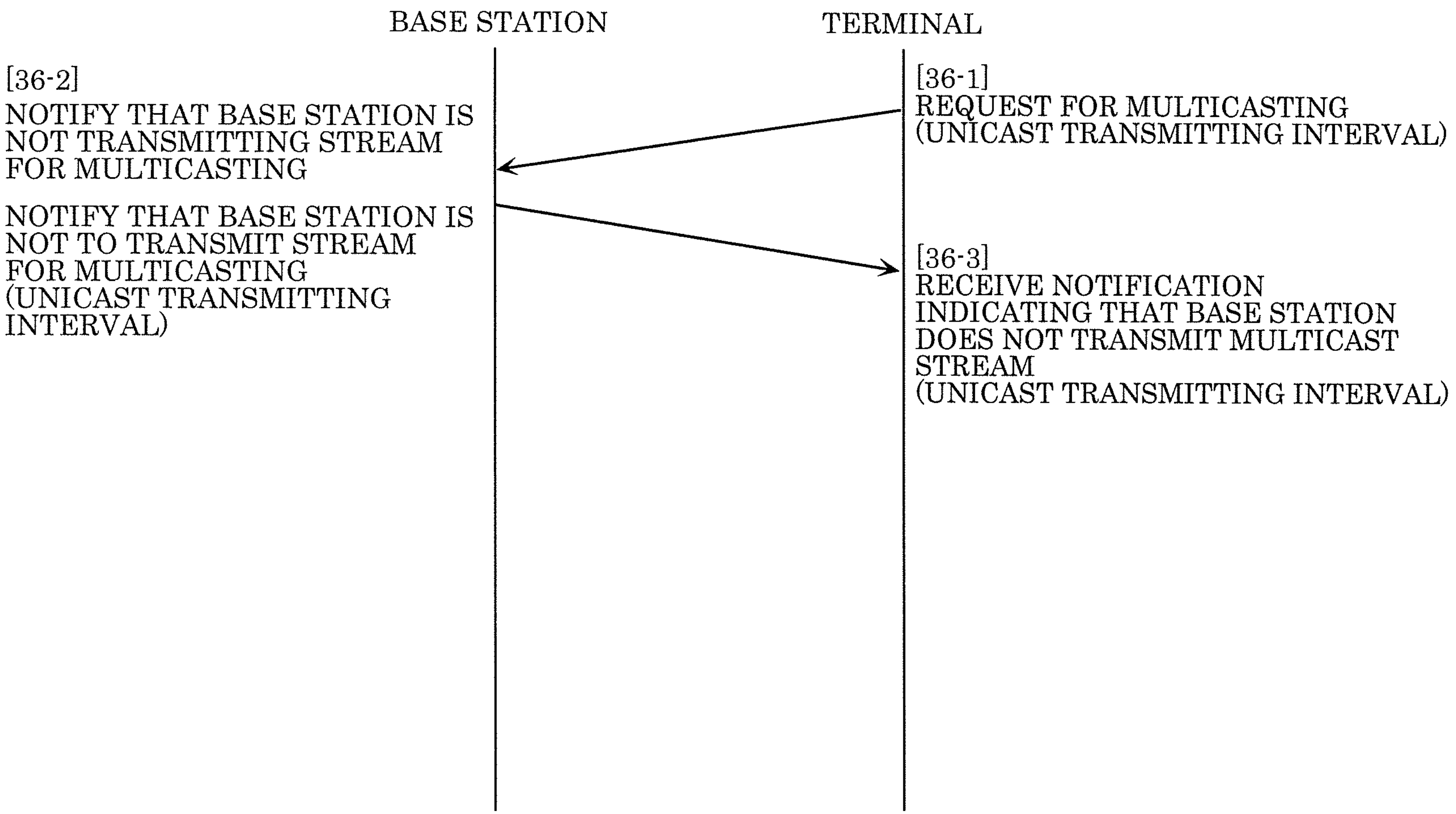
FIG. 36 is a diagram illustrating a procedure of performing communication between the base station and a terminal.

FIG. 36 illustrates an example of operation when new terminal 2202-3 transmits a request to the base station to add a transmission beam for another stream for multicasting (stream 2), in addition to transmission beams for multicasting transmitted by the base station to two terminals (terminals 2202-1 and 2202-2), as illustrated in FIG. 29. Note that FIG. 32 illustrates a frame of a modulated signal which the base station transmits.

[36-1] Terminal 2202-3 transmits to the base station a "request to transmit stream 2 by multicasting". Note that terminal 2202-3 transmits the "request to transmit stream 2 by multicasting" in a unicast transmitting interval in FIG. 32.

[36-2] Upon receiving [36-1], the base station notifies terminal 2202-3 that "the base station is not transmitting stream 2 for multicasting". Note that the base station transmits the notification indicating that "the base station is not transmitting stream 2 for multicasting" in a unicast transmitting interval in FIG. 32. In addition, the base station determines whether a transmission beam for stream 2 for multicasting can be transmitted. Taking the frame illustrated in FIG. 32 into consideration, the base station determines not to transmit a transmission beam for stream 2 for multicasting. Thus, the base station notifies terminal 2202-3 that "the base station is not to transmit stream 2 for multicasting". Note that the base station transmits the "notification indicating that the base station is not to transmit stream 2 for multicasting" in a unicast transmitting interval in FIG. 32.

[36-3] Terminal 2202-3 receives the "notification indicating that the base station is not to transmit stream 2 for multicasting".

Note that the "procedure for a base station and a terminal to communicate" in FIG. 36 is an example, and the order of transmitting information items is not limited to the order in FIG. 36. Communication between the base station and the terminal can be similarly established even if the procedure of transmitting items has changed. In this manner, if there are insufficient communication resources for multicast transmission, a stream and a multicast transmission beam may not be added.

Note that a supplemental description of a method for setting unicast transmitting intervals 2503-1 and 2503-2 illustrated in, for instance, FIG. 35 is now given.

For example, in FIG. 35, the maximum value of the number of transmission beams for multicasting is determined in advance or is set.

In response to requests from the terminals, the base station transmits transmission beams for multicasting, the number of which is smaller than or equal to the maximum value. For example, in the case of FIG. 35, the number of transmission beams for multicasting is 3. Then, the base station transmits a plurality of transmission beams for multicasting, and temporal idle time after transmitting the transmission beams is set as a unicast transmitting interval.

The unicast transmitting intervals may be determined as described above.

Supplementary Note 1

Supplementary Note 1 describes the case where a base station performs unicast communication with a plurality of terminals, or in other words, communicates separately with a plurality of terminals.

At this time, for example, #1 symbol group 901-1 for stream 1, #2 symbol group 901-2 for stream 1, and #3 symbol group 901-3 for stream 1 in FIG. 9 may be control information for broadcast channels, that is, control information which the base station transmits to a plurality of terminals by broadcasting in order to perform data communication with the plurality of terminals. Note that control information is to be used to, for example, establish data communication between the base station and a terminal.

For example, #1 symbol group 901-1 for stream 1, #2 symbol group 901-2 for stream 1, and #3 symbol group 901-3 for stream 1 in FIG. 9 may be common search spaces. Note that a common search space is control information for cell control. Also, a common search space is control information broadcast to a plurality of terminals.

Similarly, for example, #1 symbol group 902-1 for stream 2, #2 symbol group 902-2 for stream 2, and #3 symbol group 902-3 for stream 2 in FIG. 9 may be control information for broadcast channels, that is, control information which the base station transmits to a plurality of terminals by broadcasting in order to perform data communication with the plurality of terminals.

For example, #1 symbol group 902-1 for stream 2, #2 symbol group 902-2 for stream 2, and #3 symbol group 902-3 for stream 2 in FIG. 9 may be common search spaces.

Note that features of #1 symbol group 901-1 for stream 1, #2 symbol group 901-2 for stream 1, #3 symbol group 901-3 for stream 1, #1 symbol group 902-1 for stream 2, #2 symbol group 902-2 for stream 2, and #3 symbol group 902-3 for stream 2 in FIG. 9 are as described in the above embodiments.

For example, #1 symbol group 1401-1 for modulated signal 1, #2 symbol group 1401-2 for modulated signal 1, and #3 symbol group 1401-3 for modulated signal 1 in FIG. 14 may be control information for broadcast channels, that is, control information which the base station transmits to a plurality of terminals by broadcasting in order to perform data communication with the plurality of terminals.

In addition, for example, #1 symbol group 1401-1 for modulated signal 1, #2 symbol group 1401-2 for modulated signal 1, and #3 symbol group 1401-3 for modulated signal 1 in FIG. 14 may be common search spaces.

For example, #1 symbol group 1402-1 for modulated signal 2, #2 symbol group 1402-2 for modulated signal 2, and #3 symbol group 1402-3 for modulated signal 2 in FIG. 14 may be control information for broadcast channels, that is, control information which the base station transmits to a plurality of terminals by broadcasting in order to perform data communication with the plurality of terminals.

For example, #1 symbol group 1402-1 for modulated signal 2, #2 symbol group 1402-2 for modulated signal 2, and #3 symbol group 1402-3 for modulated signal 2 in FIG. 14 may be common search spaces.

Note that #1 symbol group 1401-1 for modulated signal 1, #2 symbol group 1401-2 for modulated signal 1, and #3 symbol group 1401-3 for modulated signal 1 in FIG. 14 are as described in the above embodiments, and #1 symbol group 1402-1 for modulated signal 2, #2 symbol group 1402-2 for modulated signal 2, and #3 symbol group 1402-3 for modulated signal 2 in FIG. 14 are as described in the above embodiments.

For example, stream 1-1 data symbol (1) 2501-1-1, stream 1-1 data symbol (2) 2501-1-2, and stream 1-1 data symbol (3) 2501-1-3 in FIG. 25 may be control information for broadcast channels, that is, control information which the base station transmits to a plurality of terminals by broadcasting in order to perform data communication with the plurality of terminals.

Stream 1-1 data symbol (1) 2501-1-1, stream 1-1 data symbol (2) 2501-1-2, and stream 1-1 data symbol (3) 2501-1-3 in FIG. 25 may be common search spaces.

Note that stream 1-1 data symbol (1) 2501-1-1, stream 1-1 data symbol (2) 2501-1-2, and stream 1-1 data symbol (3) 2501-1-3 in FIG. 25 are as described in the above embodiments.

For example, stream 1-1 data symbol (M) 2501-1-M, stream 1-1 data symbol (M+1) 2501-1-(M+1), stream 1-1 data symbol (M+2) 2501-1-(M+2), stream 1-2 data symbol (1) 3101-1, stream 1-2 data symbol (2) 3101-2, and stream 1-2 data symbol (3) 3101-3 in FIGS. 31 and 32 may be control information for broadcast channels, that is, control information which the base station transmits to a plurality of terminals by broadcasting in order to perform data communication with the plurality of terminals.

Further, stream 1-1 data symbol (M) 2501-1-M, stream 1-1 data symbol (M+1) 2501-1-(M+1), stream 1-1 data symbol (M+2) 2501-1-(M+2), stream 1-2 data symbol (1) 3101-1, stream 1-2 data symbol (2) 3101-2, and stream 1-2 data symbol (3) 3101-3 in FIGS. 31 and 32 may be common search spaces.

Note that stream 1-1 data symbol (M) 2501-1-M, stream 1-1 data symbol (M+1) 2501-1-(M+1), stream 1-1 data symbol (M+2) 2501-1-(M+2), stream 1-2 data symbol (1) 3101-1, stream 1-2 data symbol (2) 3101-2, and stream 1-2 data symbol (3) 3101-3 in FIGS. 31 and 32 are as described in the above embodiments.

For example, in FIG. 35, stream 1-1 data symbol (M) 2501-1-M, stream 1-1 data symbol (M+1) 2501-1-(M+1), stream 1-1 data symbol (M+2) 2501-1-(M+2), stream 1-2 data symbol (N) 3101-N, stream 1-2 data symbol (N+1) 3101-(N+1), and stream 1-2 data symbol (N+2) 3101-(N+2) may be control information for broadcast channels, that is, control information which the base station transmits to a plurality of terminals by broadcasting in order to perform data communication with the plurality of terminals.

Further, in FIG. 35, stream 1-1 data symbol (M) 2501-1-M, stream 1-1 data symbol (M+1) 2501-1-(M+1), stream 1-1 data symbol (M+2) 2501-1-(M+2), stream 1-2 data symbol (N) 3101-N, stream 1-2 data symbol (N+1) 3101-(N+1), and stream 1-2 data symbol (N+2) 3101-(N+2) may be common search spaces.

For example, stream 2-1 data symbol (1) 3501-1, stream 2-1 data symbol (2) 3501-2, and stream 2-1 data symbol (3) 3501-3 in FIG. 35 may be control information for broadcast channels, that is, control information which the base station transmits to a plurality of terminals by broadcasting in order to perform data communication with the plurality of terminals.

Further, stream 2-1 data symbol (1) 3501-1, stream 2-1 data symbol (2) 3501-2, and stream 2-1 data symbol (3) 3501-3 in FIG. 35 may be common search spaces.

Note that in FIG. 35, stream 1-1 data symbol (M) 2501-1-M, stream 1-1 data symbol (M+1) 2501-1-(M+1), stream 1-1 data symbol (M+2) 2501-1-(M+2), stream 1-2 data symbol (N) 3101-N, stream 1-2 data symbol (N+1) 3101-(N+1), and stream 1-2 data symbol (N+2) 3101-(N+2) are as described in the above embodiments, and stream 2-1 data symbol (1) 3501-1, stream 2-1 data symbol (2) 3501-2, and stream 2-1 data symbol (3) 3501-3 in FIG. 35 are as described in the above embodiments.

In FIGS. 9, 14, 25, 31, 32, and 35, when data symbols are transmitted, a single carrier transmission method may be used, or a multi-carrier transmission method such as OFDM may be used. In addition, temporal positions of data symbols are not limited to the positions in FIGS. 9, 14, 25, 31, 32, and 35.

Although a description is given with reference to FIGS. 25, 31, 32, and 35, assuming that the horizontal axis indicates time, similar data transmission can be carried out even if the horizontal axis indicates frequency (carrier). Note that when the horizontal axis indicates frequency (carrier), the base station transmits data symbols using one or more carriers or subcarriers.

Supplementary Note 2

Supplementary Note 2 describes the case where the base station performs unicast communication with a plurality of terminals, or in other words, communicates separately with a plurality of terminals.

At this time, for example, #1 symbol group 901-1 for stream 1, #2 symbol group 901-2 for stream 1, #3 symbol group 901-3 for stream 1, #1 symbol group 902-1 for stream 2, #2 symbol group 902-2 for stream 2, and #3 symbol group 902-3 for stream 2 in FIG. 9 may be data addressed to the base station or data addressed to a terminal among a plurality of terminals communicating with the base station. At this time, such data may include control information.

Note that #1 symbol group 901-1 for stream 1, #2 symbol group 901-2 for stream 1, #3 symbol group 901-3 for stream 1, #1 symbol group 902-1 for stream 2, #2 symbol group 902-2 for stream 2, and #3 symbol group 902-3 for stream 2 in FIG. 9 are as described in the above embodiments.

For example, #1 symbol group 1401-1 for modulated signal 1, #2 symbol group 1401-2 for modulated signal 1, #3 symbol group 1401-3 for modulated signal 1, #1 symbol group 1401-3 for modulated signal 2, and #2 symbol group 1402-2 for modulated signal 2, and #3 symbol group 1402-3 for modulated signal 2 in FIG. 14 may be data addressed to the base station or data addressed to a terminal among a plurality of terminals communicating with the base station. At this time, such data may include control information.

Note that #1 symbol group 1401-1 for modulated signal 1, #2 symbol group 1401-2 for modulated signal 1, #3 symbol group 1401-3 for modulated signal 1, #1 symbol group 1401-3 for modulated signal 2, and #2 symbol group 1402-2 for modulated signal 2, and #3 symbol group 1402-3 for modulated signal 2 in FIG. 14 are as described in the above embodiments.

For example, stream 1-1 data symbol (1) 2501-1-1, stream 1-1 data symbol (2) 2501-1-2, and stream 1-1 data symbol (3) 2501-1-3 in FIG. 25 may be data addressed to the base station or data addressed to a terminal among a plurality of terminals communicating with the base station. At this time, such data may include control information.

Note that stream 1-1 data symbol (1) 2501-1-1, stream 1-1 data symbol (2) 2501-1-2, and stream 1-1 data symbol (3) 2501-1-3 in FIG. are as described in the above embodiments.

For example, stream 1-1 data symbol (M) 2501-1-M, stream 1-1 data symbol (M+1) 2501-1-(M+1), stream 1-1 data symbol (M+2) 2501-1-(M+2), stream 1-2 data symbol (1) 3101-1, stream 1-2 data symbol (2) 3101-2, and stream 1-2 data symbol (3) 3101-3 in FIGS. 31 and 32 may be data addressed to the base station or data addressed to a terminal among a plurality of terminals communicating with the base station. At this time, such data may include control information.

Note that stream 1-1 data symbol (M) 2501-1-M, stream 1-1 data symbol (M+1) 2501-1-(M+1), stream 1-1 data symbol (M+2) 2501-1-(M+2), stream 1-2 data symbol (1) 3101-1, stream 1-2 data symbol (2) 3101-2, and stream 1-2 data symbol (3) 3101-3 in FIGS. 31 and 32 are as described in the above embodiments.

For example, in FIG. 35, stream 1-1 data symbol (M) 2501-1-M, stream 1-1 data symbol (M+1) 2501-1-(M+1), stream 1-1 data symbol (M+2) 2501-1-(M+2), stream 1-2 data symbol (N) 3101-N, stream 1-2 data symbol (N+1) 3101-(N+1), and stream 1-2 data symbol (N+2) 3101-(N+2) may be data addressed to the base station or data addressed to a terminal among a plurality of terminals communicating with the base station. At this time, such data may include control information.

For example, stream 2-1 data symbol (1) 3501-1, stream 2-1 data symbol (2) 3501-2, and stream 2-1 data symbol (3) 3501-3 in FIG. 35 may be data addressed to the base station or data addressed to a terminal among a plurality of terminals communicating with the base station. At this time, such data may include control information.

Note that in FIG. 35, stream 1-1 data symbol (M) 2501-1-M, stream 1-1 data symbol (M+1) 2501-1-(M+1), stream 1-1 data symbol (M+2) 2501-1-(M+2), and stream 1-2 data symbol (N) 3101-N, stream 1-2 data symbol (N+1) 3101-(N+1), stream 1-2 data symbol (N+2) 3101-(N+2), stream 2-1 data symbol (1) 3501-1, stream 2-1 data symbol (2) 3501-2, and stream 2-1 data symbol (3) 3501-3 are as described in the above embodiments.

In FIGS. 9, 14, 25, 31, 32, and 35, when data symbols are transmitted, a single carrier transmission method may be used, or a multi-carrier transmission method such as OFDM may be used. In addition, temporal positions of data symbols are not limited to the positions in FIGS. 9, 14, 25, 31, 32, and 35.

Although a description is given with reference to FIGS. 25, 31, 32, and 35, assuming that the horizontal axis indicates time, similar data transmission can be carried out even if the horizontal axis indicates frequency (carrier). Note that when the horizontal axis indicates frequency (carrier), the base station transmits data symbols using one or more carriers or subcarriers.

Supplementary Note 3

In a time period in which the base station transmits #1 symbol group 901-1 for stream 1, #2 symbol group 901-2 for stream 1, #3 symbol group 901-3 for stream 1, #1 symbol group 902-1 for stream 2, #2 symbol group 902-2 for stream 2, and #3 symbol group 902-3 for stream 2 are transmitted as shown in the frame configuration in FIG. 9, the base station may transmit another symbol group using a transmission beam different from "a transmission beam for #1 symbol group 901-1 for stream 1, a transmission beam for #2 symbol group 901-2 for stream 1, a transmission beam for #3 symbol group 901-3 for stream 1, a transmission beam for #1 symbol group 902-1 for stream 2, a transmission beam for #2 symbol group 902-2 for stream 2, and a transmission beam for #3 symbol group 902-3 for stream 2".

The base station in FIG. 3 may generate a transmission beam for the above "other symbol group" through "signal processing by signal processor 102 and signal processing by weighting synthesizer 301" or "signal processing by signal processor 102 or signal processing by weighting synthesizer 301".

Further, in a time period in which the base station transmits #1 symbol group 1401-1 for modulated signal 1, #2 symbol group 1401-2 for modulated signal 1, #3 symbol group 1401-3 for modulated signal 1, #1 symbol group 1402-1 for modulated signal 2, #2 symbol group 1402-2 for modulated signal 2, and #3 symbol group 1402-3 for modulated signal 2 as shown in the frame configuration in FIG. 14, the base station may transmit another symbol group using a transmission beam different from "a transmission beam for #1 symbol group 1401-1 for modulated signal 1, a transmission beam for #2 symbol group 1401-2 for modulated signal 1, a transmission beam for #3 symbol group 1401-3 for modulated signal 1, a transmission beam for #1 symbol group 1402-1 for modulated signal 2, a transmission beam for #2 symbol group 1402-2 for modulated signal 2, and a transmission beam for #3 symbol group 1402-3 for modulated signal 2".

At this time, the "other symbol group" may be a symbol group which includes a data symbol addressed to a certain terminal, may be a symbol group which includes a control information symbol group, or may be a symbol group which includes another data symbol for multicasting, as described in other portions of the present disclosure.

The base station in FIG. 3 may generate a transmission beam for the above "other symbol group" through "signal processing by signal processor 102 and signal processing by weighting synthesizer 301" or "signal processing by signal processor 102 or signal processing by weighting synthesizer 301".

Supplementary Note 4

In time periods in which a base station transmits stream 1-1 data symbol (1) 2501-1-1, stream 1-1 data symbol (2) 2501-1-2, and stream 1-1 data symbol (3) 2501-1-3 as shown in the frame configuration in FIG. 25, the base station may transmit another symbol group using a transmission beam different from "transmission beams for transmitting stream 1-1 data symbol (1) 2501-1-1, stream 1-1 data symbol (2) 2501-1-2, and stream 1-1 data symbol (3) 2501-1-3".

Note that the same also applies to the case where the horizontal axis indicates frequency in FIG. 25, and in time periods in which the base station transmits stream 1-1 data symbol (1) 2501-1-1, stream 1-1 data symbol (2) 2501-1-2, and stream 1-1 data symbol (3) 2501-1-3, the base station may transmit another symbol group using a transmission beam different from "transmission beams for transmitting stream 1-1 data symbol (1) 2501-1-1, stream 1-1 data symbol (2) 2501-1-2, and stream 1-1 data symbol (3) 2501-1-3".

In time periods in which the base station transmits stream 1-1 data symbol (M) 2501-1-M, stream 1-1 data symbol (M+1) 2501-1-(M+1), and stream 1-1 data symbol (M+2) 2501-1-(M+2) as shown in the frame configuration in FIGS. 31 and 32, the base station may transmit another symbol group using a transmission beam different from "transmission beams for transmitting stream 1-1 data symbol (M) 2501-1-M, stream 1-1 data symbol (M+1) 2501-1-(M+1), and stream 1-1 data symbol (M+2) 2501-1-(M+2)".

Note that the same also applies to the case where the horizontal axis indicates frequency in FIGS. 31 and 32, and in time periods in which the base station transmits stream 1-1 data symbol (M) 2501-1-M, stream 1-1 data symbol (M+1) 2501-1-(M+1), and stream 1-1 data symbol (M+2) 2501-1-(M+2), the base station may transmit another symbol group using a transmission beam different from "transmission beams for transmitting stream 1-1 data symbol (M) 2501-1-M, stream 1-1 data symbol (M+1) 2501-1-(M+1), and stream 1-1 data symbol (M+2) 2501-1-(M+2)".

In time periods in which the base station transmits stream 1-2 data symbol (1) 3101-1, stream 1-2 data symbol (2) 3101-2, and stream 1-2 data symbol (3) 3101-3 as shown in the frame configuration in FIGS. 31 and 32, the base station may transmit another symbol group using a transmission beam different from "transmission beams for transmitting stream 1-2 data symbol (1) 3101-1, stream 1-2 data symbol (2) 3101-2, and stream 1-2 data symbol (3) 3101-3".

Note that in FIGS. 31 and 32, the same also applies to the case where the horizontal axis indicates frequency in FIGS. 31 and 32, and in time periods in which the base station transmits stream 1-2 data symbol (1) 3101-1, stream 1-2 data symbol (2) 3101-2, and stream 1-2 data symbol (3) 3101-3, the base station may transmit another symbol group using a transmission beam different from transmission beams for transmitting "stream 1-2 data symbol (1) 3101-1, stream 1-2 data symbol (2) 3101-2, and stream 1-2 data symbol (3) 3101-3".

In time periods in which the base station transmits stream 1-1 data symbol (M) 2501-1-M, stream 1-1 data symbol (M+1) 2501-(M+1), and stream 1-1 data symbol (M+2) 2501-(M+2) as shown in the frame configuration in FIG. 35, the base station may transmit another symbol group using a transmission beam different from transmission beams for transmitting "stream 1-1 data symbol (M) 2501-1-M, stream 1-1 data symbol (M+1) 2501-(M+1), and stream 1-1 data symbol (M+2) 2501-(M+2)".

Note that in FIG. 35, the same also applies to the case where the horizontal axis indicates frequency, and in time periods in which the base station transmits stream 1-1 data symbol (M) 2501-1-M, stream 1-1 data symbol (M+1) 2501-(M+1), and stream 1-1 data symbol (M+2) 2501-(M+2), the base station may transmit another symbol group using a transmission beam different from "transmission beams for transmitting stream 1-1 data symbol (M) 2501-1-M, stream 1-1 data symbol (M+1) 2501-(M+1), and stream 1-1 data symbol (M+2) 2501-(M+2)".

In time periods in which the base station transmits stream 1-2 data symbol (N) 3101-N, stream 1-2 data symbol (N+1) 3101-(N+1), and stream 1-2 data symbol (N+2) 3101-(N+2) as shown in the frame configuration in FIG. 35, the base station may transmit another symbol group using a transmission beam different from "transmission beams for transmitting stream 1-2 data symbol (N) 3101-N, stream 1-2 data symbol (N+1) 3101-(N+1), and stream 1-2 data symbol (N+2) 3101-(N+2)".

Note that the same also applies to the case where the horizontal axis indicates frequency in FIG. 35, and in time periods in which the base station transmits stream 1-2 data symbol (N) 3101-N, stream 1-2 data symbol (N+1) 3101-(N+1), and stream 1-2 data symbol (N+2) 3101-(N+2), the base station may transmit another symbol group using a transmission beam different from "transmission beams for transmitting stream 1-2 data symbol (N) 3101-N, stream 1-2 data symbol (N+1) 3101-(N+1), and stream 1-2 data symbol (N+2) 3101-(N+2)".

In time periods in which the base station transmits stream 2-1 data symbol (1) 3501-1, stream 2-1 data symbol (2) 3501-2, and stream 2-1 data symbol (3) 3501-3 as shown in the frame configuration in FIG. 35, the base station may transmit another symbol group using a transmission beam different from "transmission beams for transmitting stream 2-1 data symbol (1) 3501-1, stream 2-1 data symbol (2) 3501-2, and stream 2-1 data symbol (3) 3501-3".

Note that the same also applies to the case where the horizontal axis indicates frequency in FIG. 35, and in time periods in which the base station transmits stream 2-1 data symbol (1) 3501-1, stream 2-1 data symbol (2) 3501-2, and stream 2-1 data symbol (3) 3501-3, the base station may transmit another symbol group using a transmission beam different from "transmission beams for transmitting stream 2-1 data symbol (1) 3501-1, stream 2-1 data symbol (2) 3501-2, and stream 2-1 data symbol (3) 3501-3".

In the above, the "other symbol group" may be a symbol group which includes a data symbol addressed to a certain terminal, or may be a symbol group which includes a control information symbol or a symbol group which includes another data symbol for multicasting, as described in other portions of the specification.

At this time, the base station in FIG. 1 may generate a transmission beam for the above "other symbol group" through signal processing by signal processor 102, or may generate a transmission beam for the above "other symbol group" by selecting antennas from antenna unit 106-1 to antenna unit 106-M.

The base station in FIG. 3 may generate a transmission beam for the above "other symbol group" through "signal processing by signal processor 102 and signal processing by weighting synthesizer 301" or "signal processing by signal processor 102 or signal processing by weighting synthesizer 301".

Then, unicast transmitting intervals 2503-1 and 2503-2 as illustrated in FIGS. 25, 31, and 32 may not be set.

Supplementary Note 5

A description with regard to FIGS. 31 and 32 includes the statement as follows.

"Stream 1-1 data symbol (M) (for multicasting)" 2501-1-M, "stream 1-1 data symbol (M+1) (for multicasting)" 2501-1-(M+1), "stream 1-1 data symbol (M+2) (for multicasting)" 2501-1-(M+2), "stream 1-2 data symbol (1) (for multicasting)" 3101-1, "stream 1-2 data symbol (2) (for multicasting)" 3101-2, and "stream 1-2 data symbol (3) (for multicasting)" 3101-3 are all data symbols for transmitting "stream 1".

A terminal can obtain "data of stream 1" by obtaining "data symbols for stream 1-1". Furthermore, a terminal can obtain "data of stream 1" by obtaining "data symbols for stream 1-2".

A description with regard to FIG. 35 includes the following statement.

"Stream 1-1 data symbol (M) (for multicasting)" 2501-1-M, "stream 1-1 data symbol (M+1) (for multicasting)" 2501-1-(M+1), "stream 1-1 data symbol (M+2) (for multicasting)" 2501-1-(M+2), "stream 1-2 data symbol (N) (for multicasting)" 3101-N, "stream 1-2 data symbol (N+1) (for multicasting)" 3101-(N+1), and "stream 1-2 data symbol (N+2) (for multicasting)" 3101-(N+2) are all data symbols to transmit "stream 1".

A terminal can obtain "data of stream 1" by obtaining "data symbols for stream 1-1". Furthermore, a terminal can obtain "data of stream 1" by obtaining "data symbols for stream 1-2".

The following gives a supplementary description with regard to the above. For example, in FIG. 35, the above can be achieved using <method 1-1>, <method 1-2>, <method 2-1>, or <method 2-2> as below.

<Method 1-1>

Stream 1-1 data symbol (M) 2501-1-M and stream 1-2 data symbol (N) 3101-N include the same data.

Then, stream 1-1 data symbol (M+1) 2501-1-(M+1) and stream 1-2 data symbol (N+1) 3101-(N+1) include the same data.

Stream 1-1 data symbol (M+2) 2501-1-(M+2) and stream 1-2 data symbol (N+2) 3101-(N+2) include the same data.

<Method 1-2>

Stream 1-2 data symbol (L) 3101-L which includes the same data as the data included in stream 1-1 data symbol (K) 2501-1-K is present. Note that K and L are integers.

<Method 2-1>

Stream 1-1 data symbol (M) 2501-1-M and stream 1-2 data symbol (N) 3101-N include the same data in part.

Then, stream 1-1 data symbol (M+1) 2501-1-(M+1) and stream 1-2 data symbol (N+1) 3101-(N+1) include the same data in part.

Stream 1-1 data symbol (M+2) 2501-1-(M+2) and stream 1-2 data symbol (N+2) 3101-(N+2) include the same data in part.

<Method 2-2>

Stream 1-2 data symbol (L) 3101-L which includes a part of data included in stream 1-1 data symbol (K) 2501-1-K is present. Note that K and L are integers.

Specifically, a first base station or a first transmission system generates a first packet group which includes data of a first stream, and a second packet group which includes data of the first stream, transmits a packet included in the first packet group in a first period using a first transmission beam, and transmits a packet included in the second packet group in a second period using a second transmission beam different from the first transmission beam. The first period and the second period do not overlap.

Here, the second packet group may include a second packet which includes data same as data included in a first packet included in the first packet group. As a configuration different from the above, the second packet group may include a third packet which includes data same as a part of the data included in the first packet included in the first packet group.

The first transmission beam and the second transmission beam may be transmission beams transmitted using the same antenna unit and having different directivities, or may be transmission beams transmitted using different antenna units.

In addition to the configuration of the first base station or the first transmission system, a second base station or a second transmission system further generates a third packet group which includes data of the first stream, and transmits a packet included in the third packet group in a third period using a third transmission beam different from the first transmission beam and the second transmission beam. The third period does not overlap the first period and the second period.

Here, the second base station or the second transmission system may repeatedly set the first period, the second period, and the third period in a predetermined order.

Further, in addition to the configuration of the first base station or the first transmission system, the third base station or the third transmission system further generates a third packet group which includes data of the first stream, and transmits a packet included in the third packet group in the third period using the third transmission beam different from the first transmission beam and the second transmission beam. At least a portion of the third period overlaps the first period.

Here, the third base station or the third transmission system may repeatedly set the first period, the second period, and the third period, the third periods repeatedly set may each at least partially overlap the first period, or at least one of the third periods repeatedly set may not overlap the first period(s).

Further, in addition to the configuration of the first base station or the first transmission system, a fourth base station or a fourth transmission system further generates a fourth packet which includes data of a second stream, and transmits the fourth packet in a fourth period using a fourth transmission beam different from the first transmission beam. At least a portion of the fourth period overlaps the first period.

Note that the first period and the second period do not overlap in the above description, yet the first period and the second period may partially overlap, the entire first period may overlap the second period, or the entire first period may overlap the entire second period.

A fifth base station or a fifth transmission system may generate one or more packet groups each of which includes data of the first stream, transmit the one or more packet groups using a different transmission beam for each packet group, and increase or decrease the number of packet groups to be generated, based on a signal transmitted from a terminal.

Note that the above describes "streams", yet as described in other portions of the specification, "stream 1-1 data symbol (M) 2501-1-M, stream 1-1 data symbol (M+1) 2501-1-(M+1), stream 1-1 data symbol (M+2) 2501-1-(M+2), stream 1-2 data symbol (1) 3101-1, stream 1-2 data symbol (2) 3101-2, and stream 1-2 data symbol (3) 3101-3" in FIGS. 31 and 32, and "stream 1-1 data symbol (M) 2501-1-M, stream 1-1 data symbol (M+1) 2501-1-(M+1), stream 1-1 data symbol (M+2) 2501-1-(M+2), stream 1-2 data symbol (N) 3101-N, stream 1-2 data symbol (N+1) 3101-(N+1), and stream 1-2 data symbol (N+2) 3101-(N+2)" in FIG. 35 may be symbols which include data symbols addressed to a certain terminal, symbols which include a control information symbol, or symbols which include a data symbol for multicasting.

Embodiment 4

The present embodiment is to describe specific examples of the communication system described in Embodiments 1 to 3.

The communication system according to the present embodiment includes a base station (or a plurality of base stations) and a plurality of terminals. For example, consider a communication system which includes, for instance, base station 700 as illustrated in, for instance, FIGS. 7, 12, 17, 19, 20, 26, and 29 and terminals 704-1 and 704-2.

Figure 37:
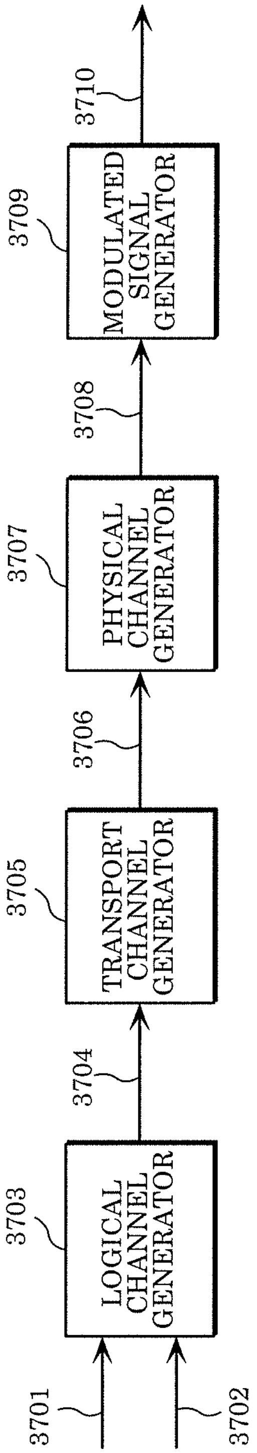
FIG. 37 illustrates an example of a configuration of the base station.

FIG. 37 illustrates an example of a configuration of a base station (700).

Logical channel generator 3703 receives inputs of data 3701 and control data 3702, and outputs logical channel signal 3704. For example, the channel for logical channel signal 3704 is constituted by at least one of "a broadcast control channel (BCCH), a paging control channel (PCCH), a common control channel (CCCH), a multicast control channel (MCCH), and a dedicated control channel (DCCH)" which are logical channels for control, and "a dedicated traffic channel (DTCH) and a multicast traffic channel (MTCH)" which are logical channels for data.

Note that "a BCCH is a downlink channel for informing system control information", "a PCCH is a downlink channel for paging information", "a CCCH is a downlink common control channel used when radio resource control (RRC) connection is not present", "an MCCH is a point-to-multipoint downlink control channel for multicast channel scheduling for multimedia broadcast multicast service (MBMS)", "a DCCH is a downlink dedicated control channel used by a terminal with RRC connection", "a DTCH is a downlink dedicated traffic channel of a user equipment (UE) terminal or a downlink user-data dedicated channel", and "an MTCH is a point-to-multipoint downlink channel for MBMS user data".

Transport channel generator 3705 receives inputs of logical channel signal 3704, and generates and outputs transport channel signal 3706. The channel for transport channel signal 3706 is constituted by, for example, at least one of a broadcast channel (BCH), a downlink shared channel (DL-SCH), a paging channel (PCH), and a multicast channel (MCH), for instance.

Note that "a BCH is a channel for system information notified throughout the entire cell", "a DL-SCH is a channel for which user data, control information, and system information are used", "a PCH is a channel for paging information notified throughout the entire cell", and "an MCH is a control channel for MBMS traffic notified throughout the entire cell".

Physical channel generator 3707 receives inputs of transport channel signal 3706, and generates and outputs physical channel signal 3708. The channel for physical channel signal 3708 is constituted by, for example, at least one of a physical broadcast channel (PBCH), a physical multicast channel (PMCH), a physical downlink shared channel (PDSCH), and a physical downlink control channel (PDCCH), for instance.

Note that "a PBCH is for BCH transport channel transmission", "a PMCH is for MCH transport channel transmission", "a PDSCH is for DL-SCH and transport channel transmission", and "a PDCCH is for transmission of downlink Layer 1 (L1)/Layer 2 (L2) control signal".

Modulated signal generator 3709 receives inputs of physical channel signal 3708, and generates and outputs modulated signal 3710 based on physical channel signal 3708. Then, base station 700 transmits modulated signal 3710 as a radio wave.

First, consider the case where the base station performs unicast communication with the plurality of terminals, or in other words, communicates separately with the plurality of terminals.

At this time, for example, the channels for symbol group #1 for stream 1 indicated by 901-1, symbol group #2 for stream 1 indicated by 901-2, and symbol group #3 for stream 1 indicated by 901-3 in FIG. 9 may be broadcast channels (that is, channels used for control information which the base station transmits to the plurality of terminals by broadcasting in order to perform data communication with the plurality of terminals). Note that control information is to be used to, for example, establish data communication between the base station and a terminal.

Here, broadcast channels are to be described. A broadcast channel corresponds to a "PBCH", a "PMCH", or "a portion of a PD-SCH" among physical channels (for physical channel signal 3708).

A broadcast channel corresponds to a "BCH", "a portion of a DL-SCH", "a PCH", or "a MCH" among transport channels (for transport channel signal 3706).

A broadcast channel corresponds to "a BCCH", "a CCCH", "an MCCH", "a portion of a DTCH", or "an MTCH" among logical channels (for logical channel signal 3704).

Similarly, for example, the channels for symbol group #1 for stream 2 indicated by 902-1, symbol group #2 for stream 2 indicated by 902-2, and symbol group #3 for stream 2 indicated by 902-3 in FIG. 9 may be broadcast channels (that is, channels used for control information which the base station transmits to the plurality of terminals by broadcasting in order to perform data communication with the plurality of terminals). Note that control information is to be used to, for example, establish data communication between the base station and a terminal.

Note that a broadcast channel corresponds to "a PBCH", "a PMCH", or "a portion of a PD-SCH" among physical channels (for physical channel signal 3708).

Further, a broadcast channel corresponds to "a BCH", "a portion of a DL-SCH", "a PCH", or "an MCH" among transport channels (for transport channel signal 3706).

A broadcast channel corresponds to "a BCCH", "a CCCH", "an MCCH", "a portion of a DTCH", or "an MTCH" among logical channels (for logical channel signal 3704).

At this time, features of symbol group #1 for stream 1 indicated by 901-1, symbol group #2 for stream 1 indicated by 901-2, and symbol group #3 for stream 1 indicated by 901-3 in FIG. 9 are as described in the above embodiments, and furthermore, features of symbol group #1 for stream 2 indicated by 902-1, symbol group #2 for stream 2 indicated by 902-2, and symbol group #3 for stream 2 indicated by 902-3 in FIG. 9 are as described in the above embodiments.

Note that stream 2 may not be transmitted since symbol group #1 for stream 2 (902-1), symbol group #2 for stream 2 (902-2), and symbol group #3 for stream 2 (902-3) in FIG. 9 are not transmitted. In particular, when a signal having a broadcast channel is transmitted, the base station may not transmit a symbol group for stream 2 (at this time, base station 701 does not transmit 703-1, 703-2, and 703-3 in FIG. 7, for example).

For example, symbol group #1 for modulated signal 1 indicated by 1401-1, symbol group #2 for modulated signal 1 indicated by 1401-2, and symbol group #3 for modulated signal 1 indicated by 1401-3 in FIG. 14 may be broadcast channels (that is, control information which the base station transmits to the plurality of terminals by broadcasting in order to perform data communication with the plurality of terminals). Note that control information is to be used to, for example, establish data communication between the base station and a terminal.

Note that a broadcast channel corresponds to "a PBCH", "a PMCH", or "a portion of a PD-SCH" among the physical channels (for physical channel signal 3708).

A broadcast channel corresponds to "a BCH", "a portion of a DL-SCH", "a PCH", or "an MCH" among transport channels (for transport channel signal 3706).

A broadcast channel corresponds to "a BCCH", "a CCCH", "an MCCH", "a portion of a DTCH", or "an MTCH" among the logical channels (for logical channel signal 3704).

For example, symbol group #1 for modulated signal 2 indicated by 1402-1, symbol group #2 for modulated signal 2 indicated by 1402-2, and symbol group #3 for modulated signal 2 indicated by 1402-3 in FIG. 14 may be broadcast channels (that is, control information which the base station transmits to the plurality of terminals by broadcasting in order to perform data communication with the plurality of terminals). Note that control information is to be used to, for example, establish data communication between the base station and a terminal.

Note that a broadcast channel corresponds to “a PBCH”, “a PMCH”, or “a portion of a PD-SCH” among the physical channels (for physical channel signal 3708).

Further, a broadcast channel corresponds to “a BCH”, “a portion of a DL-SCH”, “a PCH”, or “an MCH” among the transport channels (for transport channel signal 3706).

A broadcast channel corresponds to “a BCCH”, “a CCCH”, “an MCCH”, “a portion of a DTCH”, or “an MTCH” among the logical channels (for logical channel signal 3704).

Note that features of symbol group #1 for modulated signal 1 indicated by 1401-1, symbol group #2 for modulated signal 1 indicated by 1401-2, and symbol group #3 for modulated signal 1 indicated by 1401-3 in FIG. 14 are as described in the above embodiments, and symbol group #1 for modulated signal 2 indicated by 1402-1, symbol group #2 for modulated signal 2 indicated by 1402-2, and symbol group #3 for modulated signal 2 indicated by 1402-3 in FIG. 14 are as described in the above embodiments.

For example, stream 1-1 data symbol (1) indicated by 2501-1-1, stream 1-1 data symbol (2) indicated by 2501-1-2, and stream 1-1 data symbol (3) indicated by 2501-1-3 in FIG. 25 may be broadcast channels (that is, control information which the base station transmits to the plurality of terminals by broadcasting in order to perform data communication with the plurality of terminals). Note that control information is to be used to, for example, establish data communication between the base station and a terminal.

Note that a broadcast channel corresponds to “a PBCH”, “a PMCH”, or “a portion of a PD-SCH” among the physical channels (for physical channel signal 3708).

Further, a broadcast channel corresponds to “a BCH”, “a portion of a DL-SCH”, “a PCH”, or “an MCH” among the transport channels (for transport channel signal 3706).

A broadcast channel corresponds to “a BCCH”, “a CCCH”, “an MCCH”, “a portion of a DTCH”, or “an MTCH” among the logical channels (for logical channel signal 3704).

Note that features of stream 1-1 data symbol (1) indicated by 2501-1-1, stream 1-1 data symbol (2) indicated by 2501-1-2, and stream 1-1 data symbol (3) indicated by 2501-1-3 in FIG. 25 are as described in the above embodiments.

For example, stream 1-1 data symbol (M) indicated by 2501-1-M, stream 1-1 data symbol (M+1) indicated by 2501-1-(M+1), stream 1-1 data symbol (M+2) indicated by 2501-1-(M+2), stream 1-2 data symbol (1) indicated by 3101-1, stream 1-2 data symbol (2) indicated by 3101-2, and stream 1-2 data symbol (3) indicated by 3101-3 in FIGS. 31 and 32 may be broadcast channels (that is, control information which the base station transmits to the plurality of terminals by broadcasting in order to perform data communication with the plurality of terminals). Note that control information is to be used to, for example, establish data communication between the base station and a terminal.

Note that a broadcast channel corresponds to “a PBCH”, “a PMCH”, or “a portion of a PD-SCH” among the physical channels (for physical channel signal 3708).

Further, a broadcast channels corresponds to “a BCH”, “a portion of a DL-SCH”, “a PCH”, or “an MCH” among the transport channels (for transport channel signal 3706).

A broadcast channel corresponds to “a BCCH”, “a CCCH”, “an MCCH”, “a portion of a DTCH”, or “an MTCH” among the logical channels (for logical channel signal 3704).

Note that features of stream 1-1 data symbol (M) indicated by 2501-1-M, stream 1-1 data symbol (M+1) indicated by 2501-1-(M+1), stream 1-1 data symbol (M+2) indicated by 2501-1-(M+2), stream 1-2 data symbol (1) indicated by 3101-1, stream 1-2 data symbol (2) indicated by 3101-2, and stream 1-2 data symbol (3) indicated by 3101-3 in FIGS. 31 and 32 are as described in the above embodiments.

For example, stream 1-1 data symbol (M) indicated by 2501-1-M, stream 1-1 data symbol (M+1) indicated by 2501-1-(M+1), stream 1-1 data symbol (M+2) indicated by 2501-1-(M+2), stream 1-2 data symbol (N) indicated by 3101-N, stream 1-2 data symbol (N+1) indicated by 3101-(N+1), and stream 1-2 data symbol (N+2) indicated by 3101-(N+2) in FIG. 35 may be broadcast channels (that is, control information which the base station transmits to the plurality of terminals by broadcasting in order to perform data communication with the plurality of terminals). Note that control information is to be used to, for example, establish data communication between the base station and a terminal.

Note that a broadcast channel corresponds to “a PBCH”, “a PMCH”, or “a portion of a PD-SCH” among the physical channels (for physical channel signal 3708).

Further, a broadcast channel corresponds to “a BCH”, “a portion of a DL-SCH”, “a PCH”, or “an MCH” among the transport channels (for transport channel signal 3706).

A broadcast channel corresponds to “a BCCH”, “a CCCH”, “an MCCH”, “a portion of a DTCH”, or “an MTCH” among the logical channels (for logical channel signal 3704).

For example, stream 2-1 data symbol (1) indicated by 3501-1, stream 2-1 data symbol (2) indicated by 3501-2, and stream 2-1 data symbol (3) indicated by 3501-3 in FIG. 35 may be broadcast channels (that is, control information which the base station transmits to the plurality of terminals by broadcasting in order to perform data communication with the plurality of terminals). Note that control information is to be used to, for example, establish data communication between the base station and a terminal.

Note that a broadcast channel corresponds to “a PBCH”, “a PMCH”, or “a portion of a PD-SCH” among the physical channels (for physical channel signal 3708).

Further, a broadcast channel corresponds to “a BCH”, “a portion of a DL-SCH”, “a PCH”, or “an MCH” among the transport channels (for transport channel signal 3706).

A broadcast channel corresponds to “a BCCH”, “a CCCH”, “an MCCH”, “a portion of a DTCH”, or “an MTCH” among the logical channels (for logical channel signal 3704).

Note that features of stream 1-1 data symbol (M) indicated by 2501-1-M, stream 1-1 data symbol (M+1) indicated by 2501-1-(M+1), stream 1-1 data symbol (M+2) indicated by 2501-1-(M+2), stream 1-2 data symbol (N) indicated by 3101-N, stream 1-2 data symbol (N+1) indicated by 3101-(N+1), and stream 1-2 data symbol (N+2) indicated by 3101-(N+2) in FIG. 35 are as described in the above embodiments, and features of stream 2-1 data symbol (1) indicated by 3501-1, stream 2-1 data symbol (2) indicated by 3501-2, and stream 2-1 data symbol (3) indicated by 3501-3 in FIG. 35 are as described in the above embodiments.

In FIGS. 9, 14, 25, 31, 32, and 35, when data symbols are transmitted, a single carrier transmission method may be used, or a multi-carrier transmission method such as OFDM may be used. In addition, temporal positions of data symbols are not limited to the positions in FIGS. 9, 14, 25, 31, 32, and 35.

Although a description is given with reference to FIGS. 25, 31, 32, and 35, assuming that the horizontal axis indicates time, similar data transmission can be carried out even if the horizontal axis indicates frequency (carrier). Note that when the horizontal axis indicates frequency (carrier), the base station transmits data symbols using one or more carriers or subcarriers.

Note that the symbol groups for stream 1 in FIG. 9 may include data to be transmitted to a single terminal (unicast data) (or one or more symbols). Similarly, the symbol groups for stream 2 in FIG. 9 may include data to be transmitted to a single terminal (unicast data) (or one or more symbols).

Note that the symbol groups for stream 1 in FIG. 14 may include data to be transmitted to a single terminal (unicast data) (or one or more symbols). Similarly, the symbol groups for stream 2 in FIG. 14 may include data to be transmitted to a single terminal (unicast data) (or one or more symbols).

Note that the symbols for stream 1-1 in FIG. 25 may include data to be transmitted to a single terminal (unicast data) (or one or more symbols). The symbols for stream 1-1 and stream 1-2 in FIGS. 31 and 32 may include data to be transmitted to a single terminal (unicast data) (or one or more symbols).

A PBCH may have a configuration of "being used to transmit minimum information (including a system bandwidth, a system frame number, and the number of transmission antennas) which a UE is to read first after cell searching", for example.

A PMCH may have a configuration of "being used to utilize a multicast-broadcast single-frequency network (MBSFN), for example".

A PDSCH may have a configuration of "being, for example, a shared downlink data channel for transmitting user data and for collectively transmitting all data, irrespective of C-plane (control plane) and U-plane (user plane)".

A PDCCH may have a configuration of "being used to notify, for example, a user selected by eNodeB (gNodeB) (base station) through scheduling of information indicating allocation of radio resources".

Through the above implementation, in multicast and broadcast data transmission, the base station transmits data symbols and control information symbols using a plurality of transmission beams, and a terminal selectively receives a transmission beam with good quality among the plurality of transmission beams and receives data symbols based on the received transmission beam, thus achieving advantageous effects that the terminal can achieve high data receiving quality.

Embodiment 5

The present embodiment gives a supplemental description of configurations of the symbol groups for stream 1 and the symbol groups for stream 2 in FIG. 9 which a base station (700) transmits.

Figure 38:
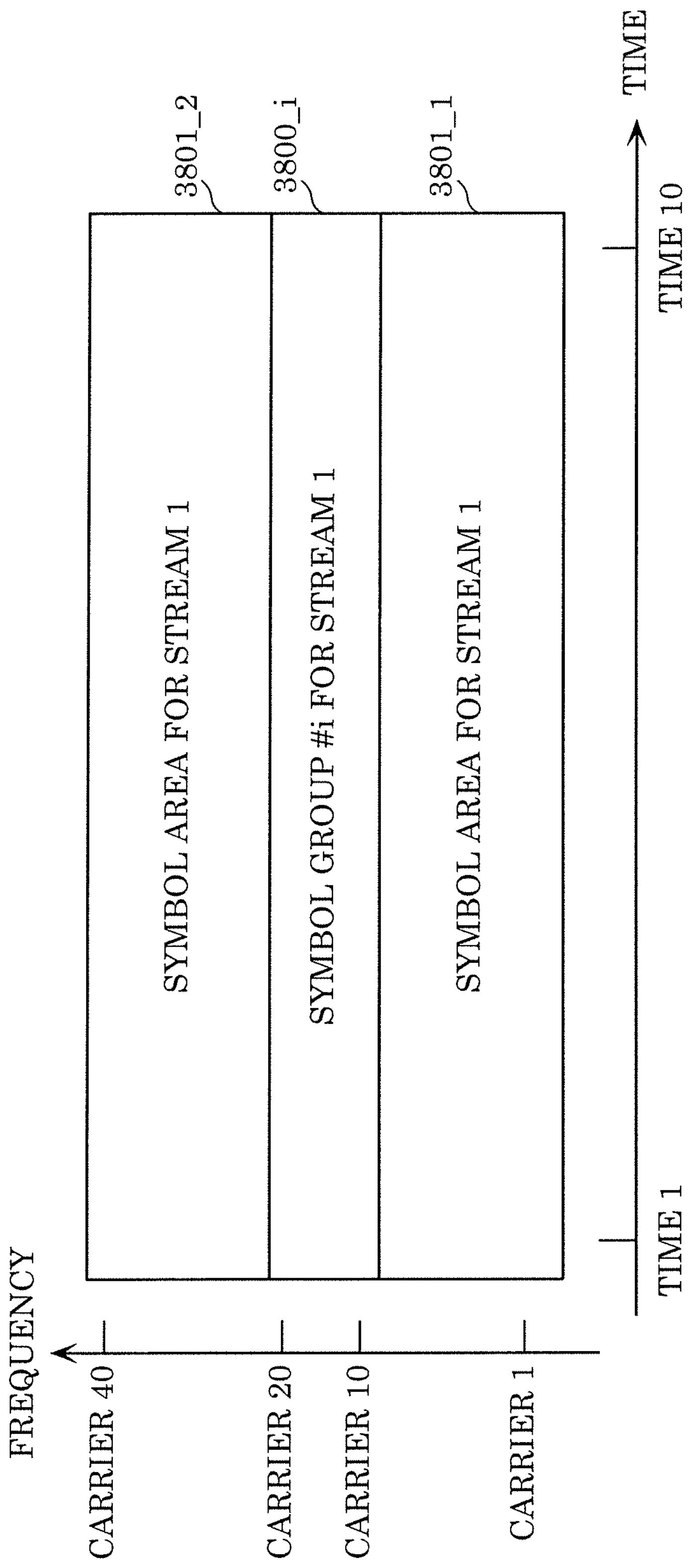
FIG. 38 illustrates an example of a frame configuration.

FIG. 38 illustrates an example of a frame configuration for stream 1 which the base station (700) transmits, the horizontal axis indicates time and the vertical axis indicates frequency in the frame configuration in FIG. 38, and the frame configuration from time 1 to time 10 and carrier 1 to carrier 40 is illustrated. Accordingly, FIG. 38 illustrates a frame configuration according to a multi-carrier transmission method such as the orthogonal frequency division multiplexing (OFDM) method.

Symbol area 3801_1 for stream 1 in FIG. 38 is present from time 1 to time 10 and from carrier 1 to carrier 9.

Symbol group #i (3800_*i*) for stream 1 is present from time 1 to time 10 and from carrier 10 to carrier 20. Note that symbol group #i (3800_*i*) for stream 1 corresponds to symbol group #i (901-*i*) for stream 1 in FIG. 9.

Symbol area 3801_2 for stream 1 is present from time 1 to time and from carrier 21 to carrier 40.

At this time, for example, as described in Embodiment 4, for instance, when the base station transmits (unicasts), to one or more terminals, data therefor, symbol areas 3801_1 and 3801_2 for stream 1 in FIG. 38 can be used.

Symbol group #i (3800_*i*) for stream 1 in FIG. 38 is to be used by the base station to transmit data for multicasting, as described in, for instance, Embodiments 1 and 4.

Figure 39:
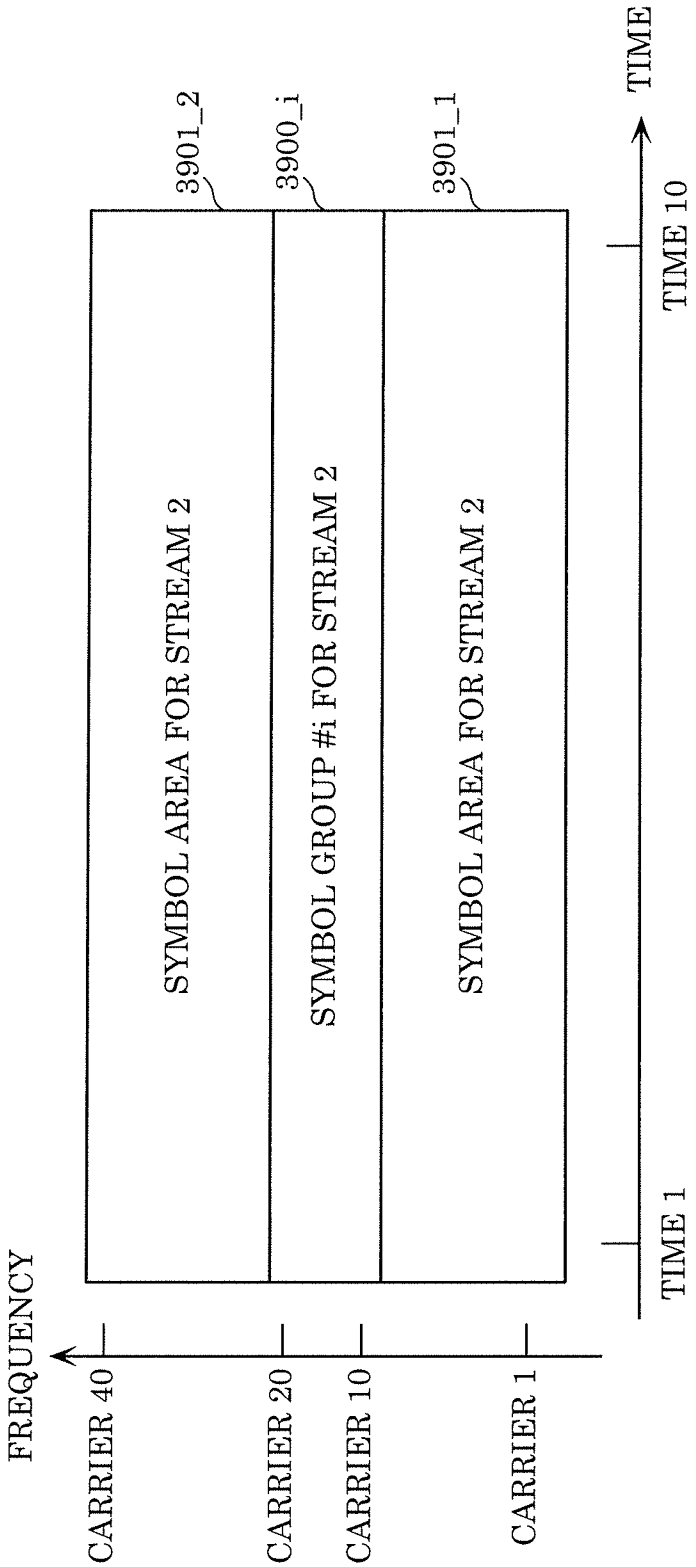
FIG. 39 illustrates an example of a frame configuration.

FIG. 39 illustrates an example of a frame configuration for stream 2 which the base station (700) transmits, the horizontal axis indicates time and the vertical axis indicates frequency in the frame configuration in FIG. 39, and the frame configuration from time 1 to time 10 and carrier 1 to carrier 40 is illustrated. Accordingly, FIG. 39 illustrates a frame according to a multi-carrier transmission method such as the OFDM method.

Symbol area 3901_1 for stream 2 in FIG. 39 is present from time 1 to time 10 and from carrier 1 to carrier 9.

Symbol group #i (3900_*i*) for stream 2 is present from time 1 to time 10 and from carrier 10 to carrier 20. Note that symbol group #i (3900_*i*) for stream 2 corresponds to symbol group #i (902-*i*) for stream 2 in FIG. 9.

Symbol area 3901_2 for stream 2 is present from time 1 to time and from carrier 21 to carrier 40.

At this time, for example, as described in Embodiment 4, for instance, when the base station transmits (unicasts), to one or more terminals, data therefor, symbol areas 3901_1 and 3901_2 for stream 2 in FIG. 39 can be used.

Symbol group #i (3900_*i*) for stream 2 in FIG. 39 is to be used by the base station to transmit data for multicasting, as described in Embodiments 1 and 4, for instance.

Note that the base station transmits, using the same frequency at the same time, a symbol at time X (in the case of FIG. 38, X is an integer in a range from 1 to 10) and carrier Y (in the case of FIG. 38, Y is an integer in a range from 1 to 40) in FIG. 38, and a symbol at time X and carrier Y in FIG. 39.

Features of symbol group #1 for stream 1 indicated by 901-1, symbol group #2 for stream 1 indicated by 901-2, and symbol group #3 for stream 1 indicated by 901-3 in FIG. 9 are as described in the above embodiments. Thus, the features of symbol group #i for stream 1 in FIG. 38 are the same as the features of the symbol groups for stream 1 in FIG. 9, and are as described in the above embodiments.

Further, features of symbol group #1 for stream 2 indicated by 902-1, symbol group #2 for stream 2 indicated by 902-2, and symbol group #3 for stream 2 indicated by 902-3 in FIG. 9 are as described in the above embodiments. Specifically, the features of symbol group #i for stream 2 in FIG. 39 are the same as the features of the symbol groups for stream 2 in FIG. 9, and are as described in the above embodiments.

Note that if symbols are present after time 11 from carrier 10 to carrier 20 in the frame configuration in FIGS. 38 and 39, the symbols may be used for multicast transmission or dedicated data transmission (unicast transmission).

If the base station transmits a frame as in FIG. 9 using the frame configuration in FIG. 38 or 39, implementation described in Embodiments 1 and 4 may be performed similarly.

Through the above implementation, in multicast and broadcast data transmission, the base station transmits data symbols and control information symbols using a plurality of transmission beams, and a terminal selectively receives a beam with good quality among the plurality of transmission beams and receives data symbols based on the received transmission beam, thus achieving advantageous effects that the terminal can achieve high data receiving quality.

Embodiment 6

The present embodiment gives a supplemental description of the configurations of the symbol groups for modulated signal 1 and the symbol groups for modulated signal 2 in FIG. 14 that a base station (700) transmits.

Figure 40:
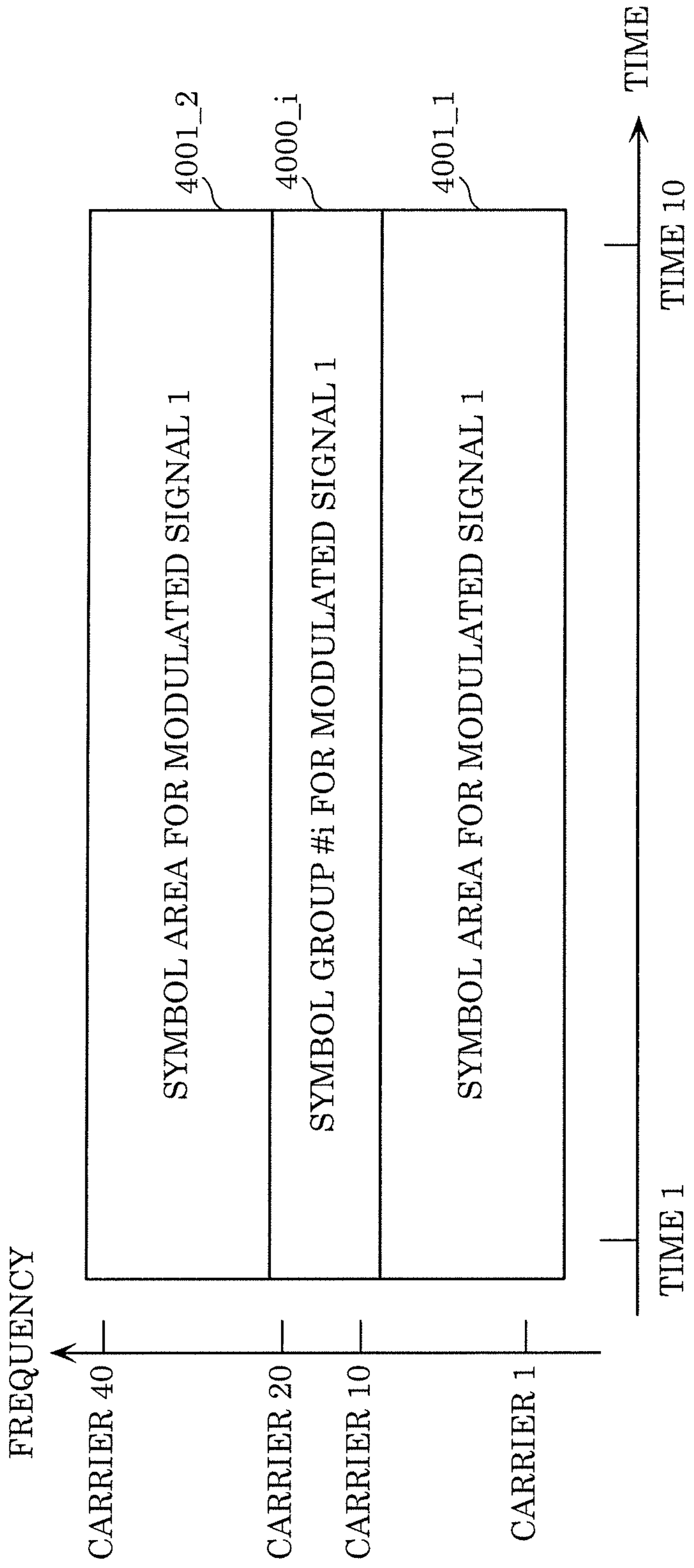
FIG. 40 illustrates an example of a frame configuration.

FIG. 40 illustrates an example of a frame configuration for modulated signal 1 which the base station (700) transmits, the horizontal axis indicates time and the vertical axis indicates frequency in the frame configuration in FIG. 40, and the frame configuration from time 1 to time and carrier 1 to carrier 40 is illustrated. Accordingly, FIG. 40 illustrates a frame configuration according to a multi-carrier transmission method such as the orthogonal frequency division multiplexing (OFDM) method.

Symbol area 4001_1 for modulated signal 1 in FIG. 40 is present from time 1 to time 10 and from carrier 1 to carrier 9.

Symbol group #i (4000_*i*) for modulated signal 1 is present from time 1 to time 10 and from carrier 10 to carrier 20. Note that symbol group #i (4000_*i*) for modulated signal 1 corresponds to symbol group #i (1401-*i*) for modulated signal 1 in FIG. 14.

Symbol area 4001_2 for modulated signal 1 is present from time 1 to time 10 and from carrier 21 to carrier 40.

At this time, for example, as described in Embodiment 4, for instance, when the base station transmits (unicasts), to one or more terminals, data therefor, symbol areas 4001_1 and 4001_2 for stream 1 in FIG. 40 can be used.

Then, symbol group #i (4000_*i*) for modulated signal 1 in FIG. 40 is to be used by the base station to transmit data for multicasting, as described in Embodiments 1 and 4, for instance.

Figure 41:
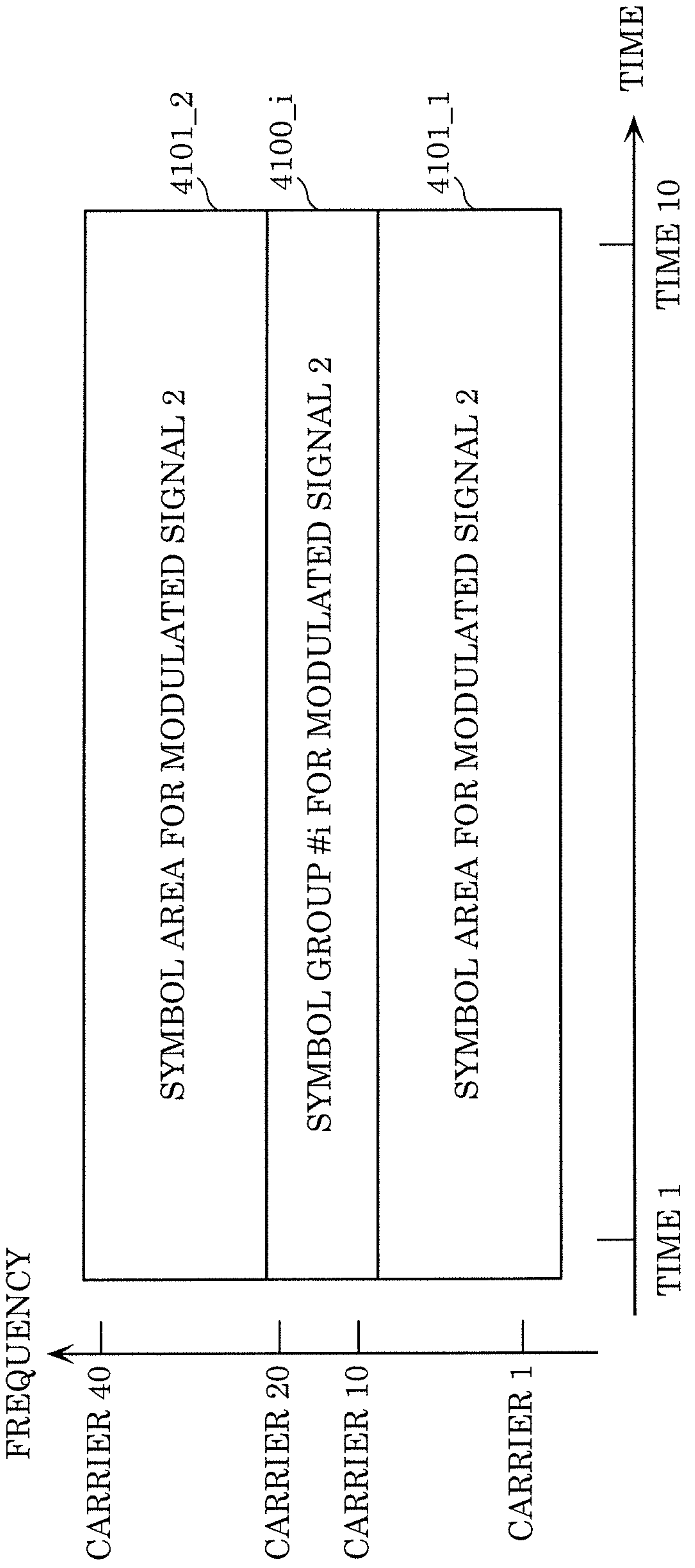
FIG. 41 illustrates an example of a frame configuration.

FIG. 41 illustrates an example of a frame configuration for modulated signal 2 which the base station (700) transmits, the horizontal axis indicates time and the vertical axis indicates frequency in the frame configuration in FIG. 41, and the frame configuration from time 1 to time and carrier 1 to carrier 40 is illustrated. Accordingly, FIG. 41 illustrates a frame according to a multi-carrier transmission method such as the OFDM system.

Symbol area 4101_1 for modulated signal 2 in FIG. 41 is present from time 1 to time 10 and from carrier 1 to carrier 9.

Symbol group #i (4100_*i*) for modulated signal 2 is present from time 1 to time 10 and from carrier 10 to carrier 20. Note that symbol group #i (4100_*i*) for modulated signal 2 corresponds to symbol group #i (1402-*i*) for modulated signal 2 in FIG. 14.

Symbol area 4101_2 for modulated signal 2 is present from time 1 to time 10 and from carrier 21 to carrier 40.

At this time, for example, as described in Embodiment 4, for instance, when the base station transmits (unicasts), to one or more terminals, data therefor, symbol areas 4101_1 and 4101_2 for modulated signal 2 in FIG. 41 can be used.

Then, symbol group #i (4100_*i*) for modulated signal 2 in FIG. 41 is to be used by the base station to transmit data for multicasting, as described in Embodiments 1 and 4, for instance.

Note that the base station transmits, using the same frequency at the same time, a symbol at time X (in the case of FIG. 40, X is an integer in a range from 1 to 10) and carrier Y (in the case of FIG. 40, Y is an integer in a range from 1 to 40) in FIG. 40, and a symbol at time X and carrier Y in FIG. 41.

Then, features of symbol group #1 for stream 1 indicated by 1401_1, symbol group #2 for modulated signal 1 indicated by 1401_2, and symbol group #3 for modulated signal 1 indicated by 1401_3 in FIG. 14 are as described in the above embodiments. Specifically, the features of symbol group #i for modulated signal 1 in FIG. 40 are the same as the features of the symbol groups for modulated signal 1 in FIG. 14, and are as described in the above embodiments.

Symbol group #1 for modulated signal 2 indicated by 1402_1, symbol group #2 for modulated signal 2 indicated by 14022, and symbol group #3 for modulated signal 2 indicated by 1402_3 in FIG. 14 are as described in the above embodiments. Specifically, the features of symbol group #i for modulated signal 2 in FIG. 41 are the same as the features of the symbol groups for modulated signal 2 in FIG. 14, and are as described in the above embodiments.

Note that if symbols are present after time 11 from carrier 10 to carrier 20 in the frame configuration in FIGS. 40 and 41, the symbols may be used for multicast transmission or dedicated data transmission (unicast transmission).

When the base station transmits a frame as in FIG. 14 using the frame configuration in FIG. 40 or 41, data transmission described in Embodiments 1 and 4 may be similarly carried out.

Examples of use of symbol areas 3801_1 and 3801_2 for stream 1 in FIG. 38, symbol areas 3901_1 and 3901_2 for stream 2 in FIG. 39, symbol areas 4001_1 and 4001_2 for modulated signal 1 in FIG. 40, and symbol areas 4101_1 and 4102_2 for modulated signal 2 in FIG. 41 in the above description are to be described.

Figure 42:
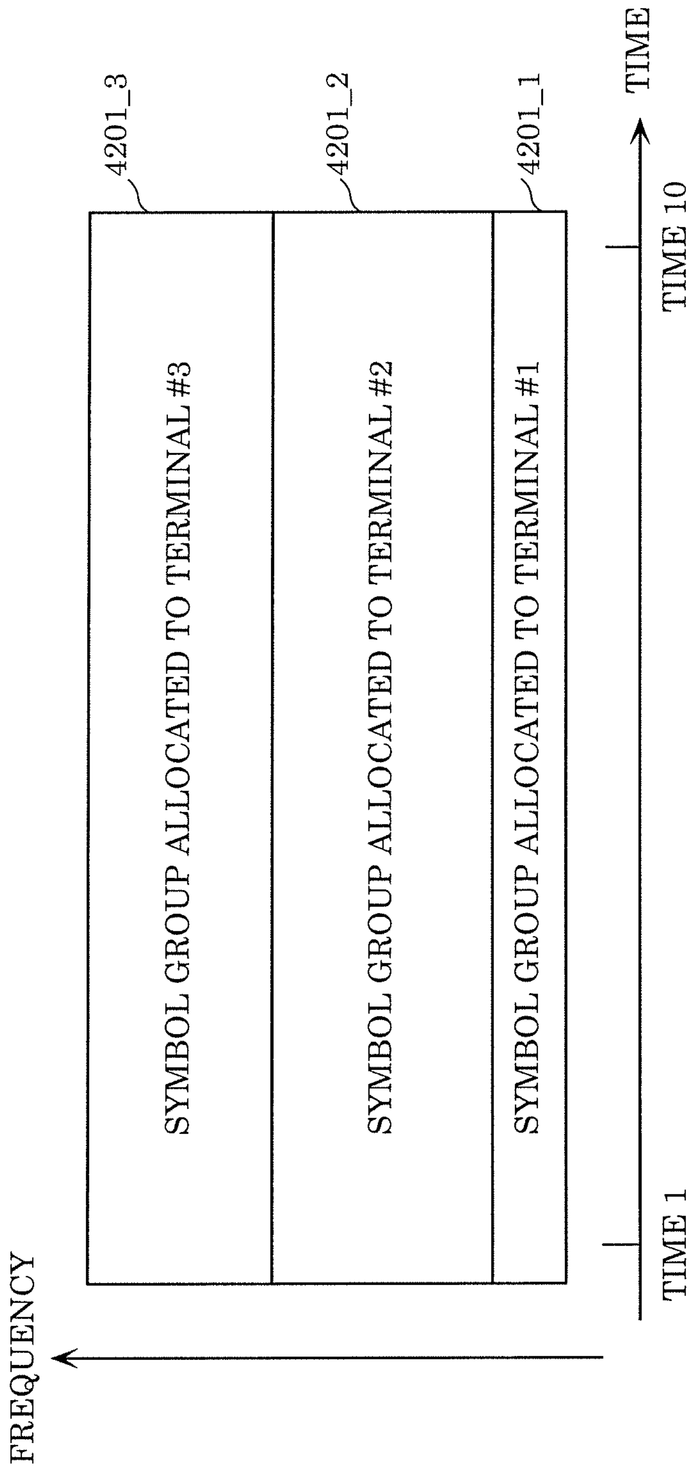
FIG. 42 illustrates an example of allocation of symbol areas to terminals.

FIG. 42 illustrates an example of allocation of "symbol areas 3801_1 and 3801_2 for stream 1 in FIG. 38, symbol areas 3901_1 and 3901_2 for stream 2 in FIG. 39, symbol areas 4001_1 and 4001_2 for modulated signal 1 in FIG. 40, and symbol areas 4101_1 and 4102_2 for modulated signal 2 in FIG. 41" to terminals. Note that in FIG. 42, the horizontal axis indicates time, and the vertical axis indicates frequency (carrier).

As illustrated in FIG. 42, for example, "symbol areas 3801_1 and 3801_2 for stream 1 in FIG. 38, symbol areas 3901_1 and 3901_2 for stream 2 in FIG. 39, symbol areas 4001_1 and 4001_2 for modulated signal 1 in FIG. 40, and symbol areas 4101_1 and 4102_2 for modulated signal 2 in FIG. 41" are subjected to frequency division, and allocated to the terminals. 4201_1 is a symbol group allocated to terminal #1, 4201_2 is a symbol group allocated to terminal #2, and 4201_3 is a symbol group allocated to terminal #3.

For example, the base station (700) communicates with terminal #1, terminal #2, and terminal #3, and when the base station transmits data to terminal #1, the base station transmits data to terminal #1, using "symbol group 4201_1 allocated to terminal #1" in FIG. 42. When the base station transmits data to terminal #2, the base station transmits data to terminal #2 using "symbol group 42012 allocated to terminal #2" in FIG. 42. When the base station transmits data to terminal #3, the base station transmits data to terminal #3 using "symbol group 4201_3 allocated to terminal #3" in FIG. 42.

Note that the method of allocating symbol groups to terminals is not limited to the method in FIG. 42, and thus the frequency band (the carrier number) may be changed with time or may be set in any manner. Furthermore, the method of allocating symbol groups to terminals may be changed with time.

Figure 43:
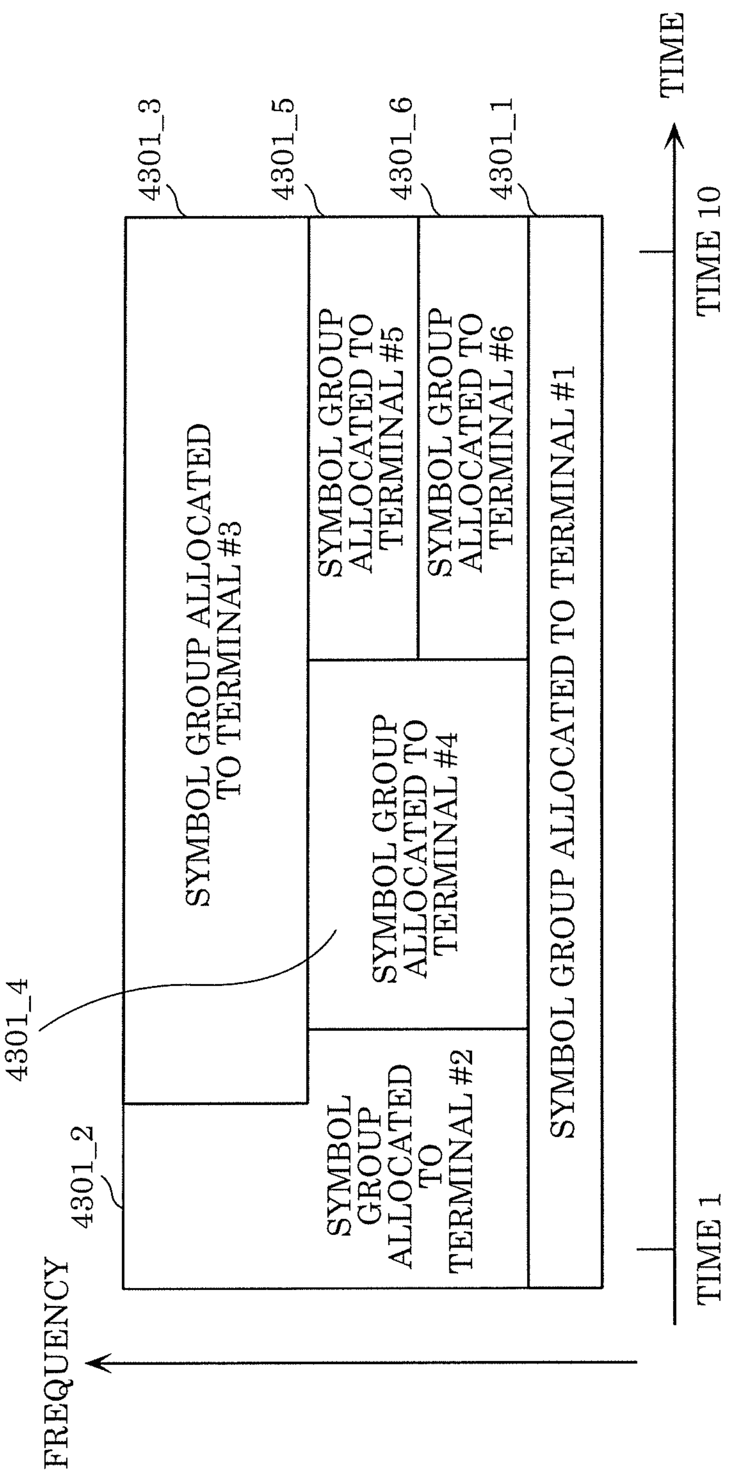
FIG. 43 illustrates an example of allocation of symbol areas to terminals.

FIG. 43 illustrates an example of allocation of "symbol areas 3801_1 and 3801_2 for stream 1 in FIG. 38, symbol areas 3901_1 and 3901_2 for stream 2 in FIG. 39, symbol areas 4001_1 and 4001_2 for modulated signal 1 in FIG. 40, and symbol areas 4101_1 and 4102_2 for modulated signal 2 in FIG. 41" to terminals, which is different from the allocation in FIG. 42. Note that in FIG. 43, the horizontal axis indicates time, and the vertical axis indicates frequency (carrier).

As illustrated in FIG. 43, for example, "symbol areas 3801_1 and 3801_2 for stream 1 in FIG. 38, symbol areas 3901_1 and 3901_2 for stream 2 in FIG. 39, symbol areas 4001_1 and 4001_2 for modulated signal 1 in FIG. 40, and symbol areas 4101_1 and 4102_2 for modulated signal 2 in FIG. 41" are subjected to time and frequency division, and allocated to the terminals. Then, 4301_1 is a symbol group allocated to terminal #1, 4301_2 is a symbol group allocated to terminal #2, 4301_3 is a symbol group allocated to terminal #3, 4301_4 is a symbol group allocated to terminal #4, 4301_5 is a symbol group allocated to terminal #5, and 4301_6 is a symbol group allocated to terminal #6.

For example, the base station (700) communicates with terminal #1, terminal #2, terminal #3, terminal #4, terminal #5, and terminal #6, and when the base station transmits data to terminal #1, the base station transmits data to terminal #1, using "symbol group 4301_1 allocated to terminal #1" in FIG. 43. Then, when the base station transmits data to terminal #2, the base station transmits data to terminal #2 using "symbol group 4301_2 allocated to terminal #2" in FIG. 43. When the base station transmits data to terminal #3, the base station transmits data to terminal #3 using "symbol group 4301_3 allocated to terminal #3" in FIG. 43. When the base station transmits data to terminal #4, the base station transmits data to terminal #4 using "symbol group 4301_4 allocated to terminal #4" in FIG. 43. When the base station transmits data to terminal #5, the base station transmits data to terminal #5 using "symbol group 4301_5 allocated to terminal #5" in FIG. 43. When the base station transmits data to terminal #6, the base station transmits data to terminal #6 using "symbol group 43016 allocated to terminal #6" in FIG. 43.

Note that the method of allocating symbol groups to terminals is not limited to the method in FIG. 43, and thus the frequency band (the carrier number) and the time width may be changed or may be set in any manner. Furthermore, the method of allocating symbol groups to terminals may be changed with time.

Further, different weighting synthesis may be performed for each carrier in the symbol areas for stream 1, the symbol areas for stream 2, the symbol areas for modulated signal 1, the symbol areas for modulated signal 2 in FIGS. 38, 39, 40, and 41, respectively, and a weighting-synthesis method may be determined for a unit of a plurality of carriers.

Figure 44:
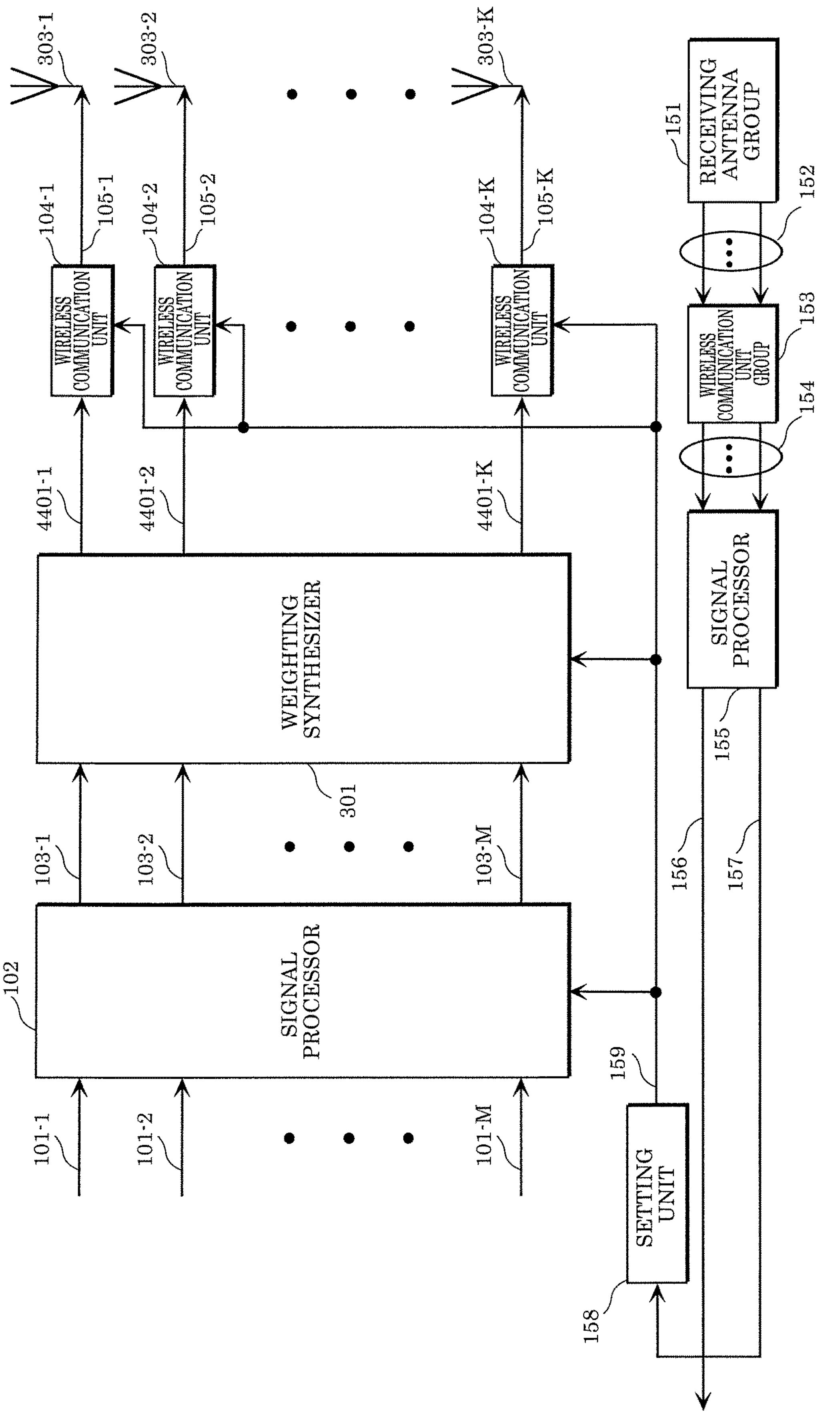
FIG. 44 illustrates an example of a configuration of the base station.

As illustrated in FIGS. 43 and 44, a weighting synthesis parameter may be set for each allocated terminal. Setting of the weighting synthesis method for carriers is not limited to these examples.

Through the above implementation, in multicast and broadcast data transmission, the base station transmits data symbols and control information symbols using a plurality of transmission beams, and a terminal selectively receives a beam with good quality among the plurality of transmission beams and receives data symbols based on the received transmission beam, thus achieving advantageous effects that the terminal can achieve high data receiving quality.

Embodiment 7

In this specification, the configurations of base stations 700 in FIGS. 7, 12, 17, 18, 19, 20, and 22 and the configurations of the base stations described in other embodiments may each be a configuration as illustrated in FIG. 44.

The following describes operation of the base station in FIG. 44. Elements which operate in the same manner as those in FIGS. 1 and 3 are assigned the same reference numerals in FIG. 44, and a description thereof is omitted.

Weighting synthesizer 301 receives inputs of signals 103_1, 103_2, . . . , and 103_M obtained as a result of signal processing, and control signal 159, performs weighting synthesis on the signals based on control signal 159, and outputs weighting-synthesis signals 4401_1, 4401_2, . . . , and 4401_K. Note that M is an integer of 2 or more, and K is an integer of 2 or more.

For example, if signal 103_*i* obtained as a result of the signal processing (i is an integer of 1 or more and M or less) is represented by ui(t) (t is time) and signal 4401_*g* (g is an integer of 1 or more and K or less) obtained as a result of the weighting synthesis is represented by vg(t), vg (t) can be represented by the following expression.

[Math. 7]

Expression (7)

$$v_g(t) = Q_{g1} + u_1(t) + Q_{g2} \times u_2(t) + \cdots + Q_{gM} \times u_M(t)$$

$$= \sum_{j=1}^{M} Q_{gj} + u_j(t)$$

Wireless communication unit 104_*g* receives inputs of signal 4401_*g* obtained as a result of the weighting synthesis and control signal 159, performs predetermined processing on the signal based on control signal 159, and generates and outputs transmission signal 105_*g*. Then, transmission signal 105_*g* is transmitted from antenna 303_1.

Note that the transmission method which the base station supports may be a multi-carrier method such as OFDM or a single carrier method. Furthermore, the base station may support both the multi-carrier method and the single carrier method. At this time, there are methods for generating modulated signals to be transmitted according to the single carrier method, and signals generated according to any of the methods can be transmitted. Examples of the single carrier method include "discrete Fourier transform (DFT)-spread orthogonal frequency division multiplexing (OFDM)", "trajectory constrained DFT-spread OFDM", "OFDM based single carrier (SC)", "single carrier (SC)-frequency division multiple access (FDMA)", and "guard interval DFT-spread OFDM".

Expression (7) is indicated by the function of time, yet Expression (7) may be a function of frequency in addition to time in the case of a multi-carrier method such as the OFDM method.

For example, according to the OFDM method, different weighting synthesis may be performed for each carrier, and a weighting-synthesis method may be determined for a unit of a plurality of carriers. Setting of the weighting synthesis method for carriers is not limited to these examples.

Supplementary Note 6

As a matter of course, the present disclosure may be carried out by combining a plurality of the exemplary embodiments and other contents such as supplementary notes described herein.

As the configuration of the base station, the examples of the configuration are not limited to those in FIGS. 1 and 3, and as long as the base station includes a plurality of transmission antennas and generates and transmits a plurality of transmission beams (transmission directivity beams), the present disclosure can be carried out with such a base station.

Moreover, the exemplary embodiments are mere examples. For example, while a "modulating method, an error correction coding method (an error correction code, a code length, a coding rate and the like to be used), control information and the like" are exemplified, it is possible to carry out the present disclosure with the same configuration even when other types of "a modulating method, an error correction coding method (an error correction code, a code length, a coding rate and the like to be used), control information and the like" are applied.

As for a modulating method, even when a modulating method other than the modulating methods described herein is used, it is possible to carry out the exemplary embodiments and the other contents described herein. For example, APSK (such as 16APSK, 64APSK, 128APSK, 256APSK, 1024APSK, and 4096APSK), PAM (such as 4PAM, 8PAM, 16PAM, 64PAM, 128PAM, 256PAM, 1024PAM and 4096PAM), PSK (such as BPSK, QPSK, 8PSK, 16PSK, 64PSK, 128PSK, 256PSK, 1024PSK and 4096PSK), and QAM (such as 4QAM, 8QAM, 16QAM, 64QAM, 128QAM, 256QAM, 1024QAM and 4096QAM) may be applied, or in each modulating method, uniform mapping or non-uniform mapping may be performed. Moreover, a method for arranging signal points, such as 2 signal points, 4 signal points, 8 signal points, 16 signal points, 64 signal points, 128 signal points, 256 signal points, and 1024 signal points on an I-Q plane (a modulating method having signal points such as 2 signal points, 4 signal points, 8 signal points, 16 signal points, 64 signal points, 128 signal points, 256 signal points, and 1024 signal points) is not limited to a signal point arranging method of the modulating methods described herein.

Herein, it can be considered that communication/broadcast apparatuses, such as a broadcast station, a base station, an access point, a terminal, and a mobile phone, each include the transmitting device. In this case, it can be considered that communication apparatuses, such as a television, a radio, a terminal, a personal computer, a mobile phone, an access point, and a base station, each include the receiving device. Moreover, it can be also considered that each of the transmitting device and the receiving device according to the present disclosure is an apparatus having communication functions and has a form connectable via any interface to devices for running applications such as a television, a radio, a personal computer, and a mobile phone. Moreover, in the present exemplary embodiment, symbols other than data symbols, for example, pilot symbols (such as preambles, unique words, postambles, and reference symbols), and control information symbols may be arranged in frames in any way. Then, these symbols are named a pilot symbol and a control information symbol here, but may be named in any way, and a function itself is important.

Moreover, the pilot symbol only needs to be a known symbol modulated by using PSK modulation in a transmitting device and a receiving device. The receiving device performs frequency synchronization, time synchronization, channel estimation of each modulated signal (estimation of CSI (Channel State Information)), signal detection, and the like by using this symbol. Alternatively, the pilot symbol may allow the receiving device to learn a symbol transmitted by the transmitting device by establishing synchronization.

Moreover, the control information symbol is a symbol for transmitting information that is used for realizing communication other than communication for data (data of an application, for instance) and that is to be transmitted to a communicating party (for example, a modulating method used for communication, an error correction coding method, a coding rate of the error correction coding method, setting information in an upper layer, and the like).

Note that the present disclosure is not limited to the exemplary embodiments, and can be carried out with various modifications. For example, the case where the present disclosure is performed as a communication device is described in the exemplary embodiments.

However, the present disclosure is not limited to this case, and this communication method can also be used as software.

Note that a program for executing the above-described communication method may be stored in a ROM in advance, and a CPU may be caused to operate this program.

Moreover, the program for executing the communication method may be stored in a computer-readable storage medium, the program stored in the recording medium may be recorded in a RAM of a computer, and the computer may be caused to operate according to this program.

Then, the configurations of the above-described exemplary embodiments, for instance, may be each realized as an LSI (Large Scale Integration) which is typically an integrated circuit having an input terminal and an output terminal. The configurations may be separately formed as one chip, or all or at least one of the configurations of the exemplary embodiments may be formed as one chip. The LSI is described here, but the integrated circuit may also be referred to as an IC (Integrated Circuit), a system LSI, a super LSI, or an ultra LSI, depending on a degree of integration. Moreover, a circuit integration technique is not limited to the LSI, and may be realized by a dedicated circuit or a general purpose processor. After manufacturing of the LSI, a programmable FPGA (Field Programmable Gate Array) or a reconfigurable processor which is reconfigurable in connection or settings of circuit cells inside the LSI may be used. Further, when development of a semiconductor technology or another derived technology provides a circuit integration technology which replaces the LSI, as a matter of course, functional blocks may be integrated by using this technology. Application of biotechnology, for instance, is one such possibility.

Various frame configurations have been described herein. For example, the base station (AP) which includes the transmitting device in FIG. 1 transmits a modulated signal having a frame configuration described herein, using a multi-carrier method such as an OFDM method. At this time, it is conceivable to apply a method in which when a terminal (user) communicating with the base station (AP) transmits a modulated signal, the modulated signal may be transmitted by the terminal according to a single carrier method (the base station (AP) can simultaneously transmit data symbol groups to a plurality of terminals using the OFDM method, and the terminal can reduce power consumption by using a single carrier method).

A time division duplex (TDD) method in which a terminal transmits a modulation signal, using a portion of a frequency band used for a modulated signal transmitted by the base station (AP) may be applied.

The configuration of antenna units 106-1, 106-2, . . . , and 106-M in FIG. 1 is not limited to the configurations described in the embodiments. For example, antenna units 106-1, 106-2, . . . , and 106-M may not each include a plurality of antennas, and may not receive an input of signal 159.

The configuration of antenna units 401-1, 401-2, . . . , and 401-N in FIG. 4 is not limited to the configuration described in the embodiments. For example, antenna units 401-1, 401-2, . . . , and 401-N may not each include a plurality of antennas, and may not receive an input of signal 410.

Note that the transmission method which the base station and the terminals support may be a multi-carrier method such as OFDM or a single carrier method. Furthermore, the base station may support both the multi-carrier method and the single carrier method. At this time, there are methods for generating modulated signals according to the single carrier method, and signals generated according to any of the methods can be transmitted. Examples of the single carrier system include "discrete Fourier transform (DFT)-spread orthogonal frequency division multiplexing (OFDM)", "trajectory constrained DFT-spread OFDM", "OFDM based single carrier (SC)", and "single carrier (SC)-frequency division multiple access (FDMA)", and "guard interval DFT-spread OFDM".

Furthermore, at least multicast (broadcast) data is included in information #1 (101_1), information #2 (101_2), . . . , and information #M (101_M) in FIGS. 1, 3, and 44. For example, in FIG. 1, if information #1 (101_1) is data for multicasting, a plurality of streams or modulated signals that include such data are generated by signal processor 102, and output from an antenna.

In FIG. 3, if information #1 (101_1) is data for multicasting, a plurality of streams or modulated signals that include such data are generated by signal processor 102 and/or weighting synthesizer 301, and output from an antenna.

In FIG. 44, if information #1 (101_1) is data for multicasting, a plurality of streams or modulated signals that include such data are generated by signal processor 102 and/or weighting synthesizer 301, and output from an antenna.

Note that the states of the streams and modulated signals are as described with reference to FIGS. 7, 9, 12, 14, 17, 18, and 19.

Furthermore, information #1 (101_1), information #2 (101_2), . . . , and information #M (101_M) in FIGS. 1, 3, and 44 may include data addressed to individual terminals. With regard to this point, a description is as given in the embodiments in the specification.

Note that a configuration may be adopted in which at least one of a field programmable gate array (FPGA) and a central processing unit (CPU) can download the entirety of or a portion of software necessary to achieve the communication method described in the present disclosure by wireless communication or wire communication. Furthermore, the configuration may allow downloading the entirety of or a portion of software for update by wireless communication or wire communication. Then, the downloaded software may be stored into a storage, and at least one of an FPGA and a CPU may be operated based on the stored software, so that the digital signal processing described in the present disclosure may be performed.

At this time, a device that includes at least one of an FPGA and a CPU may be connected with a communication modem in a wireless or wired manner, and this device and the communication modem may achieve the communication method described in the present disclosure.

For example, the base station, an access point, and communication devices such as terminals described in this specification may each include at least one of an FPGA and a CPU, and the communication devices may each include an interface for receiving, from the outside, software for operating at least one of the FPGA and the CPU.

Furthermore, the communication devices may include a storage for storing the software obtained from the outside, and cause the FPGA and the CPU to operate based on the stored software, thus achieving signal processing described in the present disclosure.

Embodiment 8

In the present embodiment, an example of a case in which data held by communication device #A is transmitted to a plurality of communication devices will be given.

Figure 45:
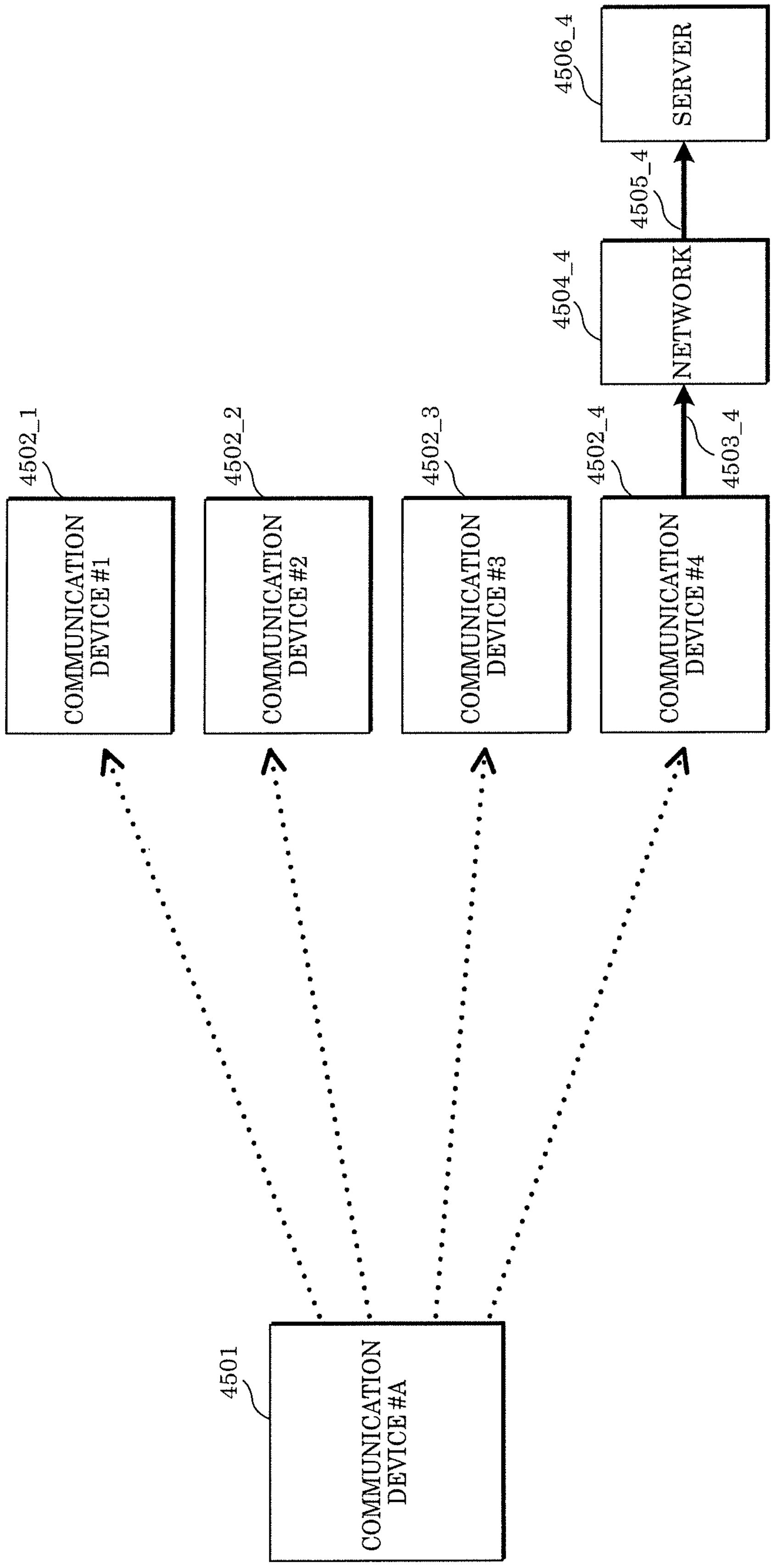
FIG. 45 illustrates an example of a case in which data held by a communication device is transmitted to a plurality of communication devices.

FIG. 45 illustrates an example of a case in which data held by communication device #A is transmitted to a plurality of communication devices. Communication device #A labeled as 4501, for example, accumulates a first file configured of first data in an accumulation unit, and communication device #A labeled as 4501 transmits the first data to communication device #1 labeled as 4502_1, communication device #2 labeled as 4502_2, communication device #3 labeled as 4502_3, and communication device #4 labeled as 4502_4.

Communication device #4 labeled as 4502_4 transmits the first data obtained from communication device #A labeled as 4501 to server 4506_4 via network 4503.

Next, operations performed by communication device #A labeled as 4501, communication device #1 labeled as 4502_1, communication device #2 labeled as 4502_2, communication device #3 labeled as 45023, and communication device #4 labeled as 4502_4 in FIG. 45 will be described in detail.

For example, communication device #A labeled as 4501 has the configuration illustrated in FIG. 1 (or FIG. 3 or FIG. 44). Communication device #1 labeled as 4502_1, communication device #2 labeled as 4502_2, communication device #3 labeled as 4502_3, and communication device #4 labeled as 4502_4 have, for example, the configuration illustrated in FIG. 4. Note that as operations performed by each element illustrated in FIG. 1 (FIG. 3, FIG. 44) and operations performed by each element illustrated in FIG. 4 have already been described, repeated description thereof will be omitted.

Signal processor 102 included in communication device #A labeled as 4501 receives inputs of information 101-1 including first data, and control signal 159, and signal processing is performed based on "information on a method of error correction coding (a coding rate, a code length (block length))", "information on a modulation method", and "a transmitting method (multiplexing method)", etc., that are included in control signal 159.

At this time, signal processor 102 generates, based on information 101-1 including first data, a signal obtained as a result of signal processing to be transmitted to communication device #1 labeled as 4502_1, a signal obtained as a result of signal processing to be transmitted to communication device #2 labeled as 45022, a signal obtained as a result of signal processing to be transmitted to communication device #3 labeled as 45023, and a signal obtained as a result of signal processing to be transmitted to communication device #4 labeled as 4502_4. In one example, the signal obtained as a result of signal processing to be transmitted to communication device #1 labeled as 4502_1 is labeled as 103-1, the signal obtained as a result of signal processing to be transmitted to communication device #2 labeled as 4502_2 is labeled as 103-2, the signal obtained as a result of signal processing to be transmitted to communication device #3 labeled as 4502_3 is labeled as 103-3, and the signal obtained as a result of signal processing to be transmitted to communication device #4 labeled as 4502_4 is labeled as 103-4.

Signal 103-1 obtained as a result of signal processing to be transmitted to communication device #1 labeled as 4502_1 is transmitted from antenna unit 106-1 as transmission signal 105-1 via wireless communication unit 104-1. Similarly, signal 103-2 obtained as a result of signal processing to be transmitted to communication device #2 labeled as 4502_2 is transmitted from antenna unit 106-2 as transmission signal 105-2 via wireless communication unit 104-2, signal 103-3 obtained as a result of signal processing to be transmitted to communication device #3 labeled as 4502_3 is transmitted from antenna unit 106-3 as transmission signal 105-3 via wireless communication unit 104-3, and signal 103-4 obtained as a result of signal processing to be transmitted to communication device #4 labeled as 4502_4 is transmitted from antenna unit 106-4 as transmission signal 105-4 via wireless communication unit 104-4.

Next, a method for setting the frequencies of transmission signals 105-1, 105-2, 105-3, and 105-4 at this time will be described with reference to FIG. 46.

Figure 46:
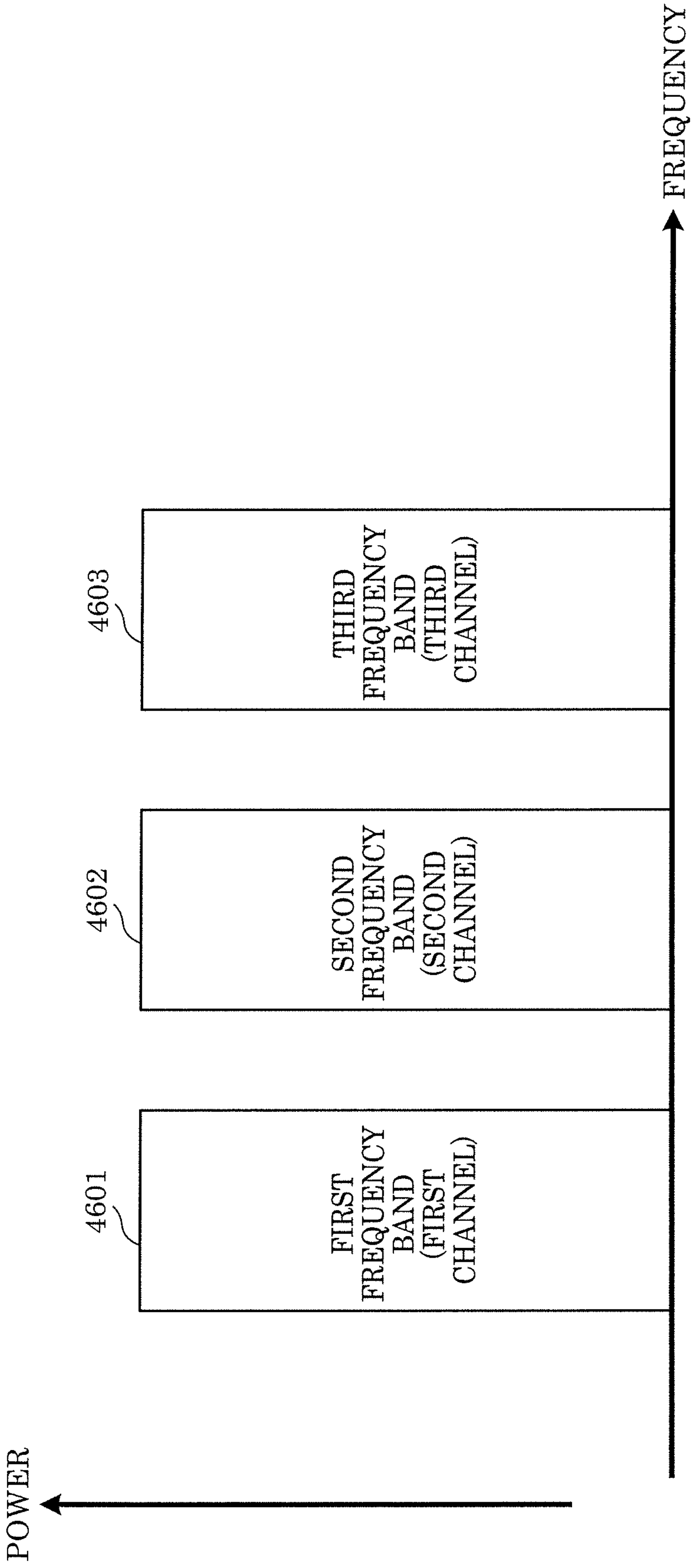
FIG. 46 illustrates one example of spectrums.

In FIG. 46, frequency is represented on the horizontal axis, and power is represented on the vertical axis. Transmission signals 105-1, 105-2, 105-3, and 105-4 are signals having any one of a spectrum including spectrum 4601 in a first frequency band (first channel), a spectrum including spectrum 4602 in a second frequency band (second channel), and a spectrum including spectrum 4603 in a third frequency band (third channel).

Specific examples will be given with reference to FIG. 47, FIG. 48, FIG. 49, and FIG. 50.

Figure 47:
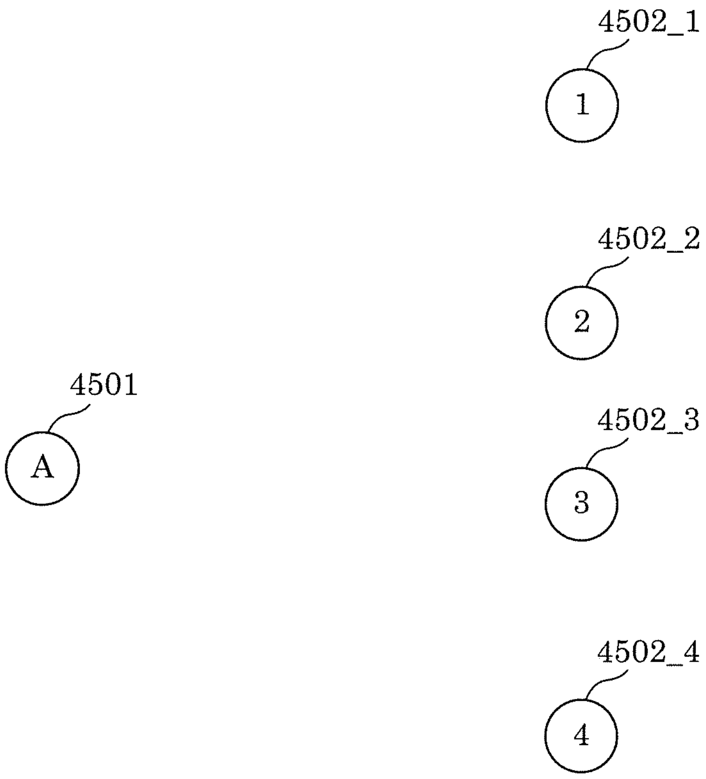
FIG. 47 illustrates one example of a positional relationship between communication devices.

FIG. 47 illustrates a positional relationship between communication device #A labeled as 4501, communication device #1 labeled as 4502_1 communication device #2 labeled as 4502_2 communication device #3 labeled as 45023, and communication device #4 labeled as 4502_4 illustrated in FIG. 45. Accordingly, the reference signs used in FIG. 45 are also used in FIG. 47.

With the example illustrated in FIG. 47, communication device #A labeled as 4501 can use, as the spectrum to be used by transmission signal 105-1 to be transmitted to communication device #1 labeled as 4502_1, spectrum 4601 having the first frequency band that is illustrated in FIG. 46, can use, as the spectrum to be used by transmission signal 105-2 to be transmitted to communication device #2 labeled as 4502_2, spectrum 4601 having the first frequency band that is illustrated in FIG. 46, can use, as the spectrum to be used by transmission signal 105-3 to be transmitted to communication device #3 labeled as 45023, spectrum 4601 having the first frequency band that is illustrated in FIG. 46, and can use, as the spectrum to be used by transmission signal 105-4 to be transmitted to communication device #4 labeled as 45024, spectrum 4601 having the first frequency band that is illustrated in FIG. 46. In this way, the frequency band used by the transmission signal to be transmitted to communication device #1 labeled as 4502_1, the frequency band used by the transmission signal to be transmitted to communication device #2 labeled as 45022, the frequency band used by the transmission signal to be transmitted to communication device #3 labeled as 4502_3, and the frequency band used by the transmission signal to be transmitted to communication device #4 labeled as 4502_4 can be set to the same frequency band. This achieves the advantageous effect that the frequency usage efficiency can be improved.

Next, the temporal presence of transmission signal 105-1 to be transmitted to communication device #1 labeled as 4502_1, transmission signal 105-2 to be transmitted to communication device #2 labeled as 45022, transmission signal 105-3 to be transmitted to communication device #3 labeled as 45023, and transmission signal 105-4 to be transmitted to communication device #4 labeled as 4502_4 will be described.

Figure 51:
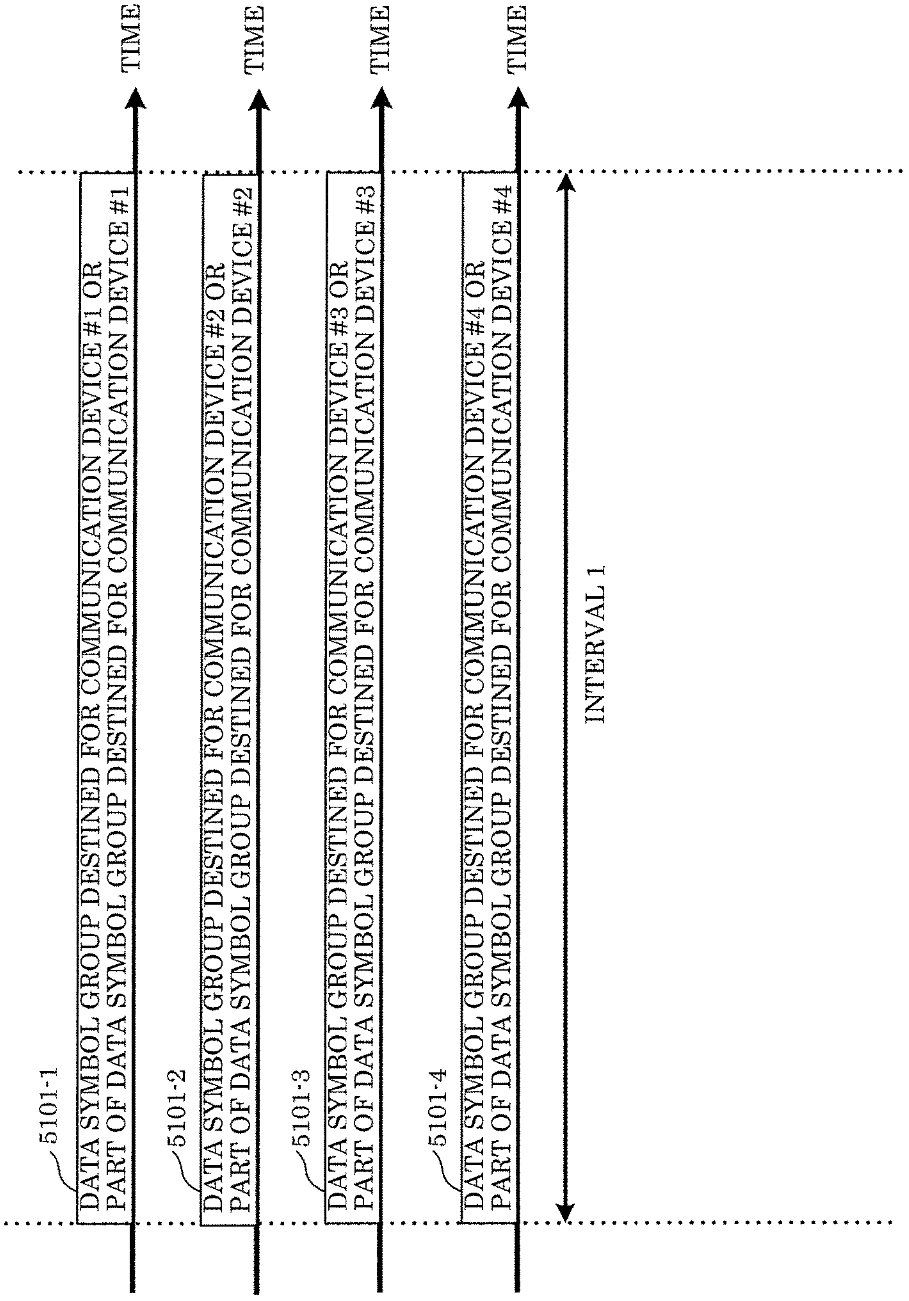
FIG. 51 illustrates one example of a frame configuration of a modulated signal transmitted by a communication device.

FIG. 51 illustrates one example of a frame configuration of a modulated signal transmitted by communication device A labeled as 4501, and is an example of symbol arrangement on the horizontal axis indicating time. In FIG. 51, 5101-1 indicates a data symbol group destined for communication device #1 labeled as 45021 or part of a data symbol group destined for communication device #1 labeled as 4502_1, 5101-2 indicates a data symbol group destined for communication device #2 labeled as 4502_2 or part of a data symbol group destined for communication device #2 labeled as 45022, 5101-3 indicates a data symbol group destined for communication device #3 labeled as 4502_3 or part of a data symbol group destined for communication device #3 labeled as 45023, and 5101-4 indicates a data symbol group destined for communication device #4 labeled as 4502_4 or part of a data symbol group destined for communication device #4 labeled as 4502_4.

Each of "data symbol group destined for communication device #1 labeled as 4502_1 or part of a data symbol group destined for communication device #1 labeled as 4502_1" 5101_1, "data symbol group destined for communication device #2 labeled as 4502_2 or part of a data symbol group destined for communication device #2 labeled as 4502_2" 5101-2, "data symbol group destined for communication device #3 labeled as 4502_3 or part of a data symbol group destined for communication device #3 labeled as 4502_3" 51013, and "data symbol group destined for communication device #4 labeled as 4502_4 or part of a data symbol group destined for communication device #4 labeled as 4502_4" 5101_4 is present in time interval 1.

Figure 48:
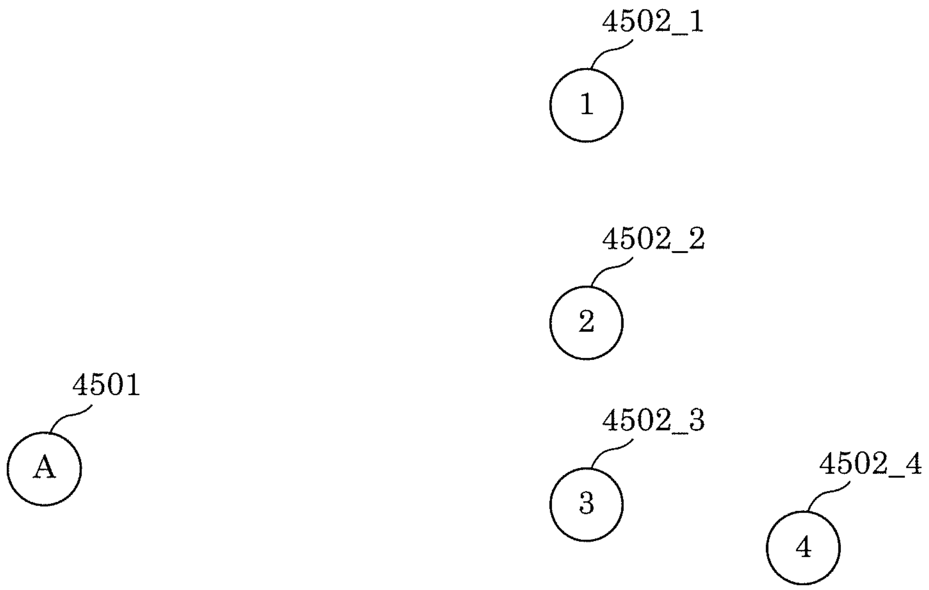
FIG. 48 illustrates another example of a positional relationship between communication devices.

FIG. 48 illustrates a positional relationship between communication device #A labeled as 4501, communication device #1 labeled as 4502_1, communication device #2 labeled as 4502_2, communication device #3 labeled as 45023, and communication device #4 labeled as 4502_4 illustrated in FIG. 45 that differs from the example illustrated in FIG. 47. Accordingly, the reference signs used in FIG. 45 are also used in FIG. 48.

With the example illustrated in FIG. 48, communication device #A labeled as 4501 uses, as the spectrum to be used by transmission signal 105-1 to be transmitted to communication device #1 labeled as 4502_1, spectrum 4601 having the first frequency band that is illustrated in FIG. 46, uses, as the spectrum to be used by transmission signal 105-2 to be transmitted to communication device #2 labeled as 45022, spectrum 4601 having the first frequency band that is illustrated in FIG. 46, uses, as the spectrum to be used by transmission signal 105-3 to be transmitted to communication device #3 labeled as 45023, spectrum 4601 having the first frequency band that is illustrated in FIG. 46, and uses, as the spectrum to be used by transmission signal 105-4 to be transmitted to communication device #4 labeled as 45024, spectrum 4602 having the second frequency band that is illustrated in FIG. 46. At this time, the reason why the frequency band used by transmission signal 105-3 to be transmitted to communication device #3 labeled as 4502_3 and the frequency band used by transmission signal 105-4 to be transmitted to communication device #4 labeled as 4502_4 are different is because when transmitting device #A labeled as 4501 tries to make the frequency band used by transmission signal 105-3 to be transmitted to communication device #3 labeled as 4502_3 and the frequency band used by transmission signal 105-4 to be transmitted to communication device #4 labeled as 4502_4 the same, communication device #3 labeled as 4502_3 and communication device #4 labeled as 4502_4 have difficulty in splitting the beam whereby interference increases, which results in a reduction in data reception quality.

This achieves the advantageous effect that the frequency usage efficiency can be improved while ensuring high data reception quality.

Next, the temporal presence of transmission signal 105-1 to be transmitted to communication device #1 labeled as 4502_1, transmission signal 105-2 to be transmitted to communication device #2 labeled as 45022, transmission signal 105-3 to be transmitted to communication device #3 labeled as 45023, and transmission signal 105-4 to be transmitted to communication device #4 labeled as 4502_4 will be described.

FIG. 51 illustrates one example of a frame configuration of a modulated signal transmitted by communication device A labeled as 4501, and is an example of symbol arrangement on the horizontal axis indicating time. In FIG. 51, 5101-1 indicates a data symbol group destined for communication device #1 labeled as 45021 or part of a data symbol group destined for communication device #1 labeled as 4502_1, 5101-2 indicates a data symbol group destined for communication device #2 labeled as 4502_2 or part of a data symbol group destined for communication device #2 labeled as 45022, 5101-3 indicates a data symbol group destined for communication device #3 labeled as 4502_3 or part of a data symbol group destined for communication device #3 labeled as 45023, and 5101-4 indicates a data symbol group destined for communication device #4 labeled as 4502_4 or part of a data symbol group destined for communication device #4 labeled as 4502_4.

Each of "data symbol group destined for communication device #1 labeled as 4502_1 or part of a data symbol group destined for communication device #1 labeled as 4502_1" 51011, "data symbol group destined for communication device #2 labeled as 4502_2 or part of a data symbol group destined for communication device #2 labeled as 4502_2" 5101-2, "data symbol group destined for communication device #3 labeled as 4502_3 or part of a data symbol group destined for communication device #3 labeled as 4502_3" 51013, and "data symbol group destined for communication device #4 labeled as 4502_4 or part of a data symbol group destined for communication device #4 labeled as 4502_4" 5101_4 is present in time interval 1.

Note that even in the example illustrated in FIG. 47, communication device #A labeled as 4501 can use, as the spectrum to be used by transmission signal 105-1 to be transmitted to communication device #1 labeled as 45021, spectrum 4601 having the first frequency band that is illustrated in FIG. 46, can use, as the spectrum to be used by transmission signal 105-2 to be transmitted to communication device #2 labeled as 45022, spectrum 4601 having the first frequency band that is illustrated in FIG. 46, can use, as the spectrum to be used by transmission signal 105-3 to be transmitted to communication device #3 labeled as 4502_3, spectrum 4601 having the first frequency band that is illustrated in FIG. 46, and can use, as the spectrum to be used by transmission signal 105-4 to be transmitted to communication device #4 labeled as 4502_4, spectrum 4602 having the second frequency band that is illustrated in FIG. 46.

Figure 49:
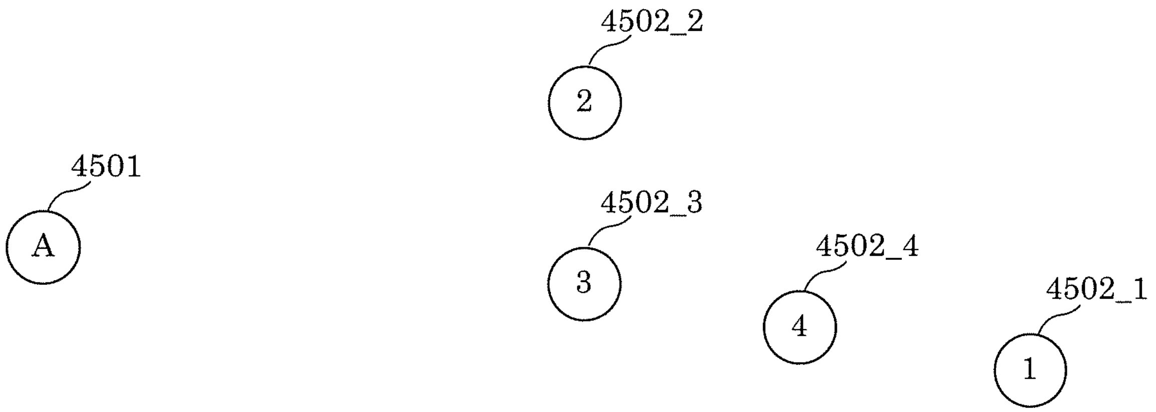
FIG. 49 illustrates another example of a positional relationship between communication devices.

FIG. 49 illustrates a positional relationship of communication device #A labeled as 4501, communication device #1 labeled as 4502_1, communication device #2 labeled as 45022, communication device #3 labeled as 4502_3, and communication device #4 labeled as 4502_4 that are illustrated in FIG. 45, that differs from the examples illustrated in FIG. 47 and FIG. 48. Accordingly, the reference signs used in FIG. 45 are also used in FIG. 49.

With the example illustrated in FIG. 49, communication device #A labeled as 4501 uses, as the spectrum to be used by transmission signal 105-1 to be transmitted to communication device #1 labeled as 4502_1, spectrum 4601 having the first frequency band that is illustrated in FIG. 46, uses, as the spectrum to be used by transmission signal 105-2 to be transmitted to communication device #2 labeled as 4502_2, spectrum 4602 having the second frequency band that is illustrated in FIG. 46, uses, as the spectrum to be used by transmission signal 105-3 to be transmitted to communication device #3 labeled as 4502_3, spectrum 4602 having the second frequency band that is illustrated in FIG. 46, and uses, as the spectrum to be used by transmission signal 105-4 to be transmitted to communication device #4 labeled as 4502_4, spectrum 4603 having the third frequency band that is illustrated in FIG. 46. At this time, the reason why the frequency band used by transmission signal 105-1 to be transmitted to communication device #1 labeled as 4502_1, the frequency band used by transmission signal 105-3 to be transmitted to communication device #3 labeled as 4502_3 and the frequency band used by transmission signal 105-4 to be transmitted to communication device #4 labeled as 4502_4 are different is because when transmitting device #A labeled as 4501 tries to make the frequency band used by transmission signal 105-1 to be transmitted to communication device #1 labeled as 4502_1, the frequency band used by transmission signal 105-3 to be transmitted to communication device #3 labeled as 4502_3 and the frequency band used by transmission signal 105-4 to be transmitted to communication device #4 labeled as 4502_4 the same, communication device #1 labeled as 4502_1, communication device #3 labeled as 45023, and communication device #4 labeled as 4502_4 have difficulty in splitting the beam whereby interference increases, which results in a reduction in data reception quality.

This achieves the advantageous effect that the frequency usage efficiency can be improved while ensuring high data reception quality.

Next, the temporal presence of transmission signal 105-1 to be transmitted to communication device #1 labeled as 4502_1, transmission signal 105-2 to be transmitted to communication device #2 labeled as 4502_2 transmission signal 105-3 to be transmitted to communication device #3 labeled as 45023, and transmission signal 105-4 to be transmitted to communication device #4 labeled as 4502_4 will be described.

FIG. 51 illustrates one example of a frame configuration of a modulated signal transmitted by communication device A labeled as 4501, and is an example of symbol arrangement on the horizontal axis indicating time. In FIG. 51, 5101-1 indicates a data symbol group destined for communication device #1 labeled as 45021 or part of a data symbol group destined for communication device #1 labeled as 4502_1, 5101-2 indicates a data symbol group destined for communication device #2 labeled as 4502_2 or part of a data symbol group destined for communication device #2 labeled as 45022, 5101-3 indicates a data symbol group destined for communication device #3 labeled as 4502_3 or part of a data symbol group destined for communication device #3 labeled as 45023, and 5101-4 indicates a data symbol group destined for communication device #4 labeled as 4502_4 or part of a data symbol group destined for communication device #4 labeled as 4502_4.

Each of "data symbol group destined for communication device #1 labeled as 4502_1 or part of a data symbol group destined for communication device #1 labeled as 4502_1" 51011, "data symbol group destined for communication device #2 labeled as 4502_2 or part of a data symbol group destined for communication device #2 labeled as 4502_2" 5101-2, "data symbol group destined for communication device #3 labeled as 4502_3 or part of a data symbol group destined for communication device #3 labeled as 4502_3" 51013, and "data symbol group destined for communication device #4 labeled as 4502_4 or part of a data symbol group destined for communication device #4 labeled as 4502_4" 5101_4 is present in time interval 1.

Note that even in the example illustrated in FIG. 47, communication device #A labeled as 4501 can use, as the spectrum to be used by transmission signal 105-1 to be transmitted to communication device #1 labeled as 45021, spectrum 4601 having the first frequency band that is illustrated in FIG. 46, can use, as the spectrum to be used by transmission signal 105-2 to be transmitted to communication device #2 labeled as 45022, spectrum 4602 having the second frequency band that is illustrated in FIG. 46, can use, as the spectrum to be used by transmission signal 105-3 to be transmitted to communication device #3 labeled as 4502_3, spectrum 4602 having the second frequency band that is illustrated in FIG. 46, and can use, as the spectrum to be used by transmission signal 105-4 to be transmitted to communication device #4 labeled as 4502_4, spectrum 4603 having the third frequency band that is illustrated in FIG. 46.

Figure 50:
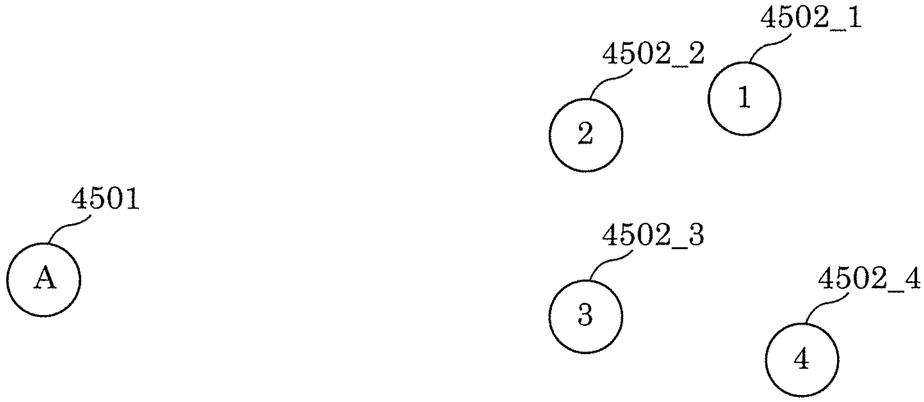
FIG. 50 illustrates another example of a positional relationship between communication devices.

FIG. 50 illustrates a positional relationship of communication device #A labeled as 4501, communication device #1 labeled as 4502_1, communication device #2 labeled as 45022, communication device #3 labeled as 4502_3, and communication device #4 labeled as 4502_4 that are illustrated in FIG. 45, that differs from the examples illustrated in FIG. 47, FIG. 48, and FIG. 49. Accordingly, the reference signs used in FIG. are also used in FIG. 50.

With the example illustrated in FIG. 50, communication device #A labeled as 4501 uses, as the spectrum to be used by transmission signal 105-1 to be transmitted to communication device #1 labeled as 4502_1 spectrum 4601 having the first frequency band that is illustrated in FIG. 46, uses, as the spectrum to be used by transmission signal 105-2 to be transmitted to communication device #2 labeled as 45022, spectrum 4602 having the second frequency band that is illustrated in FIG. 46, uses, as the spectrum to be used by transmission signal 105-3 to be transmitted to communication device #3 labeled as 45023, spectrum 4602 having the second frequency band that is illustrated in FIG. 46, and uses, as the spectrum to be used by transmission signal 105-4 to be transmitted to communication device #4 labeled as 45024, spectrum 4601 having the first frequency band that is illustrated in FIG. 46.

At this time, the reason why the frequency band used by transmission signal 105-1 to be transmitted to communication device #1 labeled as 4502_1 and the frequency band used by transmission signal 105-2 to be transmitted to communication device #2 labeled as 4502_2 are different is because when transmitting device #A labeled as 4501 tries to make the frequency band used by transmission signal 105-1 to be transmitted to communication device #1 labeled as 4502_1 and the frequency band used by transmission signal 105-2 to be transmitted to communication device #2 labeled as 4502_2 the same, communication device #1 labeled as 4502_1 and communication device #2 labeled as 4502_2 have difficulty in splitting the beam whereby interference increases, which results in a reduction in data reception quality.

Similarly, the reason why the frequency band used by transmission signal 105-3 to be transmitted to communication device #3 labeled as 4502_3 and the frequency band used by transmission signal 105-4 to be transmitted to communication device #4 labeled as 4502_4 are different is because when transmitting device #A labeled as 4501 tries to make the frequency band used by transmission signal 105-3 to be transmitted to communication device #3 labeled as 4502_3 and the frequency band used by transmission signal 105-4 to be transmitted to communication device #4 labeled as 4502_4 the same, communication device #3 labeled as 4502_3 and communication device #4 labeled as 4502_4 have difficulty in splitting the beam whereby interference increases, which results in a reduction in data reception quality.

This achieves the advantageous effect that the frequency usage efficiency can be improved while ensuring high data reception quality.

Next, the temporal presence of transmission signal 105-1 to be transmitted to communication device #1 labeled as 4502_1, transmission signal 105-2 to be transmitted to communication device #2 labeled as 45022, transmission signal 105-3 to be transmitted to communication device #3 labeled as 45023, and transmission signal 105-4 to be transmitted to communication device #4 labeled as 4502_4 will be described.

FIG. 51 illustrates one example of a frame configuration of a modulated signal transmitted by communication device A labeled as 4501, and is an example of symbol arrangement on the horizontal axis indicating time. In FIG. 51, 5101-1 indicates a data symbol group destined for communication device #1 labeled as 4502_1 or part of a data symbol group destined for communication device #1 labeled as 4502_1, 5101-2 indicates a data symbol group destined for communication device #2 labeled as 4502_2 or part of a data symbol group destined for communication device #2 labeled as 4502_2, 5101-3 indicates a data symbol group destined for communication device #3 labeled as 4502_3 or part of a data symbol group destined for communication device #3 labeled as 4502_3, and 5101-4 indicates a data symbol group destined for communication device #4 labeled as 4502_4 or part of a data symbol group destined for communication device #4 labeled as 4502_4.

Each of "data symbol group destined for communication device #1 labeled as 4502_1 or part of a data symbol group destined for communication device #1 labeled as 4502_1" 5101_1, "data symbol group destined for communication device #2 labeled as 4502_2 or part of a data symbol group destined for communication device #2 labeled as 4502_2"

5101-2, "data symbol group destined for communication device #3 labeled as 4502_3 or part of a data symbol group destined for communication device #3 labeled as 4502_3" 51013, and "data symbol group destined for communication device #4 labeled as 4502_4 or part of a data symbol group destined for communication device #4 labeled as 4502_4" 5101_4 is present in time interval 1.

Note that even in the example illustrated in FIG. 47, communication device #A labeled as 4501 can use, as the spectrum to be used by transmission signal 105-1 to be transmitted to communication device #1 labeled as 4502_1, spectrum 4601 having the first frequency band that is illustrated in FIG. 46, can use, as the spectrum to be used by transmission signal 105-2 to be transmitted to communication device #2 labeled as 4502_2, spectrum 4602 having the second frequency band that is illustrated in FIG. 46, can use, as the spectrum to be used by transmission signal 105-3 to be transmitted to communication device #3 labeled as 4502_3, spectrum 4602 having the second frequency band that is illustrated in FIG. 46, and can use, as the spectrum to be used by transmission signal 105-4 to be transmitted to communication device #4 labeled as 4502_4, spectrum 4601 having the first frequency band that is illustrated in FIG. 46.

Moreover, with the example illustrated in FIG. 50, even when communication device #A labeled as 4501 uses, as the spectrum to be used by transmission signal 105-1 to be transmitted to communication device #1 labeled as 45021, spectrum 4601 having the first frequency band that is illustrated in FIG. 46, uses, as the spectrum to be used by transmission signal 105-2 to be transmitted to communication device #2 labeled as 4502_2, spectrum 4602 having the second frequency band that is illustrated in FIG. 46, uses, as the spectrum to be used by transmission signal 105-3 to be transmitted to communication device #3 labeled as 4502_3, spectrum 4602 having the second frequency band that is illustrated in FIG. 46, and uses, as the spectrum to be used by transmission signal 105-4 to be transmitted to communication device #4 labeled as 4502_4, spectrum 4603 having the third frequency band that is illustrated in FIG. 46, the advantageous effect that the frequency usage efficiency can be improved while ensuring high data reception quality can be achieved.

Furthermore, with the example illustrated in FIG. 50, even when communication device #A labeled as 4501 uses, as the spectrum to be used by transmission signal 105-1 to be transmitted to communication device #1 labeled as 4502_1, spectrum 4601 having the first frequency band that is illustrated in FIG. 46, uses, as the spectrum to be used by transmission signal 105-2 to be transmitted to communication device #2 labeled as 4502_2, spectrum 4602 having the second frequency band that is illustrated in FIG. 46, uses, as the spectrum to be used by transmission signal 105-3 to be transmitted to communication device #3 labeled as 4502_3, spectrum 4601 having the first frequency band that is illustrated in FIG. 46, and uses, as the spectrum to be used by transmission signal 105-4 to be transmitted to communication device #4 labeled as 4502_4, spectrum 4603 having the third frequency band that is illustrated in FIG. 46, the advantageous effect that the frequency usage efficiency can be improved while ensuring high data reception quality can be achieved.

Note that communication device #1 labeled as 4502_1, communication device #2 labeled as 4502_2, communication device #3 labeled as 4502_3, and communication device #4 labeled as 4502_4 have, for example, the configuration illustrated in FIG. 4, receive a desired signal, and obtain desired data by causing the reception part in FIG. 4 to operate.

As described above, when transmitting the same data to a plurality of communication devices, by employing any one of: (1) using a plurality of beams and a plurality of frequency bands; (2) using a plurality of beams and a specific frequency band; (3) using a specific beam and a plurality of frequency bands, it is possible to achieve high data reception quality and achieve the advantageous effect that a high frequency usage efficiency can be achieved.

Next, a case in which communication device #A labeled as 4501 has, for example, the configuration illustrated in FIG. 3, and communication device #1 labeled as 4502_1, communication device #2 labeled as 4502_2, communication device #3 labeled as 4502_3, and communication device #4 labeled as 4502_4 have, for example, the configuration illustrated in FIG. 4 will be described.

Signal processor 102 included in communication device #A labeled as 4501 receives inputs of information 101-1 including first data, and control signal 159, and signal processing is performed based on "information on a method of error correction coding (a coding rate, a code length (block length))", "information on a modulation method", and "a transmitting method (multiplexing method)", etc., that are included in control signal 159.

At this time, signal processor 102 generates, based on information 101-1 including first data, a signal obtained as a result of signal processing to be transmitted to communication device #1 labeled as 4502_1, a signal obtained as a result of signal processing to be transmitted to communication device #2 labeled as 4502_2, a signal obtained as a result of signal processing to be transmitted to communication device #3 labeled as 4502_3, and a signal obtained as a result of signal processing to be transmitted to communication device #4 labeled as 4502_4. In one example, the signal obtained as a result of signal processing to be transmitted to communication device #1 labeled as 4502_1 is labeled as 103-1, the signal obtained as a result of signal processing to be transmitted to communication device #2 labeled as 4502_2 is labeled as 103-2, the signal obtained as a result of signal processing to be transmitted to communication device #3 labeled as 4502_3 is labeled as 103-3, and the signal obtained as a result of signal processing to be transmitted to communication device #4 labeled as 4502_4 is labeled as 103-4.

Wireless communication unit 104-1 receives an input of signal 103-1 obtained as a result of signal processing to be transmitted to communication device #1 labeled as 45021, and outputs transmission signal 105-1. Similarly, wireless communication unit 104-2 receives an input of signal 103-2 obtained as a result of signal processing to be transmitted to communication device #2 labeled as 4502_2, and outputs transmission signal 105-2. Wireless communication unit 104-3 receives an input of signal 103-3 obtained as a result of signal processing to be transmitted to communication device #3 labeled as 4502_3, and outputs transmission signal 105-3. Wireless communication unit 104-4 receives an input of signal 103-4 obtained as a result of signal processing to be transmitted to communication device #4 labeled as 4502_4, and outputs transmission signal 105-4.

Weighting synthesizer 301 receives inputs of at least transmission signal 105-1, transmission signal 105-2, transmission signal 105-3, and transmission signal 105-4, performs weighting synthesis calculation, and outputs signals 302-1, 302-2, . . . , and 302-K obtained as a result of the weighting synthesis, and signals 302-1, 302-2, . . . , and 302-K obtained as a result of the weighting synthesis are then output as radio waves from antennas 303-1, 303-2, . . . , and 303-K. Accordingly, transmission signal 105-1 is transmitted using one or more antennas from among antennas 303-1, 303-2, . . . , and 303-K. Similarly, transmission signal 105-2 is transmitted using one or more antennas from among antennas 303-1, 303-2, . . . , and 303-K, transmission signal 105-3 is transmitted using one or more antennas from among antennas 303-1, 303-2, . . . , and 303-K, and transmission signal 105-4 is transmitted using one or more antennas from among antennas 303-1, 303-2, . . . , and 303-K.

Note that each of antennas 303-1, 303-2, . . . , and 303-K may have the configuration illustrated in FIG. 2.

Next, the method of setting the frequencies of transmission signals 105-1, 105-2, 105-3, and 105-4 at this time will be described with reference to FIG. 46.

In FIG. 46, frequency is represented on the horizontal axis, and power is represented on the vertical axis. Transmission signals 105-1, 105-2, 105-3, and 105-4 are signals having any one of a spectrum including spectrum 4601 in a first frequency band (first channel), a spectrum including spectrum 4602 in a second frequency band (second channel), and a spectrum including spectrum 4603 in a third frequency band (third channel).

Specific examples will be given with reference to FIG. 47, FIG. 48, FIG. 49, and FIG. 50.

FIG. 47 illustrates a positional relationship between communication device #A labeled as 4501, communication device #1 labeled as 4502_1, communication device #2 labeled as 4502_2, communication device #3 labeled as 4502_3, and communication device #4 labeled as 4502_4 illustrated in FIG. 45. Accordingly, the reference signs used in FIG. 45 are also used in FIG. 47.

With the example illustrated in FIG. 47, communication device #A labeled as 4501 can use, as the spectrum to be used by transmission signal 105-1 to be transmitted to communication device #1 labeled as 4502_1 spectrum 4601 having the first frequency band that is illustrated in FIG. 46, can use, as the spectrum to be used by transmission signal 105-2 to be transmitted to communication device #2 labeled as 4502_2, spectrum 4601 having the first frequency band that is illustrated in FIG. 46, can use, as the spectrum to be used by transmission signal 105-3 to be transmitted to communication device #3 labeled as 4502_3, spectrum 4601 having the first frequency band that is illustrated in FIG. 46, and can use, as the spectrum to be used by transmission signal 105-4 to be transmitted to communication device #4 labeled as 4502_4, spectrum 4601 having the first frequency band that is illustrated in FIG. 46. In this way, the frequency band used by the transmission signal to be transmitted to communication device #1 labeled as 4502_1, the frequency band used by the transmission signal to be transmitted to communication device #2 labeled as 4502_2, the frequency band used by the transmission signal to be transmitted to communication device #3 labeled as 4502_3, and the frequency band used by the transmission signal to be transmitted to communication device #4 labeled as 4502_4 can be set to the same frequency band. This achieves the advantageous effect that the frequency usage efficiency can be improved.

Next, the temporal presence of transmission signal 105-1 to be transmitted to communication device #1 labeled as 4502_1, transmission signal 105-2 to be transmitted to communication device #2 labeled as 45022, transmission signal 105-3 to be transmitted to communication device #3 labeled as 45023, and transmission signal 105-4 to be transmitted to communication device #4 labeled as 4502_4 will be described.

FIG. 51 illustrates one example of a frame configuration of a modulated signal transmitted by communication device A labeled as 4501, and is an example of symbol arrangement on the horizontal axis indicating time. In FIG. 51, 5101-1 indicates a data symbol group destined for communication device #1 labeled as 4502_1 or part of a data symbol group destined for communication device #1 labeled as 4502_1, 5101-2 indicates a data symbol group destined for communication device #2 labeled as 4502_2 or part of a data symbol group destined for communication device #2 labeled as 45022, 5101-3 indicates a data symbol group destined for communication device #3 labeled as 4502_3 or part of a data symbol group destined for communication device #3 labeled as 4502_3, and 5101-4 indicates a data symbol group destined for communication device #4 labeled as 4502_4 or part of a data symbol group destined for communication device #4 labeled as 4502_4.

Each of "data symbol group destined for communication device #1 labeled as 4502_1 or part of a data symbol group destined for communication device #1 labeled as 4502_1" 51011, "data symbol group destined for communication device #2 labeled as 4502_2 or part of a data symbol group destined for communication device #2 labeled as 4502_2" 5101-2, "data symbol group destined for communication device #3 labeled as 4502_3 or part of a data symbol group destined for communication device #3 labeled as 4502_3" 51013, and "data symbol group destined for communication device #4 labeled as 4502_4 or part of a data symbol group destined for communication device #4 labeled as 4502_4" 5101_4 is present in time interval 1.

FIG. 48 illustrates a positional relationship between communication device #A labeled as 4501, communication device #1 labeled as 4502_1, communication device #2 labeled as 4502_2, communication device #3 labeled as 4502_3, and communication device #4 labeled as 4502_4 illustrated in FIG. 45 that differs from the example illustrated in FIG. 47. Accordingly, the reference signs used in FIG. 45 are also used in FIG. 48.

With the example illustrated in FIG. 48, communication device #A labeled as 4501 uses, as the spectrum to be used by transmission signal 105-1 to be transmitted to communication device #1 labeled as 4502_1, spectrum 4601 having the first frequency band that is illustrated in FIG. 46, uses, as the spectrum to be used by transmission signal 105-2 to be transmitted to communication device #2 labeled as 4502_2, spectrum 4601 having the first frequency band that is illustrated in FIG. 46, uses, as the spectrum to be used by transmission signal 105-3 to be transmitted to communication device #3 labeled as 45023, spectrum 4601 having the first frequency band that is illustrated in FIG. 46, and uses, as the spectrum to be used by transmission signal 105-4 to be transmitted to communication device #4 labeled as 4502_4, spectrum 4602 having the second frequency band that is illustrated in FIG. 46. At this time, the reason why the frequency band used by transmission signal 105-3 to be transmitted to communication device #3 labeled as 4502_3 and the frequency band used by transmission signal 105-4 to be transmitted to communication device #4 labeled as 4502_4 are different is because when transmitting device #A labeled as 4501 tries to make the frequency band used by transmission signal 105-3 to be transmitted to communication device #3 labeled as 4502_3 and the frequency band used by transmission signal 105-4 to be transmitted to communication device #4 labeled as 4502_4 the same, communication device #3 labeled as 4502_3 and communication device #4 labeled as 4502_4 have difficulty in splitting the beam whereby interference increases, which results in a reduction in data reception quality.

This achieves the advantageous effect that the frequency usage efficiency can be improved while ensuring high data reception quality.

Next, the temporal presence of transmission signal 105-1 to be transmitted to communication device #1 labeled as 4502_1, transmission signal 105-2 to be transmitted to communication device #2 labeled as 45022, transmission signal 105-3 to be transmitted to communication device #3 labeled as 45023, and transmission signal 105-4 to be transmitted to communication device #4 labeled as 4502_4 will be described.

FIG. 51 illustrates one example of a frame configuration of a modulated signal transmitted by communication device A labeled as 4501, and is an example of symbol arrangement on the horizontal axis indicating time. In FIG. 51, 5101-1 indicates a data symbol group destined for communication device #1 labeled as 4502_1 or part of a data symbol group destined for communication device #1 labeled as 4502_1, 5101-2 indicates a data symbol group destined for communication device #2 labeled as 4502_2 or part of a data symbol group destined for communication device #2 labeled as 45022, 5101-3 indicates a data symbol group destined for communication device #3 labeled as 4502_3 or part of a data symbol group destined for communication device #3 labeled as 45023, and 5101-4 indicates a data symbol group destined for communication device #4 labeled as 4502_4 or part of a data symbol group destined for communication device #4 labeled as 4502_4.

Each of "data symbol group destined for communication device #1 labeled as 4502_1 or part of a data symbol group destined for communication device #1 labeled as 4502_1" 5101_1, "data symbol group destined for communication device #2 labeled as 4502_2 or part of a data symbol group destined for communication device #2 labeled as 4502_2" 5101-2, "data symbol group destined for communication device #3 labeled as 4502_3 or part of a data symbol group destined for communication device #3 labeled as 4502_3" 5101_3, and "data symbol group destined for communication device #4 labeled as 4502_4 or part of a data symbol group destined for communication device #4 labeled as 4502_4" 5101_4 is present in time interval 1.

Note that even in the example illustrated in FIG. 47, communication device #A labeled as 4501 can use, as the spectrum to be used by transmission signal 105-1 to be transmitted to communication device #1 labeled as 45021, spectrum 4601 having the first frequency band that is illustrated in FIG. 46, can use, as the spectrum to be used by transmission signal 105-2 to be transmitted to communication device #2 labeled as 4502_2, spectrum 4601 having the first frequency band that is illustrated in FIG. 46, can use, as the spectrum to be used by transmission signal 105-3 to be transmitted to communication device #3 labeled as 4502_3, spectrum 4601 having the first frequency band that is illustrated in FIG. 46, and can use, as the spectrum to be used by transmission signal 105-4 to be transmitted to communication device #4 labeled as 4502_4, spectrum 4602 having the second frequency band that is illustrated in FIG. 46.

FIG. 49 illustrates a positional relationship of communication device #A labeled as 4501, communication device #1 labeled as 4502_1, communication device #2 labeled as 45022, communication device #3 labeled as 4502_3, and communication device #4 labeled as 4502_4 that are illustrated in FIG. 45, that differs from the examples illustrated in FIG. 47 and FIG. 48. Accordingly, the reference signs used in FIG. 45 are also used in FIG. 49.

With the example illustrated in FIG. 49, communication device #A labeled as 4501 uses, as the spectrum to be used by transmission signal 105-1 to be transmitted to communication device #1 labeled as 4502_1, spectrum 4601 having the first frequency band that is illustrated in FIG. 46, uses, as the spectrum to be used by transmission signal 105-2 to be transmitted to communication device #2 labeled as 4502_2, spectrum 4602 having the second frequency band that is illustrated in FIG. 46, uses, as the spectrum to be used by transmission signal 105-3 to be transmitted to communication device #3 labeled as 4502_3, spectrum 4602 having the second frequency band that is illustrated in FIG. 46, and uses, as the spectrum to be used by transmission signal 105-4 to be transmitted to communication device #4 labeled as 4502_4, spectrum 4603 having the third frequency band that is illustrated in FIG. 46. At this time, the reason why the frequency band used by transmission signal 105-1 to be transmitted to communication device #1 labeled as 4502_1, the frequency band used by transmission signal 105-3 to be transmitted to communication device #3 labeled as 4502_3 and the frequency band used by transmission signal 105-4 to be transmitted to communication device #4 labeled as 4502_4 are different is because when transmitting device #A labeled as 4501 tries to make the frequency band used by transmission signal 105-1 to be transmitted to communication device #1 labeled as 4502_1, the frequency band used by transmission signal 105-3 to be transmitted to communication device #3 labeled as 4502_3 and the frequency band used by transmission signal 105-4 to be transmitted to communication device #4 labeled as 4502_4 the same, communication device #1 labeled as 4502_1, communication device #3 labeled as 4502_3, and communication device #4 labeled as 4502_4 have difficulty in splitting the beam whereby interference increases, which results in a reduction in data reception quality.

This achieves the advantageous effect that the frequency usage efficiency can be improved while ensuring high data reception quality.

Next, the temporal presence of transmission signal 105-1 to be transmitted to communication device #1 labeled as 4502_1, transmission signal 105-2 to be transmitted to communication device #2 labeled as 4502_2, transmission signal 105-3 to be transmitted to communication device #3 labeled as 45023, and transmission signal 105-4 to be transmitted to communication device #4 labeled as 4502_4 will be described.

FIG. 51 illustrates one example of a frame configuration of a modulated signal transmitted by communication device A labeled as 4501, and is an example of symbol arrangement on the horizontal axis indicating time. In FIG. 51, 5101-1 indicates a data symbol group destined for communication device #1 labeled as 4502_1 or part of a data symbol group destined for communication device #1 labeled as 4502_1, 5101-2 indicates a data symbol group destined for communication device #2 labeled as 4502_2 or part of a data symbol group destined for communication device #2 labeled as 45022, 5101-3 indicates a data symbol group destined for communication device #3 labeled as 4502_3 or part of a data symbol group destined for communication device #3 labeled as 4502_3, and 5101-4 indicates a data symbol group destined for communication device #4 labeled as 4502_4 or part of a data symbol group destined for communication device #4 labeled as 4502_4.

Each of "data symbol group destined for communication device #1 labeled as 4502_1 or part of a data symbol group destined for communication device #1 labeled as 4502_1" 51011, "data symbol group destined for communication device #2 labeled as 4502_2 or part of a data symbol group destined for communication device #2 labeled as 4502_2" 5101-2, "data symbol group destined for communication device #3 labeled as 4502_3 or part of a data symbol group destined for communication device #3 labeled as 4502_3" 51013, and "data symbol group destined for communication device #4 labeled as 4502_4 or part of a data symbol group destined for communication device #4 labeled as 4502_4" 5101_4 is present in time interval 1.

Note that even in the example illustrated in FIG. 47, communication device #A labeled as 4501 can use, as the spectrum to be used by transmission signal 105-1 to be transmitted to communication device #1 labeled as 4502_1, spectrum 4601 having the first frequency band that is illustrated in FIG. 46, can use, as the spectrum to be used by transmission signal 105-2 to be transmitted to communication device #2 labeled as 4502_2, spectrum 4602 having the second frequency band that is illustrated in FIG. 46, can use, as the spectrum to be used by transmission signal 105-3 to be transmitted to communication device #3 labeled as 4502_3, spectrum 4602 having the second frequency band that is illustrated in FIG. 46, and can use, as the spectrum to be used by transmission signal 105-4 to be transmitted to communication device #4 labeled as 4502_4, spectrum 4603 having the third frequency band that is illustrated in FIG. 46.

FIG. 50 illustrates a positional relationship of communication device #A labeled as 4501, communication device #1 labeled as 4502_1, communication device #2 labeled as 4502_2, communication device #3 labeled as 4502_3, and communication device #4 labeled as 4502_4 that are illustrated in FIG. 45, that differs from the examples illustrated in FIG. 47, FIG. 48, and FIG. 49. Accordingly, the reference signs used in FIG. are also used in FIG. 50.

With the example illustrated in FIG. 50, communication device #A labeled as 4501 uses, as the spectrum to be used by transmission signal 105-1 to be transmitted to communication device #1 labeled as 4502_1, spectrum 4601 having the first frequency band that is illustrated in FIG. 46, uses, as the spectrum to be used by transmission signal 105-2 to be transmitted to communication device #2 labeled as 45022, spectrum 4602 having the second frequency band that is illustrated in FIG. 46, uses, as the spectrum to be used by transmission signal 105-3 to be transmitted to communication device #3 labeled as 4502_3, spectrum 4602 having the second frequency band that is illustrated in FIG. 46, and uses, as the spectrum to be used by transmission signal 105-4 to be transmitted to communication device #4 labeled as 4502_4, spectrum 4601 having the first frequency band that is illustrated in FIG. 46.

At this time, the reason why the frequency band used by transmission signal 105-1 to be transmitted to communication device #1 labeled as 4502_1 and the frequency band used by transmission signal 105-2 to be transmitted to communication device #2 labeled as 4502_2 are different is because when transmitting device #A labeled as 4501 tries to make the frequency band used by transmission signal 105-1 to be transmitted to communication device #1 labeled as 4502_1 and the frequency band used by transmission signal 105-2 to be transmitted to communication device #2 labeled as 4502_2 the same, communication device #1 labeled as 4502_1 and communication device #2 labeled as 4502_2 have difficulty in splitting the beam whereby interference increases, which results in a reduction in data reception quality.

Similarly, the reason why the frequency band used by transmission signal 105-3 to be transmitted to communication device #3 labeled as 4502_3 and the frequency band used by transmission signal 105-4 to be transmitted to communication device #4 labeled as 4502_4 are different is because when transmitting device #A labeled as 4501 tries to make the frequency band used by transmission signal 105-3 to be transmitted to communication device #3 labeled as 4502_3 and the frequency band used by transmission signal 105-4 to be transmitted to communication device #4 labeled as 4502_4 the same, communication device #3 labeled as 4502_3 and communication device #4 labeled as 4502_4 have difficulty in splitting the beam whereby interference increases, which results in a reduction in data reception quality.

This achieves the advantageous effect that the frequency usage efficiency can be improved while ensuring high data reception quality.

Next, the temporal presence of transmission signal 105-1 to be transmitted to communication device #1 labeled as 4502_1, transmission signal 105-2 to be transmitted to communication device #2 labeled as 45022, transmission signal 105-3 to be transmitted to communication device #3 labeled as 4502_3, and transmission signal 105-4 to be transmitted to communication device #4 labeled as 4502_4 will be described.

FIG. 51 illustrates one example of a frame configuration of a modulated signal transmitted by communication device A labeled as 4501, and is an example of symbol arrangement on the horizontal axis indicating time. In FIG. 51, 5101-1 indicates a data symbol group destined for communication device #1 labeled as 4502_1 or part of a data symbol group destined for communication device #1 labeled as 4502_1, 5101-2 indicates a data symbol group destined for communication device #2 labeled as 4502_2 or part of a data symbol group destined for communication device #2 labeled as 4502_2, 5101-3 indicates a data symbol group destined for communication device #3 labeled as 4502_3 or part of a data symbol group destined for communication device #3 labeled as 4502_3, and 5101-4 indicates a data symbol group destined for communication device #4 labeled as 4502_4 or part of a data symbol group destined for communication device #4 labeled as 4502_4.

Each of "data symbol group destined for communication device #1 labeled as 4502_1 or part of a data symbol group destined for communication device #1 labeled as 4502_1" 51011, "data symbol group destined for communication device #2 labeled as 4502_2 or part of a data symbol group destined for communication device #2 labeled as 4502_2" 5101-2, "data symbol group destined for communication device #3 labeled as 4502_3 or part of a data symbol group destined for communication device #3 labeled as 4502_3" 5101_3, and "data symbol group destined for communication device #4 labeled as 4502_4 or part of a data symbol group destined for communication device #4 labeled as 4502_4" 5101_4 is present in time interval 1.

Note that even in the example illustrated in FIG. 47, communication device #A labeled as 4501 can use, as the spectrum to be used by transmission signal 105-1 to be transmitted to communication device #1 labeled as 4502_1, spectrum 4601 having the first frequency band that is illustrated in FIG. 46, can use, as the spectrum to be used by transmission signal 105-2 to be transmitted to communication device #2 labeled as 45022, spectrum 4602 having the second frequency band that is illustrated in FIG. 46, can use, as the spectrum to be used by transmission signal 105-3 to be transmitted to communication device #3 labeled as 4502_3, spectrum 4602 having the second frequency band that is illustrated in FIG. 46, and can use, as the spectrum to be used by transmission signal 105-4 to be transmitted to communication device #4 labeled as 4502_4, spectrum 4601 having the first frequency band that is illustrated in FIG. 46.

Moreover, with the example illustrated in FIG. 50, even when communication device #A labeled as 4501 uses, as the spectrum to be used by transmission signal 105-1 to be transmitted to communication device #1 labeled as 4502_1, spectrum 4601 having the first frequency band that is illustrated in FIG. 46, uses, as the spectrum to be used by transmission signal 105-2 to be transmitted to communication device #2 labeled as 4502_2, spectrum 4602 having the second frequency band that is illustrated in FIG. 46, uses, as the spectrum to be used by transmission signal 105-3 to be transmitted to communication device #3 labeled as 4502_3, spectrum 4602 having the second frequency band that is illustrated in FIG. 46, and uses, as the spectrum to be used by transmission signal 105-4 to be transmitted to communication device #4 labeled as 4502_4, spectrum 4603 having the third frequency band that is illustrated in FIG. 46, the advantageous effect that the frequency usage efficiency can be improved while ensuring high data reception quality can be achieved.

Furthermore, with the example illustrated in FIG. 50, even when communication device #A labeled as 4501 uses, as the spectrum to be used by transmission signal 105-1 to be transmitted to communication device #1 labeled as 4502_1, spectrum 4601 having the first frequency band that is illustrated in FIG. 46, uses, as the spectrum to be used by transmission signal 105-2 to be transmitted to communication device #2 labeled as 4502_2, spectrum 4602 having the second frequency band that is illustrated in FIG. 46, uses, as the spectrum to be used by transmission signal 105-3 to be transmitted to communication device #3 labeled as 4502_3, spectrum 4601 having the first frequency band that is illustrated in FIG. 46, and uses, as the spectrum to be used by transmission signal 105-4 to be transmitted to communication device #4 labeled as 4502_4, spectrum 4603 having the third frequency band that is illustrated in FIG. 46, the advantageous effect that the frequency usage efficiency can be improved while ensuring high data reception quality can be achieved.

Note that communication device #1 labeled as 4502_1, communication device #2 labeled as 4502_2, communication device #3 labeled as 4502_3, and communication device #4 labeled as 4502_4 have, for example, the configuration illustrated in FIG. 4, receive a desired signal, and obtain desired data by causing the reception part in FIG. 4 to operate.

Next, a case in which communication device #A labeled as 4501 has, for example, the configuration illustrated in FIG. 4, and communication device #1 labeled as 4502_1, communication device #2 labeled as 4502_2, communication device #3 labeled as 4502_3, and communication device #4 labeled as 4502_4 have, for example, the configuration illustrated in FIG. 44 will be described.

Signal processor 102 included in communication device #A labeled as 4501 receives inputs of information 101-1 including first data, and control signal 159, and signal processing is performed based on "information on a method of error correction coding (a coding rate, a code length (block length))", "information on a modulation method", and "a transmitting method (multiplexing method)", etc., that are included in control signal 159.

At this time, signal processor 102 generates, based on information 101-1 including first data, a signal obtained as a result of signal processing to be transmitted to communication device #1 labeled as 4502_1, a signal obtained as a result of signal processing to be transmitted to communication device #2 labeled as 4502_2, a signal obtained as a result of signal processing to be transmitted to communication device #3 labeled as 4502_3, and a signal obtained as a result of signal processing to be transmitted to communication device #4 labeled as 4502_4. In one example, the signal obtained as a result of signal processing to be transmitted to communication device #1 labeled as 4502_1 is labeled as 103-1, the signal obtained as a result of signal processing to be transmitted to communication device #2 labeled as 4502_2 is labeled as 103-2, the signal obtained as a result of signal processing to be transmitted to communication device #3 labeled as 4502_3 is labeled as 103-3, and the signal obtained as a result of signal processing to be transmitted to communication device #4 labeled as 4502_4 is labeled as 103-4.

Weighting synthesizer 301 receives inputs of at least signal 103-1 obtained as a result of signal processing, signal 103-2 obtained as a result of signal processing, signal 103-3 obtained as a result of signal processing, and signal 103-4 obtained as a result of signal processing, performs weighting synthesis calculation, and outputs signals 4402-1, 4402-2, . . . , and 4402-K obtained as a result of the weighting synthesis. Accordingly, signal 103-1 obtained as a result of signal processing is transmitted using one or more antennas from among antennas 303-1, 303-2, . . . , and 303-K. Similarly, signal 103-2 obtained as a result of signal processing is transmitted using one or more antennas from among antennas 303-1, 303-2, . . . , and 303-K, signal 103-3 obtained as a result of signal processing is transmitted using one or more antennas from among antennas 303-1, 303-2, . . . , and 303-K, and signal 103-4 obtained as a result of signal processing is transmitted using one or more antennas from among antennas 303-1, 303-2, . . . , and 303-K.

Note that each of antennas 303-1, 303-2, . . . , and 303-K may have the configuration illustrated in FIG. 2.

Next, the method of setting the frequencies of signals 103-1, 103-2, 103-3, and 103-4 obtained as a result of signal processing at this time will be described with reference to FIG. 46.

In FIG. 46, frequency is represented on the horizontal axis, and power is represented on the vertical axis. Signals 103-1, 103-2, 103-3, and 103-4 obtained as a result of signal processing are, after frequency conversion, signals having any one of a spectrum including spectrum 4601 in a first frequency band (first channel), a spectrum including spectrum 4602 in a second frequency band (second channel), and a spectrum including spectrum 4603 in a third frequency band (third channel).

Note that, for example, when a transmitting device having the configuration in FIG. 1 or FIG. 3 generates a modulated signal of first frequency band 4601, a modulated signal of second frequency band 4602, and a modulated signal of third frequency band 4603, in the antenna units in FIG. 1 and the weighting synthesizer in FIG. 3 and FIG. 44, settings may be configured so that the directivity of the modulated signal of first frequency band 4601 and the directivity of the modulated signal of second frequency band 4602 are different. Similarly, in the antenna units in FIG. 1 and the weighting synthesizer in FIG. 3 and FIG. 44, settings may be configured so that the directivity of the modulated signal of first frequency band 4601 and the directivity of the modulated signal of third frequency band 4603 are different. Moreover, in the antenna units in FIG. 1 and the weighting synthesizer in FIG. 3 and FIG. 44, settings may be configured so that the directivity of the modulated signal of second frequency band 4602 and the directivity of the modulated signal of third frequency band 4603 are different.

Specific examples will be given with reference to FIG. 47, FIG. 48, FIG. 49, and FIG. 50.

FIG. 47 illustrates a positional relationship between communication device #A labeled as 4501, communication device #1 labeled as 4502_1, communication device #2 labeled as 4502_2, communication device #3 labeled as 4502_3, and communication device #4 labeled as 4502_4 illustrated in FIG. 45. Accordingly, the reference signs used in FIG. 45 are also used in FIG. 47.

With the example illustrated in FIG. 47, communication device #A labeled as 4501 can use spectrum 4601 of the first frequency band illustrated in FIG. 46 as the spectrum to be used, after frequency conversion, by signal 103-1 obtained as a result of signal processing that is to be transmitted to communication device #1 labeled as 4502_1, can use spectrum 4601 of the first frequency band illustrated in FIG. 46 as the spectrum to be used, after frequency conversion, by signal 103-2 obtained as a result of signal processing that is to be transmitted to communication device #2 labeled as 4502_2, can use spectrum 4601 of the first frequency band illustrated in FIG. 46 as the spectrum to be used, after frequency conversion, by signal 103-3 obtained as a result of signal processing that is to be transmitted to communication device #3 labeled as 4502_3, and can use spectrum 4601 of the first frequency band illustrated in FIG. 46 as the spectrum to be used, after frequency conversion, by signal 103-4 obtained as a result of signal processing that is to be transmitted to communication device #4 labeled as 4502_4. In this way, the frequency band used by the transmission signal to be transmitted to communication device #1 labeled as 4502_1, the frequency band used by the transmission signal to be transmitted to communication device #2 labeled as 45022, the frequency band used by the transmission signal to be transmitted to communication device #3 labeled as 4502_3, and the frequency band used by the transmission signal to be transmitted to communication device #4 labeled as 4502_4 can be set to the same frequency band. This achieves the advantageous effect that the frequency usage efficiency can be improved.

Next, the temporal presence of signal 103-1 obtained as a result of signal processing that is to be transmitted to communication device #1 labeled as 4502_1, signal 103-2 obtained as a result of signal processing that is to be transmitted to communication device #2 labeled as 4502_2, signal 103-3 obtained as a result of signal processing that is to be transmitted to communication device #3 labeled as 4502_3, and signal 103-4 obtained as a result of signal processing that is to be transmitted to communication device #4 labeled as 4502_4 will be described.

FIG. 51 illustrates one example of a frame configuration of a modulated signal transmitted by communication device A labeled as 4501, and is an example of symbol arrangement on the horizontal axis indicating time. In FIG. 51, 5101-1 indicates a data symbol group destined for communication device #1 labeled as 4502_1 or part of a data symbol group destined for communication device #1 labeled as 4502_1, 5101-2 indicates a data symbol group destined for communication device #2 labeled as 4502_2 or part of a data symbol group destined for communication device #2 labeled as 4502)2, 5101-3 indicates a data symbol group destined for communication device #3 labeled as 4502_3 or part of a data symbol group destined for communication device #3 labeled as 4502_3, and 5101-4 indicates a data symbol group destined for communication device #4 labeled as 4502_4 or part of a data symbol group destined for communication device #4 labeled as 4502_4.

Each of "data symbol group destined for communication device #1 labeled as 4502_1 or part of a data symbol group destined for communication device #1 labeled as 4502_1" 5101_1, "data symbol group destined for communication device #2 labeled as 4502_2 or part of a data symbol group destined for communication device #2 labeled as 4502_2" 5101-2, "data symbol group destined for communication device #3 labeled as 4502_3 or part of a data symbol group destined for communication device #3 labeled as 4502_3" 5101_3, and "data symbol group destined for communication device #4 labeled as 4502_4 or part of a data symbol group destined for communication device #4 labeled as 4502_4" 5101_4 is present in time interval 1.

FIG. 48 illustrates a positional relationship between communication device #A labeled as 4501, communication device #1 labeled as 4502_1 communication device #2 labeled as 4502_2 communication device #3 labeled as 45023, and communication device #4 labeled as 4502_4 illustrated in FIG. 45 that differs from the example illustrated in FIG. 47. Accordingly, the reference signs used in FIG. 45 are also used in FIG. 48.

With the example illustrated in FIG. 48, communication device #A labeled as 4501 uses spectrum 4601 of the first frequency band illustrated in FIG. 46 as the spectrum to be used, after frequency conversion, by signal 103-1 obtained as a result of signal processing that is to be transmitted to communication device #1 labeled as 4502_1, uses spectrum 4601 of the first frequency band illustrated in FIG. 46 as the spectrum to be used, after frequency conversion, by signal 103-2 obtained as a result of signal processing that is to be transmitted to communication device #2 labeled as 4502_2, uses spectrum 4601 of the first frequency band illustrated in FIG. 46 as the spectrum to be used, after frequency conversion, by signal 103-3 obtained as a result of signal processing that is to be transmitted to communication device #3 labeled as 4502_3, and uses spectrum 4602 of the second frequency band illustrated in FIG. 46 as the spectrum to be used, after frequency conversion, by signal 103-4 obtained as a result of signal processing that is to be transmitted to communication device #4 labeled as 4502_4. At this time, the reason why the frequency band used, after frequency conversion, by signal 103-3 obtained as a result of signal processing that is to be transmitted to communication device #3 labeled as 4502_3 and the frequency band used, after frequency conversion, by signal 103-4 obtained as a result of signal processing that is to be transmitted to communication device #4 labeled as 4502_4 are different is because when transmitting device #A labeled as 4501 tries to make the frequency band used, after frequency conversion, by signal 103-3 obtained as a result of signal processing that is to be transmitted to communication device #3 labeled as 4502_3 and the frequency band used, after frequency conversion, by signal 103-4 obtained as a result of signal processing that is to be transmitted to communication device #4 labeled as 4502_4 the same, communication device #3 labeled as 4502_3 and communication device #4 labeled as 4502_4 have difficulty in splitting the beam whereby interference increases, which results in a reduction in data reception quality.

This achieves the advantageous effect that the frequency usage efficiency can be improved while ensuring high data reception quality.

Next, the temporal presence of signal 103-1 obtained as a result of signal processing that is to be transmitted to communication device #1 labeled as 4502_1, signal 103-2 obtained as a result of signal processing that is to be transmitted to communication device #2 labeled as 4502_2, signal 103-3 obtained as a result of signal processing that is to be transmitted to communication device #3 labeled as 45023, and signal 103-4 obtained as a result of signal processing that is to be transmitted to communication device #4 labeled as 4502_4 will be described.

FIG. 51 illustrates one example of a frame configuration of a modulated signal transmitted by communication device A labeled as 4501, and is an example of symbol arrangement on the horizontal axis indicating time. In FIG. 51, 5101-1 indicates a data symbol group destined for communication device #1 labeled as 4502_1 or part of a data symbol group destined for communication device #1 labeled as 4502_1, 5101-2 indicates a data symbol group destined for communication device #2 labeled as 4502_2 or part of a data symbol group destined for communication device #2 labeled as 4502_2, 5101-3 indicates a data symbol group destined for communication device #3 labeled as 4502_3 or part of a data symbol group destined for communication device #3 labeled as 4502_3, and 5101-4 indicates a data symbol group destined for communication device #4 labeled as 4502_4 or part of a data symbol group destined for communication device #4 labeled as 4502_4.

Each of "data symbol group destined for communication device #1 labeled as 4502_1 or part of a data symbol group destined for communication device #1 labeled as 4502_1" 5101_1, "data symbol group destined for communication device #2 labeled as 4502_2 or part of a data symbol group destined for communication device #2 labeled as 4502_2" 5101-2, "data symbol group destined for communication device #3 labeled as 4502_3 or part of a data symbol group destined for communication device #3 labeled as 4502_3" 5101_3, and "data symbol group destined for communication device #4 labeled as 4502_4 or part of a data symbol group destined for communication device #4 labeled as 4502_4" 5101_4 is present in time interval 1.

Note that even with the example illustrated in FIG. 47, communication device #A labeled as 4501 can use spectrum 4601 of the first frequency band illustrated in FIG. 46 as the spectrum to be used, after frequency conversion, by signal 103-1 obtained as a result of signal processing that is to be transmitted to communication device #1 labeled as 4502_1, can use spectrum 4601 of the first frequency band illustrated in FIG. 46 as the spectrum to be used, after frequency conversion, by signal 103-2 obtained as a result of signal processing that is to be transmitted to communication device #2 labeled as 4502_2, can use spectrum 4601 of the first frequency band illustrated in FIG. 46 as the spectrum to be used, after frequency conversion, by signal 103-3 obtained as a result of signal processing that is to be transmitted to communication device #3 labeled as 4502_3, and can use spectrum 4602 of the second frequency band illustrated in FIG. 46 as the spectrum to be used, after frequency conversion, by signal 103-4 obtained as a result of signal processing that is to be transmitted to communication device #4 labeled as 4502_4.

FIG. 49 illustrates a positional relationship of communication device #A labeled as 4501, communication device #1 labeled as 4502_1, communication device #2 labeled as 4502_2, communication device #3 labeled as 4502_3, and communication device #4 labeled as 4502_4 that are illustrated in FIG. 45, that differs from the examples illustrated in FIG. 47 and FIG. 48. Accordingly, the reference signs used in FIG. 45 are also used in FIG. 49.

With the example illustrated in FIG. 49, communication device #A labeled as 4501 uses spectrum 4601 of the first frequency band illustrated in FIG. 46 as the spectrum to be used, after frequency conversion, by signal 103-1 obtained as a result of signal processing that is to be transmitted to communication device #1 labeled as 4502_1, uses spectrum 4602 of the second frequency band illustrated in FIG. 46 as the spectrum to be used, after frequency conversion, by signal 103-2 obtained as a result of signal processing that is to be transmitted to communication device #2 labeled as 45022, uses spectrum 4602 of the second frequency band illustrated in FIG. 46 as the spectrum to be used, after frequency conversion, by signal 103-3 obtained as a result of signal processing that is to be transmitted to communication device #3 labeled as 4502_3, and uses spectrum 4603 of the third frequency band illustrated in FIG. 46 as the spectrum to be used, after frequency conversion, by signal 103-4 obtained as a result of signal processing that is to be transmitted to communication device #4 labeled as 4502_4. At this time, the reason why the frequency band used by signal 103-1 obtained as a result of signal processing that is to be transmitted to communication device #1 labeled as 4502_1, the frequency band used, after frequency conversion, by transmission signal 105-3 that is to be transmitted to communication device #3 labeled as 4502_3, and the frequency band used, after frequency conversion, by signal 103-4 obtained as a result of signal processing that is to be transmitted to communication device #4 labeled as 4502_4 are different is because when transmitting device #A labeled as 4501 tries to make the frequency band used, after frequency conversion, by signal 103-1 obtained as a result of signal processing that is to be transmitted to communication device #1 labeled as 4502_1, the frequency band used, after frequency conversion, by signal 103-3 obtained as a result of signal processing that is to be transmitted to communication device #3 labeled as 4502_3, and the frequency band used, after frequency conversion, by signal 103-4 obtained as a result of signal processing that is to be transmitted to communication device #4 labeled as 4502_4 the same, communication device #1 labeled as 4502_1, communication device #3 labeled as 4502_3, and communication device #4 labeled as 4502_4 have difficulty in splitting the beam whereby interference increases, which results in a reduction in data reception quality.

This achieves the advantageous effect that the frequency usage efficiency can be improved while ensuring high data reception quality.

Next, the temporal presence of signal 103-1 obtained as a result of signal processing that is to be transmitted to communication device #1 labeled as 4502_1, signal 103-2 obtained as a result of signal processing that is to be transmitted to communication device #2 labeled as 4502_2, signal 103-3 obtained as a result of signal processing that is to be transmitted to communication device #3 labeled as 4502_3, and signal 103-4 obtained as a result of signal processing that is to be transmitted to communication device #4 labeled as 4502_4 will be described.

FIG. 51 illustrates one example of a frame configuration of a modulated signal transmitted by communication device A labeled as 4501, and is an example of symbol arrangement on the horizontal axis indicating time. In FIG. 51, 5101-1 indicates a data symbol group destined for communication device #1 labeled as 45021 or part of a data symbol group destined for communication device #1 labeled as 4502_1, 5101-2 indicates a data symbol group destined for communication device #2 labeled as 4502_2 or part of a data symbol group destined for communication device #2 labeled as 4502_2, 5101-3 indicates a data symbol group destined for communication device #3 labeled as 4502_3 or part of a data symbol group destined for communication device #3 labeled as 4502_3, and 5101-4 indicates a data symbol group destined for communication device #4 labeled as 4502_4 or part of a data symbol group destined for communication device #4 labeled as 4502_4.

Each of "data symbol group destined for communication device #1 labeled as 4502_1 or part of a data symbol group destined for communication device #1 labeled as 4502_1" 5101_1, "data symbol group destined for communication device #2 labeled as 4502_2 or part of a data symbol group destined for communication device #2 labeled as 4502_2" 5101-2, "data symbol group destined for communication device #3 labeled as 4502_3 or part of a data symbol group destined for communication device #3 labeled as 4502_3" 5101_3, and "data symbol group destined for communication device #4 labeled as 4502_4 or part of a data symbol group destined for communication device #4 labeled as 4502_4" 5101_4 is present in time interval 1.

Note that even with the example illustrated in FIG. 47, communication device #A labeled as 4501 can use spectrum 4601 of the first frequency band illustrated in FIG. 46 as the spectrum to be used, after frequency conversion, by signal 103-1 obtained as a result of signal processing that is to be transmitted to communication device #1 labeled as 4502_1, can use spectrum 4602 of the second frequency band illustrated in FIG. 46 as the spectrum to be used, after frequency conversion, by signal 103-2 obtained as a result of signal processing that is to be transmitted to communication device #2 labeled as 4502_2 can use spectrum 4602 of the second frequency band illustrated in FIG. 46 as the spectrum to be used, after frequency conversion, by signal 103-3 obtained as a result of signal processing that is to be transmitted to communication device #3 labeled as 4502_3, and can use spectrum 4603 of the third frequency band illustrated in FIG. 46 as the spectrum to be used, after frequency conversion, by signal 103-4 obtained as a result of signal processing that is to be transmitted to communication device #4 labeled as 4502_4.

FIG. 50 illustrates a positional relationship of communication device #A labeled as 4501, communication device #1 labeled as 4502_1, communication device #2 labeled as 45022, communication device #3 labeled as 4502_3, and communication device #4 labeled as 4502_4 that are illustrated in FIG. 45, that differs from the examples illustrated in FIG. 47, FIG. 48, and FIG. 49. Accordingly, the reference signs used in FIG. are also used in FIG. 50.

With the example illustrated in FIG. 50, communication device #A labeled as 4501 uses spectrum 4601 of the first frequency band illustrated in FIG. 46 as the spectrum to be used, after frequency conversion, by signal 103-1 obtained as a result of signal processing that is to be transmitted to communication device #1 labeled as 4502_1, uses spectrum 4602 of the second frequency band illustrated in FIG. 46 as the spectrum to be used, after frequency conversion, by signal 103-2 obtained as a result of signal processing that is to be transmitted to communication device #2 labeled as 4502_2, uses spectrum 4602 of the second frequency band illustrated in FIG. 46 as the spectrum to be used, after frequency conversion, by signal 103-3 obtained as a result of signal processing that is to be transmitted to communication device #3 labeled as 4502_3, and uses spectrum 4601 of the first frequency band illustrated in FIG. 46 as the spectrum to be used, after frequency conversion, by signal 103-4 obtained as a result of signal processing that is to be transmitted to communication device #4 labeled as 4502_4.

At this time, the reason why the frequency band used, after frequency conversion, by signal 103-1 obtained as a result of signal processing that is to be transmitted to communication device #1 labeled as 4502_1 and the frequency band used, after frequency conversion, by signal 103-2 obtained as a result of signal processing that is to be transmitted to communication device #2 labeled as 4502_2 are different is because when transmitting device #A labeled as 4501 tries to make the frequency band used, after frequency conversion, by signal 103-1 obtained as a result of signal processing that is to be transmitted to communication device #1 labeled as 4502_1 and the frequency band used, after frequency conversion, by signal 103-2 obtained as a result of signal processing that is to be transmitted to communication device #2 labeled as 4502_2 the same, communication device #1 labeled as 4502_1 and communication device #2 labeled as 4502_2 have difficulty in splitting the beam whereby interference increases, which results in a reduction in data reception quality.

Similarly, the reason why the frequency band used, after frequency conversion, by signal 103-3 obtained as a result of signal processing that is to be transmitted to communication device #3 labeled as 4502_3 and the frequency band used, after frequency conversion, by signal 103-4 obtained as a result of signal processing that is to be transmitted to communication device #4 labeled as 4502_4 are different is because when transmitting device #A labeled as 4501 tries to make the frequency band used, after frequency conversion, by signal 103-3 obtained as a result of signal processing that is to be transmitted to communication device #3 labeled as 4502_3 and the frequency band used, after frequency conversion, by signal 103-4 obtained as a result of signal processing that is to be transmitted to communication device #4 labeled as 4502_4 the same, communication device #3 labeled as 4502_3 and communication device #4 labeled as 4502_4 have difficulty in splitting the beam whereby interference increases, which results in a reduction in data reception quality.

This achieves the advantageous effect that the frequency usage efficiency can be improved while ensuring high data reception quality.

Next, the temporal presence of signal 103-1 obtained as a result of signal processing that is to be transmitted to communication device #1 labeled as 4502_1, signal 103-2 obtained as a result of signal processing that is to be transmitted to communication device #2 labeled as 4502_2, signal 103-3 obtained as a result of signal processing that is to be transmitted to communication device #3 labeled as 4502_3, and signal 103-4 obtained as a result of signal processing that is to be transmitted to communication device #4 labeled as 4502_4 will be described.

FIG. 51 illustrates one example of a frame configuration of a modulated signal transmitted by communication device A labeled as 4501, and is an example of symbol arrangement on the horizontal axis indicating time. In FIG. 51, 5101-1 indicates a data symbol group destined for communication device #1 labeled as 4502_1 or part of a data symbol group destined for communication device #1 labeled as 4502_1, 5101-2 indicates a data symbol group destined for communication device #2 labeled as 4502_2 or part of a data symbol group destined for communication device #2 labeled as 4502_2, 5101-3 indicates a data symbol group destined for communication device #3 labeled as 4502_3 or part of a data symbol group destined for communication device #3 labeled as 4502_3, and 5101-4 indicates a data symbol group destined for communication device #4 labeled as 4502_4 or part of a data symbol group destined for communication device #4 labeled as 4502_4.

Each of "data symbol group destined for communication device #1 labeled as 4502_1 or part of a data symbol group destined for communication device #1 labeled as 4502_1" 5101_1, "data symbol group destined for communication device #2 labeled as 4502_2 or part of a data symbol group destined for communication device #2 labeled as 4502_2" 5101-2, "data symbol group destined for communication device #3 labeled as 4502_3 or part of a data symbol group destined for communication device #3 labeled as 4502_3" 5101_3, and "data symbol group destined for communication device #4 labeled as 4502_4 or part of a data symbol group destined for communication device #4 labeled as 4502_4" 5101_4 is present in time interval 1.

Note that even with the example illustrated in FIG. 47, communication device #A labeled as 4501 can use spectrum 4601 of the first frequency band illustrated in FIG. 46 as the spectrum to be used, after frequency conversion, by signal 103-1 obtained as a result of signal processing that is to be transmitted to communication device #1 labeled as 4502_1, can use spectrum 4602 of the second frequency band illustrated in FIG. 46 as the spectrum to be used, after frequency conversion, by signal 103-2 obtained as a result of signal processing that is to be transmitted to communication device #2 labeled as 4502_2, can use spectrum 4602 of the second frequency band illustrated in FIG. 46 as the spectrum to be used, after frequency conversion, by signal 103-3 obtained as a result of signal processing that is to be transmitted to communication device #3 labeled as 4502_3, and can use spectrum 4601 of the first frequency band illustrated in FIG. 46 as the spectrum to be used, after frequency conversion, by signal 103-4 obtained as a result of signal processing that is to be transmitted to communication device #4 labeled as 4502_4.

Moreover, with the example illustrated in FIG. 50, even when communication device #A labeled as 4501 uses spectrum 4601 of the first frequency band illustrated in FIG. 46 as the spectrum to be used, after frequency conversion, by signal 103-1 obtained as a result of signal processing that is to be transmitted to communication device #1 labeled as 4502_1, uses spectrum 4602 of the second frequency band illustrated in FIG. 46 as the spectrum to be used, after frequency conversion, by signal 103-2 obtained as a result of signal processing that is to be transmitted to communication device #2 labeled as 4502_2, uses spectrum 4602 of the second frequency band illustrated in FIG. 46 as the spectrum to be used, after frequency conversion, by signal 103-3 obtained as a result of signal processing that is to be transmitted to communication device #3 labeled as 4502_3, and uses spectrum 4603 of the third frequency band illustrated in FIG. 46 as the spectrum to be used, after frequency conversion, by signal 103-4 obtained as a result of signal processing that is to be transmitted to communication device #4 labeled as 4502_4.

Furthermore, with the example illustrated in FIG. 50, even when communication device #A labeled as 4501 uses spectrum 4601 of the first frequency band illustrated in FIG. 46 as the spectrum to be used, after frequency conversion, by signal 103-1 obtained as a result of signal processing that is to be transmitted to communication device #1 labeled as 4502_1, uses spectrum 4602 of the second frequency band illustrated in FIG. 46 as the spectrum to be used, after frequency conversion, by signal 103-2 obtained as a result of signal processing that is to be transmitted to communication device #2 labeled as 4502_2, uses spectrum 4601 of the first frequency band illustrated in FIG. 46 as the spectrum to be used, after frequency conversion, by signal 103-3 obtained as a result of signal processing that is to be transmitted to communication device #3 labeled as 45023, and uses spectrum 4603 of the third frequency band illustrated in FIG. 46 as the spectrum to be used, after frequency conversion, by signal 103-4 obtained as a result of signal processing that is to be transmitted to communication device #4 labeled as 4502_4.

Note that communication device #1 labeled as 4502_1, communication device #2 labeled as 45022, communication device #3 labeled as 4502_3, and communication device #4 labeled as 4502_4 have, for example, the configuration illustrated in FIG. 4, receive a desired signal, and obtain desired data by causing the reception part in FIG. 4 to operate.

In the present embodiment, when the modulation method and the error correction coding method for generating "data symbol group destined for communication device #1 labeled as 4502_1 or part of a data symbol group destined for communication device #1 labeled as 4502_1" 5101_1, the modulation method and the error correction coding method for generating "data symbol group destined for communication device #2 labeled as 4502_2 or part of a data symbol group destined for communication device #2 labeled as 4502_2" 5101-2, the modulation method and the error correction coding method for generating "data symbol group destined for communication device #3 labeled as 4502_3 or part of a data symbol group destined for communication device #3 labeled as 4502_3" 5101_3, and the modulation method and the error correction coding method for generating "data symbol group destined for communication device #4 labeled as 4502_4 or part of a data symbol group destined for communication device #4 labeled as 4502_4" 5101_4 in FIG. 51 are the same modulation method and error correction coding method, and the frequency band used for each channel is the same, it is possible to achieve the advantageous effect that the time it takes to transmit these data symbol groups can be shortened. Moreover, it is possible to achieve the advantageous effect that these data symbol groups can be transmitted in synchronization (the transmission start time and transmission end time of these data symbol groups can be made to be the same). Note that it is possible to use different modulation methods or error correction coding methods for the data symbol groups. Moreover, the present embodiment describes a case in which communication device #A labeled as 4501 transmits modulated signals including first data to communication device #1 labeled as 4502_1, communication device #2 labeled as 4502_2, communication device #3 labeled as 4502_3, and communication device #4 labeled as 4502_4, but communication device #A labeled as 4501 may transmit a modulated signal including first data to a single communication device.

Figure 52:
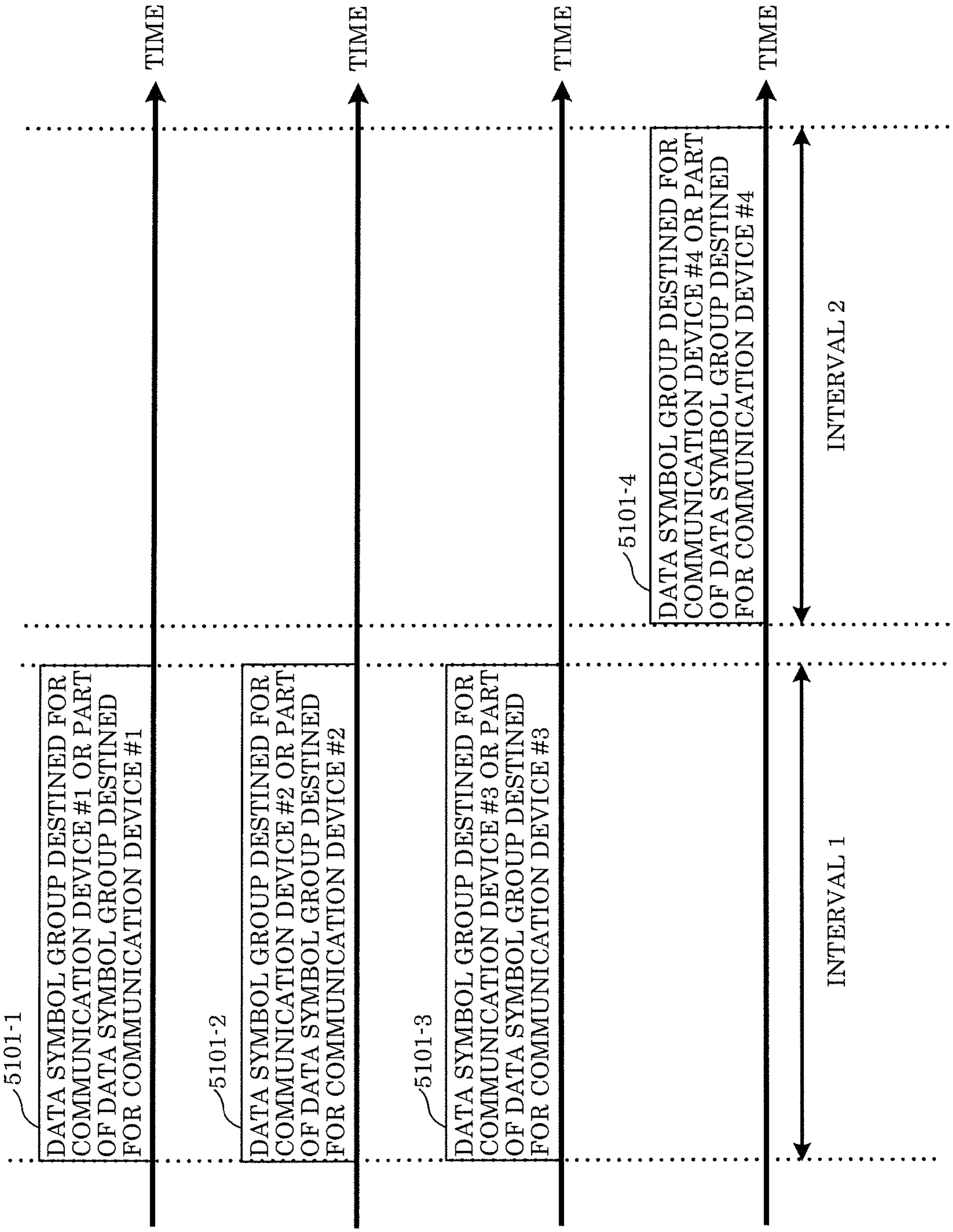
FIG. 52 illustrates another example of a frame configuration of a modulated signal transmitted by a communication device.

For example, time sharing may be used, like in FIG. 52. Note that in FIG. 52, elements that are the same as those in FIG. 51 share like reference signs, and time is represented on the horizontal axis. As illustrated in FIG. 52, 5101-1 indicating a data symbol group destined for communication device #1 or part of a data symbol group destined for communication device #1, 5101-2 indicating a data symbol group destined for communication device #2 or part of a data symbol group destined for communication device #2, and 5101-3 indicating a data symbol group destined for communication device #3 or part of a data symbol group destined for communication device #3 are transmitted by communication device #A labeled as 4501 using interval 1, and 5101-4 indicating a data symbol group destined for communication device #4 or part of a data symbol group destined for communication device #4 is transmitted by communication device #A labeled as 4501 using interval 2.

When, for example, communication device #A labeled as 4501, communication device #1 labeled as 4502_1, communication device #2 labeled as 4502_2, communication device #3 labeled as 4502_3, and communication device #4 labeled as 4502_4 have a positional relationship like that illustrated in FIG. 49, upon communication device #A labeled as 4501 transmitting a data symbol to communication device #4 labeled as 4502_4, the data symbol is transmitted using interval 2 like illustrated in FIG. 52, and upon communication device #A labeled as 4501 transmitting a data symbol to communication device #1 labeled as 4502_1, communication device #2 labeled as 4502_2, and communication device #3 labeled as 4502_3, the data symbol is transmitted using interval 1 like illustrated in FIG. 52. Note that the method of using a frequency band upon transmitting the data symbol group or part of the data symbol group for communication device #1 labeled as 4502_1, the data symbol group or part of the data symbol group for communication device #2 labeled as 4502_2, and the data symbol group or part of the data symbol group for communication device #3 labeled as 4502_3 may be the same as performed in the description made with reference to FIG. 49.

In this way, it is possible to achieve the above-described advantageous effect even when data symbols are transmitted using time sharing.

Note that in the present embodiment, a device is referred to as "server" (4506_4), but even if this device is a communication device rather than a server, the present embodiment can still be carried out in the same manner.

Moreover, the wireless communication between communication device #A labeled as 4501 and communication device #1 labeled as 4502_1, the wireless communication between communication device #A labeled as 4501 and communication device #2 labeled as 4502_2, the wireless communication between communication device #A labeled as 4501 and communication device #3 labeled as 4502_3, and the wireless communication between communication device #A labeled as 4501 communication device #4 labeled as 4502_4 described in the present embodiment may be carried out via MIMO transmission like described in other embodiments, that is to say, a plurality of transmitting antennas and a plurality of receiving antennas (a single receiving antenna is acceptable) may be provided and the transmitting device may transmit a plurality of modulated signals from a plurality of antennas at the same frequency and at the same time. Moreover, the wireless communication may be carried out using a method by which a single modulated signal is transmitted. Note that an example of a configuration of the transmitting device and receiving device in such cases is as described in other embodiments.

Embodiment 9

In the present embodiment, a specific example of communication between communication device #A labeled as 4501 and communication device #4 labeled as 4502_4 illustrated in FIG. 45 described in Embodiment 8 will be given.

As illustrated in FIG. 45, communication device #4 labeled as 4502_4 can communicate over a wired connection to a network.

For example, assume the maximum data transfer speed when communication device #A labeled as 4501 transfers data to communication device #4 labeled as 4502_4 via wireless communication is faster than the maximum data transfer speed via communication over the wired connection of communication device #4 labeled as 4502_4 (however, the present embodiment can be partially carried out even when this condition is not satisfied).

Figure 53:
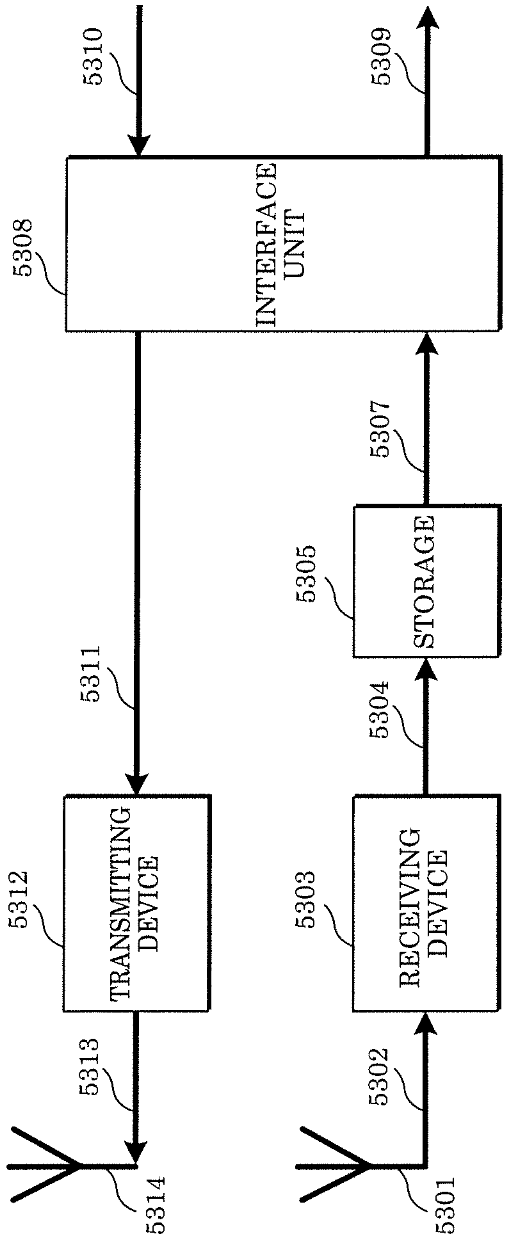
FIG. 53 illustrates an example of a configuration of a communication device.

An example of a configuration of communication device #4 labeled as 4502_4 in this case is illustrated in FIG. 53. In FIG. 53, receiving device 5303 receives an input of received signal 5302 received by antenna 5301, performs processing such as demodulation and error correction decoding, and outputs reception data 5304. For example, in the case of FIG. 45, receiving device 5303 receives modulated signal including data transmitted by communication device #A labeled as 4501, performs processing such as demodulation, and obtains reception data 5304.

Note that in FIG. 53, antenna 5301 is exemplified as including a single antenna, but the device may include a plurality of reception antennas and may receive and demodulate a plurality of modulated signals.

Storage 5305 receives an input of reception data 5304 and temporarily stores the reception data. This is because the maximum data transfer speed when communication device #A labeled as 4501 transfers data to communication device #4 labeled as 4502_4 via wireless communication is faster than the maximum data transfer speed via communication over the wired connection of communication device #4 labeled as 45024, so if storage 5305 is not included, there is a possibility that part of reception data 5304 will be lost.

Interface unit 5308 receives an input of data 5307 output from the storage, and this becomes data 5309 for wired communication after passing through interface unit 5308.

Data 5310 for wired communication generates data 5311 via interface unit 5308, and transmitting device 5312 receives an input of data 5311, performs processing such as error correction coding, mapping, and frequency conversion, and generates and outputs transmission signal 5313. Transmission signal 5313 is output from antenna 5314 as radio waves, whereby data is transmitted to a communication partner.

Figure 54:
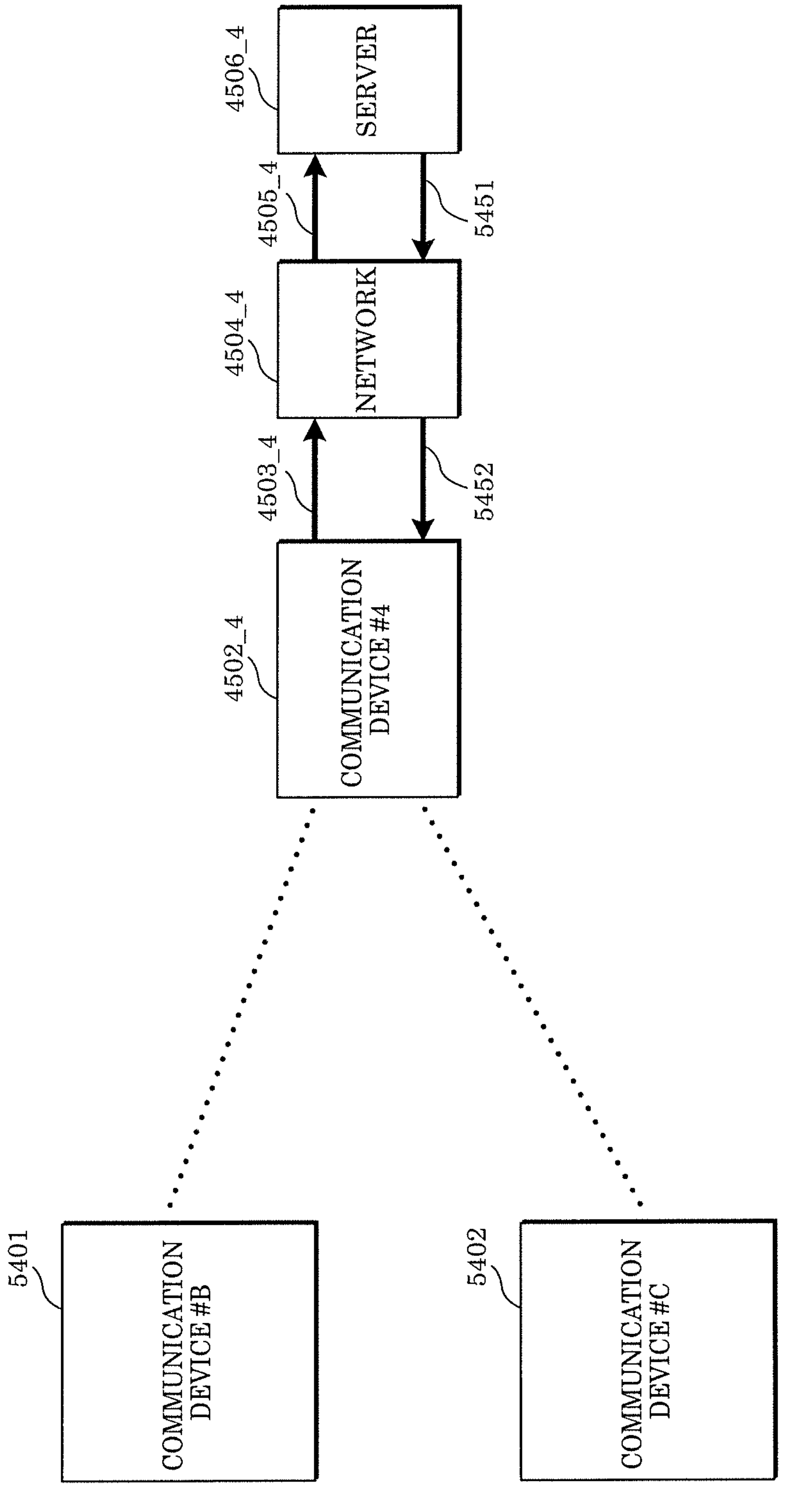
FIG. 54 illustrates one example of communication between communication devices.

Next, FIG. 54 will be described. As described in Embodiment 8 with reference to FIG. 45, communication device #4 labeled as 4502_4 obtains data from communication device #A 4501. In addition, communication device #4 labeled as 4502_4, like a base station or access point, performs communication with a terminal other than communication device #A 4501 and provides information to, for example, a server, via a network, or, alternatively, receives information from a server and provides information to a terminal other than communication device #A 4501. FIG. 54 illustrates a state in which communication device #4 labeled as 4502_4 is communicating with terminals other than communication device #A 4501, i.e., communication device #B labeled as 5401 and communication device #C labeled as 5402.

As illustrated in FIG. 54, for example, communication device #B labeled as 5401 transmits a modulated signal, and communication device #4 labeled as 4502_4 receives the modulated signal. Communication device #4 labeled as 4502_4 then demodulates the modulated signal and obtains and outputs reception data 4503_4. Moreover, reception data 4503_4 is transmitted to, for example, server 4506_4 via network 4504_4.

As illustrated in FIG. 54, data 5451 output by server 4506_4 is input into communication device #4 labeled as 4502_4 via network 4504_4 and communication device #4 labeled as 45024 performs processing such as error correction coding and modulation to generate a modulated signal, and transmits the modulated signal to communication device #B labeled as 5401.

Similarly, for example, communication device #C labeled as 5402 transmits a modulated signal, and communication device #4 labeled as 4502_4 receives the modulated signal. Communication device #4 labeled as 4502_4 then demodulates the modulated signal and obtains and outputs reception data 4503_4. Moreover, reception data 4503_4 is transmitted to, for example, server 4506_4 via network 4504_4.

As illustrated in FIG. 54, data 5451 output by server 4506_4 is input into communication device #4 labeled as 4502_4 via network 4504_4, and communication device #4 labeled as 4502_4 performs processing such as error correction coding and modulation to generate a modulated signal, and transmits the modulated signal to communication device #C labeled as 5402.

Figure 55:
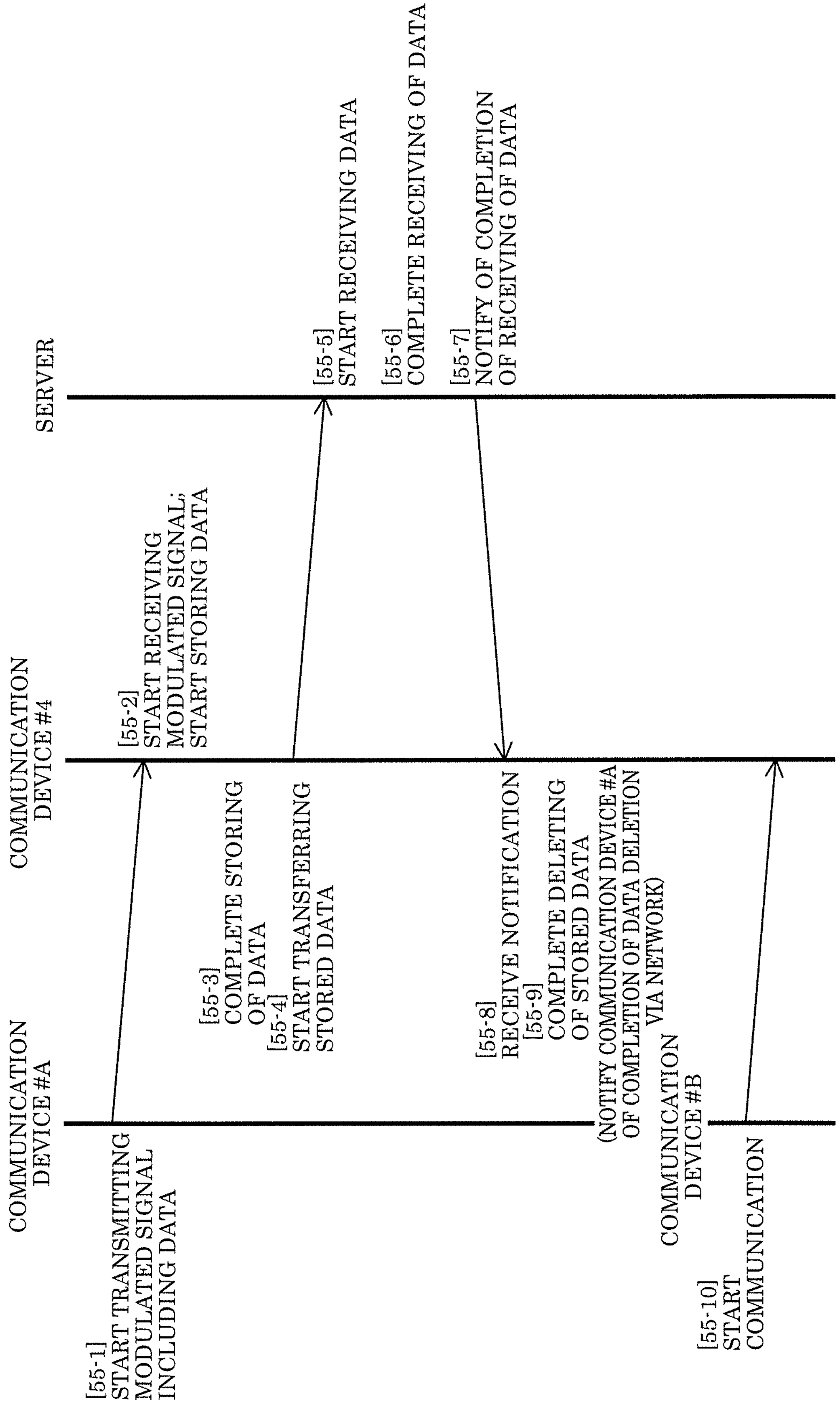
FIG. 55 illustrates one example of a procedure for communication performed by each communication device.

FIG. 55 illustrates an example of communication between (i) communication device #4 labeled as 4502_4 and (ii) communication device #A labeled as 4501 and communication device #B labeled as 5401.

First, as indicated by [55-1], communication device #A labeled as 4501 starts transmitting a modulated signal including data to communication device #4 labeled as 4502_4.

As indicated by [55-2], communication device #4 labeled as 4502_4 starts receiving the modulated signal transmitted by communication device #A labeled as 4501. Storage 5305 included in communication device #4 labeled as 4502_4 then starts storing the data obtained as a result of the reception.

As indicated by [55-3], communication device #4 labeled as 4502_4 completes communication with communication device #A labeled as 4501 and completes the storing of the data.

As indicated by [55-4], communication device #4 labeled as 4502_4 starts transferring the data obtained from communication device #A labeled as 4501 and held in storage 5305 to server 4506_4.

Note that the transferring of data may be started before the completion of the storing of the data in [55-3].

As indicated by [55-5], server 4506_4 starts receiving the data transferred by communication device #4 labeled as 4502_4 (that was obtained from communication device #A labeled as 4501).

As indicated by [55-6], server 4506_4 completes receiving the data transferred by communication device #4 labeled as 4502_4 (that was obtained from communication device #A labeled as 4501).

As indicated by [55-7], server 4506_4 notifies communication device #4 labeled as 4502_4 of the completion of reception of the data transferred by communication device #4 labeled as 4502_4 (that was obtained from communication device #A labeled as 4501).

[55-8] Communication device #4 labeled as 4502_4 receives the notification from server 4506_4 of the completion of the reception of the data.

[55-9] Communication device #4 labeled as 4502_4 deletes the data obtained from communication device #A labeled as 4501 and held in storage 5305.

Note that communication device #A may be notified of the deletion of this data.

[55-10] Communication device #B labeled as 5401 starts communicating with communication device #A labeled as 4501.

In FIG. 55, the function whereby communication device #4 labeled as 4502_4 deletes the data obtained from communication device #A labeled as 4501 and held in storage 5305 is important. This makes it possible to achieve the advantageous effect that the probability that the data from communication device #A labeled as 4501 will be stolen by another communication device can be reduced.

Figure 56:
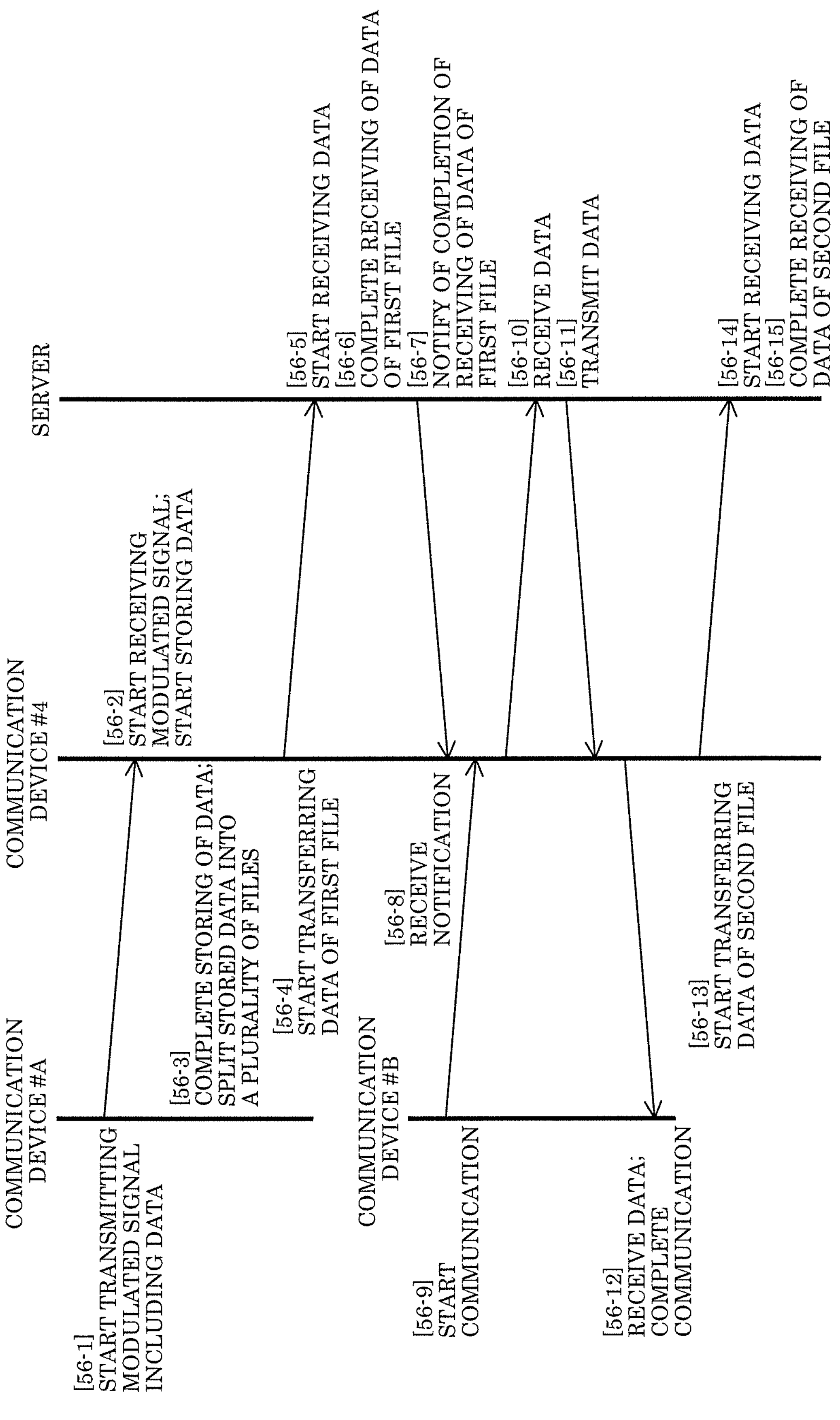
FIG. 56 illustrates another example of a procedure for communication performed by each communication device.

FIG. 56 illustrates an example of communication between (i) communication device #4 labeled as 4502_4 and (ii) communication device #A labeled as 4501 and communication device #B labeled as 5401 that differs from the example given in FIG. 55.

First, as indicated by [56-1], communication device #A labeled as 4501 starts transmitting a modulated signal including data to communication device #4 labeled as 4502_4.

As indicated by [56-2], communication device #4 labeled as 4502_4 starts receiving the modulated signal transmitted by communication device #A labeled as 4501. Storage 5305 included in communication device #4 labeled as 4502_4 then starts storing the data obtained as a result of the reception.

As indicated by [56-3], the communication device labeled as 4502_4 completes communication with communication device #A labeled as 4501 and completes the storing of the data. The stored data is split into a plurality of files. In this example, N files are created. N is an integer that is greater than or equal to 1 or an integer that is greater than or equal to 2 (hereinafter, these files will be named first file, second file, and N-th file).

As indicated by [56-4], communication device #4 labeled as 4502_4 starts transferring, from among the data obtained from communication device #A labeled as 4501 and held in storage 5305, the data of a first file, to 4506_4.

Note that the transferring of data may be started before the completion of the storing of the data in [56-3].

As indicated by [56-5], server 4506_4 starts receiving the data of the first file from among the data transferred by communication device #4 labeled as 45024 (that was obtained from communication device #A labeled as 4501).

As indicated by [56-6], server 4506_4 starts receiving the data of the first file transferred by communication device #4 labeled as 4502_4.

As indicated by [56-7], server 4506_4 notifies communication device #4 labeled as 4502_4 of the completion of the reception of the data of the first file transferred by communication device #4 labeled as 4502_4.

[56-8] Communication device #4 labeled as 4502_4 receives the notification from server 4506_4 of the completion of the reception of the data of the first file.

[56-9] Communication device #B labeled as 5401 starts communicating with communication device #A labeled as 4501.

[56-10] Server 4506_4 receives the data transmitted by communication device #B labeled as 5401, via communication device #4 labeled as 4502_4.

[56-11] In response to this, for example, server 4506_4 transmits the data.

As indicated by [56-12], communication device #B labeled as 5401 receives the data transmitted by server 4506_4, via communication device #4 labeled as 4502_4.

As indicated by [56-13], communication device #4 labeled as 4502_4 starts transferring, from among the data obtained from communication device #A labeled as 4501 and held in storage 5305, the data of a second file, to 4506_4.

As indicated by [56-14], server 4506_4 starts receiving the data of the second file from among the data transmitted by communication device #4 labeled as 45024 (that was obtained from communication device #A labeled as 4501).

As indicated by [56-15], server 4506_4 completes the reception of the data of the second file transferred by communication device #4 labeled as 4502_4.

In FIG. 56, the function whereby communication device #4 labeled as 4502_4 deletes the data obtained from communication device #A labeled as 4501 and held in storage 5305 is important. This makes it possible to achieve the advantageous effect that the probability that the data from communication device #A labeled as 4501 will be stolen by another communication device can be reduced (i.e., can ensure security).

With respect to the above, the following two methods are applicable.

First Method

In [56-8] in FIG. 56, communication device #4 labeled as 4502_4 that received the notification transmitted by the server of the completion of reception of the data of the first file deletes the data of the first file at this point in time (accordingly, communication device #4 labeled as 4502_4 receives the notification transmitted by the server of the completion of reception of data of the X-th file, and deletes the data of the X-th file (note there here, X is an integer that is greater than or equal to 1 and less than or equal to N)).

As an example of a variation of the first method, communication device #4 labeled as 4502_4 may delete the data of the X-th file along with the completion of the transmission of the data of the X-th file to the server.

Second Method

Communication device #4 labeled as 4502_4 completes transmission of the data of the first file through the N-th file, receives notification that reception of the data of all files is complete from the server, and thereafter deletes the data of the first file through the N-th file.

As an example of a variation of the second method, communication device #4 labeled as 4502_4 may delete the data of the first file through the N-th file along with the completion of the transmission of the data of the first file through the N-th file to the server.

As described above, when the maximum data transfer speed when a first communication device transfers data to a second communication device via wireless communication is faster than the maximum data transfer speed via communication over the wired connection of the second communication device, the second communication device that received the data transmitted by the first communication device stores the data in a storage, and after the second communication device transmits the stored data to another communication device, the second communication device deletes the stored data, which achieves the advantageous effect that data security can be ensured.

Next, the maximum data transfer speed when a first communication device transfers data to a second communication device via wireless communication being faster than the maximum data transfer speed via communication over the wired connection of the second communication device will be described.

For example, assume the first communication device uses frequency band A [Hz] when transferring data to the second communication device via wireless communication. Here, for example, the transfer speed when one stream is transmitted using BPSK without using error correction code is approximately A [bits per second (bps)], the transfer speed when one stream is transmitted using QPSK without using error correction code is approximately 2×A [bits per second (bps)], the transfer speed when one stream is transmitted using 16QAM without using error correction code is approximately 4×A [bits per second (bps)], and the transfer speed when one stream is transmitted using 64QAM without using error correction code is approximately 6×A [bits per second (bps)]. Furthermore, the transfer speed when two streams are transmitted (for example, via MIMO transmission) using BPSK is approximately 2×A [bits per second (bps)], the transfer speed when two streams are transmitted using QPSK is approximately 4×A [bits per second (bps)], the transfer speed when two streams are transmitted using 16QAM without using error correction code is approximately 8×A [bits per second (bps)], and the transfer speed when two streams are transmitted using 64QAM without using error correction code is approximately 12×A [bits per second (bps)].

Here, the maximum data transfer speed via communication over the wired connection of the second communication device is B [bps].

Here, when A≥B, with the majority of configurations of communication parameters, the condition "the maximum data transfer speed when a first communication device transfers data to a second communication device via wireless communication is faster than the maximum data transfer speed via communication over the wired connection of the second communication device" is satisfied, (however, even if this condition is not satisfied, the present embodiment can be partially carried out).

Accordingly, even when A B is satisfied, the second communication device that received the data transmitted by the first communication device stores the data in a storage, and the second communication device deletes the stored data after the second communication device transmits the stored data to another communication device, the advantageous effect that data security can be ensured can be achieved.

Note that in the present embodiment, a device is referred to as "server" (4506_4), but even if this device is a communication device rather than a server, the present embodiment can still be carried out in the same manner.

Moreover, network 4504_4 may be a network based on wireless communication. In such cases, the maximum data transfer speed when a first communication device transfers data to a second communication device via first wireless communication being faster than the maximum data transfer speed via second wireless communication, which is different from the first wireless communication, of the second communication device is important. Furthermore, when the maximum data transfer speed via the second wireless communication of the second communication device is expressed as B [bps], satisfying the condition A≥B is important (however, even if this condition is not satisfied, the present embodiment can be partially carried out).

Moreover, the wireless communication between communication device #A labeled as 4501 and communication device #1 labeled as 4502_1, the wireless communication between communication device #A labeled as 4501 and communication device #2 labeled as 45022, the wireless communication between communication device #A labeled as 4501 and communication device #3 labeled as 4502_3, the wireless communication between communication device #A labeled as 4501 communication device #4 labeled as 45024, the wireless communication between communication device #B labeled as 5401 and communication device #4 labeled as 4502_4, and the communication between communication device #C labeled as 5402 and communication device #4 labeled as 4502_4 described in the present embodiment may be carried out via MIMO transmission like described in other embodiments, that is to say, a plurality of transmitting antennas and a plurality of receiving antennas (a single receiving antenna is acceptable) may be provided and the transmitting device may transmit a plurality of modulated signals from a plurality of antennas at the same frequency and at the same time. Moreover, the wireless communication may be carried out using a method by which a single modulated signal is transmitted. Note that an example of a configuration of the transmitting device and receiving device in such cases is as described in other embodiments.

Embodiment 10

In the present embodiment, a variation of Embodiment 9 will be described.

Figure 57:
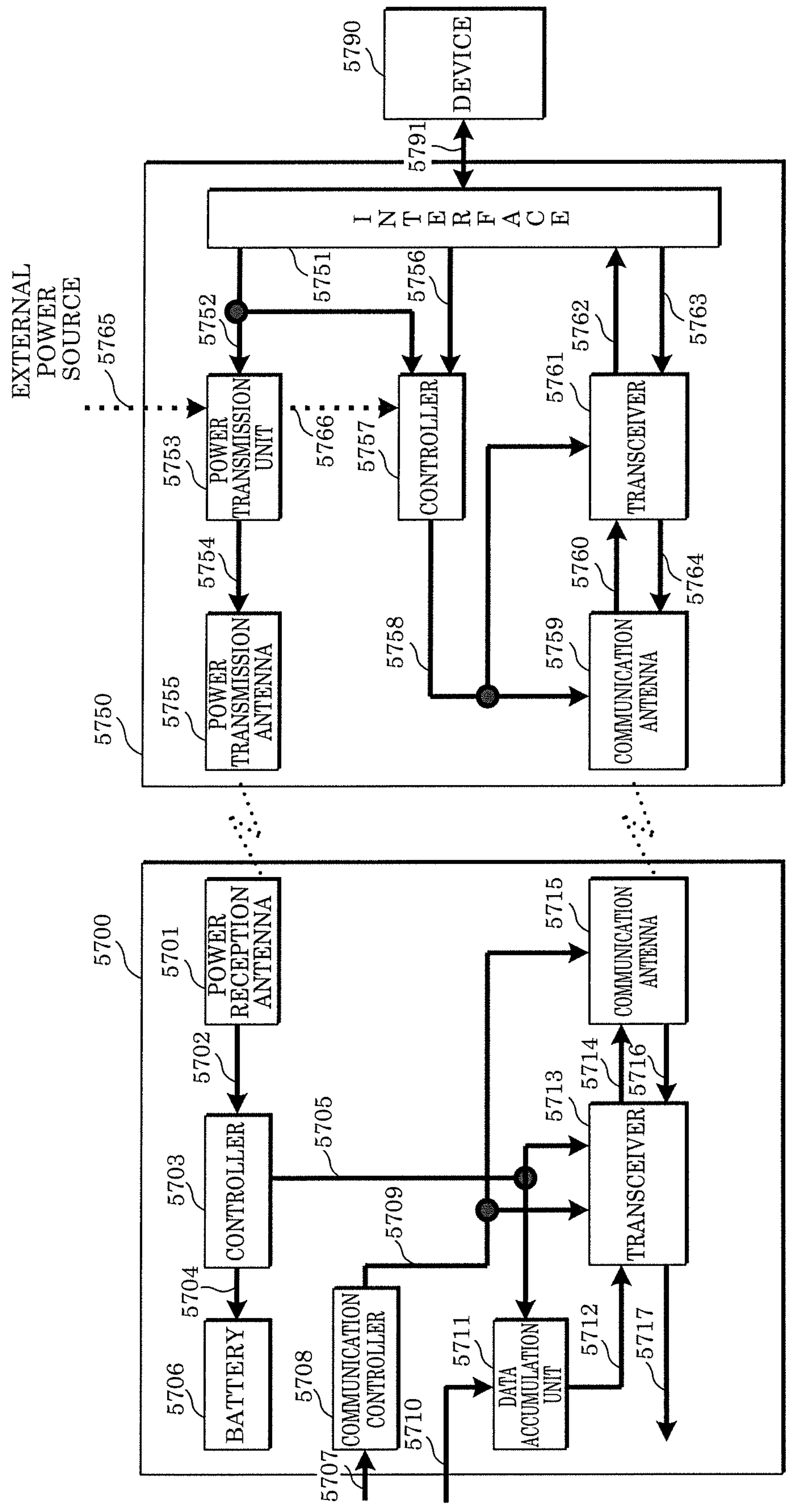
FIG. 57 illustrates an example of a configuration of a communication device and a power transmission device.
Figure 58:
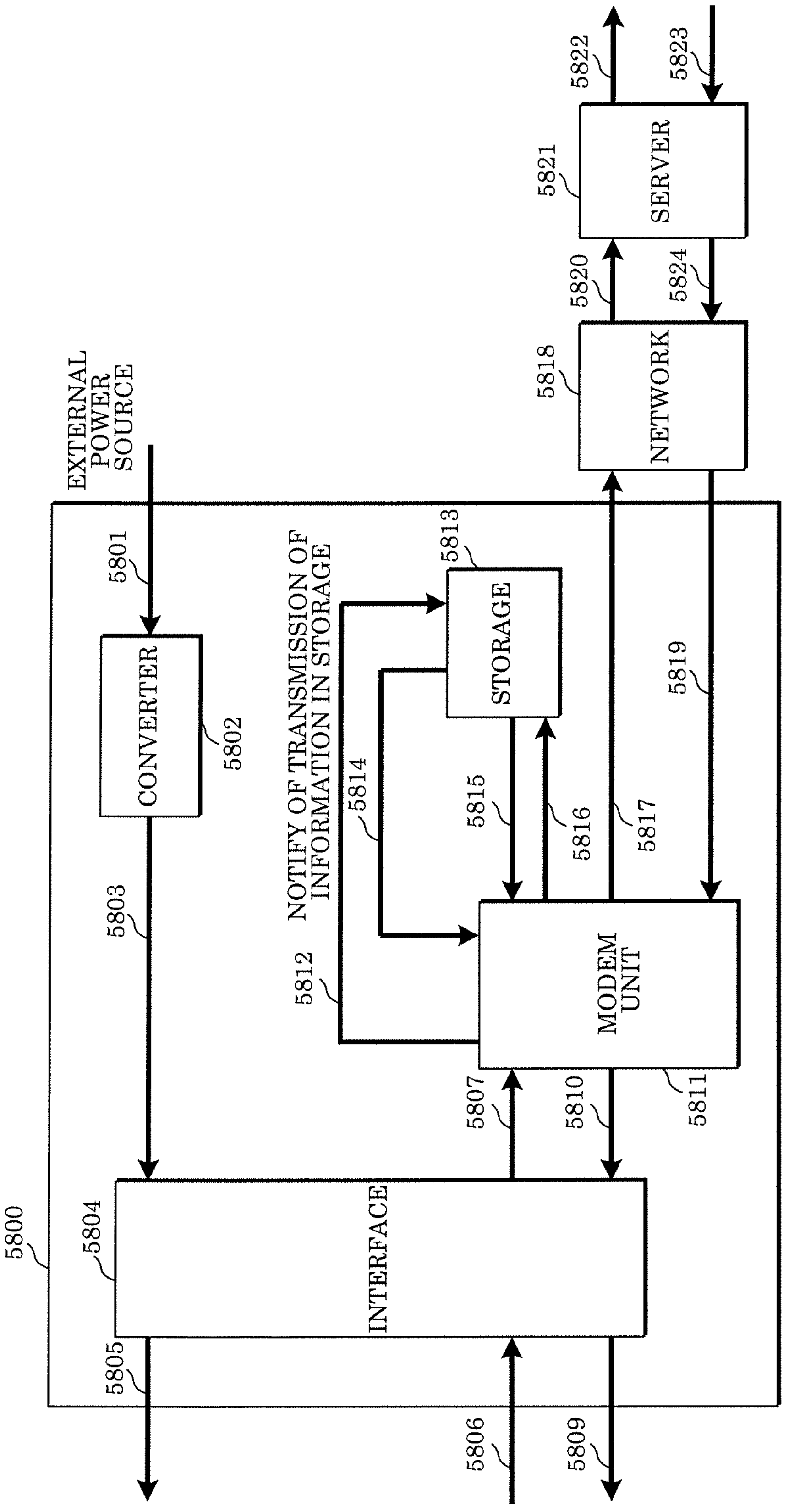
FIG. 58 illustrates an example of a configuration of a device.

In FIG. 57, 5700 indicates a communication device, 5750 indicates a power transmission device, and 5790 indicates a device. In FIG. 58, 5800 indicates the device labeled as 5790 in FIG. 57, and 5821 indicates a server.

In this example, communication device 5700 and power transmission device 5750 illustrated in FIG. 57 communicate wirelessly, for example.

Moreover, power transmission device 5750 illustrated in FIG. 57 transmits power, communication device 5700 receives power and charges a battery.

Power transmission device 5750 illustrated in FIG. 57 and device 5790 communicate with one another (for example, over a wired connection; however, note that the communication may be wireless).

Moreover, as illustrated in FIG. 58, device 5800 (in other words, device 5790 in FIG. 57) communicates with server 5821 via network 5817.

In this example, the maximum data transfer speed when communication device 5700 transfers data to power transmission device 5750 via wireless communication is faster than the maximum data transfer speed via communication over the wired connection (or via the wireless communication) of device 5800 (in other words, device 5790 in FIG. 57) (however, even if this condition is not satisfied, the present embodiment can be partially carried out).

Stated differently, when the frequency band used when communication device 5700 transfers data to power transmission device 5750 via wireless communication is expressed as A [Hz] and the maximum transfer speed via communication over the wired connection (or via the wireless communication) of device 5800 (in other words, device 5790 in FIG. 57) is expressed as B [bps], A≥B is satisfied (however, even if this condition is not satisfied, the present embodiment can be partially carried out).

Next, the detailed operation example in FIG. 57 will be described. Power transmission unit 5753 included in power transmission device 5750 receives input(s) of a supply of power 5752 from interface 5751 and/or a supply of power 5765 from external power source, outputs power transmission signal 5754, and power transmission signal 5754 is transmitted wirelessly from power transmission antenna 5755.

Controller 5703 included in communication device 5700 receives an input of received signal 5702 received by power reception antenna 5701.

In the description above, the terminology "power transmission antenna" 5755 is written, but this may be referred to as a power transmission coil. Moreover, the terminology "power reception antenna" 5701 is used, but this may be referred to as a power reception coil. Controller 5703 outputs power supply signal 5704 and control signal 5705. Battery 5706 is charged in response to input of power supply signal 5704.

Based on the voltage and/or current, for example, controller 5703 knows whether power is currently being received, and outputs control signal 5705 including information on whether power is currently being received or not. Note that the element related to power reception may include a communication function, controller 5703 may know whether power is currently being received or not via communication, and may output control signal 5705 including information on whether power is currently being received or not. Moreover, control signal 5705 may include control information other than the above-described information.

Data accumulation unit 5711 receives an input of data 5710, and accumulates data. Note that data 5710 may be data generated by communication device 5700.

Data accumulation unit 5711 receives an input of control signal 5705, and based on control signal 5705, outputs data 5712 accumulated in data accumulation unit 5711.

Communication controller 5708 receives an input of control information 5707, and outputs communication control signal 5709.

Transceiver 5713 receives inputs of data 5712, control signal 5705, and communication control signal 5709, and based on control signal 5705 and communication control signal 5709, determines, for example, the transmitting method to be used, generates a modulated signal including data 5712, and outputs transmission signal 5714 from communication antenna 5715 as, for example, radio waves.

Moreover, transceiver 5713 receives an input of received signal 5716 received by communication antenna 5715, performs processing such as demodulation and error correction decoding, and outputs reception data 5717.

Controller 5757 included in power transmission device 5750 receives inputs of a supply of power 5752 and information 5756 from device 5790, and outputs communication control signal 5758.

Communication antenna 5759 receives the transmission signal transmitted by the communication partner (communication device 5700). Transceiver 5761 receives inputs of received signal 5760 received by communication antenna 5759, and communication control signal 5758, performs processing such as demodulation and error correction decoding, and outputs reception data 5762.

Moreover, transceiver 5761 receives inputs of data 5763 and communication control signal 5758, and based on communication control signal 5758, determines, for example, the modulation method and transmitting method to be used, generates a modulated signal, and outputs transmission signal 5764. Transmission signal 5764 is output from communication antenna 5759 as radio waves.

Signal 5791 is input into and output from power transmission device 5750. Signal 5791 is also input into and output from device 5790.

Signal 5791 includes supply of power 5752, information 5756, reception 5762, and data 5763. Interface 5751 is an interface for (i) signal 5791 and (ii) supply of power 5752, information 5756, reception 5762, and data 5763.

FIG. 58 illustrates a configuration of device 5790 illustrated in FIG. 57 (device 5800), and network 5817 and server 5821 which are connected to device 5800.

Converter 5802 receives an input of, for example, a supply of alternating current (AC) power 5801 from an external power source, performs AC to direct current (DC) conversion, and outputs a supply of DC power 5803. The supply of DC power 5803 becomes 5805 after passing through interface 5804.

Storage 5813 outputs notification signal 5814 for notifying that device 5800 includes a storage. Modem unit 5811 receives an input of notification signal 5814, and outputs data (or modulated signal) 5810 including information indicating that device 5800 includes a storage, in order to notify power transmission device 5750 illustrated in FIG. 57 that device 5800 includes a storage. Data (or modulated signal) 5810 becomes 5809 after passing through interface 5804.

Modem unit 5811 receives, via interface 5804, as 5807, an input of data 5806 obtained from power transmission device 5750 illustrated in FIG. 57. Modem unit 5811 determines whether to store the data in storage 5813. When it is determined to store the data in storage 5813, control signal 5812 includes notification information indicating "store the data in the storage". Moreover, modem unit 5811 outputs the obtained data 5807 as 5816.

Storage 5813 then stores data 5816.

Moreover, there are instances in which modem unit 5811 transmits data to server 5821 via network 5818. For example, there are instances in which modem unit 5811 transmits data stored in storage 5813 to server 5821. Modem unit 5811 outputs, to storage 5813, control signal 5812 including information on a notification to transmit data included in storage 5813 to server 5821.

Then, storage 5813 receives the information on the notification to transmit data included in storage 5813 to server 5821 that is included in control signal 5812, and outputs the stored data 5815.

Modem unit 5811 receives an input of the stored data 5815, and outputs data 5816 (or a modulated signal including data) that corresponds to this data. Data (or modulated signal) 5816 (5820) arrives at server 5821 via network 5818. If necessary, server 5821 transmits the data to another device (5822).

Server 5821 receives an input of data 5823 from another device, which arrives at modem unit 5811 via a network. If necessary, modem unit 5811 transmits the data obtained from server 5821 (or a modulated signal including the data) to power transmission device 5750 illustrated in FIG. 57.

Note that "the maximum data transfer speed when communication device 5700 transfers data to power transmission device 5750 via wireless communication" is faster than the maximum data transfer speeds of 5816 and 5819 in FIG. 58 (however, even if this condition is not satisfied, the present embodiment can be partially carried out).

Stated differently, when the frequency band used when communication device 5700 transfers data to power transmission device 5750 via wireless communication is expressed as A [Hz] and the maximum transfer speed of 5816 and 5819 in FIG. 58 is expressed as B [bps], A≥B is satisfied (however, even if this condition is not satisfied, the present embodiment can be partially carried out).

Moreover, data transfers 5806 and 5809 in FIG. 58 are capable of ensuring sufficient data transfer speeds.

Next, a detailed example of communication between communication device 5700 in FIG. 57, power transmission device 5750 in FIG. 57, device 5790 in FIG. 57 (corresponding to device 5800 in FIG. 58), and server 5821 in FIG. 58 will be given with reference to FIG. 59 and FIG. 60.

Figure 59:
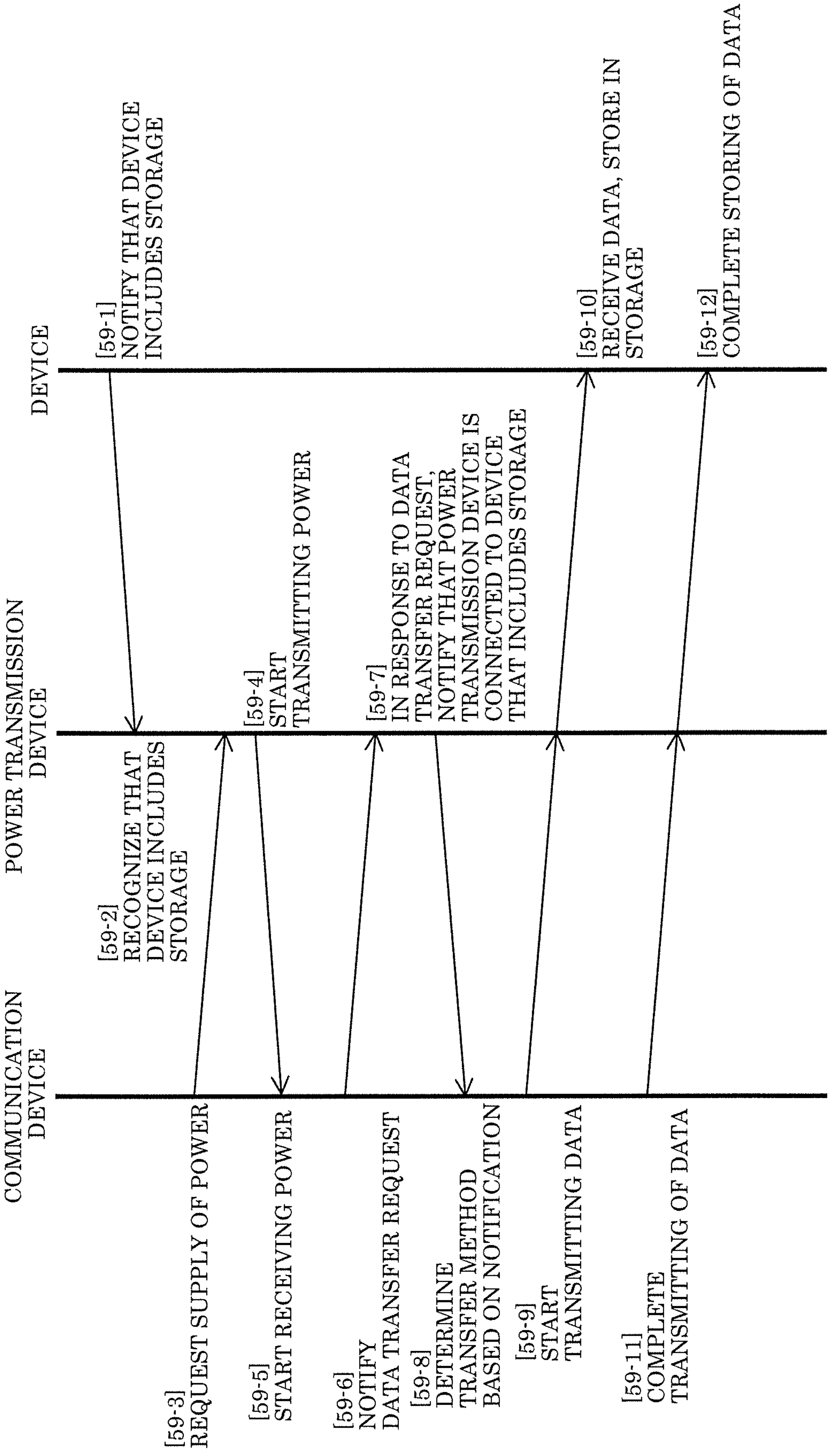
FIG. 59 illustrates one example of a procedure for communication performed by each device.

As illustrated in FIG. 59, [59-1] first, device 5790 in FIG. 57, that is to say, device 5800 in FIG. 58 notifies power transmission device 5750 in FIG. 57 that it includes storage 5813.

[59-2] Power transmission device 5750 receives the notification, and recognizes that device 5790 in FIG. 57, that is to say, device 5800 in FIG. 58 includes storage 5813.

[59-3] Communication device 5700 in FIG. 57 makes a request to power transmission device 5750 in FIG. 57 for a supply of power.

[59-4] Power transmission device 5750 in FIG. 57 receives the request, and starts transmitting power to communication device 5700 in FIG. 57.

[59-5] Accordingly, communication device 5700 in FIG. 57 starts receiving power, that is to say, the battery included in communication device 5700 in FIG. 57 starts charging.

[59-6] In accordance with starting to receive power, communication device 5700 in FIG. 57 notifies power transmission device 5750 in FIG. 57 with a data transfer request.

By the communication device in FIG. 57 requesting power transmission device 5750 to transfer data in accordance with the communication device in FIG. 57 receiving the power, it is possible to achieve the advantageous effect that high data transfer speeds can be achieved. Since it is possible to receive power, this means that the communication distance for the data transfer is extremely short, which in turn means that there is a high probability of a favorable communication environment. Accordingly, the communication device in FIG. 57 can select a modulation method and an error correction coding method that allow of high data transfer speeds when transmitting the modulation method.

[59-7] Power transmission device 5750 in FIG. 57 receives the data transfer request from communication device 5700 in FIG. 57, and notifies the communication device in FIG. 57 that power transmission device 5750 is connected to device 5800 that includes storage 5813.

[59-8] Communication device 5700 in FIG. 57 receives this notification and determines a transfer method (transmitting method) to be used. At this time, a transfer method is selected by communication device 5700 that satisfies the condition "the maximum data transfer speed when communication device 5700 transfers data to power transmission device 5750 via wireless communication is faster than the maximum data transfer speed of 5816 and 5819 in FIG. 58". Stated differently, a transfer method is selected by communication device 5700 that satisfies the condition "when the frequency band used when communication device 5700 transfers data to power transmission device 5750 via wireless communication is expressed as A [Hz] and the maximum transfer speed of 5816 and 5819 in FIG. 58 is expressed as B [bps], A≥B".

As described in Embodiment 9, even when such a selection is made, it is possible to reduce the probability that part of the data will be lost during communication.

[59-9] Communication device 5700 in FIG. 57 starts transferring the data (wirelessly).

In [59-10] and [59-9], power transmission device 5750 receives the data transmitted by communication device 5700 in FIG. 57, and transmits the data to device 5790 in FIG. 57, that is to say, device 5800 in FIG. 58. Device 5790 in FIG. 57, that is to say, device 5800 in FIG. 58 receives the data and stores the received data in storage 5813 in FIG. 58.

[59-11] Communication device 5700 in FIG. 57 completes the transferring of the data (wirelessly).

[59-12] In accordance with the completion of the transferring of data in [59-11], device 5790 in FIG. 57, that is to say, device 5800 in FIG. 58 completes the storing of the received data into storage 5813.

Figure 60:
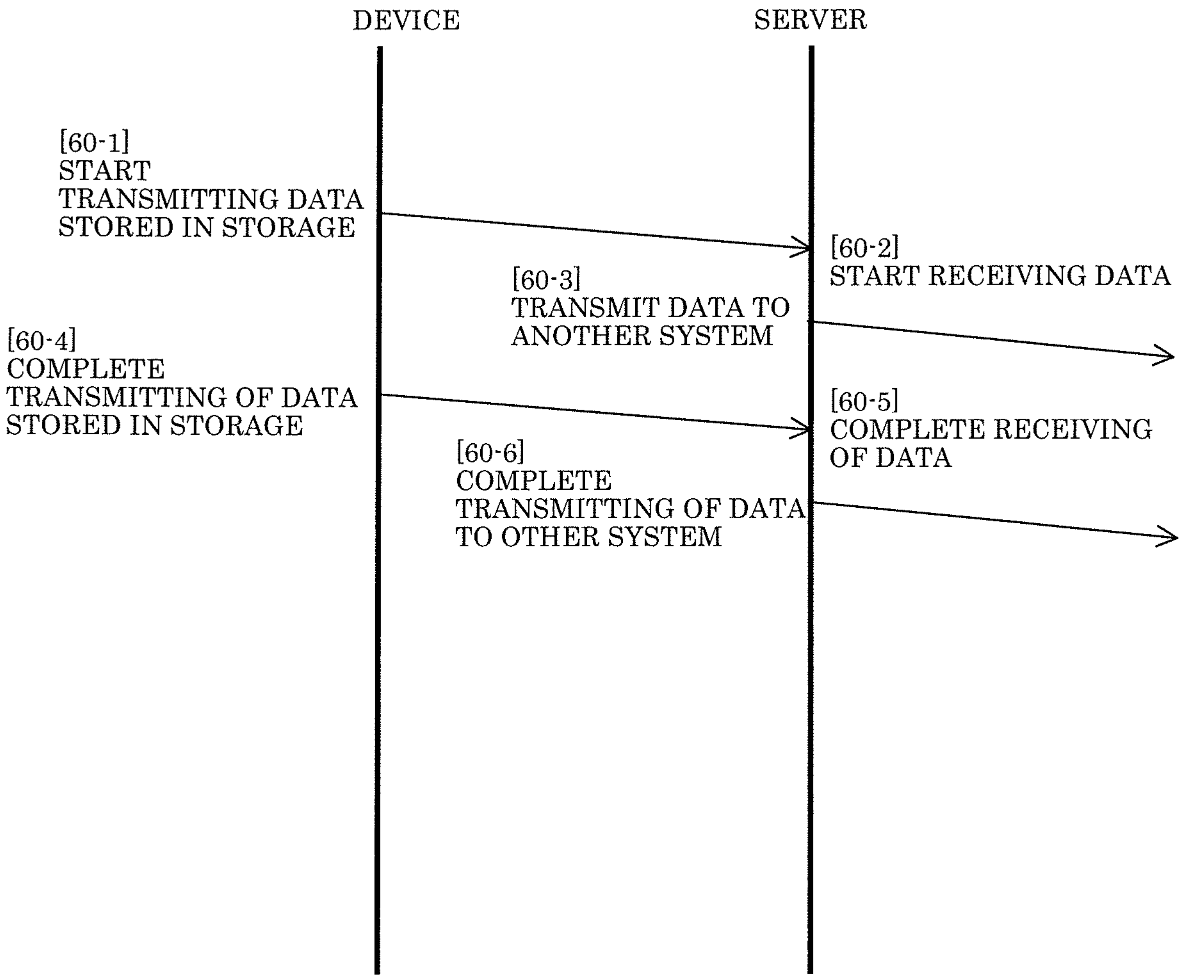
FIG. 60 illustrates one example of a procedure for communication between a device and a server.

In accordance with the completion of the storing in [59-12] in FIG. 59, processing can proceed to the operations in FIG. 60. FIG. 60 illustrates an example of communication between device 5790 in FIG. 57, that is to say, device 5800 in FIG. 58, and server 5821 in FIG. 58.

[60-1] Device 5790 in FIG. 57, that is to say, device 5800 in FIG. 58 starts transmitting data stored in storage 5813 to server 5821 via network 5818.

[60-2] Server 5821 in FIG. 58 starts receiving the data.

[60-3] For example, server 5821 in FIG. 58 transmits the received data to another system.

[60-4] Device 5790 in FIG. 57, that is to say, device 5800 in FIG. 58 completes the transmission of the data stored in storage 5813.

[60-5] Server 5821 in FIG. 58 completes the reception of the data.

[60-6] For example, server 5821 in FIG. 58 completes the transmission of the received data to another system.

As described above, communication device 5700 in FIG. 57 recognizes that the power transmission device labeled as 5750 in FIG. 57, which is the communication partner of communication device 5700 in FIG. 57, is connected to a device that includes a storage, and selects a communication method based on this. As a result, it is possible to achieve the advantageous effect that the probability of loss of data resulting from transferring data to another system can be reduced.

Note that in the above description, the wireless communication between communication device 5700 and power transmission device 5750 illustrated in FIG. 57 may be carried out via MIMO transmission like described in other embodiments, that is to say, a plurality of transmitting antennas and a plurality of receiving antennas (a single receiving antenna is acceptable) may be provided and the transmitting device may transmit a plurality of modulated signals from a plurality of antennas at the same frequency and at the same time. Moreover, the wireless communication may be carried out using a method by which a single modulated signal is transmitted. Note that an example of a configuration of the transmitting device and receiving device in such cases is as described in other embodiments.

Moreover, communication device 5700 in FIG. 57 may be included in a mobile phone terminal, and an example in which communication device 5700 in FIG. 57 is included in a conveyance such as a car is conceivable. Moreover, an example in which device 5790 is included in a base station, access point, computer, or server, for example, is conceivable.

Next, problems related to communication antenna arrangement in power transmission device 5750 illustrated in FIG. 57 will be described with reference to FIG. 61.

Figure 61:
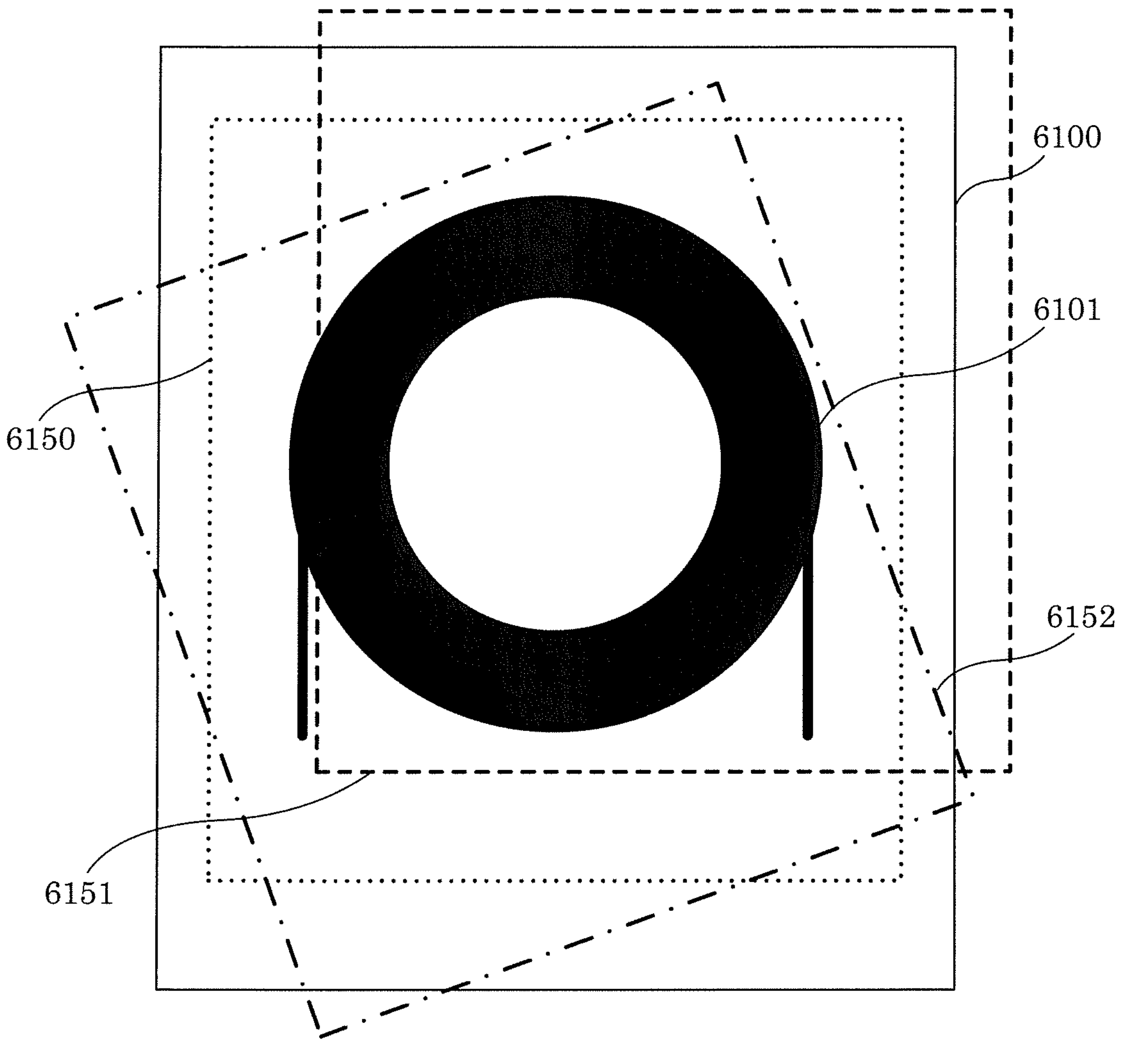
FIG. 61 illustrates a problem related to the arrangement of communication antennas.

In FIG. 61, 6100 indicates the contour of the power transmission device in FIG. 57. 6101 indicates power transmission coil 5755. Note that in FIG. 57, "power transmission coil" is phrased as "power transmission antenna".

In this example, communication device 5700 in FIG. 57 includes a power reception coil as power reception antenna 5701.

6150, 6151, and 6152 indicate the contour of communication device 5700 in FIG. 57. As illustrated in FIG. 61, when the user of communication device 5700 in FIG. 57 causes communication device 5700 to receive power, there are a variety of ways in which the user may arrange communication device 5700, such as the arrangement indicated by 6150, the arrangement indicated by 6151, and the arrangement indicated by 6152.

When wireless communication is performed between communication device 5700 and power transmission device 5750 in such arrangements, there is a desire for a communication method to be selected that achieves fast data transfer speeds and yields high data reception quality, in other words, this desire is a problem to be overcome.

Regarding communication device 5700 that communicates with power transmission device 5750, since communication devices vary from user to user, for example, the arrangement and such of communication antenna 5715 may differ from communication device to communication device. Even under such conditions, when communication device 5700 and power transmission device 5750 wirelessly communicate, there is a desire for a communication method to be selected that achieves fast data transfer speeds and yields high data reception quality, in other words, this desire is a problem to be overcome.

The present embodiment will describe a configuration of power transmission device 5750 illustrated in FIG. 57 for overcoming this problem.

Figure 62:
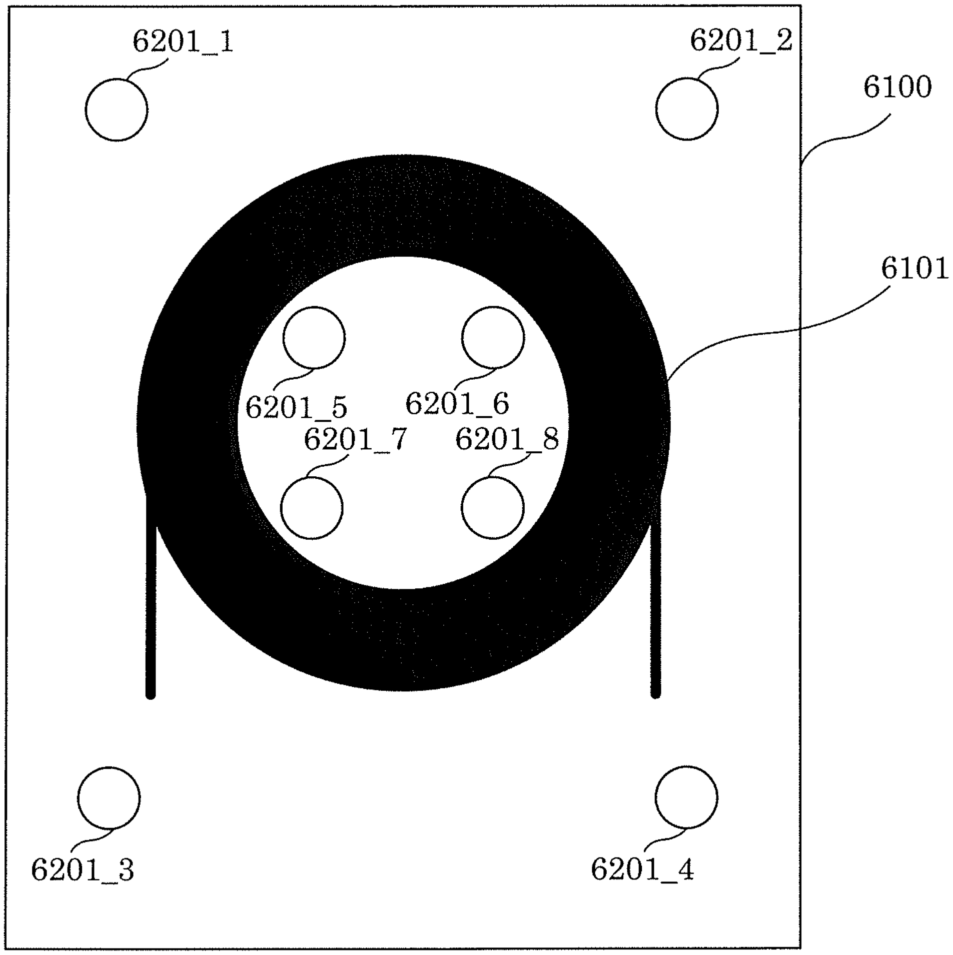
FIG. 62 illustrates one example of an arrangement of communication antennas.

FIG. 62 illustrates an example of a favorable arrangement of communication antenna 5759 and power transmission coil 5755 in power transmission device 5750 illustrated in FIG. 57. Note that in FIG. 62, elements which operate in the same manner as those in FIG. 61 are assigned the same reference numerals, and repeated description thereof is omitted.

In FIG. 62, 6201_1, 6201_2, 6201_3, 6201_4, 6201_5, 6201_6, 6201_7, and 6201_8 are communication antennas of power transmission device 5750.

As illustrated in FIG. 62, since power transmission device 5750 needs to transmit power to power reception coil 5701 included in communication device 5700, power transmission coil 6101 (corresponding to power transmission coil 5755 in FIG. 57) is disposed, for example, in the central region, like illustrated in FIG. 62.

In this example, power transmission coil 5755 is arranged in a circular shape (so as to form a closed loop). This aspect corresponds to the black portion of 6101 in FIG. 62. Accordingly, this circular shape defines a space inside the circle and a space outside the circle.

In this example, communication antennas of power transmission device 5750 are arranged inside of the circular coil and outside of the circular coil. In the example illustrated in FIG. 62, communication antennas 6201_5, 6201_6, 6201_7, and 6201_8 are arranged inside the circular coil, and communication antennas 6201_1, 6201_2, 6201_3, and 6201_4 are arranged outside the circular coil.

When the communication antennas of power transmission device 5750 are arranged in this manner, communication antennas are densely arranged with respect to plane 6100, so no matter how communication device 5700 is arranged with respect to plane 6100, in communication device 5700 and power transmission device 5750, the probability that modulated signal reception electric field strength can be ensured is increased. This makes it possible to achieve the advantageous effect that it is possible to select a communication method that achieves a high data transfer speed and ensure high data reception quality. Moreover, when the communication antennas of power transmission device 5750 are arranged in this manner, no matter how the communication antennas are arranged and included in communication device 5700, communication antennas are densely arranged with respect to plane 6100, so in communication device 5700 and power transmission device 5750, the probability that modulated signal reception electric field strength can be ensured is increased.

Figure 63:
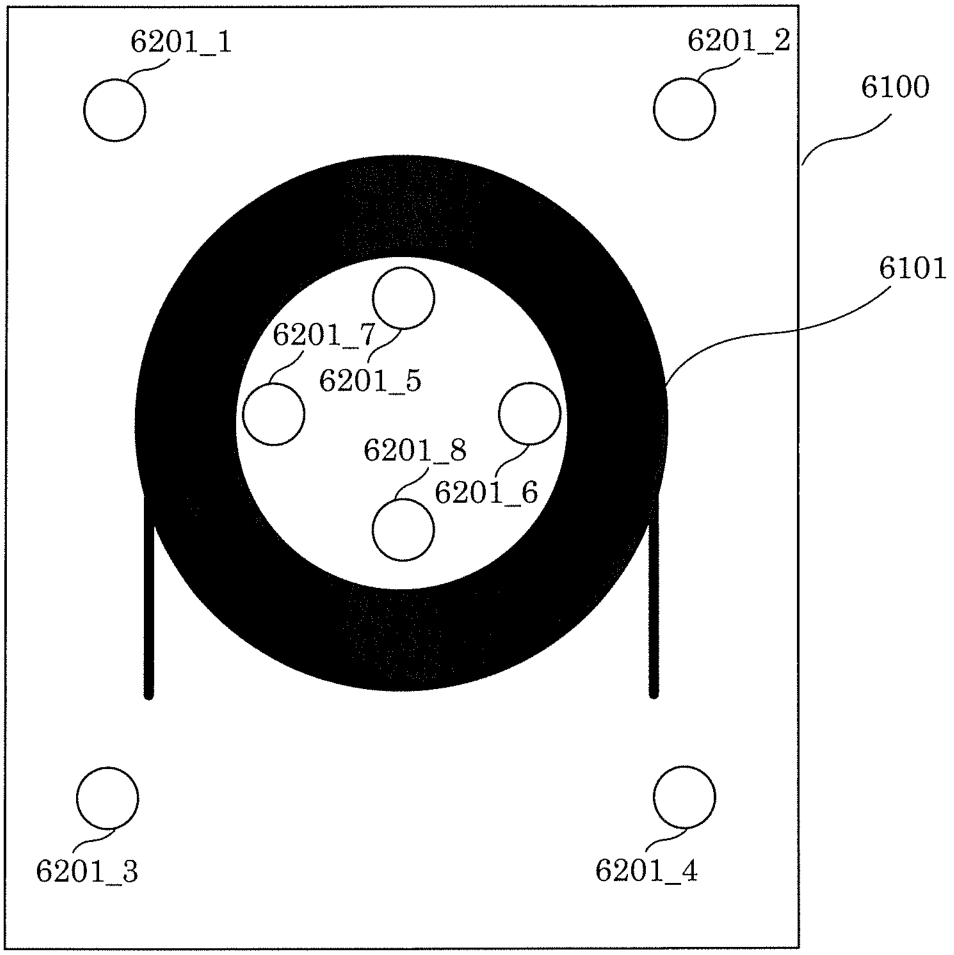
FIG. 63 illustrates another example of an arrangement of communication antennas.
Figure 64:
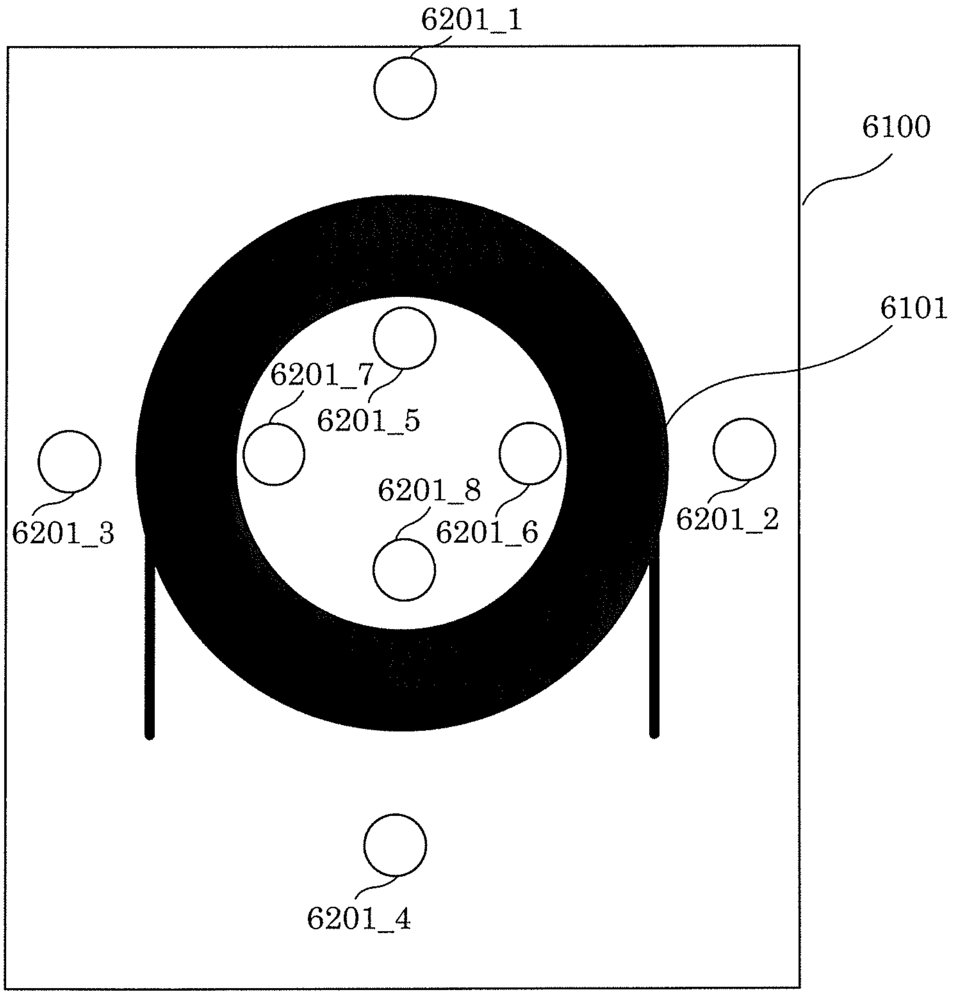
FIG. 64 illustrates another example of an arrangement of communication antennas.

Note that the arrangement of the communication antennas of power transmission device 5750 is not limited to an arrangement like that of FIG. 61. For example, the communication antennas of power transmission device 5750 may be arranged like in FIG. 62, FIG. 63, or FIG. 64. Note that in FIG. 62, FIG. 63, and FIG. 64, elements which operate in the same manner as those in FIG. 61 are assigned the same reference numerals, and repeated description thereof is omitted. Here, the characterizing point is the formation of a quadrangular shape by communication antennas 6201_5, 6201_6, 6201_7, and 6201_8.

A configuration other than a configuration in which four communication antennas are arranged inside the circular coil and four communication antennas are arranged outside the circular coil is also acceptable.

For example, even when one or two or more of the communication antennas of power transmission device 5750 are arranged inside the circular coil and one or two or more of the communication antennas of power transmission device 5750 are arranged outside the circular coil, the advantageous effects described above can be achieved.

Moreover, when N (N is an integer that is greater than or equal to 1 or greater than or equal to 2) communication antennas of power transmission device 5750 are arranged inside the circular coil and M (M is an integer that is greater than or equal to 1 or greater than or equal to 2) communication antennas of power transmission device 5750 are arranged outside the circular coil, N=M may be satisfied, and, alternatively, N*M may be satisfied. Moreover, when M is greater than N, it is possible to more densely arrange the antennas.

Figure 65:
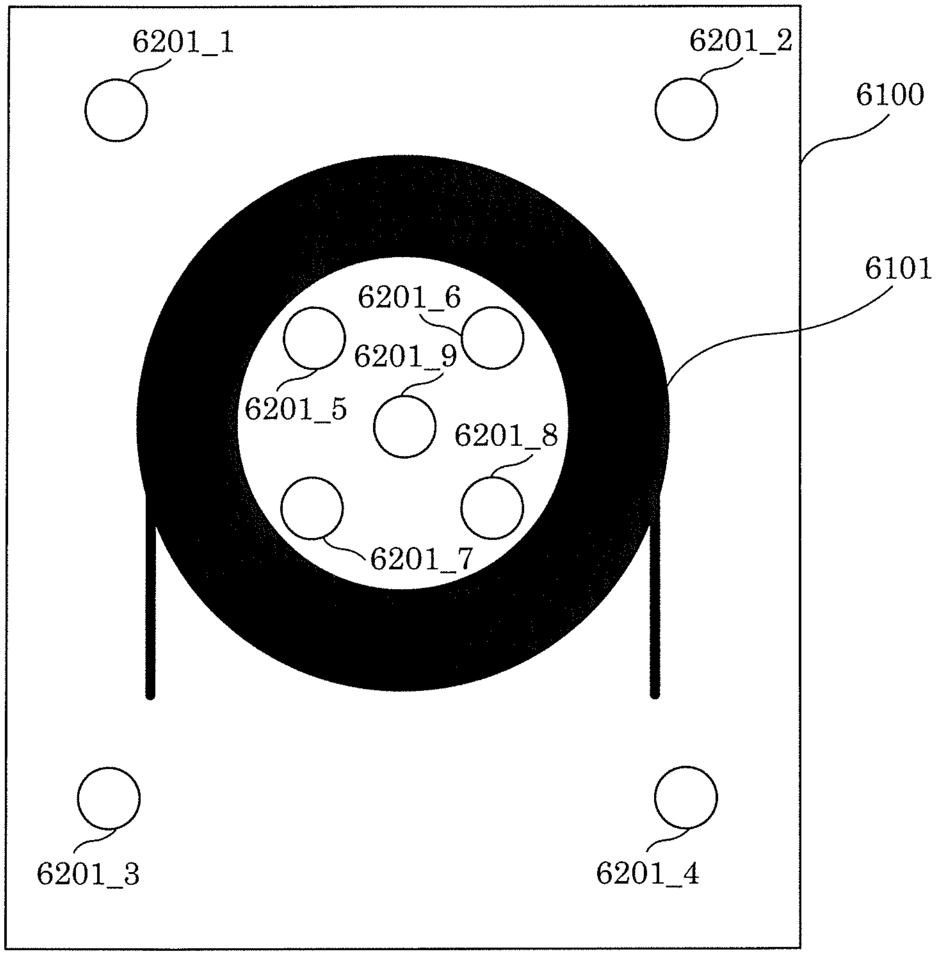
FIG. 65 illustrates another example of an arrangement of communication antennas.
Figure 66:
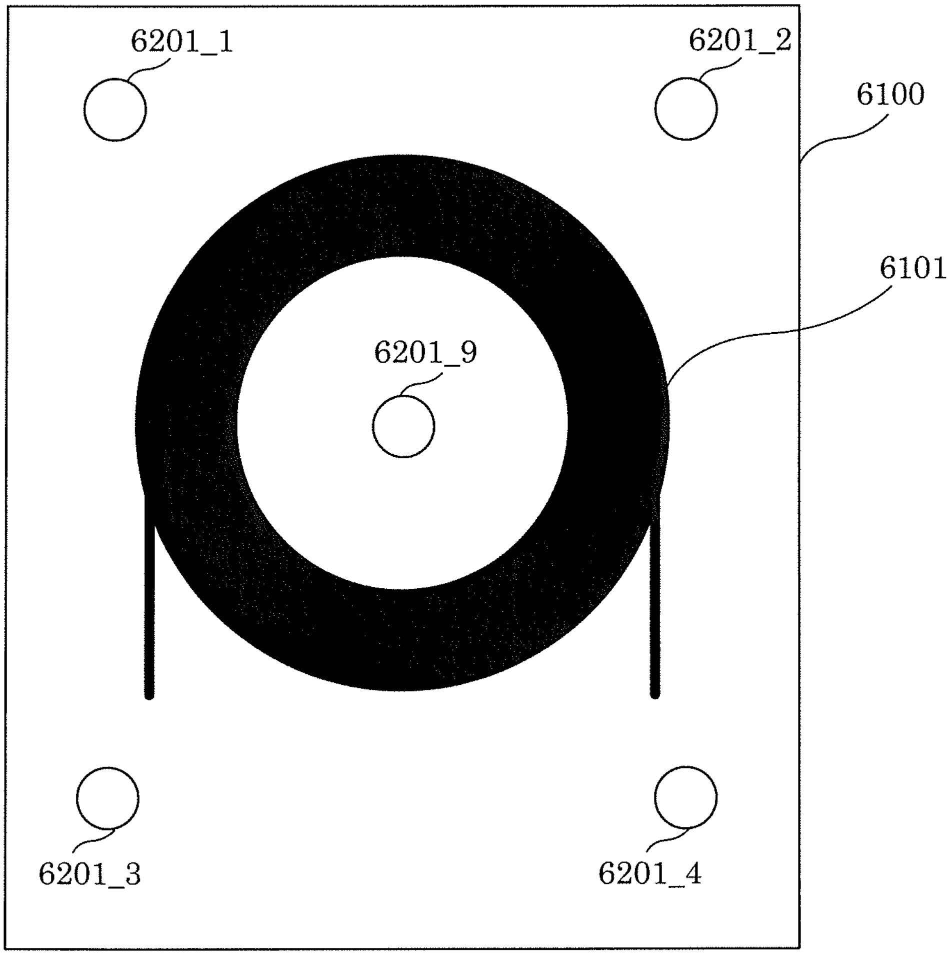
FIG. 66 illustrates another example of an arrangement of communication antennas.

FIG. 65 and FIG. 66 each illustrate an example of an arrangement of communication antennas where N*M. Note that in FIG. 65 and FIG. 66, elements which operate in the same manner as those in FIG. 61 and FIG. 62 are assigned the same reference numerals. In FIG. 65 and FIG. 66, 6201_1, 6201_2, 62013, 6201_4, 6201_5, 6201_6, 6201_7, 6201_8, and 6201_9 are communication antennas of power transmission device 5750.

Figure 67:
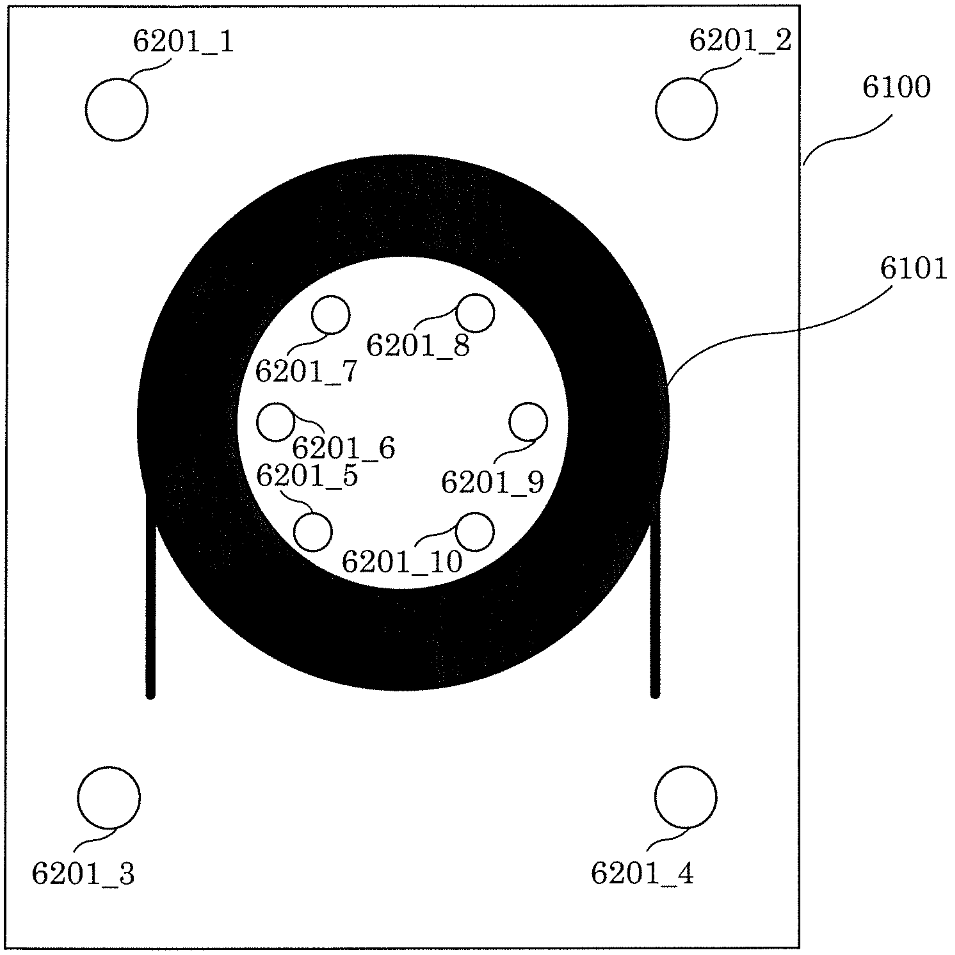
FIG. 67 illustrates another example of an arrangement of communication antennas.
Figure 68:
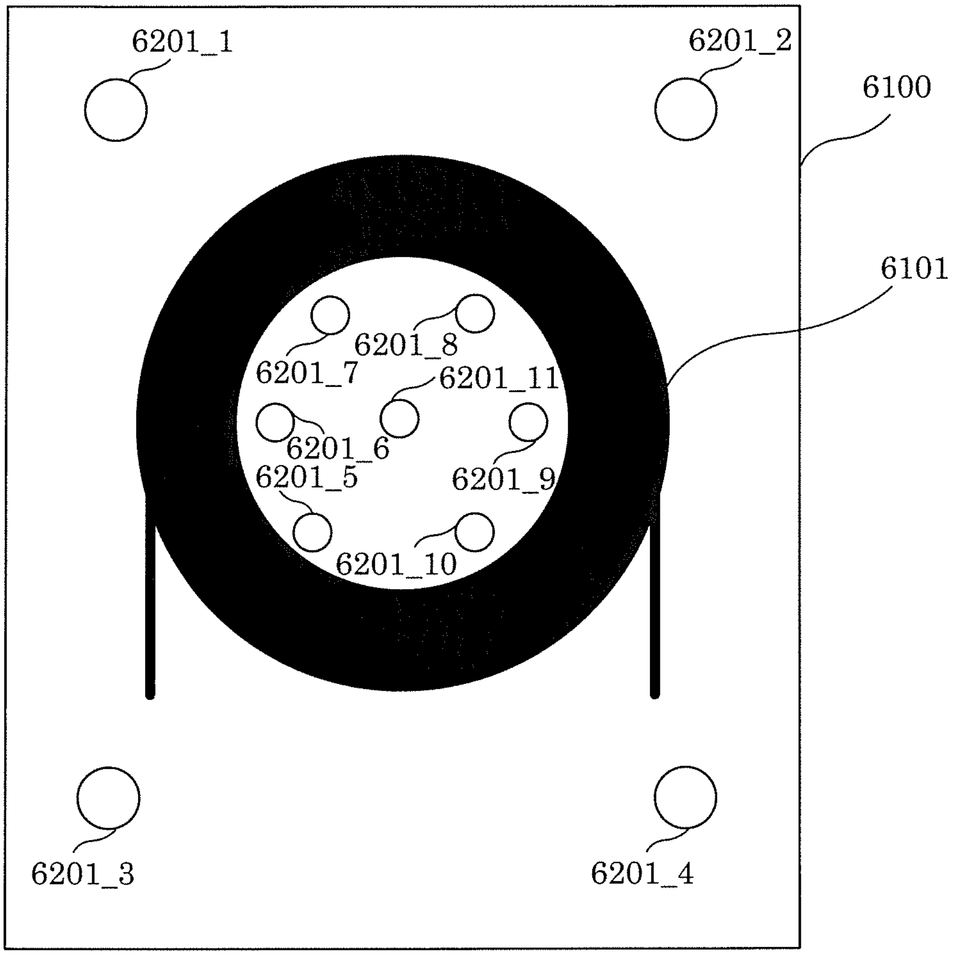
FIG. 68 illustrates another example of an arrangement of communication antennas.

Moreover, focusing on the inside of the circular coil, when the communication antennas of power transmission device 5750 are arranged like in FIG. 67 and FIG. 68, it is possible to more densely arrange the communication antennas. Note that in FIG. 67 and FIG. 68, elements which operate in the same manner as those in FIG. 61 and FIG. 62 are assigned the same reference numerals. 6201_1, 6201_2, 6201_3, 6201_4, 6201_5, 6201_6, 6201_7, 6201_8, 6201_9, 6201_10, and 6201_11 are communication antennas of power transmission device 5750. Here, the characterizing point is the formation of a hexagonal shape by communication antennas 6201_5, 6201__7, 6201_8, 6201_9, and 6201_10.

In, for example, FIG. 62, FIG. 63, FIG. 64, FIG. 65, FIG. 66, FIG. 67, and FIG. 68, power transmission coil 5755 of power transmission device 5750 need not be circular in shape. For example, power transmission coil 5755 may be configured as a closed loop that defines a space inside the loop and a space outside the loop, and the communication antennas of power transmission device 5750 may be arranged both inside and outside of the closed loop. Here, the number of communication antennas arranged inside the closed loop and the number of communication antennas arranged outside the closed loop may be the same as when communication antennas are arranged inside the circle and communication antennas are arranged outside the circle.

Hereinbefore, methods of arranging the communication antennas of power transmission device 5750 have been described, but when the communication antennas of communication device 5700 are arranged in accordance with the same method of arranging the communication antennas of power transmission device 5750, the same advantageous effects can be achieved.

For example, in FIG. 62, FIG. 63, FIG. 64, FIG. 65, FIG. 66, FIG. 67, and FIG. 68, if 6100 is considered to indicate the contour of communication device 5700, 6101 is considered to indicate the power reception coil 5701 of communication device 5700, and 6201_1, 6201_2, 6201_3, 6201_4, 6201_5, 6201_6, 6201_7, 6201_8, 6201_9, 6201_10, 6201_11 are considered to indicate communication antennas of communication device 5700, if such an embodiment is carried out such that the configuration requirements described above are satisfied, the advantageous effects described above can be achieved.

Note that when controller 5757 of power transmission device in FIG. 57 recognizes that it is not connected to device 5790 from signals 5752, 5756, and 5763 from interface 5751, controller 5757 may instruct, via 5758, transceiver 5761 and communication antenna 5759 to stop the communication function.

Moreover, power transmission device 5750 may include a function for recognizing a required current (or power) for power transmission and a required current (or power) for communication via controller 5757, and notifying that current (or power) is insufficient in the supply of power 5752 from interface 5751 (for example, by causing a lamp such as a light emitting diode (LED) to emit light).

Embodiment 11

Each of the wireless communication methods using a plurality of antennas described in the above embodiments is one example of a wireless communication method that is applicable to a communication system. The wireless communication method used by the communication system may be a communication method that performs communication using a device other than an antenna such as an optical communication device. In other words, in the present specification, when the communication device, the transmitting device, the receiving device and the like perform communication, optical communication using visible light, for example, may be used. Hereinafter, a specific example related to visible light communication will be given as an example of optical communication. First, a first visible light communication example which is one example of a visible light communication method applicable to each embodiment of the present disclosure will be given.

<Line Scan Sampling>

Smartphones and digital cameras, for example, are equipped with an image sensor such as a CMOS (Complementary Metal Oxide Semiconductor) sensor. For example, the entire scene in a single image captured by the CMOS sensor is not captured at a single instant, but rather, for example, captured line by line using a rolling shutter method, whereby the sensor reads out the amount of light received line by line. Accordingly, taking the readout time into account, the starting and stopping of the reception of light is controlled so that there is a time shift from line to line. In other words, images captured by the CMOS sensor are constructed from a plurality of lines captured with a slight time lag between each line.

Figure 69:
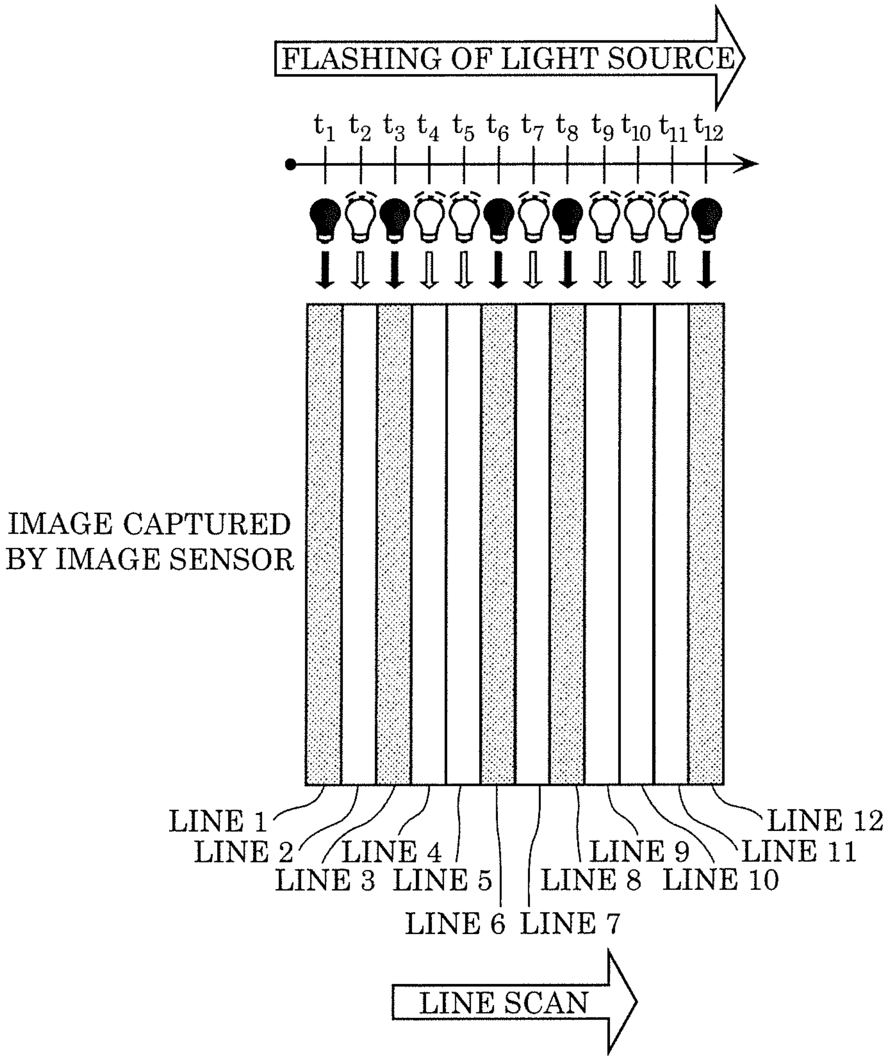
FIG. 69 illustrates the principle behind line scan sampling.

In the first example of a visible light communication method, high-speed reception of visible light signals is achieved based on a method that focuses on the characteristics of the CMOS sensor. In other words, in the first example of a visible light communication method, by utilizing the slight difference in exposure time between lines, the luminance and color of the light source at a plurality of points in time can be measured line by line, from a single image (image captured by the image sensor, i.e., "captured image"), making it possible to capture a modulated signal faster than the frame rate of the image sensor, as illustrated in FIG. 69.

Hereinafter, this sampling technique is referred to as "line scan sampling", and one line of pixels that are exposed at the same time is referred to as an "exposure line".

Note that line scan sampling can be implemented using the rolling shutter scheme of a CMOS sensor, but even when the rolling shutter scheme is implemented using a sensor other than a CMOS sensor, such as a charge-coupled device (CCD) sensor or an organic CMOS sensor, the line scan sampling can be implemented in the same manner.

Figure 70:
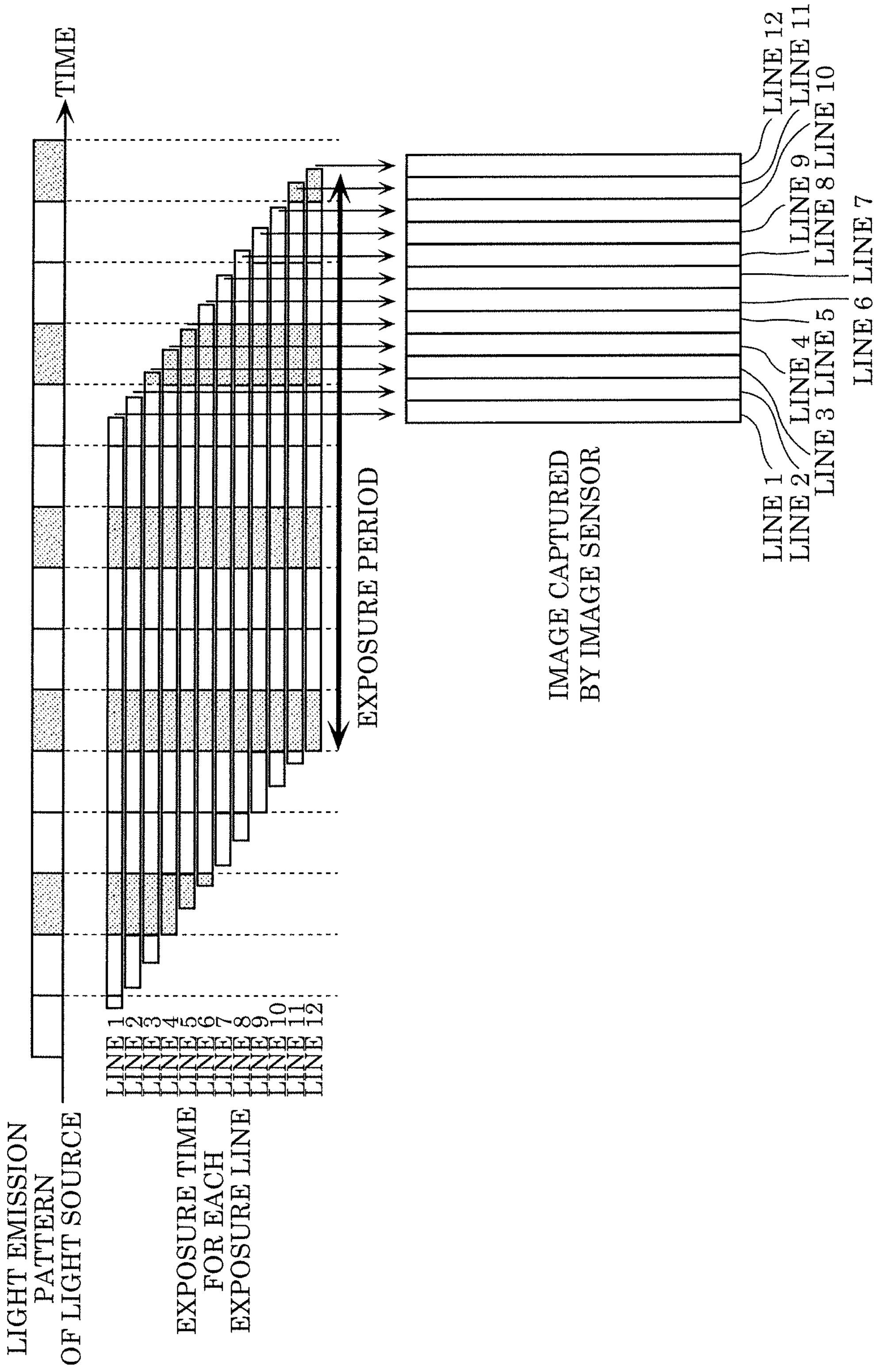
FIG. 70 illustrates one example of a captured image when exposure time is long.

However, when the photography setting for photographing an image using the camera function (the function for capturing a video or still image) is used, even if a rapidly flashing light source is captured, the flashing will not appear as a striped pattern extending along the exposure lines. This is because, with this setting, since the exposure time is sufficiently longer than the flash cycle, as illustrated in FIG. 70, the change in luminance resulting from the light source flashing (light-emission pattern) is uniform, whereby the variation in pixel values between exposure lines is small, resulting in a substantially uniform image.

Figure 71:
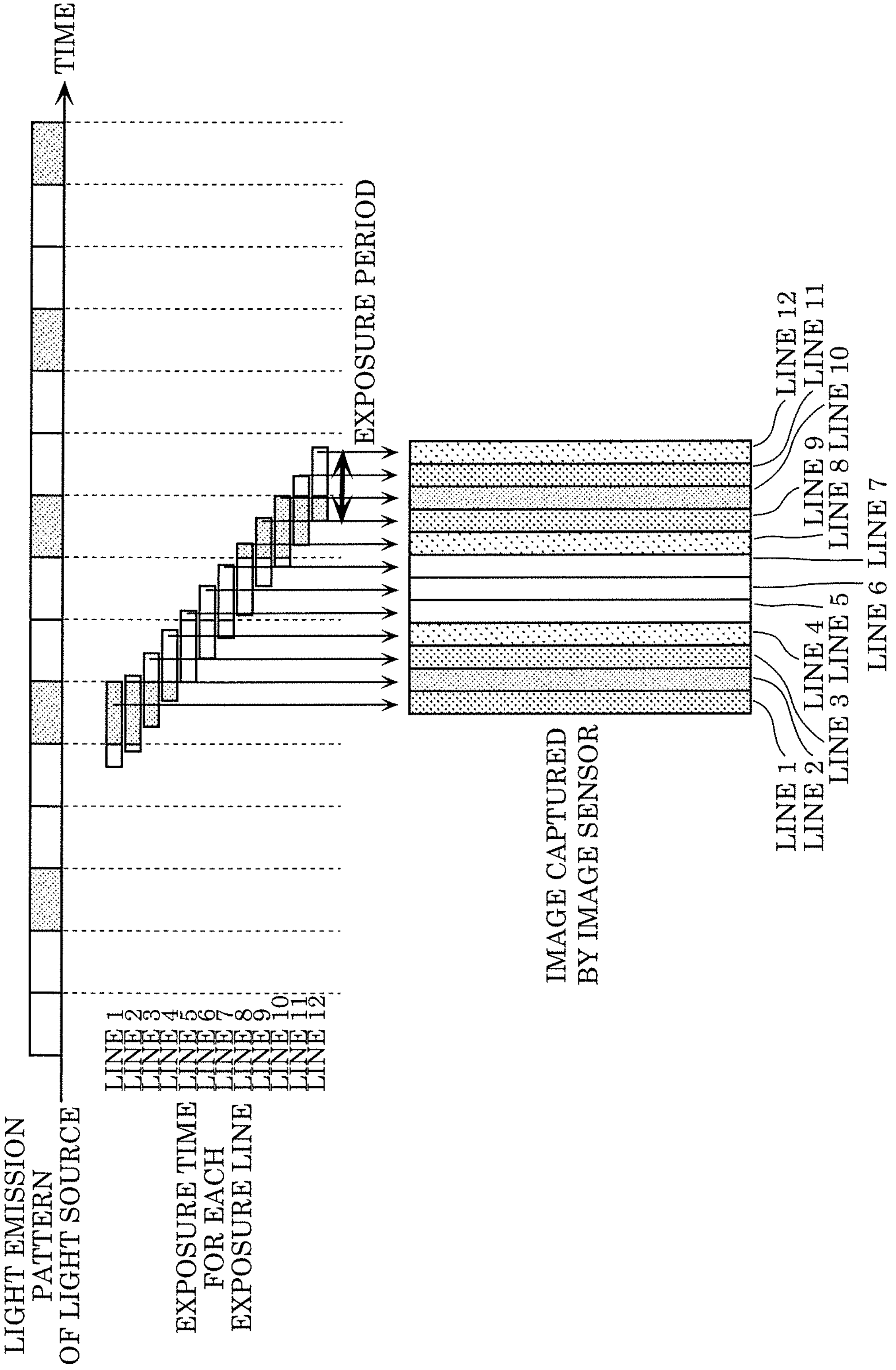
FIG. 71 illustrates one example of a captured image when exposure time is short.

In contrast, by setting the exposure time to the flash cycle of the light source as illustrated in FIG. 71, the state of the flashing of the light source (light-emission pattern) can be observed as a change in luminance between exposure lines. In FIG. 71, the length of the exposure period is set slightly longer than the length of the shortest period of a continuous light-emitting state, and the difference in start times of exposure periods between adjacent exposure lines is set longer than the shortest period of a continuous light-emitting state, but the exposure period setting in line scan sampling is not limited to this example. For example, the length of the exposure period may be set shorter than the shortest period of a continuous light-emitting state, and may be set to approximately double the length of the shortest period of a continuous light-emitting state. Moreover, in addition to a method in which the optical signal is expressed as, for example, a combination of square waves like illustrated in FIG. 72A, a method in which the optical signal continuously changes may be used as the optical communication method. In any case, with respect to the sampling rate required to receive and demodulate optical signals, a reception device that uses an optical communication method sets the difference between start times or end times between temporally neighboring exposure lines to be less than or equal to the sampling interval corresponding to the sampling rate. Moreover, the reception device having an optical communication method sets the length of the exposure period to be less than or equal to the length of the sampling interval. However, the reception device having an optical communication method may set the length of the exposure period to less than or equal to 1.5 times the sampling interval, and may set the exposure period to less than or equal to 2 times the sampling interval.

For example, exposure lines are designed so as to be parallel to the lengthwise direction of the image sensor. In such cases, in one example, assuming the frame rate is 30 fps (frames per second), at a resolution of 1920×1080, 32,400 or more samples are obtained each second, and at a resolution of 3840×2160, 64,800 or more samples are obtained each second.

<Line Scan Sampling Application Example>

Note that in the above description, line scan sampling in which a signal that indicates an amount of light received per line is read out is described, but the method of sampling optical signals using an image sensor such as a CMOS sensor is not limited to this line scan sampling example. A variety of methods that can obtain signals sampled at a sampling rate higher than the frame rate used in typical video capturing can be implemented as a sampling method used for optical signal reception. For example, a method of controlling the exposure time per pixel and reading out a signal or a method of controlling the exposure time per group of pixels arranged in a shape other than a line and reading out a signal may be used by utilizing a global shutter method that has a shutter function for each pixel. Moreover, a method may be used in which a signal is read out a plurality of times from the same pixel during a period corresponding to a single frame in the frame rate used in typical video capturing.

<Frame Sampling>

Furthermore, by employing a frame rate method that gives a shutter function to each pixel, it is possible to sample optical signals even in a method that speeds up the frame rate.

For example, the embodiments to be described hereinafter can be realized in any of the methods described above: "Line Scan Sampling", "Line Scan Sampling Application Example", and "Frame Sampling".

<Light Source and Modulation Scheme>

In visible light communication, for example, instead of an antenna, a light emitting element such as an LED (Light Emitting Diode) or organic electroluminescent (EL) element can be used as a transmitter. LEDs and organic EL elements are commonly used as light sources in display backlights, and are capable of rapidly flashing.

However, light sources that are used as visible light communication transmitters cannot be allowed to flash uncontrolled when performing visible light communication depending on the application of the light source. When a light source that provides a function that is not visible light communication, such as a lighting function, is used for visible light communication, if the changes in luminance made for visible light communication are recognizable to the human eye, the original functionality of a light source as a lamp will be lost. Accordingly, the transmission signal needs to be emitted at a desired brightness and needs to be imperceptible to the human eye.

Figure 72A:
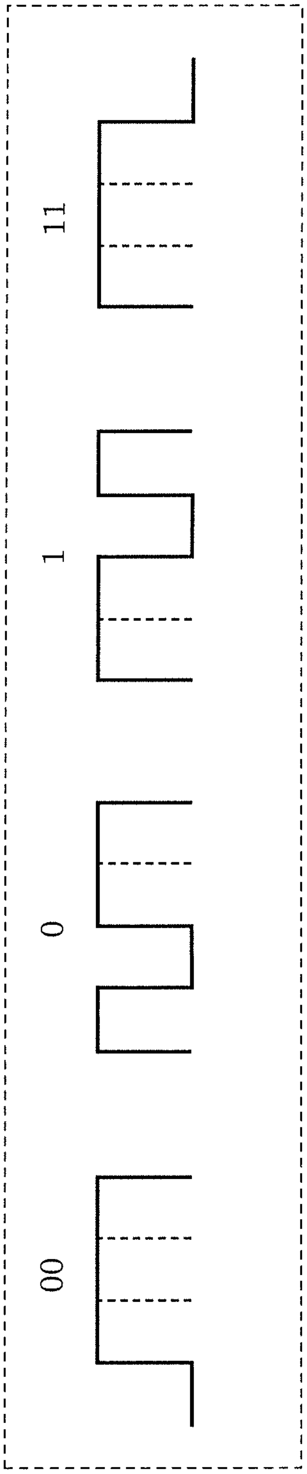
FIG. 72A is for illustrating a 4 PPM modulation scheme.

One example of a modulation scheme that satisfies these conditions is 4 PPM (4-Pulse Position Modulation). As illustrated in FIG. 72A, 4 PPM is a scheme in which two bits are expressed by a group of four time slots each indicating either bright or dark light emitted by a light source. Moreover, as illustrated in FIG. 72A, in 4 PPM, three of the four slots are bright and one of the slots is dark. Accordingly, regardless of the content of the signal, the average brightness (average luminance) is ¾=75%.

Figure 72B:
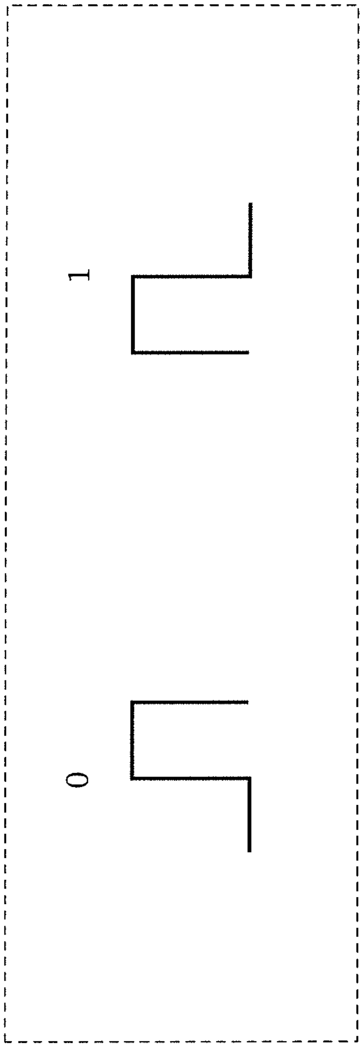
FIG. 72B is for illustrating Manchester coding scheme.

For comparison, one example of a similar scheme is Manchester encoding illustrated in FIG. 72B. In the Manchester coding scheme, one bit is expressed with two states, and the modulation efficiency is 50%, which is the same as 4 PPM, but among the two states, one is bright and one is dark, so the average luminance is ½=50%. In other words, 4 PPM is more suitable than Manchester encoding as a modulation scheme for visible light communication. However, since communication capability is not adversely affected by changes in luminance from visible light communication that are recognizable to the human eye, depending on the application, there may be no problem in using a method in which the changes in luminance are recognizable to the human eye. Accordingly, the transmitter (light source) may use, for example, an amplitude shift keying (ASK) method, a phase shift keying (PSK) method, or a pulse amplitude modulation (PAM) method to generate the modulated signal and pulse the light source to emit light.

<Example of Overall Configuration of Communication System>

Figure 73:
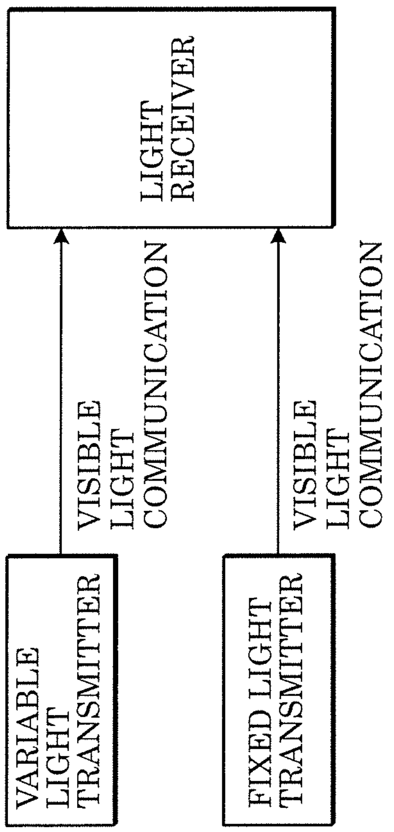
FIG. 73 illustrates an example of a configuration of a visible light communication system.

As illustrated in FIG. 73, the communication system that performs visible light communication includes at least a transmitter that transmits (emits) optical signals and a receiver that receives optical signals. For example, there are two types of transmitters: a variable light transmitter that changes the transmission content depending on the image or content to be displayed or depending on time or depending on the communication partner; and a fixed light transmitter that continues transmitting fixed transmission content. However, even with a configuration including only either the variable light transmitter or the fixed light transmitter, a communication system that communicates via light can be realized.

The receiver can receive an optical signal from the transmitter, obtain, for example, relevant information associated with the optical signal, and provide it to the user.

As shown above, even when a transmitter that transmits optical signals and a receiver that receives optical signals are applied to each embodiment in the present specification, each embodiment can be carried out in the same manner.

This concludes the summary of the visible light communication method, but communication methods applicable to the light communication are not limited to this example. For example, the light emitter in the transmitter may transmit data using a plurality of light sources. Moreover, the light receiver in the reception device need not be an image sensor such as a CMOS sensor, and may employ a communication method that can use a device that is capable of converting an optical signal into an electrical signal, such as a photodiode. In such cases, since there is no need to perform sampling using the above-described line scan sampling, such a light receiver is applicable even to methods that require 32,400 or more samples per second. Moreover, depending on the application, for example, a wireless communication method that uses light in frequencies outside of the visible light range, such as infrared light or ultraviolet light, may be used.

Note that although the configuration illustrated in FIG. 73 is described as one example of a communication system that performs visible light communication, the configuration of the communication system that performs visible light communication is not limited to the configuration illustrated in FIG. 73. Hereinafter, a second visible light communication example which is one example of a visible light communication method applicable to each embodiment will be given.

Embodiment 12

Figure 74:
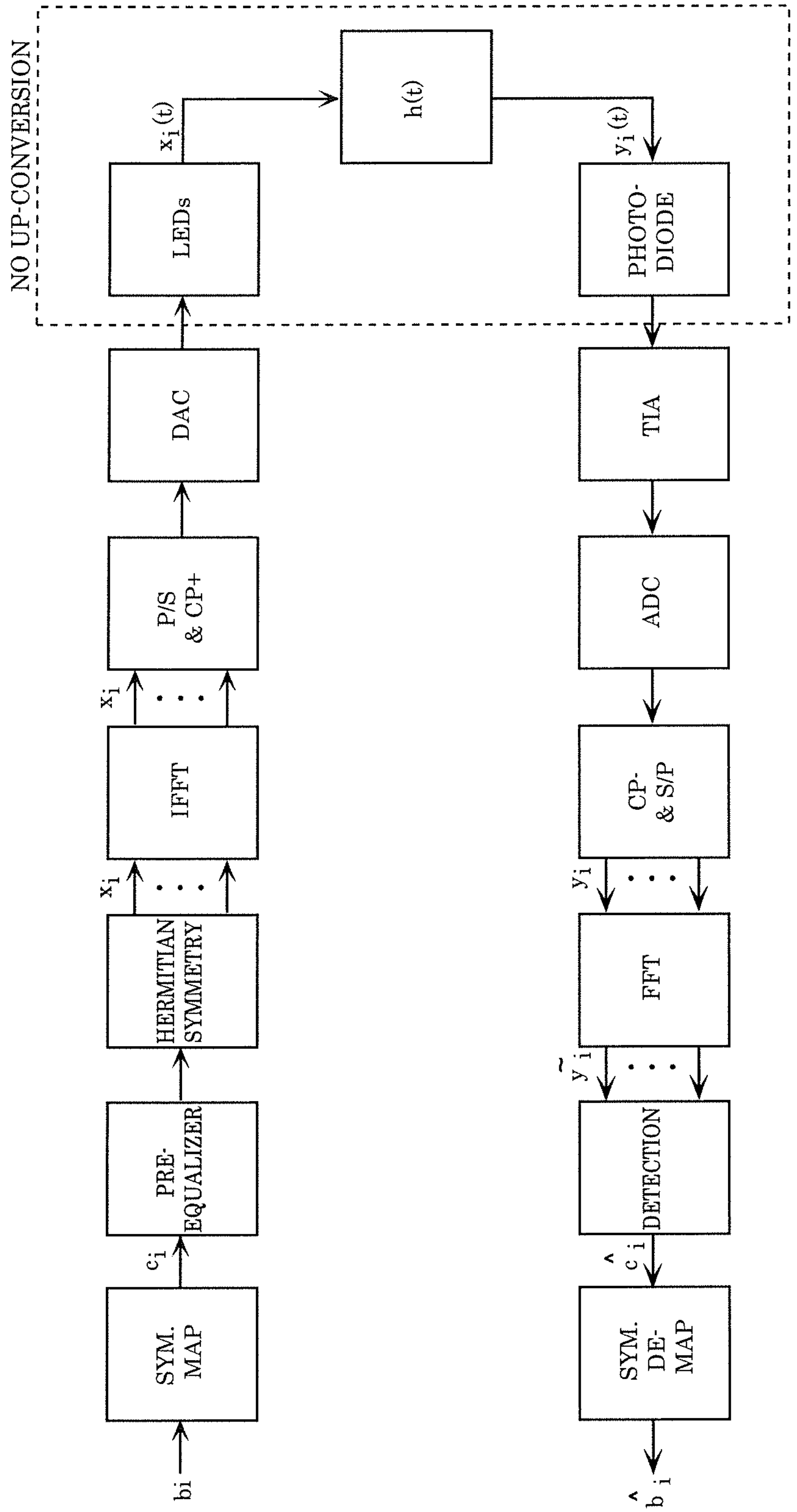
FIG. 74 illustrates an example of a configuration of another communication system that performs optical communication.

In the present embodiment, a supplemental description will be given regarding FIG. 74. The configuration of the communication system that performs visible light communication may be, for example, a configuration like that illustrated in FIG. 74 (see, for example, "IEEE 802.11-16/1499r1"). In FIG. 74, the transmission signal is transmitted as an optical signal in a baseband bandwidth without being up-converted. In other words, a device that transmits the optical signal according to the present embodiment (i.e., a device including a light source) may have the configuration illustrated on the transmission-side in FIG. 74 (a configuration including elements from "Sym. Map" to "LEDs"), and a terminal that receives the optical signal according to the present embodiment may have the configuration illustrated on the reception-side in FIG. 74 (a configuration including elements from "Photo-Diode" to "Sym. DE-MAP").

FIG. 74 will be described in more detail. The symbol mapper receives an input of transmission data, performs mapping based on a modulation scheme, and outputs a symbol sequence (ci).

The pre-equalizer receives an input of the symbol sequence, performs pre-equalizing processing on the symbol sequence to reduce the equalizing processes on the reception-side, and outputs a pre-equalized symbol sequence.

The Hermitian symmetry processor receives an input of the pre-equalized symbol sequence, allocates sub-carriers to the pre-equalized symbol sequence to secure Hermitian symmetry, and outputs parallel signals.

The inverse (fast) Fourier transformer receives inputs of the parallel signals, applies an inverse (fast) Fourier transform to the parallel signals, and outputs inverse (fast) Fourier transformed signals.

The parallel serial and cyclic prefix adder receives an input of the inverse (fast) Fourier transformed signals, performs parallel conversion and adds cyclic prefix, and outputs the signal-processed signal.

The digital-to-analog converter receives an input of the signal-processed signal, performs digital-to-analog conversion, outputs an analog signal, and the analog signal is emitted as light from, for example, one or more LEDs.

Note that the pre-equalizer and the Hermitian symmetry processor need not be included. In other words, there may be instances in which the pre-equalizer and the Hermitian symmetry processor do not perform their respective signal processing.

The photodiode receives an input of light, and obtains a reception signal via a transimpedance amplifier (TIA).

The analog-to-digital converter performs an analog-to-digital conversion on the reception signal, and outputs a digital signal.

The cyclic prefix subtractor and serial parallel converter receives an input of the digital signal, subtracts the cyclic prefix, and then performs serial parallel conversion, and receives an input of parallel signals.

The (fast) Fourier transformer receives inputs of the parallel signals, applies a (fast) Fourier transform to the parallel signals, and outputs (fast) Fourier transformed signals.

The detector receives inputs of the (fast) Fourier transformed signals, performs detection, and outputs a series of reception symbols.

The symbol demapper receives an input of the series of reception symbols, performs demapping, and obtains a series of reception data.

Note that FIG. 74 is one non-limiting example; it goes without saying that the present embodiment can be carried out regardless of whether the transmitting device and receiving device support a multi-carrier method such as orthogonal frequency division multiplexing (OFDM) or support a single carrier scheme like described below.

Accordingly, the configuration of the transmitting device and the configuration of the receiving device are not limited to the example given in FIG. 74. Note that examples of single carrier methods include Discrete Fourier Transform (DFT)-Spread Orthogonal Frequency Division Multiplexing (OFDM), Trajectory Constrained DFT-Spread OFDM, OFDM based Single Carrier (SC), Single Carrier (SC)-Frequency Division Multiple Access (FDMA), and Guard interval DFT-Spread OFDM.

Even when a transmitting device that transmits modulated optical signals and a receiving device that receives modulated optical signals are implemented in each embodiment according to the present specification in this way, the embodiments can be carried out in the same manner.

SUPPLEMENTAL DESCRIPTION

Hereinafter, supplemental description of the transmitting device, the receiving device, the transmitting method, and the receiving method according to the present disclosure will be given.

A transmitting device according to one aspect of the present disclosure includes a plurality of transmitting antennas, and further includes: a signal processor configured to generate a first baseband signal by modulating data of a first stream and generate a second baseband signal by modulating data of a second stream; a transmission unit configured to generate, from the first baseband signal, a plurality of first transmission signals having mutually different directivities, generate, from the second baseband signal, a plurality of second transmission signals having mutually different directivities, and transmit the plurality of first transmission signals and the plurality of second transmission signals at the same time. When a request for transmission of the first stream is received from a terminal, the transmission unit is further configured to generate, from the first baseband signal, a plurality of third transmission signals having mutually different directivities and being different from the plurality of first transmission signals, and transmit the plurality of third transmission signals.

Each transmission signal of the plurality of first transmission signals and the plurality of second transmission signals may include a control signal for notifying which one of the data of the first stream and the data of the second stream the transmission signal is for transmitting.

Each of the plurality of first transmission signals and the plurality of second transmission signals may include a training signal for a receiving device to perform directivity control.

A receiving device according to one aspect of the present disclosure includes a plurality of receiving antennas, and further includes: a reception unit configured to select at least one first signal and at least one second signal from among a plurality of first signals and a plurality of second signals that are transmitted at the same time by a transmitting device, the plurality of first signals having mutually different directivities and transfer data of a first stream, and the plurality of second signals having mutually different directivities and transfer data of a second stream, and perform directivity control for reception of the selected plurality of signals and receive the signals; a signal processor configured to demodulate the received signals and output data of the first stream and data of the second stream; and a transmission unit configured to, when the at least one first signal is not received by the reception unit, request the transmitting device to transmit the first stream.

The reception unit may be configured to select the at least one first signal and the at least one second signal, based on a control signal included in each of a plurality of received signals, the control signal being for notifying which one of the data of the first stream and the data of the second stream the signal is for transmitting.

The reception unit may be configured to perform directivity control using a training signal included in each of the plurality of received signals.

A transmitting method according to one aspect of the present disclosure is executed by a transmitting device including a plurality of transmission antennas, and includes: (a) generating a first baseband signal by modulating data of a first stream and generating a second baseband signal by modulating data of a second stream; and (b) generating, from the first baseband signal, a plurality of first transmission signals having mutually different directivities, generating, from the second baseband signal, a plurality of second transmission signals having mutually different directivities, and transmitting the plurality of first transmission signals and the plurality of second transmission signals at the same time. When a request for transmission of the first stream is received from a terminal, (b) further includes generating, from the first baseband signal, a plurality of third transmission signals having mutually different directivities and being different from the plurality of first transmission signals, and transmitting the plurality of third transmission signals.

A receiving method according to one aspect of the present disclosure is executed in a receiving device including a plurality of receiving antennas, and includes: (a) selecting at least one first signal and at least one second signal from among a plurality of first signals and a plurality of second signals that are transmitted at the same time by a transmitting device, the plurality of first signals having mutually different directivities and transfer data of a first stream, and the plurality of second signals having mutually different directivities and transfer data of a second stream, and performing directivity control for reception of the selected plurality of signals and receiving the signals; (b) demodulating the received signals and outputting data of the first stream and data of the second stream; and, when the at least one first signal is not received in (a), (c) requesting the transmitting device to transmit the first stream.

According to the present disclosure, compared to when a pseudo-omnidirectional pattern antenna is used, it is possible to increase the communication distance in multicast/broadcast communication of a plurality of streams.

A communication system according to one aspect of the present disclosure includes one or more chargers and a server capable of communicating with the one or more chargers. The server obtains first information from a first vehicle via a first charger included in the one or more chargers, during charging of the first vehicle by the first charger, and supplies second information based on the first information to a second vehicle via a second charger included in the one or more chargers, during charging of the second vehicle by the second charger.

Note that the power transmission device according to the above embodiment (for example, power transmission device 5750 in FIG. 57) is one example of the charger. In the communication systems illustrated in FIG. 57 and FIG. 58, server 5821 is exemplified as communicating with a single power transmission device 5750, but server 5821 may communicate with a plurality of power transmission devices 5750 (for example, the “another device” described in Embodiment 10). For example, server 5821 may be capable of communicating with power transmission device 5750 illustrated in FIG. 57 (one example of the second charger) and another power transmission device which is one example of “another device” (one example of the first charger (not illustrated in the drawings)). The configuration of the other power transmission device may be the same as the configuration of power transmission device 5750.

Note that the vehicle is one example of the conveyance equipped with the communication device according to the above embodiment (for example communication device 5700 in FIG. 57). Moreover, "during charging of the . . . vehicle" includes, for example, charging of the communication device equipped in the vehicle via the power transmission device. Moreover, the charging of the vehicle is one example of a new form of service whereby the vehicle is charged while stopped in, for example, a parking lot. Moreover, although the communication system illustrated in FIG. 57 and FIG. 58 is exemplified as including a single communication device (for example, the vehicle equipped with the communication device), the communication system may include, for example, another communication device that communicates with another power transmission device (for example, another vehicle equipped with the other communication device). In other words, the communication system may include one vehicle equipped with communication device 5700 that is charged by power transmission device 5750 (this vehicle is one example of the second vehicle), and another vehicle that is charged by another power transmission device (this vehicle is one example of the first vehicle).

Note that data 5823 output to server 5821 by the other power transmission device may be data that is obtained via the other power transmission device from the first vehicle during charging of the first vehicle by the other power transmission device, and is one example of the first information. Server 5821 receives an input of data 5823 from the other power transmission device, which arrives at modem unit 5811 via a network. If necessary, modem unit 5811 transmits, as data 5809, data 5819 obtained from server 5821 (or a modulated signal including the data) to power transmission device 5750 illustrated in FIG. 57. Transmission signal 5764 output to communication device 5700 (that is, the second vehicle) from power transmission device 5750 may be a signal based on, for example, data 5809, and is one example of the second information supplied to the second vehicle during charging of the second vehicle by power transmission device 5750.

Note that when power transmission device 5750 is configured to be capable of charging a plurality of vehicles concurrently, the communication system may include a single power transmission device. Moreover, the vehicle is, for example, an electric automobile, which is an automobile that drives using an electric motor as a source of power which is electric, or a two-wheeled vehicle that drives using an electric motor as a source of power which is electric, but the vehicle is not limited to these examples.

Each of the one or more chargers may include: a power transmission coil for transmitting power to a vehicle; a first communication antenna for communicating with the vehicle, the first communication antenna being arranged inside the power transmission coil; and a second communication antenna for communicating with the vehicle, the second communication antenna being arranged outside the power transmission coil.

A communication method according to one aspect of the present disclosure includes: obtaining first information from a first vehicle via a first charger included in one or more chargers, during charging of the first vehicle by the first charger; and supplying second information based on the first information to a second vehicle via a second charger included in the one or more chargers, during charging of the second vehicle by the second charger.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

It is possible for the present disclosure to facilitate, for example, improvement in the performance of a communication system and the provision of new services.

What is claimed is:

1. A communication apparatus comprising:

a first access point that, in operation, communicates with one or more terminals according to a first communication scheme;

a second access point that, in operation, communicates with a server according to a second communication scheme;

a storage; and a processor that, in operation, performs:

in a first mode, receiving a first transfer data via the first access point;

storing the first transfer data in the storage; and transmitting the first transfer data stored in the storage to the server via the second access point;

in a second mode, receiving a second transfer data via the first access point; and transmitting the second transfer data to the server via the second access point without storing the second transfer data in the storage.

2. The communication apparatus according to claim 1, wherein the communication apparatus transmits a control signal to notify that the communication apparatus comprises the storage for the first mode prior to receiving the first transfer data.

3. The communication apparatus according to claim 1, wherein the communication apparatus receives an acknowledgement of receiving the first transfer data from the server, and the communication apparatus deletes the first transfer data in response to the acknowledgement.

4. The communication apparatus according to claim 1, wherein the communication apparatus further comprises a power supply device to supply power to the one or more terminals.

5. A communication method performed by a communication apparatus comprising a first communication device, a second communication device, and a storage, the communication method comprising:

communicating with one or more terminals according to a first communication scheme;

communicating with a server according to a second communication scheme;

in a first mode, receiving a first transfer data via the first communication device;

storing the first transfer data in the storage; and transmitting the first transfer data stored in the storage to the server via the second communication device;

in a second mode, receiving a second transfer data via the first communication device; and transmitting the second transfer data to the server via the second communication device without storing the second transfer data in the storage.

6. The communication method according to claim 5, wherein the communication method further comprising:

transmitting a control signal to notify that the communication apparatus comprises the storage for the first mode prior to receiving the first transfer data.

7. The communication method according to claim 5, wherein the communication method further comprising:

receiving an acknowledgement of receiving the first transfer data from the server; and deleting the first transfer data in response to the acknowledgement.

8. The communication method according to claim 5, wherein the communication apparatus further comprises a power supply device, the communication method further comprising supplying power to one of the one or more terminals.

* * * * *